(12) United States Patent
Campbell et al.

(10) Patent No.: US 12,403,419 B1
(45) Date of Patent: Sep. 2, 2025

(54) FILTER ELEMENTS AND ASSEMBLIES

(71) Applicant: Donaldson Company, Inc., Bloomington, MN (US)

(72) Inventors: Steven K. Campbell, Lakeville, MN (US); Gunther Van De Poel, Waanrode (BE)

(73) Assignee: Donaldson Company, Inc., Bloomington, MN (US)

( * ) Notice: Subject to any disclaimer, the term of this patent is extended or adjusted under 35 U.S.C. 154(b) by 0 days.

(21) Appl. No.: 19/210,888

(22) Filed: May 16, 2025

Related U.S. Application Data

(60) Provisional application No. 63/768,562, filed on Mar. 7, 2025, provisional application No. 63/715,456, filed
(Continued)

(51) Int. Cl.
B01D 46/24 (2006.01)

(52) U.S. Cl.
CPC .... B01D 46/2414 (2013.01); *B01D 2265/021* (2013.01); *B01D 2265/06* (2013.01); *B01D 2271/027* (2013.01); *B01D 2279/60* (2013.01)

(58) Field of Classification Search
CPC ........ B01D 2271/027; B01D 2265/021; B01D 2265/06; B01D 46/2414; B01D 2279/60; B01D 2201/347
See application file for complete search history.

(56) References Cited

U.S. PATENT DOCUMENTS

| 4,159,197 A | 6/1979 | Schuler et al. |
| 4,925,561 A | 5/1990 | Ishii et al. |
(Continued)

FOREIGN PATENT DOCUMENTS

| DE | 2709000 | 9/1978 |
| DE | 19838401 | 4/1999 |
| DE | 19944344 | 3/2000 |
| DE | 102004033550 | 2/2006 |
(Continued)

OTHER PUBLICATIONS

Extended European Search Report for EP25177106.9 mailed Jun. 30, 2025.
(Continued)

*Primary Examiner* — Robert Clemente
(74) *Attorney, Agent, or Firm* — Merchant & Gould P.C.

(57) ABSTRACT

A filter cartridge can include a media pack including media extending between a first end and a second end along a longitudinal axis; an end cap secured to the media and including: a seal member presenting a radially inward or outward facing seal surface, the seal member being formed from a first material; and a support structure including a base part and a plurality of spaced apart, radially flexible extensions, the support structure being formed from a second material harder and/or stiffer than the first material. At least a portion of the base part is covered by and/or embedded within the first material, and the plurality of flexible extensions includes an exposed portion that is uncovered by and/or embedded within the first material and defines an axial end of the filter cartridge and is coincident with a radial innermost portion of the end cap. The seal surface and the exposed portion of the flexible extensions are axially aligned such that a plane orthogonal to the longitudinal axis can pass through the seal member and through the exposed portion of the plurality of flexible extensions.

20 Claims, 96 Drawing Sheets

Related U.S. Application Data on Nov. 1, 2024, provisional application No. 63/649,173, filed on May 17, 2024.

(56) References Cited

U.S. PATENT DOCUMENTS

| | | |
|---|---|---|
| 5,049,326 A | 9/1991 | Matsumoto et al. |
| 5,474,337 A | 12/1995 | Nepsund et al. |
| 5,562,825 A | 10/1996 | Yamada et al. |
| 5,613,992 A | 3/1997 | Engel |
| 5,736,040 A | 4/1998 | Duerrstein |
| 5,772,883 A | 6/1998 | Rothman et al. |
| D396,098 S | 7/1998 | Gillingham et al. |
| 5,792,247 A | 8/1998 | Gillingham et al. |
| D398,046 S | 9/1998 | Gillingham et al. |
| D399,944 S | 10/1998 | Gillingham et al. |
| 5,820,646 A | 10/1998 | Gillingham et al. |
| 5,895,574 A | 4/1999 | Friedmann et al. |
| 5,902,364 A | 5/1999 | Tokar et al. |
| 6,039,778 A | 3/2000 | Coulonvaux |
| D428,128 S | 7/2000 | Gillingham et al. |
| 6,179,890 B1 | 1/2001 | Ramos et al. |
| D437,401 S | 2/2001 | Ramos et al. |
| 6,190,432 B1 | 2/2001 | Gieseke et al. |
| 6,210,469 B1 | 4/2001 | Tokar |
| 6,235,195 B1 | 5/2001 | Tokar |
| 6,350,291 B1 | 2/2002 | Gieseke et al. |
| 6,673,136 B2 | 1/2004 | Gillingham et al. |
| 6,837,920 B2 | 1/2005 | Gieseke et al. |
| 7,282,077 B2 | 10/2007 | Honisch et al. |
| 7,520,913 B2 | 4/2009 | Mills et al. |
| 7,625,419 B2 | 12/2009 | Nelson et al. |
| 7,897,046 B2 | 3/2011 | Fick |
| 8,128,724 B2 | 3/2012 | Mills et al. |
| 8,147,576 B2 | 4/2012 | Gillenberg et al. |
| 8,152,876 B2 | 4/2012 | Gillenberg et al. |
| 8,163,056 B2 | 4/2012 | Coulonvaux et al. |
| 8,354,023 B2 | 1/2013 | Wallerstorfer et al. |
| 8,424,686 B2 | 4/2013 | Ehrenberg et al. |
| 8,479,924 B2 | 7/2013 | Mbadinga-Mouanda et al. |
| 8,524,078 B2 | 9/2013 | Wawrla et al. |
| 8,747,512 B2 | 6/2014 | Mills et al. |
| 9,089,805 B2 | 7/2015 | Lepine et al. |
| 9,254,457 B2 | 2/2016 | Kaufmann et al. |
| 9,498,743 B2 | 11/2016 | Dhiman et al. |
| 9,776,118 B2 | 10/2017 | Fedak |
| 9,919,254 B2 | 3/2018 | Campbell et al. |
| 9,919,256 B2 | 3/2018 | Mbadinga-Mouanda et al. |
| 9,932,943 B2 | 4/2018 | Brown et al. |
| 10,137,390 B2 | 11/2018 | Jokschas et al. |
| 10,518,198 B2 | 12/2019 | Page et al. |
| 10,576,403 B2 | 3/2020 | Osendorf et al. |
| 10,589,203 B1 | 3/2020 | Golinsky et al. |
| 10,744,444 B2 | 8/2020 | Fritzsching et al. |
| 10,874,970 B2 | 12/2020 | Malgorn et al. |
| 11,215,205 B2 | 1/2022 | Pastori |
| 11,331,612 B2 | 5/2022 | Movia et al. |
| 11,426,691 B2 | 8/2022 | Decoster et al. |
| 11,486,411 B2 | 11/2022 | Purdey |
| 11,773,812 B2 | 10/2023 | Holzmann et al. |
| 11,969,686 B2 | 4/2024 | Schwartz et al. |
| 11,969,687 B2 | 4/2024 | Holzmann et al. |
| 11,975,283 B2 | 5/2024 | Louison et al. |
| 11,975,284 B2 | 5/2024 | Baseotto et al. |
| 12,076,676 B2 | 9/2024 | Bannister et al. |
| 2004/0104537 A1 | 6/2004 | McArthy |
| 2004/0187689 A1 | 9/2004 | Sporre et al. |
| 2005/0130508 A1 | 6/2005 | Yeh |
| 2006/0174598 A1* | 8/2006 | Mills ............ B01D 46/58 55/499 |
| 2007/0209146 A1 | 9/2007 | Mersmann et al. |
| 2008/0092501 A1 | 4/2008 | Sporre et al. |
| 2008/0282890 A1 | 11/2008 | Rocklitz et al. |
| 2009/0127211 A1 | 5/2009 | Rocklitz et al. |
| 2010/0032365 A1 | 2/2010 | Moe et al. |
| 2012/0060453 A1 | 3/2012 | Holzmann et al. |
| 2014/0165834 A1 | 6/2014 | Kaufmann et al. |
| 2014/0208705 A1 | 7/2014 | Krull |
| 2017/0030384 A1 | 2/2017 | Pastori |
| 2018/0207566 A1 | 7/2018 | Stanhope et al. |
| 2021/0101097 A1 | 4/2021 | Rathsmann et al. |
| 2021/0379522 A1 | 12/2021 | Von Seggern et al. |
| 2022/0305421 A1 | 9/2022 | Wijadi et al. |
| 2022/0387921 A1 | 12/2022 | Louison |
| 2023/0032889 A1 | 2/2023 | Holzmann et al. |
| 2023/0149842 A1 | 5/2023 | Schmid et al. |
| 2023/0166207 A1 | 6/2023 | Louison et al. |
| 2023/0264129 A1 | 8/2023 | Cesar Proenca Ribeiro et al. |
| 2023/0264130 A1 | 8/2023 | Canik |
| 2023/0390687 A1 | 12/2023 | Louison et al. |
| 2024/0066452 A1 | 2/2024 | Burton et al. |
| 2024/0109015 A1 | 4/2024 | Epli et al. |
| 2024/0238713 A1 | 7/2024 | Finn |
| 2024/0269599 A1 | 8/2024 | Louison et al. |

FOREIGN PATENT DOCUMENTS

| | | |
|---|---|---|
| DE | 102009060517 | 7/2010 |
| DE | 202009018835 | 11/2013 |
| DE | 102014007118 | 11/2014 |
| DE | 102013014498 | 3/2015 |
| EP | 0867215 | 9/1998 |
| EP | 1106232 | 6/2001 |
| EP | 1144078 | 4/2003 |
| EP | 1520611 | 4/2005 |
| EP | 2764904 | 8/2014 |
| EP | 3549654 | 10/2019 |
| EP | 3892352 | 10/2021 |
| EP | 4124374 | 10/2023 |
| EP | 4335532 | 3/2024 |
| FR | 2573322 | 5/1986 |
| GB | 1327382 | 8/1973 |
| WO | 9740918 | 11/1997 |
| WO | 200347722 | 6/2003 |
| WO | 2004007054 | 1/2004 |
| WO | 2004082795 | 9/2004 |
| WO | 2005077487 | 8/2005 |
| WO | 2012172019 | 12/2012 |
| WO | 2016077377 | 5/2016 |
| WO | 2020163756 | 8/2020 |

OTHER PUBLICATIONS

Invitation to Pay Additional Fees for PCT/US2025/029843 mailed Jul. 1, 2025.

Invitation to Pay Additional Fees for PCT/US2025/029824 mailed Jul. 1, 2025.

* cited by examiner

FILTER ELEMENTS AND ASSEMBLIES

RELATED APPLICATIONS

This application claims the benefit of U.S. Provisional Application Ser. No. 63/768,562, filed on Mar. 7, 2025; U.S. Provisional Application Ser. No. 63/715,456, filed on Nov. 1, 2024; and U.S. Provisional Application Ser. No. 63/649,173, filed on May 17, 2024, the disclosures of which are hereby incorporated by reference in their entireties.

FIELD OF THE DISCLOSURE

The present disclosure relates to the field of gas filtration, such as, for instance air filtration. It relates to the field of filter assemblies comprising a filter element which is arranged in a filter housing in a sealing manner, such that air passing from an inlet of the housing to an outlet of the housing is filtered by the filter element. Preferably the assemblies are used for filtering air that is afterwards directed to an engine of, for instance, a vehicle.

BACKGROUND

Filter elements, also named filter cartridges, are used for a wide variety of filtering applications and the fluid to be filtered can be a liquid or a gas, e.g., air.

Indeed, in many instances, it is desired to filter contaminant material from a fluid stream. For example, airflow streams to engines for motorized vehicles or for power generation equipment, construction equipment or other equipment, gas streams to gas turbine systems and air streams to various combustion furnaces, carry particulate contaminant therein. It is preferred for such systems that contaminant materials be removed from the fluid or at least be reduced.

Filter elements comprise filter media for removing contaminant materials when the fluid flows through the filter media. Commonly used and commercially available filter media are, for example, pleated media or fluted media. When the filter media is loaded with dust and/or particles above a certain threshold load, a filter element needs to be replaced. Filter elements are typically installed in the housing in a replaceable manner.

There is a need in industry for new solutions which allow an easy installation of a correct filter element in a filter housing, especially complex filter housing designs, and which would not allow the installation of a wrong filter element. Complex filter housing designs can, for instance, be a result of boundary conditions imposed by the geometry and positioning of other vehicle/engine components.

SUMMARY

An air filter cartridge for use within a housing assembly of an air cleaner can include a media pack including filter media extending from a first end to a second end and forming a tubular shape having a hollow center; a first end cap operably arranged at the media pack first end, the first end cap including: a seal member presenting an inner radial side defining a seal surface and presenting an outer radial side, the inner radial side and the outer radial side each having a generally polygonal shape formed by a plurality of flat sides and adjoining corner portions; and a seal support arrangement including a plurality of support members located adjacent the flat sides of the seal member outer radial side such that the corner portions of the outer radial side are unsupported by the plurality of support members.

In some examples, each of the plurality of support members extend in an axial direction parallel with the seal surface.

In some examples, the plurality of support members equals the number of the plurality of flat sides of the seal member outer radial side.

In some examples, the plurality of support members define an axial distal end of the filter cartridge.

In some examples, the seal member is formed from a first material and the plurality of support members are formed from a second material different from the first material.

In some examples, the plurality of flat sides includes one flat side having a different length in comparison to at least one other of the plurality of flat sides.

An air filter cartridge for use within a housing assembly of an air cleaner can include a media pack including filter media extending from a first end to a second end and forming a tubular shape having a hollow center; a first end cap operably arranged at the media pack first end, the first end cap including: a seal member presenting an inner radial side and an outer radial side, the inner radial side defining a seal surface having a generally polygonal shape formed by a plurality of flat sides and adjoining corner portions; and a seal support arrangement including a plurality of support members located radially outward from the seal surface and being radially aligned with the flat sides such that the seal surface corner portions are radially aligned with gaps formed between adjacent support members.

In some examples, the number of gaps between the plurality of support members equals the number of seal surface corner portions such that each of the gaps is radially aligned with one of the seal surface corner portions.

In some examples, the seal member outer radial side defines a generally polygonal shape having a second plurality of flat sides and adjoining corner portions, where the plurality of support members are located adjacent the second plurality of flat sides.

In some examples, an exposed portion of the plurality of support members defines an axial distal end of the filter cartridge.

In some examples, the seal member is formed from a first material and the plurality of support members are formed from a second material that is different from the first material.

In some examples, the plurality of flat sides includes one flat side having a different length in comparison to at least one other of the plurality of flat sides.

In some examples, each of the plurality of support members extend in an axial direction that is generally parallel with the seal surface.

An air filter cartridge can include a media pack including media defining an outer perimeter extending along a longitudinal axis between a first axial end and a second axial end; and a seal member operably arranged on the media pack, the seal member presenting a seal surface having a generally polygonal shape with flat sides and adjoining corner portions, where the seal surface is at least partially located between the media pack first and second axial ends, is spaced from the media pack outer perimeter, and faces in a radially inward direction towards the media pack outer perimeter.

In some examples, the end cap further includes a support structure including a base part and a plurality of spaced apart reinforcement members.

In some examples, the plurality of reinforcement members are located adjacent a radially outward facing side of the seal member and are radially aligned with the flat sides of the seal member such that gaps between adjacent reinforcement members are radially aligned with the seal surface corner portions.

In some examples, the support structure is formed from a first material that is different from a second material associated with the seal member.

In some examples, the plurality of flat sides of the seal surface have a first length and the plurality of support members have a second length that is a majority of the first length.

In some examples, each of the plurality of support members extends in an axial direction parallel with the seal surface.

In some examples, the plurality of flat sides includes one flat side having a different length in comparison to at least one other of the plurality of flat sides.

An air filter cartridge for use within a housing assembly of an air cleaner can include a media pack including filter media extending from a first end to a second end; and a first end cap arranged at the first end of the media pack, the first end cap presenting an inner radial side defining a seal surface having a generally polygonal shape formed by a plurality of flat sides and adjoining corner portions, the first end cap having a first cross-sectional thickness extending through the flat sides that is greater than a second cross-sectional thickness extending through the corner portions.

In some examples, the first end cap is formed as a single, monolithic component.

In some examples, the first end cap includes a plurality of support members at least partially defining the first cross-sectional thickness.

In some examples, a distal axial end of the filter cartridge is defined by the end cap at a location that is radially aligned with the seal surface flat sides.

In some examples, the first end cap includes a seal member defining the inner radial side and defining an outer radial side, wherein the seal member is unsupported on the outer radial side at locations radially aligned with the seal surface corner portions.

In some examples, the first end cap includes a seal member defining the inner radial side and the seal member has a constant cross-sectional thickness.

An air cleaner can include a housing assembly including a housing body defining an interior volume, an air inlet, and an air outlet, and defining a first seal surface having a generally polygonal shape with flat sides and adjoining corner portions; a filter cartridge positioned within the interior volume, the filter cartridge including: a media pack including filter media extending from a first end to a second end and forming a tubular shape having a hollow center; and a first end cap operably arranged at the media pack first end, the first end cap including: a seal member presenting an inner radial side defining a seal surface and presenting an outer radial side, the inner radial side and the outer radial side each having a generally polygonal shape formed by a plurality of flat sides and adjoining corner portions, wherein the seal surface of the seal member forms a seal against the first seal surface of the housing assembly; and a seal support arrangement including a plurality of support members located adjacent the flat sides of the seal member outer radial side such that the corner portions of the outer radial side are unsupported by the plurality of support members.

In some examples, the housing assembly includes a wall structure defining the first seal surface and that further defines an oppositely facing second seal surface having a generally polygonal shape with flat sides and adjoining corner portions.

In some examples, the air cleaner further includes a safety filter cartridge including filter media and having a seal member that forms a seal with the second seal surface.

In some examples, the first seal surface is formed as part of an outlet tube assembly that defines the air outlet.

In some examples, the outlet tube assembly includes a first part secured to a second part that includes a wall structure defining the first seal surface.

In some examples, the first and second parts are joined together on opposite sides of an end wall of the housing assembly.

An outlet tube assembly for use with an air cleaner housing can include a first part defining an air inlet or air outlet; and a second part joined to the first part such that a portion of the air cleaner housing is sandwiched between the first and second parts, wherein the second part includes a first sidewall having a radially outward facing seal surface with flat sides and adjoining corner portions forming a generally polygonal shape, and a second sidewall having a radially inward facing surface with a plurality of spaced apart flat sections interrupted by inwardly extending protrusions.

In some examples, the inwardly extending protrusions of the second sidewall include side edges that together with the flat sections define recess areas.

In some examples, the recess areas are configured to receive reinforcement members of a filter cartridge such that the protrusions are received within gaps between the reinforcement members.

In some examples, the flat sections and protrusions of the second sidewall are configured to guide rotational alignment of a filter cartridge during installation.

In some examples, at least one of the flat sections has a different width compared to the other flat sections.

In some examples, at least one of the protrusions has a different width compared to the other protrusions.

In some examples, the first sidewall defines a radially inward facing seal surface with flat sides and adjoining corner portions forming a generally polygonal shape.

A filter cartridge can include a media pack including media extending between a first end and a second end along a longitudinal axis; an end cap secured to the media pack and including: a seal member presenting a radially inward or outward facing seal surface having a generally polygonal shape with flat sides and adjoining corner portions, the seal member being formed from a first material, the seal member having a second surface opposite the seal surface; and a support structure including a base part and a plurality of spaced apart reinforcement members, the support structure being formed from a second material different than the first material, wherein the reinforcement members are located adjacent the seal member second surface and are radially aligned with the flat sides of the seal member such that gaps between adjacent reinforcement members are radially aligned with the seal surface corner portions.

In some examples, the support structure and seal member are each formed from a polyurethane material.

In some examples, the seal member has at least three flat sides and three corner portions.

In some examples, the seal member has eight flat sides and eight corner portions.

In some examples, each of the flat sides of the seal member have an equal length.

In some examples, the adjoining corner portions have a radius or curved shape.

In some examples, the plurality of spaced apart reinforcement members define a distal end of the filter cartridge.

In some examples, the plurality of spaced apart reinforcement members have a height that is greater than a height of the seal member.

In some examples, the seal member is secured to the support structure.

In some examples, the support structure is molded onto the seal member.

In some examples, the seal member is located axially beyond a distal end of the media pack.

In some examples, the seal member circumscribes the media pack.

In some examples, the media pack has one of a circular and a racetrack cross-sectional shape.

In some examples, the media pack includes pleated media.

In some examples, the media pack includes fluted media.

A filter cartridge can include a media pack including media extending between a first end and a second end along a longitudinal axis; an end cap secured to the media pack and including: a seal member presenting a radially inward or outward facing seal surface, the seal member being formed from a first material; and a support structure including a base part and a plurality of spaced apart, radially flexible extensions, the support structure being formed from a second material different than the first material, wherein at least a portion of the base part is covered by and/or embedded within the first material, the plurality of flexible extensions including an exposed portion that is uncovered by and/or embedded within the first material and that defines an axial end of the cartridge and is coincident with a radial innermost portion of the end cap and/or at least a portion of the radially inward or outward facing seal surface; wherein the seal surface and the exposed portion of the flexible extensions are axially aligned such that a plane orthogonal to the longitudinal axis can pass through the seal member and through the exposed portion of the plurality of flexible extensions.

In some examples, the support structure and seal member are each formed from a polyurethane material.

In some examples, the seal member has at least three flat sides and three corner portions.

In some examples, the seal member has eight flat sides and eight corner portions.

In some examples, each of the flat sides of the seal member have an equal length.

In some examples, the adjoining corner portions have a radius or curved shape.

In some examples, the plurality of spaced apart reinforcement members define a distal end of the filter cartridge.

In some examples, the plurality of spaced apart reinforcement members have a height that is greater than a height of the seal member.

In some examples, the seal member is secured to the support structure.

In some examples, the support structure is molded onto the seal member.

In some examples, the media pack has one of a circular and a racetrack cross-sectional shape.

In some examples, the media pack includes pleated media.

In some examples, the media pack includes fluted media.

A filter cartridge can include a media pack including media extending between a first end and a second end along a longitudinal axis; an end cap secured to the media pack and including: a seal member presenting a radially inward or outward facing seal surface, the seal member being formed from a first material; and a support structure including a base part and a plurality of spaced apart, radially flexible extensions, the support structure being formed from a second material different than the first material, wherein at least a portion of the base part is covered by and/or embedded within the first material, the plurality of flexible extensions including an exposed portion that is uncovered by and/or embedded within the first material and that defines an axial end of the cartridge; wherein the seal surface and the exposed portion of the flexible extensions are axially aligned such that a plane orthogonal to the longitudinal axis can pass through the seal member and through the exposed portion of the plurality of flexible extensions.

In some examples, the support structure and seal member are each formed from a polyurethane material.

In some examples, the seal member has at least three flat sides and three corner portions.

In some examples, the seal member has eight flat sides and eight corner portions.

In some examples, each of the flat sides of the seal member have an equal length.

In some examples, the adjoining corner portions have a radius or curved shape.

In some examples, the plurality of spaced apart reinforcement members define a distal end of the filter cartridge.

In some examples, the plurality of spaced apart reinforcement members have a height that is greater than a height of the seal member.

In some examples, the seal member is secured to the support structure.

In some examples, the support structure is molded onto the seal member.

In some examples, the seal member is located axially beyond a distal end of the media pack.

In some examples, the seal member circumscribes the media pack.

In some examples, the media pack has one of a circular and a racetrack cross-sectional shape.

In some examples, the media pack includes pleated media.

In some examples, the media pack includes fluted media.

A filter cartridge comprising: a media pack including media extending between a first end and a second end along a longitudinal axis; an end cap secured to the media pack and including: a seal member presenting a radially inward or outward facing seal surface and an undercut portion radially recessed from the seal surface, the seal member being formed from a first material; and a support structure including a base part and a plurality of spaced apart, radially flexible extensions, the support structure being formed from a second material different from the first material, wherein at least a portion of the base part is covered by and/or embedded within the first material, the plurality of flexible extensions including an exposed portion that is uncovered by and/or embedded within the first material; wherein the seal surface and the exposed portion of the flexible extensions are axially aligned such that a plane orthogonal to the longitudinal axis can pass through the seal member and through the exposed portion of the plurality of flexible extensions.

In some examples, the support structure and seal member are each formed from a polyurethane material.

In some examples, the seal member has at least three flat sides and three corner portions.

In some examples, the seal member has eight flat sides and eight corner portions.

In some examples, each of the flat sides of the seal member have an equal length.

In some examples, the adjoining corner portions have a radius or curved shape.

In some examples, the plurality of spaced apart reinforcement members define a distal end of the filter cartridge.

In some examples, the plurality of spaced apart reinforcement members have a height that is greater than a height of the seal member.

In some examples, the seal member is secured to the support structure.

In some examples, the support structure is molded onto the seal member.

In some examples, the seal member is located axially beyond a distal end of the media pack.

In some examples, the seal member circumscribes the media pack.

In some examples, the media pack has one of a circular and a racetrack cross-sectional shape.

In some examples, the media pack includes pleated media.

In some examples, the media pack includes fluted media.

A filter cartridge can include a media pack including media defining an outer perimeter extending along a longitudinal axis between a first axial end and a second axial end; and an end cap arranged about the media pack outer perimeter, the end cap including: a seal member presenting a seal surface that is spaced from the media pack outer perimeter and that faces in a radial inward direction towards the media pack outer perimeter, the seal surface having a generally polygonal shape with flat sides and adjoining corner portions.

In some examples, the end cap further includes a support structure including a base part and a plurality of spaced apart reinforcement members, the support structure being formed from a material that is different than a material associated with the seal member, wherein the reinforcement members are located adjacent a radially outward facing side of the seal member and are radially aligned with the flat sides of the seal member such that gaps between adjacent reinforcement members are radially aligned with the seal surface corner portions.

In some examples, the support structure and seal member are each formed from a polyurethane material.

In some examples, the seal member has at least three flat sides and three corner portions.

In some examples, the seal member has eight flat sides and eight corner portions.

In some examples, each of the flat sides of the seal member have an equal length.

In some examples, the adjoining corner portions have a radius or curved shape.

In some examples, the plurality of spaced apart reinforcement members define a distal end of the filter cartridge.

In some examples, the plurality of spaced apart reinforcement members have a height that is greater than a height of the seal member.

In some examples, the seal member is secured to the support structure.

In some examples, the support structure is molded onto the seal member.

In some examples, the seal member is located axially beyond a distal end of the media pack.

In some examples, the seal member circumscribes the media pack.

In some examples, the media pack has one of a circular and a racetrack cross-sectional shape.

In some examples, the media pack includes pleated media.

In some examples, the media pack includes fluted media.

In some examples, the end cap is located proximate the first axial end of the media pack.

In some examples, a distal end of the end cap is generally flush with the media pack first axial end.

In some examples, the end cap is located proximate the first axial end of the media pack.

In some examples, the plurality of reinforcement members extend in a direction from the first axial end and towards the second axial end of the media pack.

In some examples, an axial end of the seal member is at least partially exposed and uncovered by the support structure.

In some examples, at least a portion of the plurality of reinforcement members circumscribe the media pack.

In some examples, the support structure further includes an axially extending portion spaced from the plurality of reinforcement members, the axially extending portion being secured to the media pack.

In some examples, the seal member is located within an annular space defined between the axially extending portion and the plurality of reinforcement members.

In some examples, an axial end of the plurality of reinforcement members is generally flush with an axial end of the seal member.

In some examples, the seal surface has at least eight flat sides.

In some examples, the seal surface has twelve flat sides.

In some examples, a length of the flat sides of the seal surface is greater than a length of the reinforcement members.

In some examples, the number of flat sides of the seal surface is equal to the number of reinforcement members.

In any of the above-described filter cartridges, the media pack can include fluted filter media, pleated filter media, or another type of media.

The present invention is defined, at least in part, in the appended independent claims. The dependent claims define advantageous embodiments.

BRIEF DESCRIPTION OF THE DRAWINGS

These and further aspects of the present disclosure will be explained in greater detail by way of example and with reference to the accompanying drawings in which:

FIG. 137 is a schematic, perspective view of a portion of a support section of the filter media of FIG. 136, illustrated in a folded configuration but expanded or separated for illustrative purposes.

FIG. 138 is a schematic, cross-sectional view of a portion of the support section of the filter media of FIG. 136, illustrated in a folded configuration but expanded or separated for illustrative purposes.

FIG. 139 is a perspective view of another media variation useable in arrangements according to the present disclosure.

FIG. 140 is a schematic depiction of an equipment assembly including an air cleaner assembly in accordance with any of the air cleaner assemblies disclosed herein.

Figure 1:
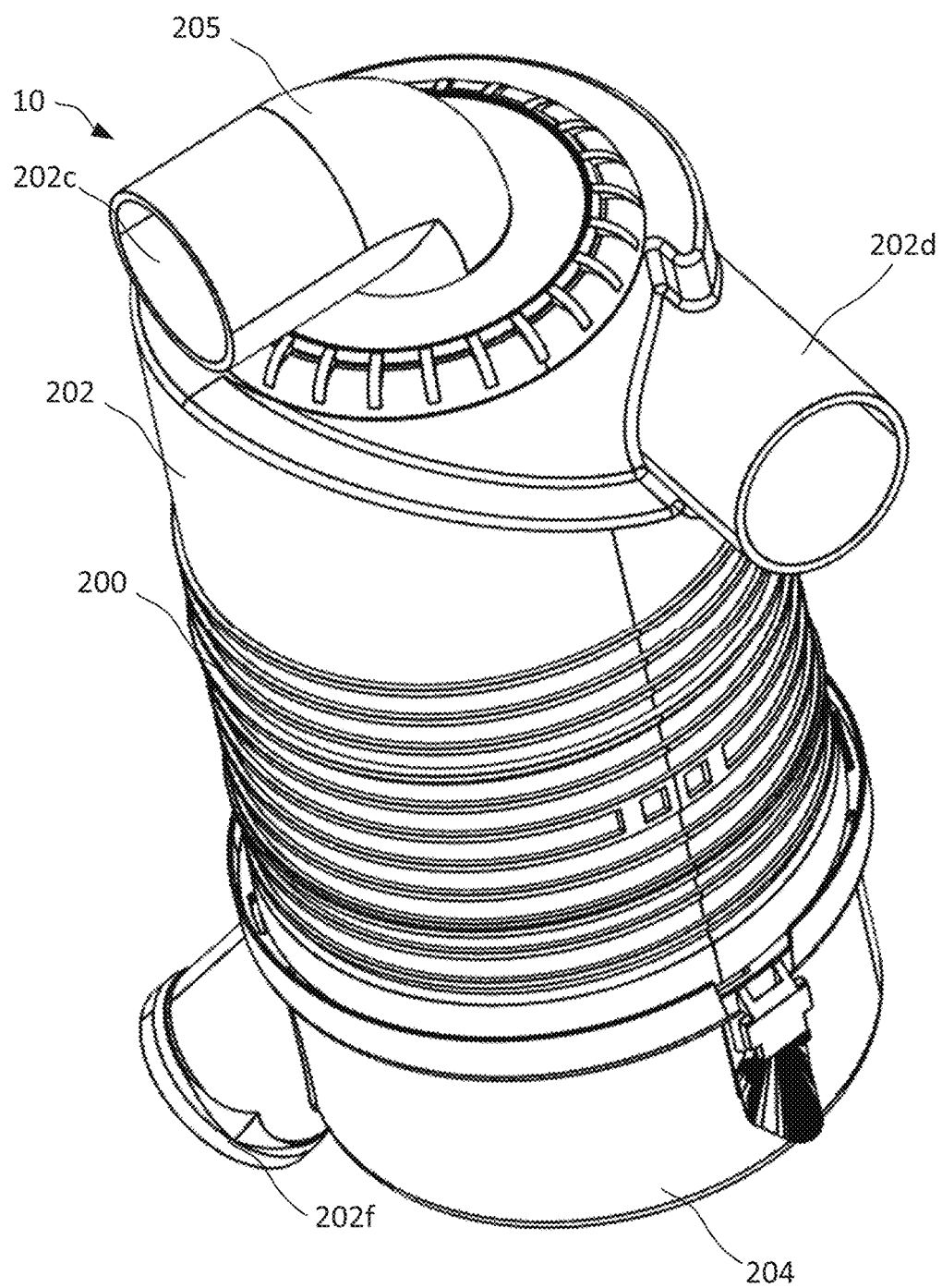
FIG. 1 is a schematic view of a first example of an air cleaner assembly having features in accordance with the present disclosure.
Figure 2:
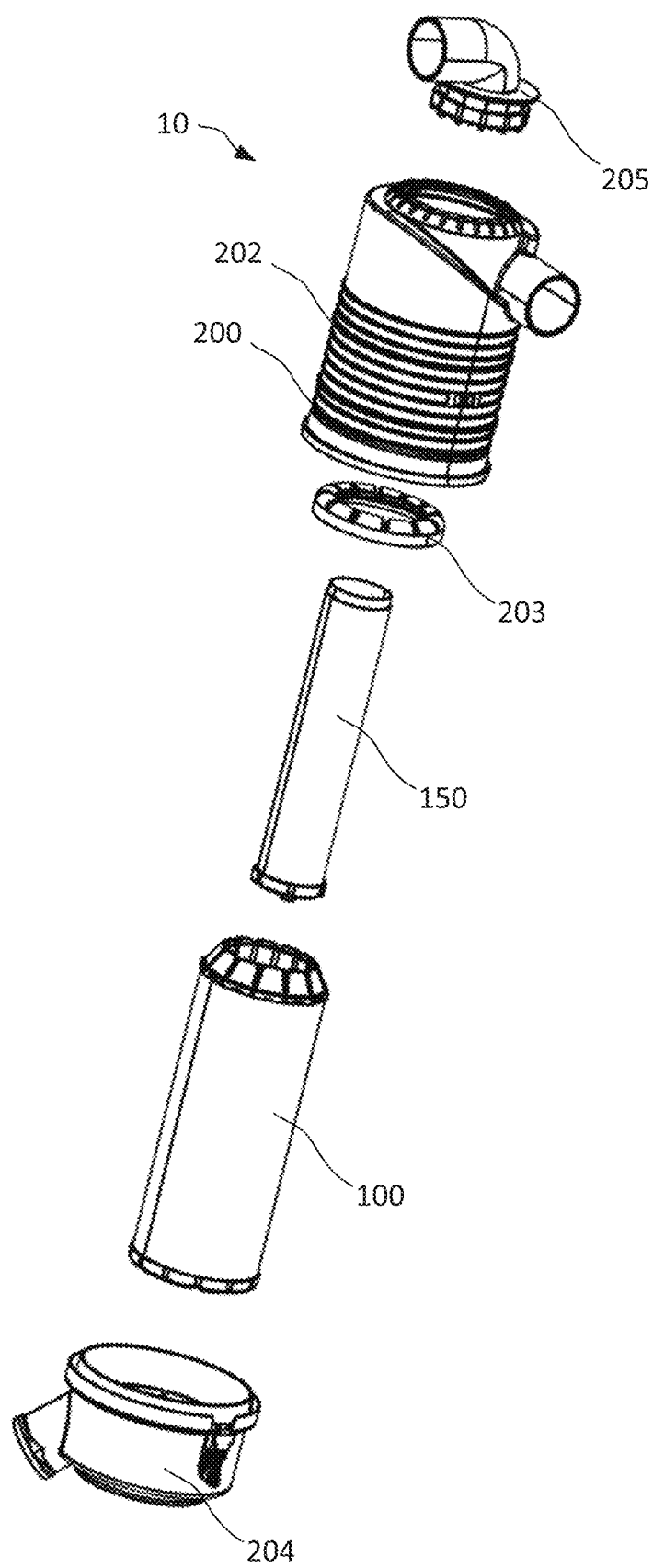
FIG. 2 is a perspective exploded view of the air cleaner assembly shown in FIG. 1.

The drawings of the figures are neither drawn to scale nor proportioned. Generally, identical components are denoted by the same reference numerals in the figures. Further, it is noted that many of the drawings presented herein are generated from computer-aided design (CAD) models that show parts in their nominal, undeformed states. In particular, for assembly views showing a filter cartridge installed within the housing, the seal member is depicted in its relaxed condition even though it would actually be compressed and/or stretched when installed against the outlet tube or other seal surfaces associated with the air cleaner assembly. For example, in some views the seal member may appear to overlap with or intersect the outlet tube or seal plate geometry since the seal is shown in its pre-installation state rather than its deformed, installed state. A person having ordinary skill in the art would readily understand that such visual overlaps or intersections in the drawings represent the undeformed components and would interpret the drawings taking into account the compressible and/or stretchable nature of the seal member materials during actual installation and use.

DETAILED DESCRIPTION

The present disclosure will be described in terms of specific embodiments, which are illustrative of the disclosure and not to be construed as limiting. It will be appreciated by persons skilled in the art that the present disclosure is not limited by what has been particularly shown and/or described and that alternatives or modified embodiments could be developed in the light of the overall teaching of this disclosure. The drawings described are only schematic and are non-limiting.

Use of the verb "to comprise", as well as the respective conjugations, does not exclude the presence of elements other than those stated. Use of the article "a", "an" or "the" preceding an element does not exclude the presence of a plurality of such elements.

Furthermore, the terms first, second, and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Reference throughout this specification to "one embodiment" or "an embodiment" means that a particular feature, structure or characteristic described in connection with the embodiments is included in one or more embodiment of the present disclosure. Thus, appearances of the phrases "in one embodiment" or "in an embodiment" in various places throughout this specification are not necessarily all referring to the same embodiment, but may refer to one or more different embodiments. Furthermore, the particular features, structures or characteristics may be combined in any suitable manner, as would be apparent to one ordinary skill in the art from this disclosure, in one or more embodiments.

As used herein, the term "axially" generally refers to a direction that is parallel to the longitudinal axis X while the term "radially" generally refers to a direction that is orthogonal to the longitudinal axis X. As also used herein, the term "radially inward" generally refers to a direction facing towards the longitudinal axis X while the term "radially outward" generally refers to a direction facing away from the longitudinal axis X.

Although a number of the drawings presented and discussed below are specifically addressing embodiments of a filter element for filtering air, the present disclosure is not limited thereto.

Figure 140:
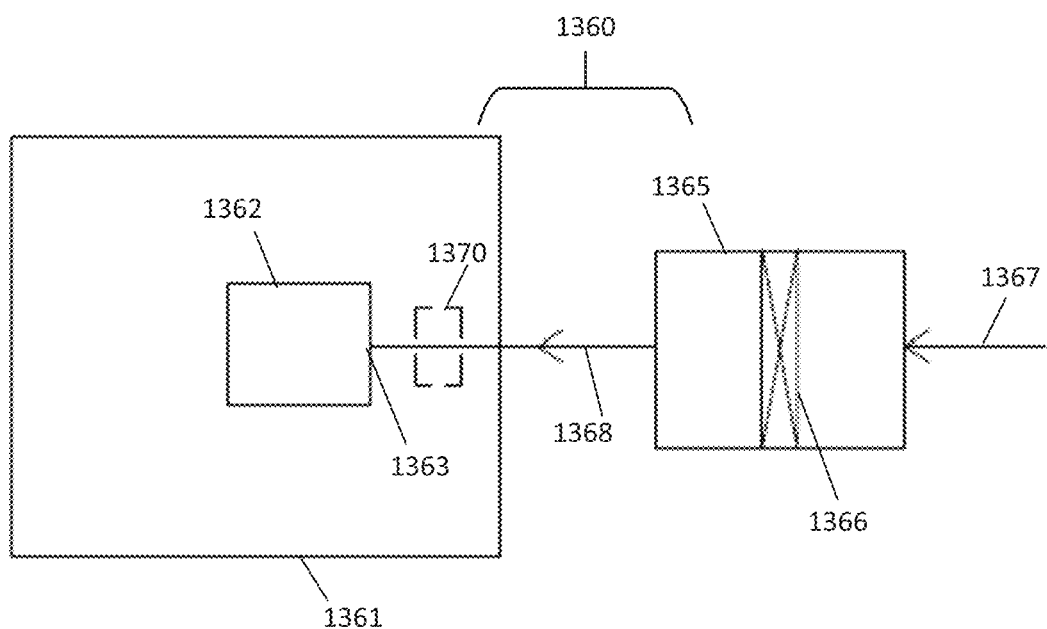

In FIG. 140, a schematic depiction of an engine equipment arrangement 1360 is depicted. The equipment system 1360, in the example, comprises a vehicle or other equipment 1361 having an internal combustion engine arrangement 1362 with a combustion air intake 1363. The equipment arrangement 1360 includes an air cleaner system 1365 having a filter arrangement 1366 therein, typically comprising a serviceable (i.e., removable and replaceable) filter cartridge. The air cleaner system 1365 and filter arrangement 1366 can include any of the below-described air cleaners and filter cartridges, and combinations thereof. Intake air to the system is shown at 1367 directed into the air cleaner assembly 1365 before filtering of unfiltered air through media of the filter cartridge arrangement 1366. At 1368, filtered air is shown being directed into the equipment air intake 1363. At 1370, optional equipment such as a turbo system is shown. Of course, alternate equipment systems can be represented by arrangements analogous to those of FIG. 140. The equipment system can be, for example, an industrial air filter, an air cleaner arrangement used in association with a turbine, etc. The use in association with an internal combustion engine is typical, but not specifically required for many of the principles characterized herein.

FIGS. 1-15 illustrate a first example of the present disclosure in a schematic manner. As shown, an air cleaner 10 is presented including a filter cartridge 100 and a filter cartridge 150 installable within a housing assembly 200.

In one aspect, the housing assembly 200 includes a main housing 202 defining an interior volume 202a extending along a longitudinal axis X1. The housing assembly 200 is further shown as including a cover assembly 204 installable onto the main housing 202 to cover a service opening and enclose the interior volume 202a. In one aspect, the main housing 202 further defines an air outlet 202c, an air inlet 202d, and a dust ejection port 202f. In some configurations, the main housing 202 may be provided with an air inlet while the cover assembly 204 may be provided with an air outlet or vice versa. The housing assembly 200 is further shown as including an outlet tube assembly 205 which defines the air outlet 202c and a collar 203 for attaching the outlet tube assembly 205 to the main housing 202. The outlet tube assembly 205 is shown in isolation at FIGS. 4 and 5 while the collar 203 is shown in isolation at FIGS. 6 and 7.

Referring to FIGS. 10 to 13, aspects of the filter cartridge 100 are further illustrated. In one aspect, the filter cartridge 100 includes filter media 102 extending between a first end cap 104 and a second end cap 106. In the particular example shown, the filter media 102 is pleated media arranged in a tubular manner to define a central opening 102c around an axis X. The filter cartridge 150 is similarly so constructed and is installed within the filter cartridge 100 and seals to the outlet tube assembly 205 such that air passing through the filter cartridge 100 must also pass through the filter cartridge 150 before exiting the housing assembly via outlet 202c. As detailed in a later section, many media types and configurations are possible for use with all of the disclosed example filter cartridges herein, for example, fluted media, z-media, depth media, non-pleated media, coiled media, and/or stacked media, etc.

In one aspect, the first end cap 104 is an open end cap and is connected to a first axial end 102a of the filter media 102 in a fluid tight manner. In one aspect, the second end cap 106 is a closed end cap and is connected to a second axial end 102b of the filter media 102 in a fluid tight manner. The first and second end caps 104, 106 can, for instance, be formed and attached to the filter cartridge 100 by a polyurethane potting process. In one aspect, the end caps 104, 106, are generally annular or circular. The filter media 102 is also shown as being provided with an annular or circular shape with a hollow interior. Other shapes for the end caps 104, 106 and filter media 102 are possible, for example, elliptical shapes, obround, oval or race-track shapes, and/or conical shapes.

Figure 11:
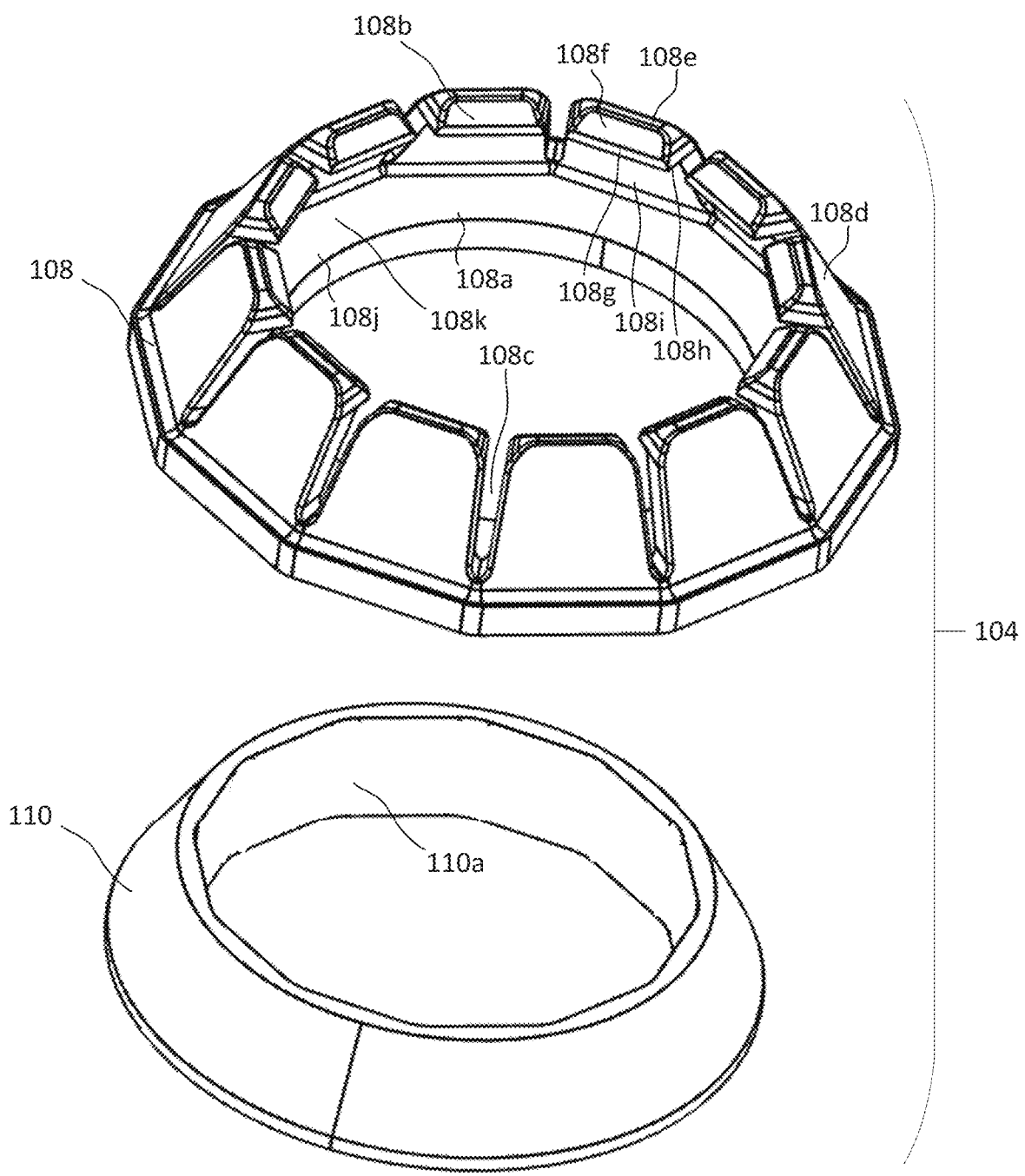
FIG. 11 is a perspective exploded view of an end cap associated with the filter cartridge shown in FIG. 8.

In one aspect, the first end cap 104 has a multi-component construction including a support structure 108 and a seal member 110, shown separately at FIG. 11. In some examples, the support structure 108 is secured to the media 102 and the seal member 110 is secured to the support structure 108. In some examples, the seal member 110 is secured to the media 102 and the support structure 108 is secured to the seal member 110. In some examples, both the support structure 108 and the seal member 110 are secured to the media 102 and to each other. In some examples, the support structure 108 and seal member 110 are independently secured to the media or another structure without being directly secured together. In examples, the support structure 108 is formed from a material that has a higher hardness and/or stiffness in comparison to the seal member 110. With respect to the materials described herein, materials with a higher hardness typically also happen to have a higher stiffness, and vice versa. In some examples, the material used for the support structure 108 has a lower coefficient of friction in comparison to the material used for the seal member 110. In some examples, the material used for the support structure 108 and seal member 110 can be or include a metal material, a plastic material such as thermoplastic and thermoset materials, or elastomer/rubber type materials. Example materials are polyurethane, polyethylene, thermoplastic elastomers (TPE), natural and synthetic rubber materials, and acrylonitrile butadiene styrene (ABS) materials. In some examples, the material for the support structure 108 and the material for the seal member 110 are the same material or type of material. In some examples, the material for the support structure 108 and the seal member 110 are different types of materials. In some examples, the support structure 108 and seal member 110 are formed from different compositions or variations of the same material type. For example, the support structure 108 and seal member 110 can both be formed from polyurethane compositions such that the support structure 108 is relatively harder and/or stiffer than the seal member 110. In another example, the seal member 110 is formed from a polyurethane material while the support structure 108 is formed from a polypropylene or ABS material. Many combinations of materials are possible, including any combination of the above-listed material types and examples.

Figure 12:
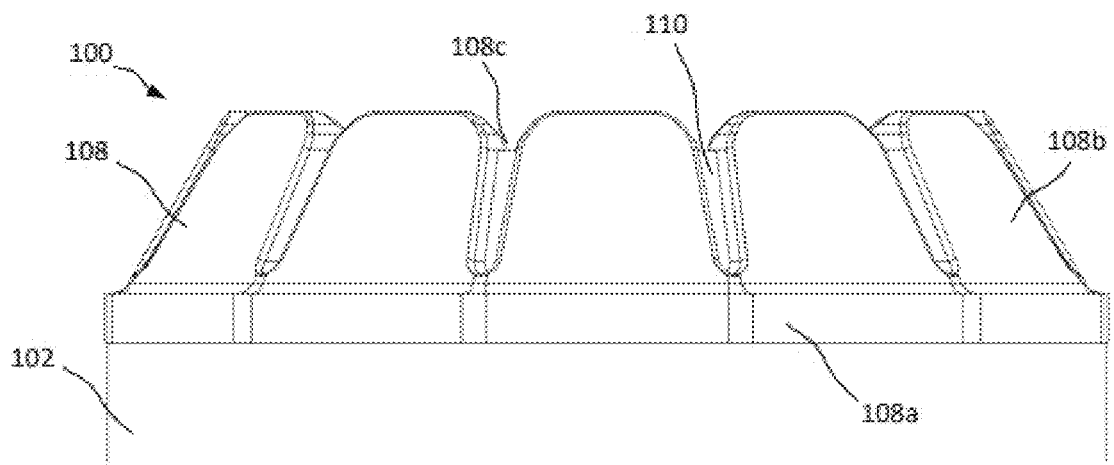
FIG. 12 is a side view of a portion of the filter cartridge shown in FIG. 8.
Figure 13:
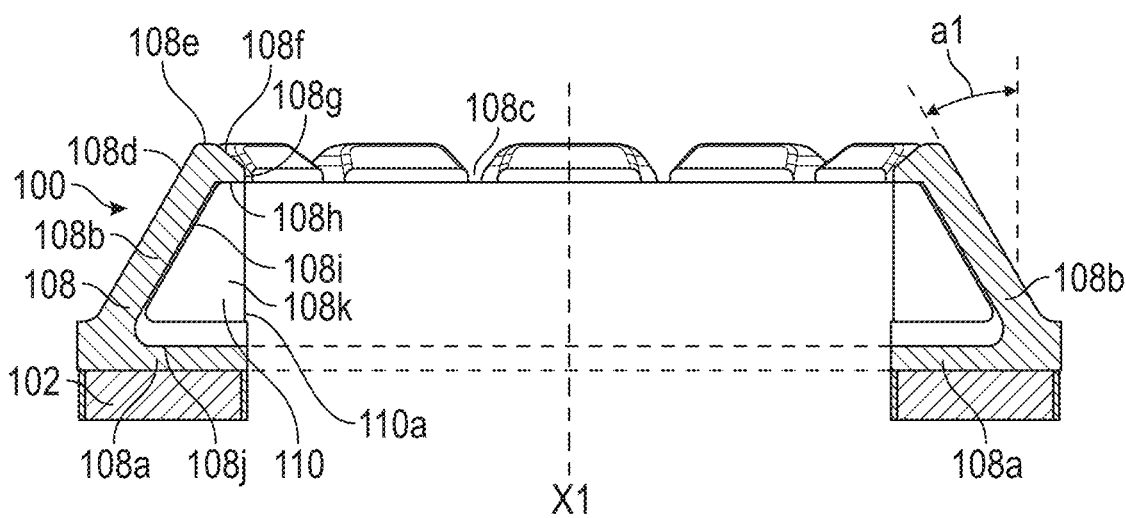
FIG. 13 is a cross-sectional side view of the filter cartridge portion shown in FIG. 12.

As most easily seen at FIGS. 11 to 13, the support structure 108 includes an annular base portion 108a from which a plurality of radially flexible reinforcement members 108b extend in an axial direction away from the axial end 102a of the media 102. As referenced at FIG. 13, the reinforcement members 108a extend at an angle a1 from a line parallel to the longitudinal axis X1. In some examples, the angle a1 may be between 0 and 60 degrees. In the example shown, the angle a1 is about 30 degrees and can be characterized as being an oblique angle. In one aspect, the reinforcement members 108b are circumferentially spaced apart so as to form gaps 108c therebetween.

As shown, each of the reinforcement members 108b includes an outer surface having portions 108d, 108e, 108f, and 108g. In one aspect, portion 108e defines a distal axial end of the support structure 108 and of the entire filter cartridge 100 while portion 108g defines a radial innermost portion of the support structure 108. Portion 108f tapers inwardly, from the portion 108e, towards the longitudinal axis X1 and portion 108g, and also extends in a direction towards the end cap 106. As most easily seen at FIG. 13, the portions 108h, 108i and an upper surface 108j of the base portion 108a define a recess or cavity 108k within which the seal member 110 is at least partially disposed. With such a configuration, the reinforcement members 108b provide lateral support to the seal member 110, as discussed in more detail below.

In one aspect, the reinforcement members 108b are flexible in a radial direction such that a radial force applied to the second portions 108d will cause the reinforcement members 108b to deflect radially in the direction of the applied force. In one aspect, the distal end or portion 108e of each reinforcement member 108b is rounded from one lateral side to the opposite lateral side towards the adjacent gaps 108c. As discussed later, this feature, along with tapered portion 108f enable for easier insertion of the filter cartridge into the housing 200.

Figure 8:
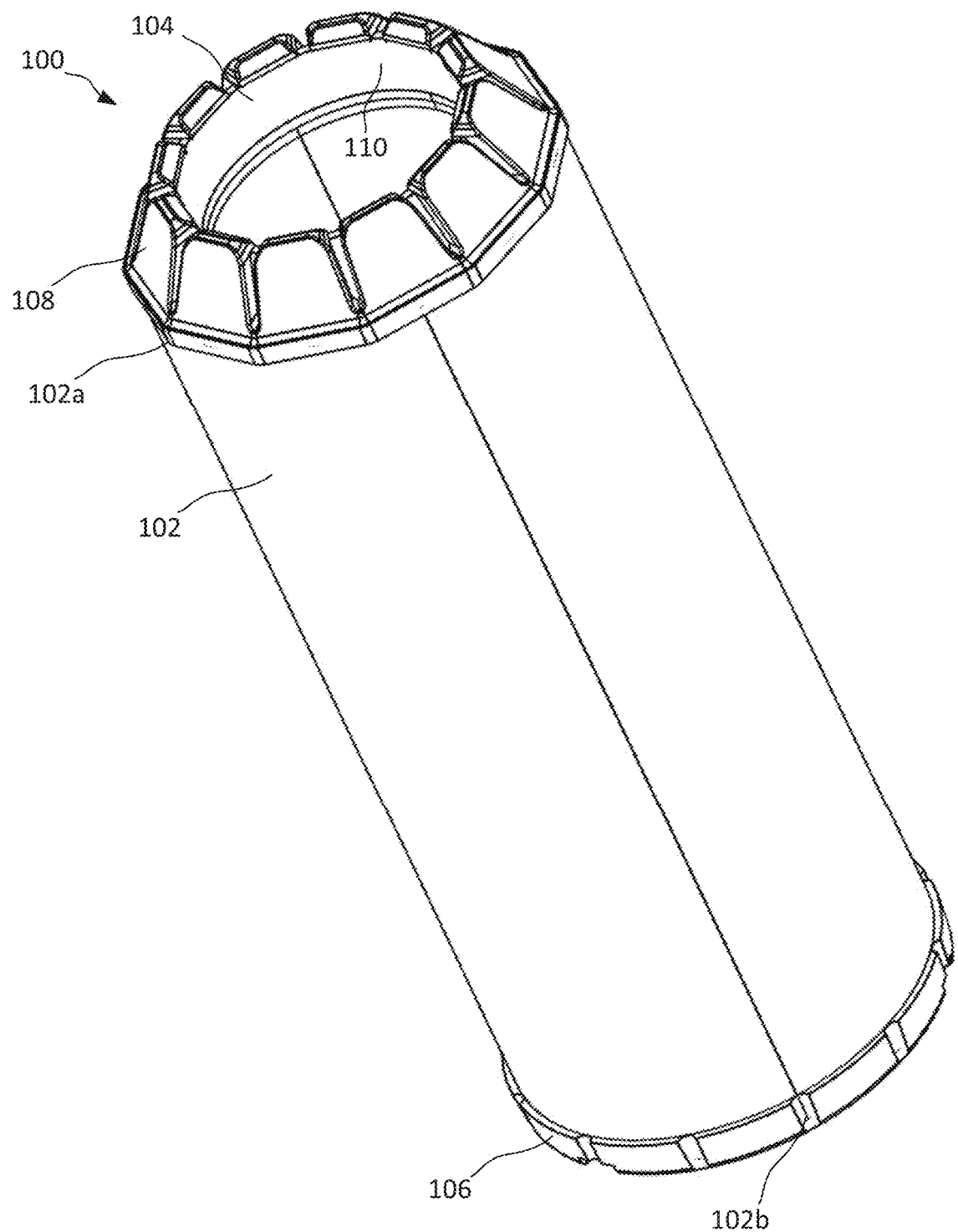
FIG. 8 is a perspective view of a filter cartridge associated with the air cleaner assembly shown in FIG. 1.
Figure 8A:
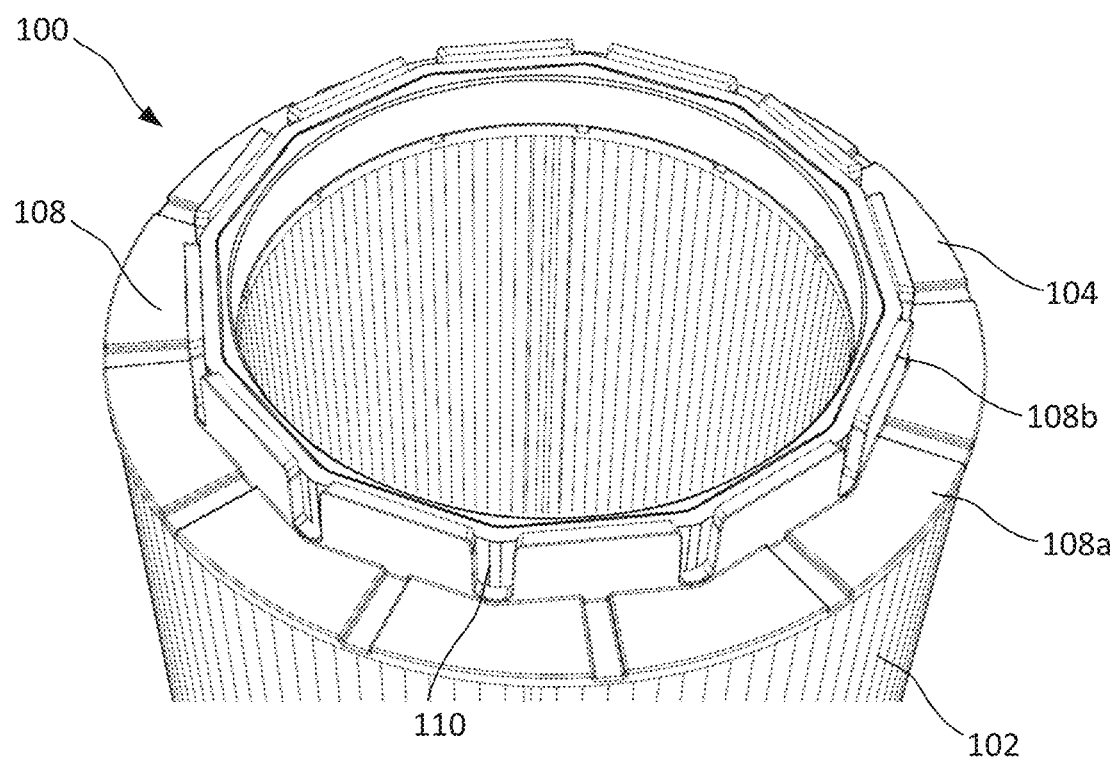
FIG. 8A is a perspective view of an alternative construction of the filter cartridge shown in FIG. 8.
Figure 9:
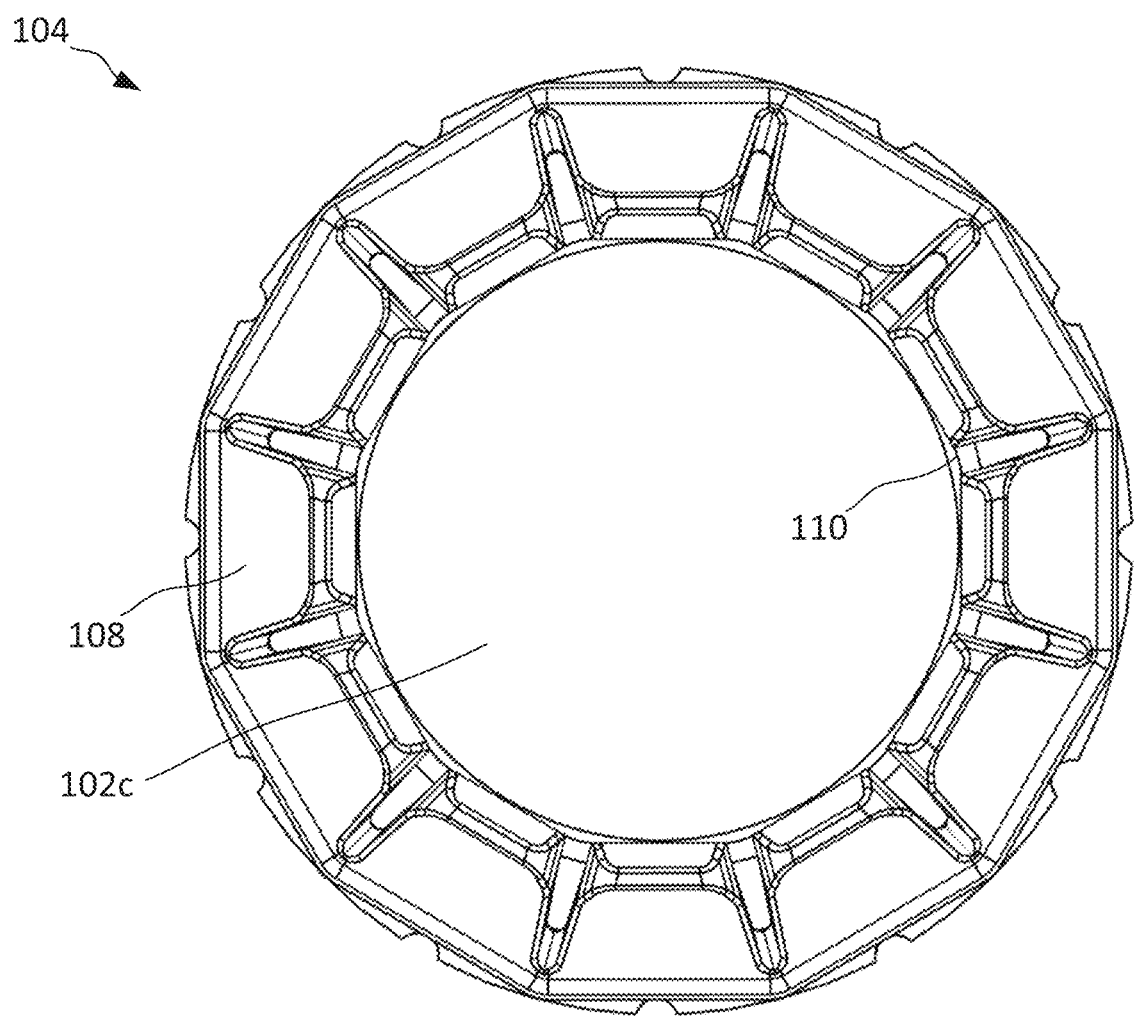
FIG. 9 is a top view of the filter cartridge shown in FIG. 8.
Figure 10:
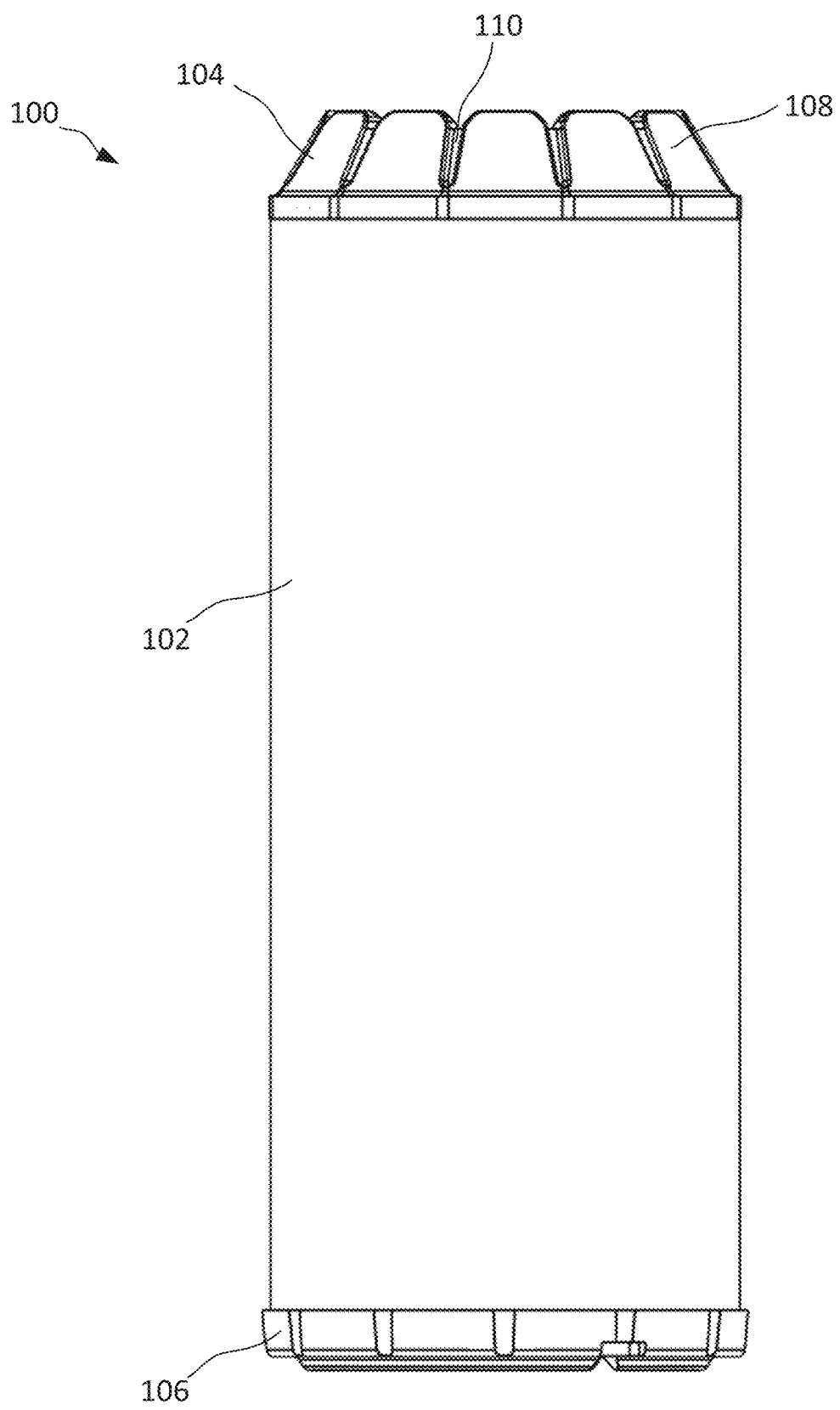
FIG. 10 is a side view of the filter cartridge shown in FIG. 8.

In one aspect, the seal member 110 is formed with a radial seal surface 110a. In the example shown, the radial seal surface 110a faces in a radially inward direction. In one aspect, the radial seal surface 110a is configured as a seal surface which forms a seal against a portion of the outlet tube assembly 205. In one aspect, the radial seal surface 110a is located opposite the reinforcement members 108b such that at least a portion of the radial seal surface 110a is coplanar with at least a portion of the reinforcement members 108b along a plane that is orthogonal to the longitudinal axis X1. Accordingly, any radial outward force exerted on the radial seal surface 110a will generate a radial outward force on the reinforcement members 108b. As explained below, such a force will cause the reinforcement members 108b to deflect radially outwardly. Reference is also made to FIG. 8A in which an alternatively constructed embodiment is illustrated wherein the reinforcement members 108b extend in an axial direction rather than being slanted in an inward direction. As with the example depicted in FIG. 8, the filter cartridge 100 illustrated at FIG. 8A has a seal surface that is round in the relaxed state and can be fit over and sealed to a polygonal-shaped outlet tube. Accordingly, the below description of the sealing interaction of the filter cartridge is generally applicable to the embodiment shown at FIG. 8A with the exception that the reinforcement members 108b are not deflected by the outlet tube in necessarily the same manner. In some examples, the cartridges shown at FIGS. 8 and 8A can be configured to form a seal with the polygonal shaped outlet tube without requiring direct interaction or contact between the outlet tube assembly 205 and the reinforcement members 108b. It is also noted that the reinforcement members 108b in FIGS. 8 and 8A are arranged with flat distal ends and sides that themselves form a generally polygonal shape or, characterized another way, extend along a polygonal shaped perimeter line or projection.

Figure 4:
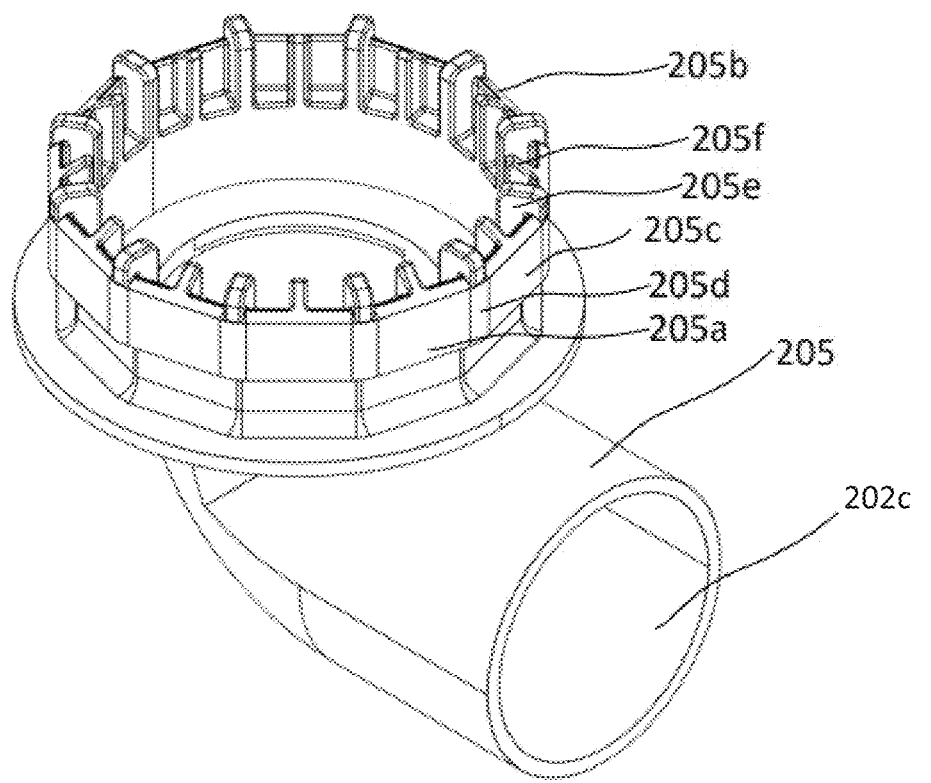
FIG. 4 is a perspective view of an outlet tube associated with the air cleaner assembly shown in FIG. 1.
Figure 5:
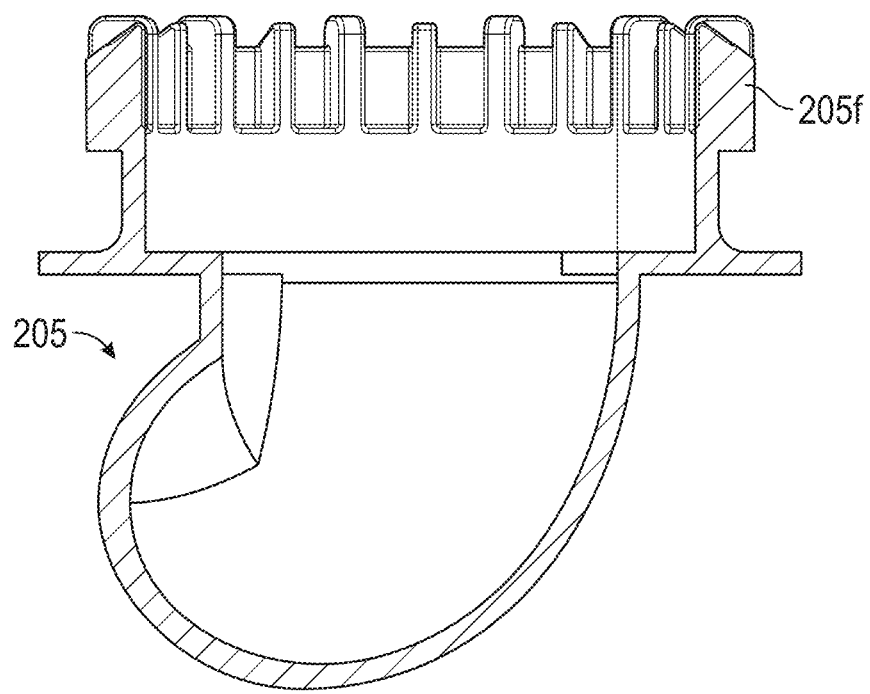
FIG. 5 is a cross-sectional side view of the outlet tube shown in FIG. 4.
Figure 6:
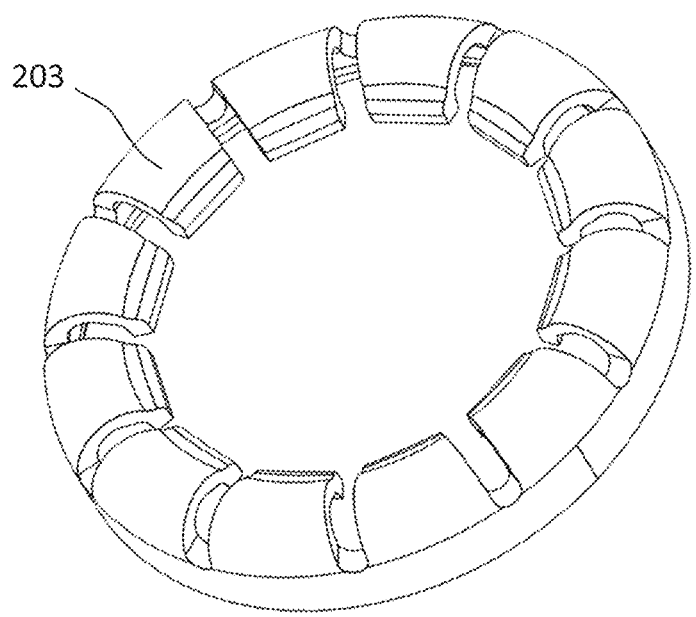
FIG. 6 is a perspective view of a collar associated with the air cleaner assembly shown in FIG. 1.
Figure 7:
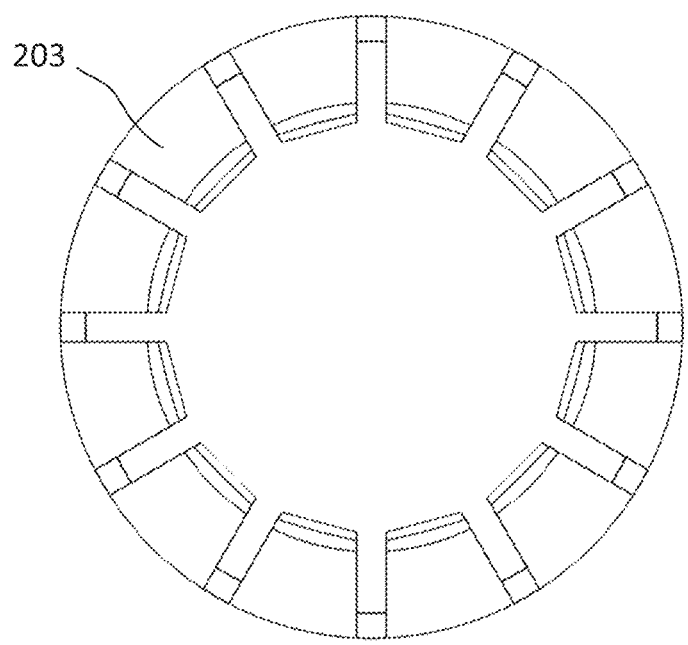
FIG. 7 is a bottom view of the collar shown in FIG. 6.

In one aspect, and as most easily seen at FIGS. 4 and 5, the outlet tube assembly 205 is provided with a number of structures configured for interaction with the first end cap 104 of the filter cartridge 100. For example, the outlet tube assembly 205 is provided with an outer radial seal surface 205a extending to a slanted distal end 205b. As shown, the seal surface 205a has a generally polygonal shape with a plurality of flat sides 205c joined together by radiused or curved portions 205d. By use of the term 'generally polygonal,' it is meant to include true polygonal shapes that have flat sides with vertices and similar shapes with flat sides having rounded corners, and is meant to include shapes with flat sides having the same length and shapes with flat sides having different lengths. By use of the term 'generally flat sides', it is meant to include surfaces that are entirely flat and surfaces which are generally flat with some degree of curvature, such as curvatures resulting from manufacturing processes. The term encompasses surfaces that maintain their generally flat characteristic while potentially having minor surface variations or features, provided such variations do not substantially alter the overall flat nature of the surface. Further, curved surfaces having a sagitta-to-chord ratio of an arc or curved surface of 10 percent or less would also be considered to be within the meaning of the term. Further, the term would also include bodies or members wherein a straight line can be drawn, within a thickness of the member, from one end of the member to the opposite end of the member. In the example shown, twelve flat sides 205c are provided but more or fewer may be used, as is discussed herein. The outlet tube is also shown as being provided with a plurality of slanted first projections 205f that extend radially inwardly and axially away from the distal end 205b. The slanted first projections 205f and distal end 205b slant in the same direction and slope toward the air outlet end 202c in a radial direction that is outward from the longitudinal axis X1. In the example shown, the slanted first projections 205f are equal in number to the flat sides 205c and are centered along the width of the flat sides 205c. Other configurations are possible. The outlet tube assembly 205 is further shown as including a plurality of second projections 205e that also project axially from the distal end 205b. In one aspect, the second projections 205e are equal in number and are radially aligned with the curved portions 205d. Other arrangements are possible. For example, the outlet tube could be provided with flat sides 205c in which one or more of the flat sides 205c have a length that is different from one or more of the other flat sides 205c. In such examples, the seal surface 205a can be rotationally symmetric with multiple folds of rotational symmetry or could be configured such that only single fold rotational symmetry exists.

Figure 3:
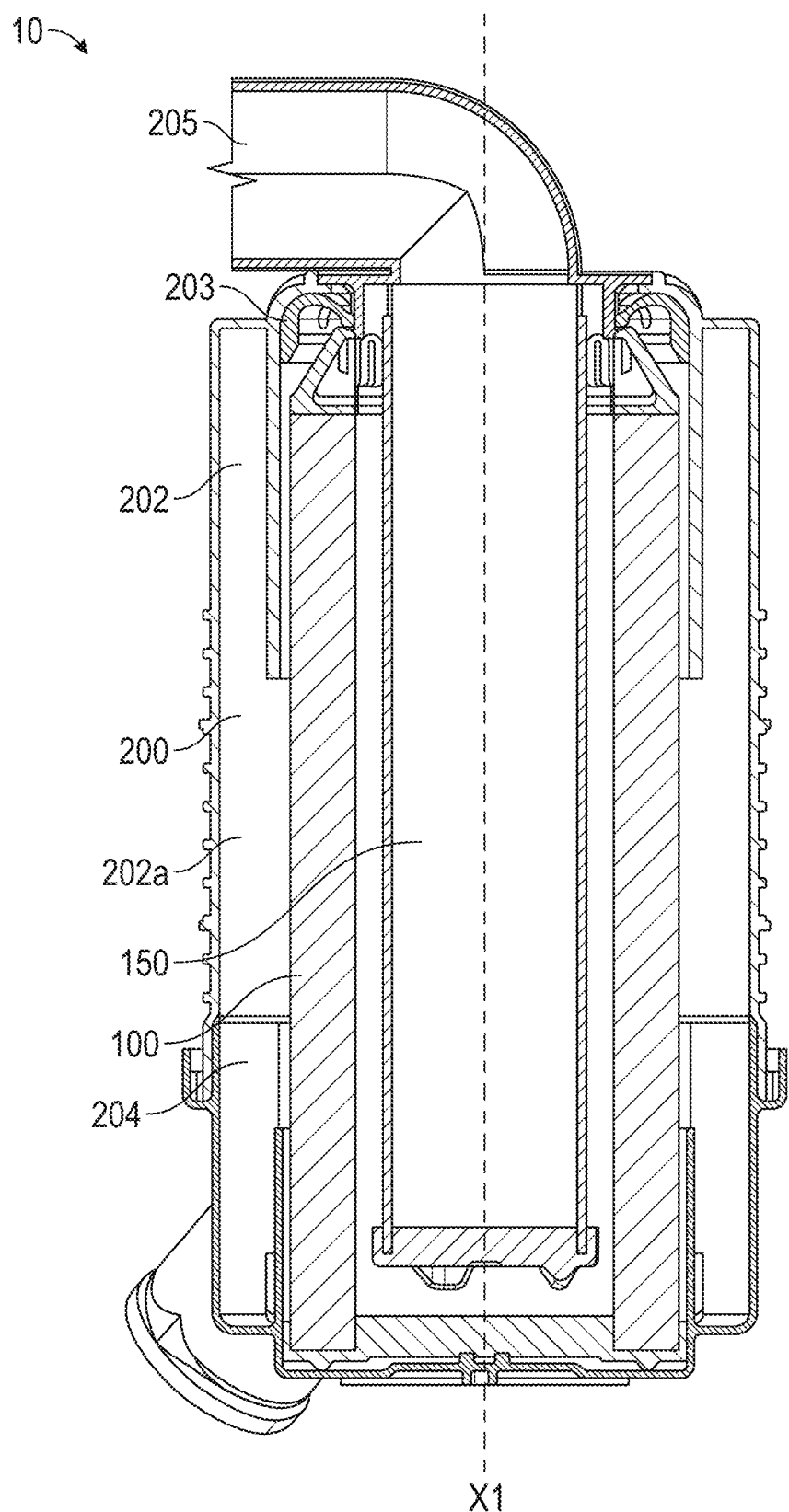
FIG. 3 is a cross-sectional side view of the air cleaner assembly shown in FIG. 1.
Figure 14:
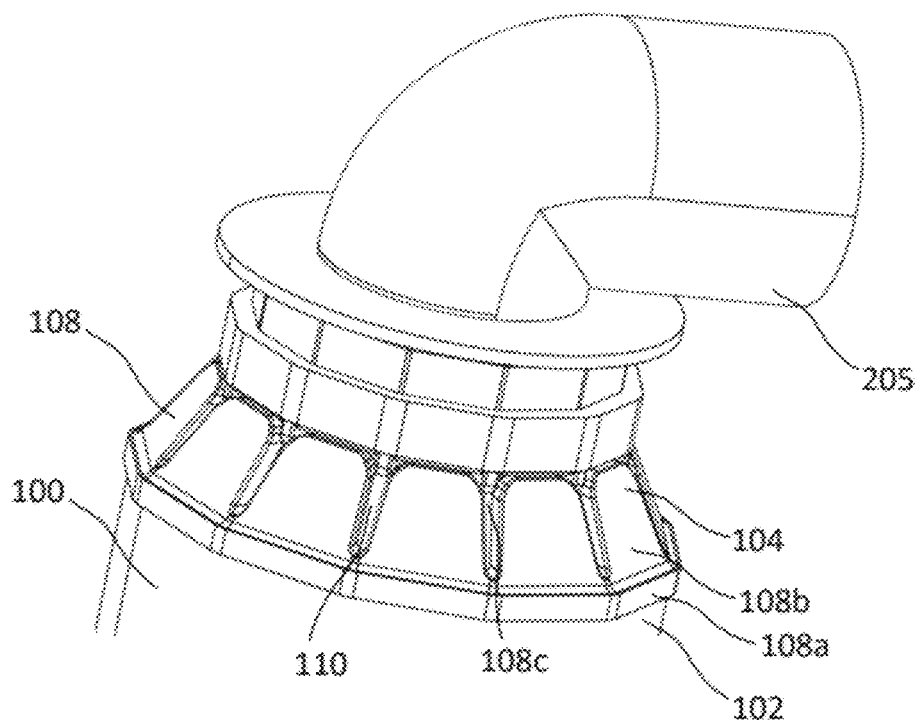
FIG. 14 is a perspective view of the outlet tube and filter cartridge of the air cleaner assembly shown in FIG. 1 with the filter cartridge partially installed onto the outlet tube.
Figure 15:
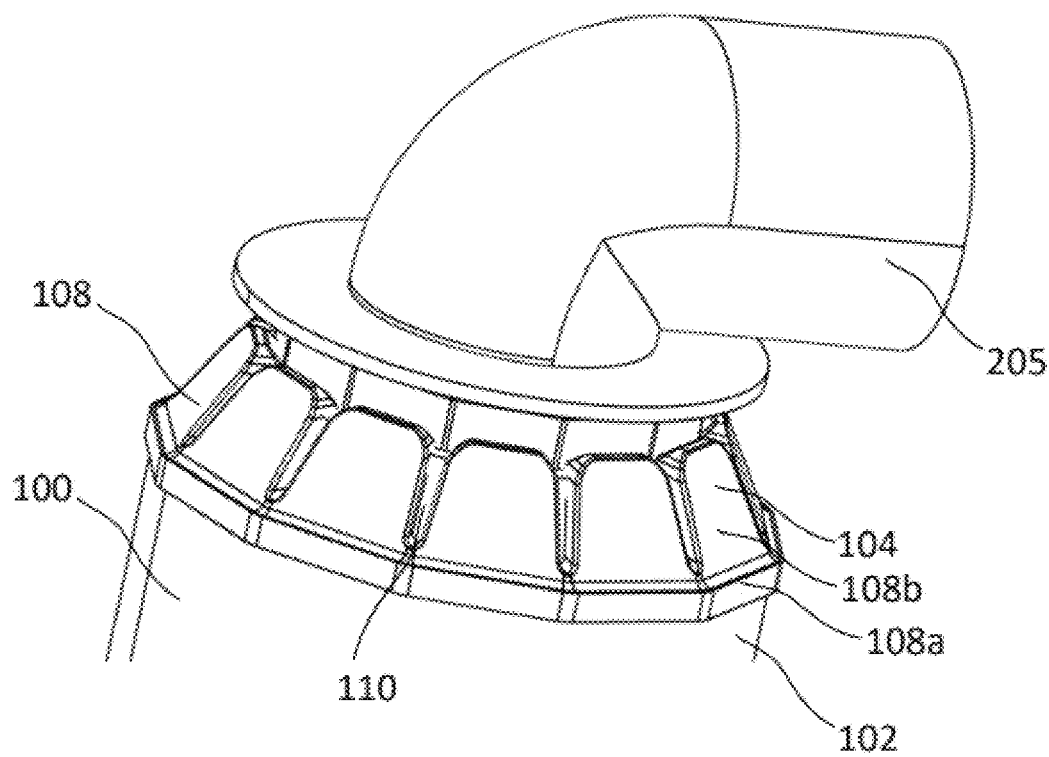
FIG. 15 is a perspective view of the outlet tube and filter cartridge of the air cleaner assembly shown in FIG. 1 with the filter cartridge fully installed onto the outlet tube.

Installation of the filter cartridge 100 onto the outlet tube assembly 205 will now be described. In a first step, and as depicted at FIG. 14, the filter cartridge 100 is axially displaced towards the outlet tube assembly 205 which will result in the end surface or portions 108e and/or 108f of the support structure 108 to contact either the axial ends of the first or second projections 205e, 205f, depending on the rotational orientation of the filter cartridge 100. In the former case, the rounded edges of the reinforcement members 108b will help the user to rotationally clock the filter cartridge 100 until the projections 205e are received into the gaps 108c between the reinforcement members 108b. Once this rotational position is achieved, as shown at FIG. 14, the slanted axial faces associated with portions 108f will contact the slanted axial faces associated with the projections 205f and distal end 205b. In the configuration shown, the slanted axial faces associated with the projections 205f and distal end 205b are generally parallel to the slanted axial faces associated with portions 108f. With such a configuration, and upon further displacement of the filter cartridge 100 towards the outlet tube assembly 205, these axial faces will force the reinforcement members 108b in a radially outward direction such that the seal member is eventually stretched over the outer radial seal surface 205a of the outlet tube, as schematically shown at FIG. 15. It is noted that the positions of the reinforcement members 108b in FIGS. 3 and 15 are not actually depicted as being flexed outwardly in the installed position and that a person skilled in the art would readily understand the resulting flexed out position of the reinforcement members 108b based on the description herein and the other figures in the application.

In one aspect, the seal member is sufficiently compressible such that the radial seal surface 110a, which is cylindrically shaped in the relaxed state, conforms to the generally polygonal shape of the outer radial seal surface 205a when the filter cartridge 100 is fully installed onto the outlet tube assembly 205. When so installed, the reinforcement members 108b provide a resistant spring force in a radial inward direction against the seal member 110 which advantageously aids in ensuring a seal is fully formed between the radial seal surface 110a and the seal surface 205a of the outlet tube assembly 205. With such a construction, it is possible to provide an end cap having a seal member 110 with a radial seal surface 110a that has a first shape in a natural or relaxed state and that has a second shape in the installed condition, wherein the first shape is different from the second shape. In the example shown, the first shape is a cylindrical or circular shape while the second shape is a generally polygonal shape. It is further noted that the first shape of the seal surface 110a has a dimension that is less than a corresponding dimension of the seal surface 205a while the second shape of the seal surface 110a has a dimension that is equal to a corresponding dimension of the seal surface 205a.

Figure 16:
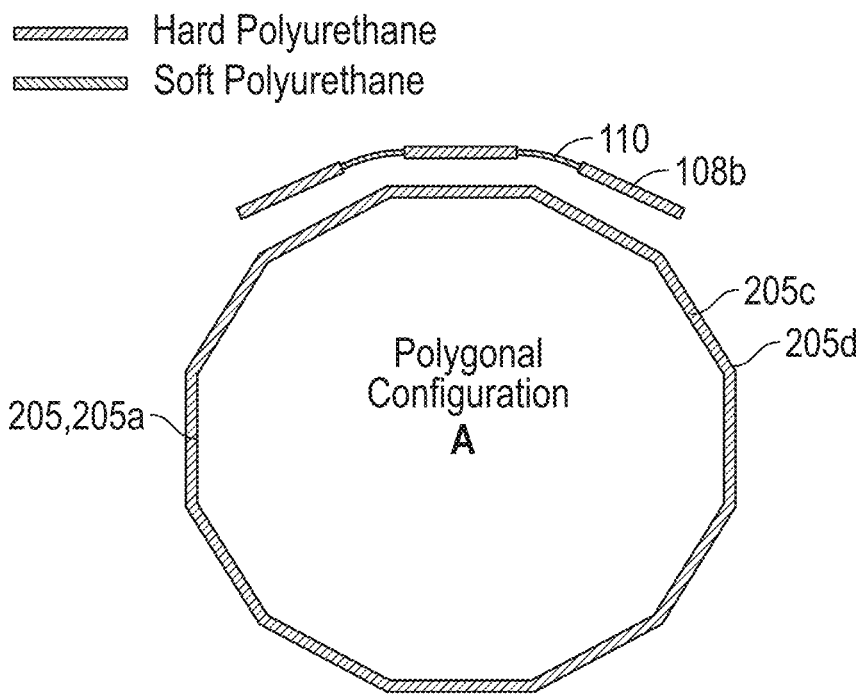
FIG. 16 is a schematic representation of the outlet tube and filter cartridge in a first sealing configuration corresponding to the configuration shown for the air cleaner assembly shown in FIG. 1.
Figure 17:
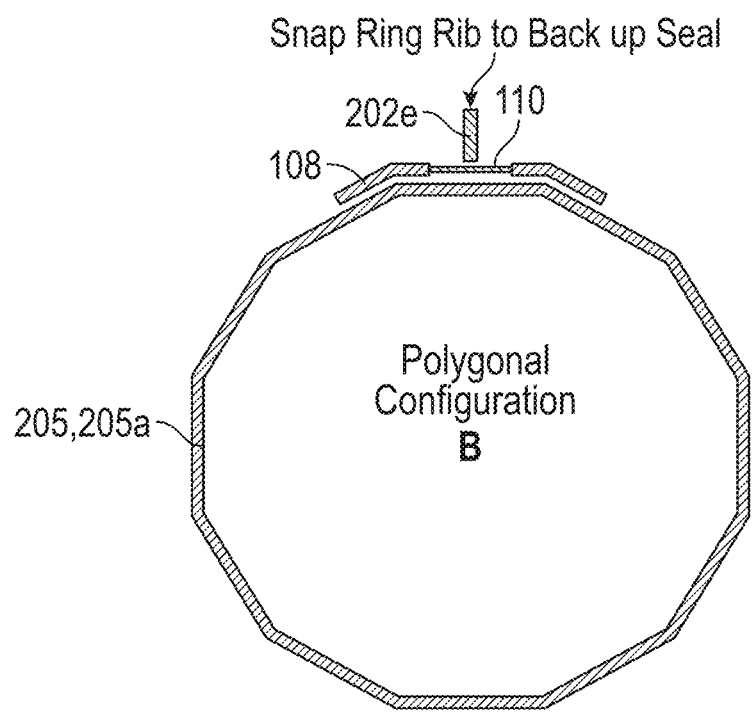
FIG. 17 is a schematic representation of the outlet tube and filter cartridge in an alternative second configuration that is usable with the air cleaner assembly shown in FIG. 1.
Figure 18:
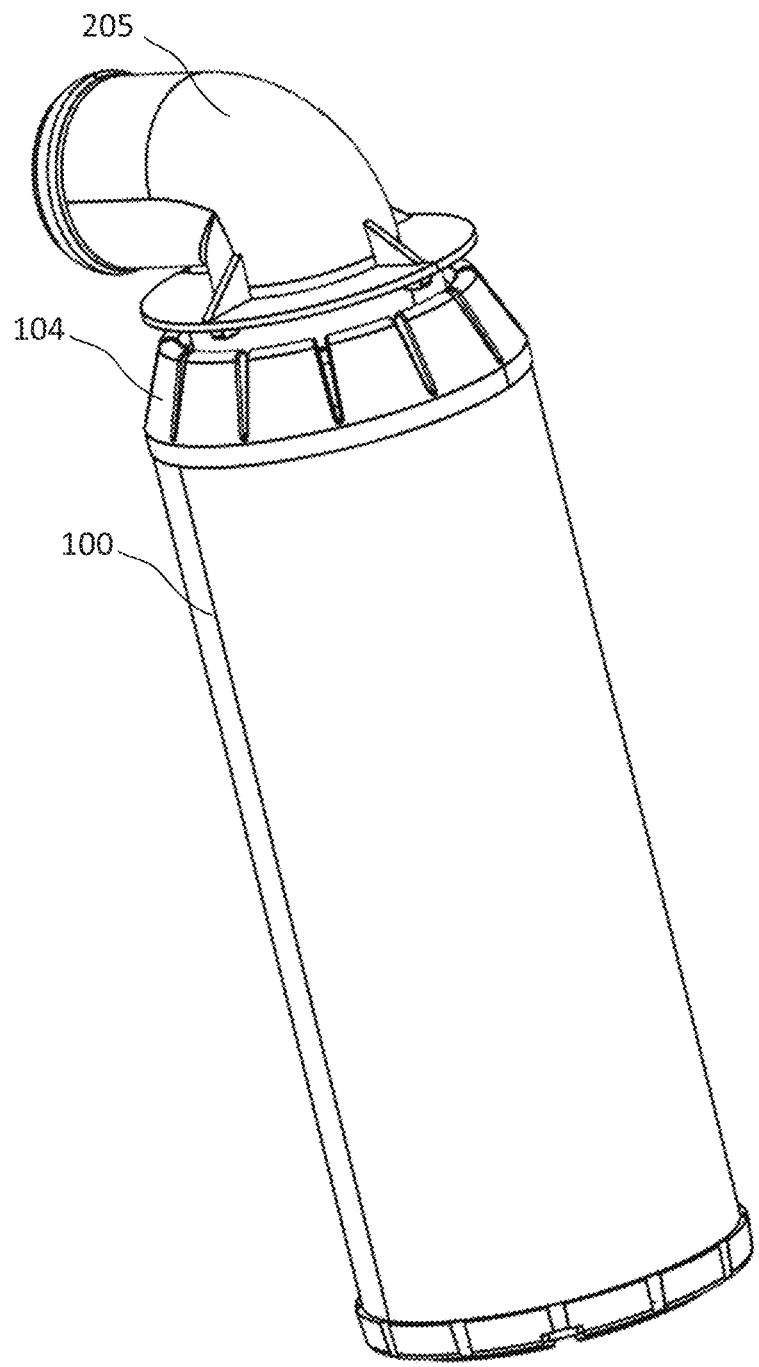
FIG. 18 is a perspective view of the filter cartridge shown in FIG. 8 shown as being mounted on an alternative outlet tube that can be used with the air cleaner assembly shown in FIG. 1.
Figure 19:
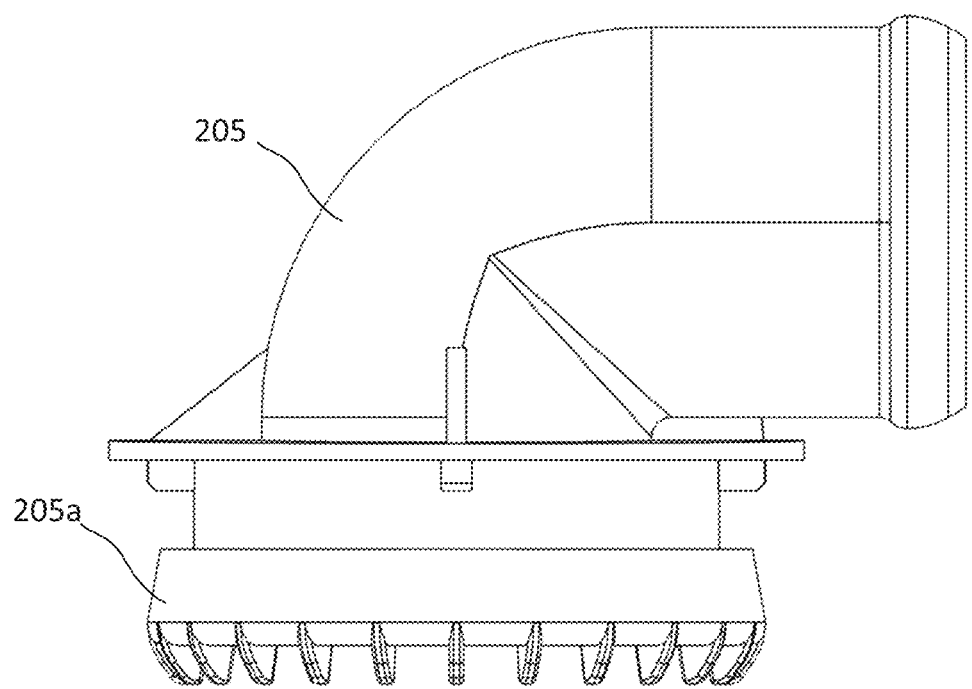
FIG. 19 is a side view of the outlet tube shown in FIG. 18.
Figure 20:
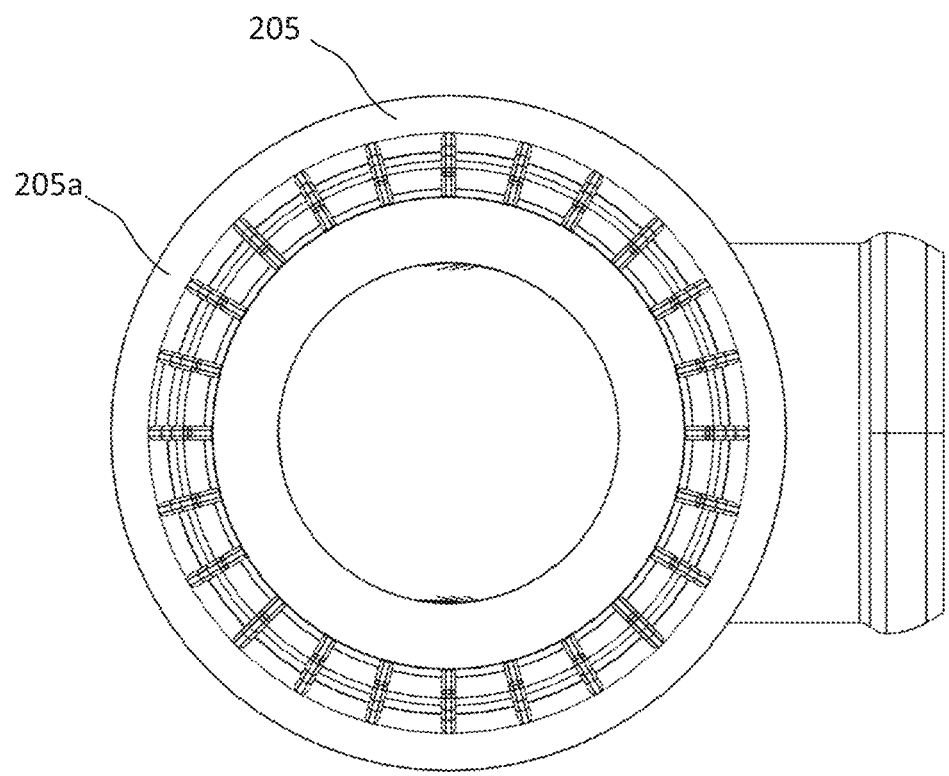
FIG. 20 is a bottom view of the outlet tube shown in FIG. 18.
Figure 21:
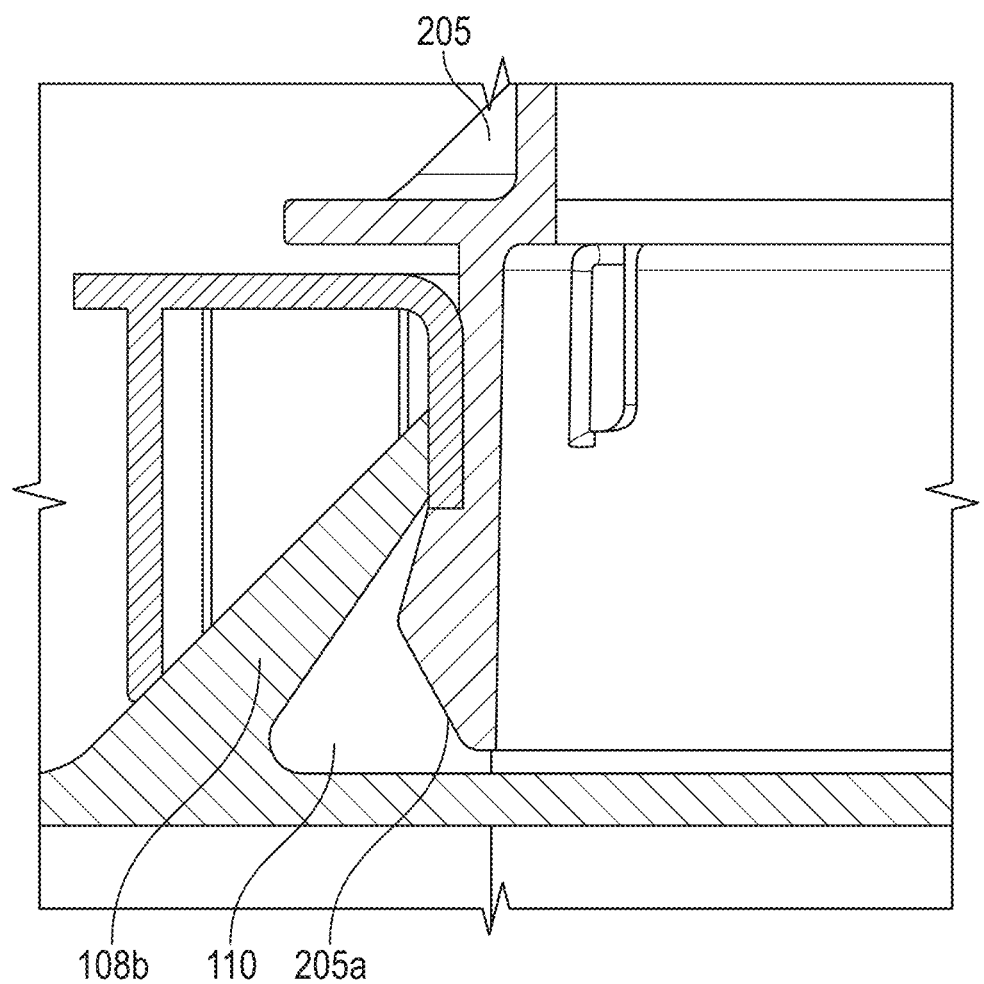
FIG. 21 is a partial cross-sectional view of an end cap arrangement usable with the filter cartridge shown in FIG. 4.

Referring to FIGS. 16 and 17, schematic depictions of the outlet tube assembly 205 and seal surface 205a are depicted in which different configurations of the support structure 108 and seal member 110 are shown. FIG. 16 generally corresponds to the example shown at FIGS. 1-15 and illustrates that the reinforcement members 108b are aligned with the flat sides 205c such that the portions of the seal member 110 that are unsupported by the reinforcement members 108b are aligned with the corners or curved portions 205d. In such a configuration, the seal member 110 can generally compress and/or stretch to accommodate and seal against the corners 205d without requiring an additional support for force from a reinforcement member 108b. FIG. 17 shows an alternative arrangement in which the reinforcement members 108b extend across the corners 205d and in which the unsupported portions of the seal member 110 extend across the flat sides 205c. In some arrangements, the seal member 110 can still adequately form a seal against the flat sides 205c without the aid of any additional supporting structures. However, in some configurations, radially inward projections 202e associated with the housing can be provided to contact and exert a compressive force onto the seal member 110.

Referring to FIGS. 18 to 21, it can be seen that the same filter cartridge 100 can advantageously also be installed onto other types of outlet tubes that do not necessarily have a polygonal shape. In the example shown at FIGS. 18 to 20, an outlet tube assembly 205 is provided with a seal surface 205a that has a smooth frustoconical shape that tapers in a direction away from the end cap 104. In the example shown at FIG. 21, the outlet tube assembly 205 is shown with a seal surface that has a distal end that initially slants in a direction away from the longitudinal axis and then slants towards the longitudinal axis. In such a configuration, the seal surface 205a has a maximum diameter somewhere between the axial ends of the seal surface 205a such that the seal surface 205a has one or more undercut portions or surfaces relative to the maximum diameter. In one aspect, the oblique angle(s) presented by the outlet tube seal surface 205a can result in advantageous force directions. When the seal surface 205a is angled as such, a force to the seal surface 110a is applied at a non-orthogonal angle. Accordingly, there is not only a radial force applied to the seal member, but also an axial force applied to the element which pushes the element further onto the outlet tube assembly 205. In some applications, this arrangement can be beneficial to securing the filter cartridge end cap 104 to the outlet tube assembly 205, and/or holding it in place during vibration. Further, such an arrangement could eliminate the need for compression bumpers on the closed end and therefore result in space savings. The angled inlet tube surface 205a shown at FIGS. 18-20 can also provide for these effects. In other examples, the filter cartridge 100 could also be installed over a seal surface having a combination of the above-noted features, for example, a polygonal shape that is also tapered or provided with an undercut surface.

Figure 22:
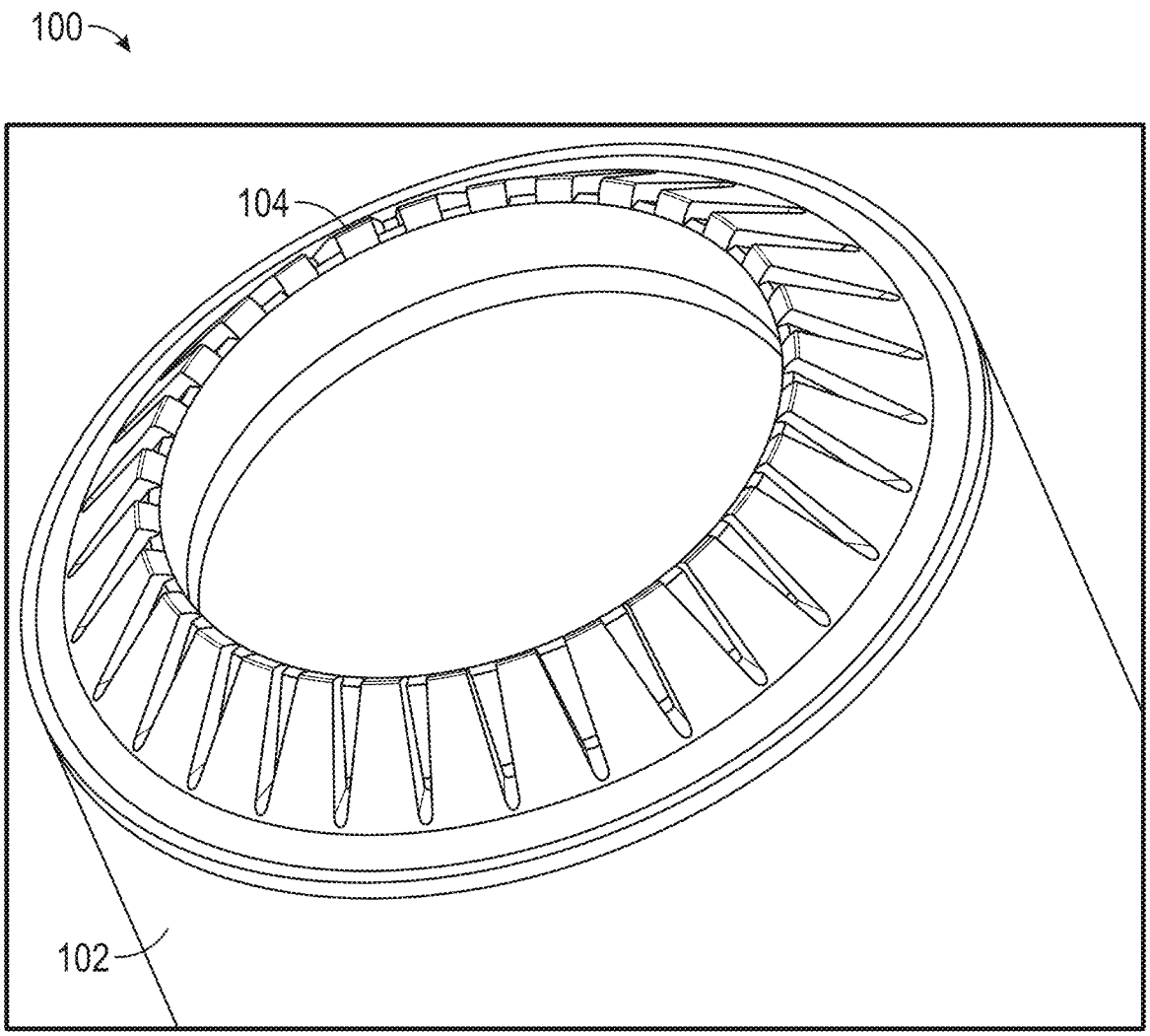
FIG. 22 is a perspective view of a portion of a filter cartridge with an end cap arrangement usable with the filter cartridge shown in FIG. 4.
Figure 23:
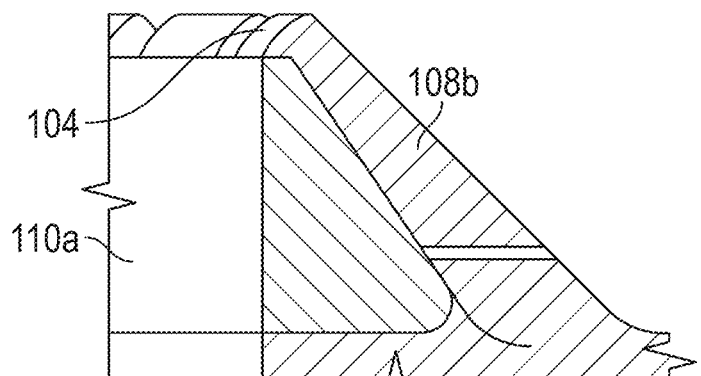
FIG. 23 is a partial cross-sectional view of an end cap associated with the filter cartridge shown in FIG. 22.
Figure 24:
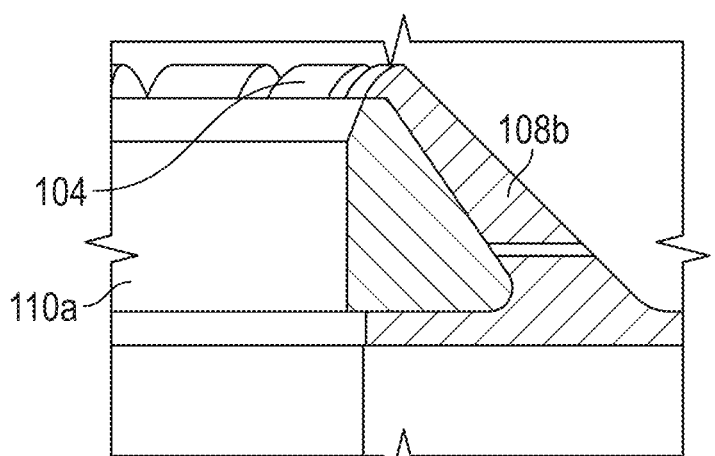
FIG. 24 is a partial cross-sectional view of an end cap arrangement usable with the filter cartridge shown in FIG. 4.
Figure 25:
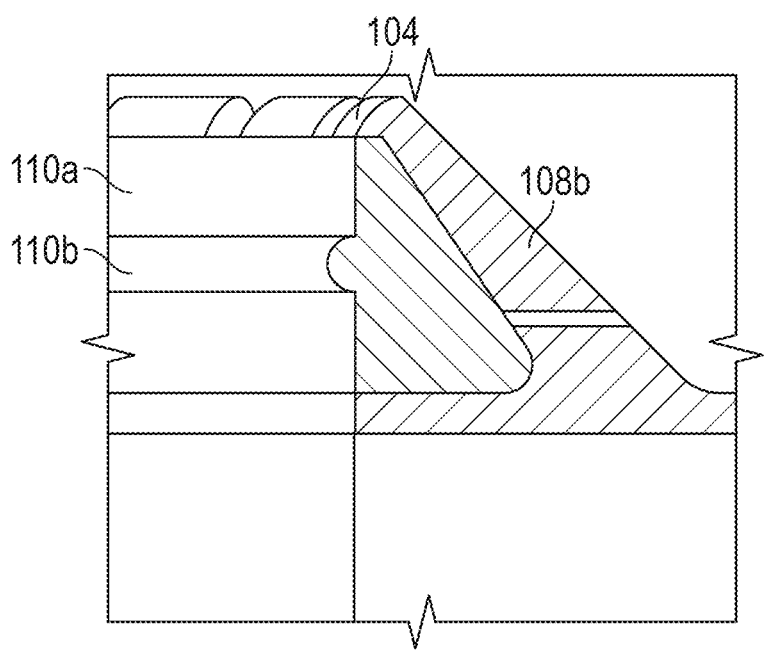
FIG. 25 is a partial cross-sectional view of the filter cartridge shown in FIG. 21 shown as being mounted on an alternative outlet tube that can be used with the air cleaner assembly shown in FIG. 1.

FIGS. 22 to 25 show variations in geometry of the end cap 104 that are usable with filter cartridge 100. FIGS. 22 and 23 show an example in which the reinforcement members 108b are provided with a more aggressive taper towards the longitudinal axis X1. FIG. 23 also shows that the radial innermost portion of the seal surface 110a and the reinforcement members 108b, in the relaxed state, extend to about the same diameter, which is also the case for the filter cartridge 100 shown at FIG. 13. FIG. 24 shows an example in which the seal member 110 is configured such that the seal surface 110a is radially inward of the innermost portion of the reinforcement members 108b. FIG. 25 shows an example in which a rib portion 110b is provided as part of the seal surface 110a, wherein the rib portion 110b is radially inward of the innermost portion of the reinforcement members 108b and wherein the remaining portion has a radial inward dimension corresponding to the radial inward dimension of the reinforcement members 108b. By providing additional seal material radially inward of the innermost radial portion of the reinforcement members 108b, an enhanced seal can be achieved with some outlet tube configurations. In one aspect, the surface 110a can be characterized as being undercut with respect to the rib portion 110b as the innermost diameter of the surface 110a is greater than that of the rib portion 110b.

Figure 26:
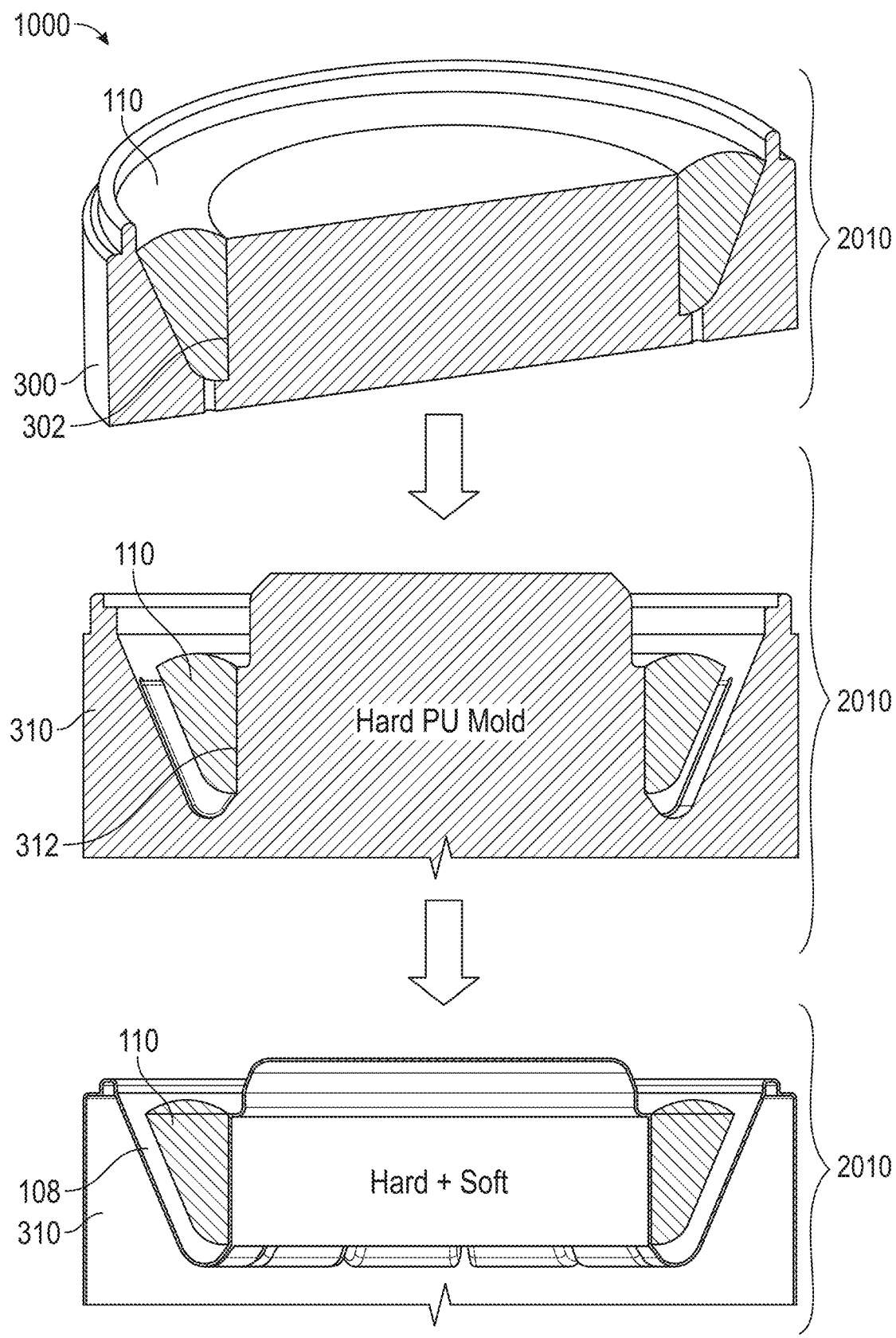
FIG. 26 is a schematic illustration of a process for forming any of the filter cartridge end cap arrangements disclosed herein.
Figure 27:
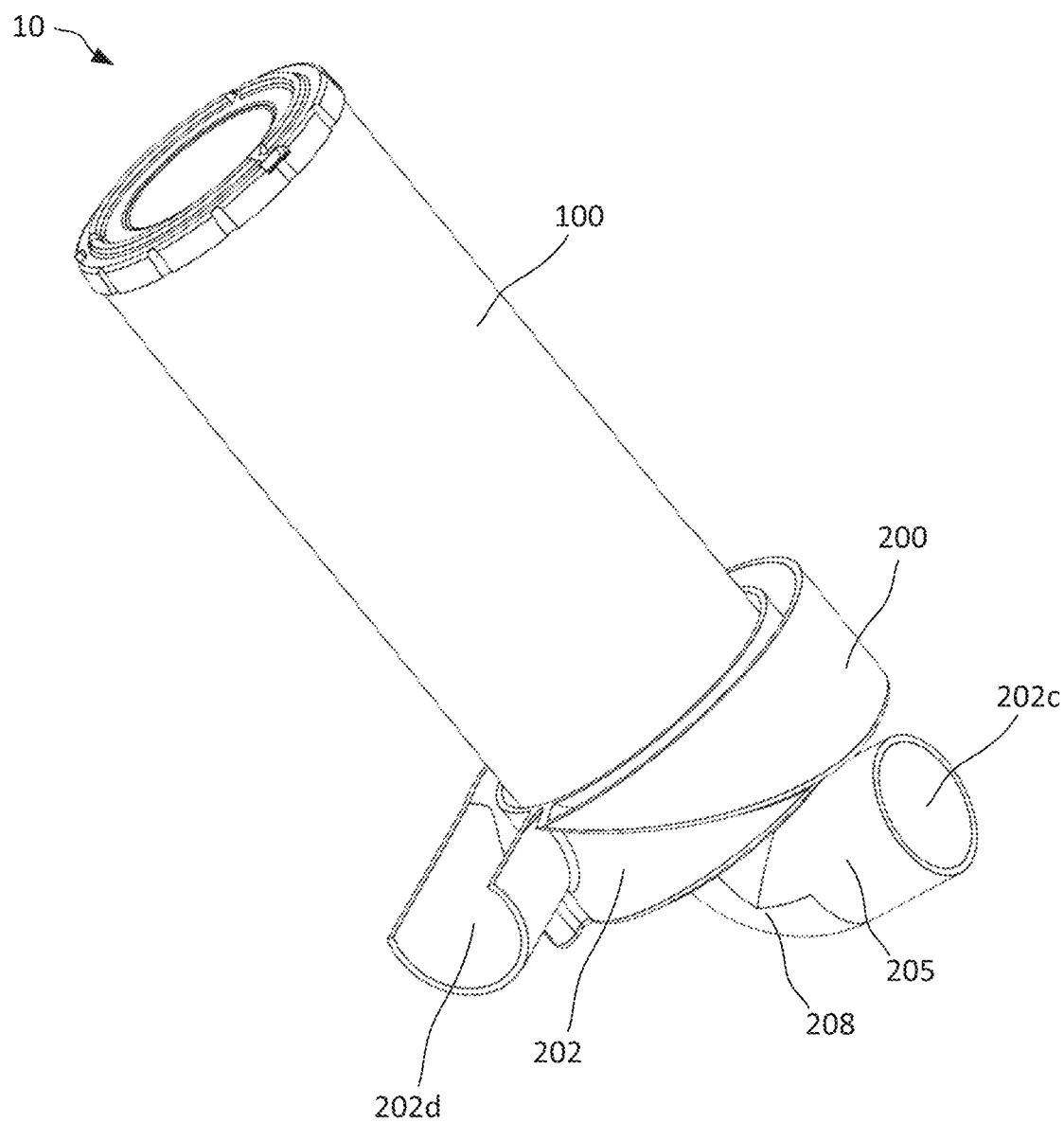
FIG. 27 is a perspective view of an example filter cartridge and housing assembly portion usable with an air cleaner assembly of the type shown in FIG. 1.
Figure 28:
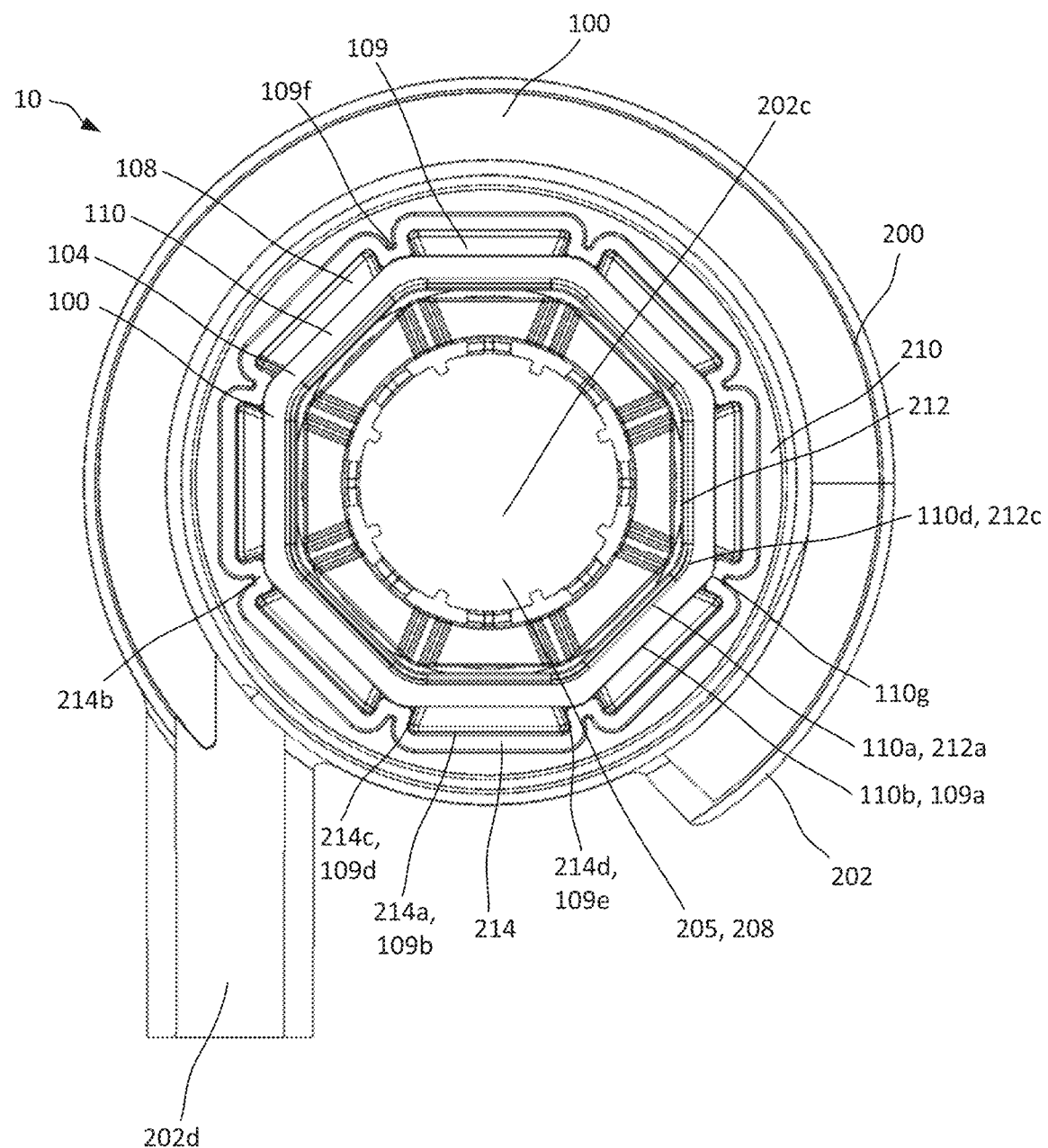
FIG. 28 is a lateral cross-sectional view of the assembly shown in FIG. 27.
Figure 29:
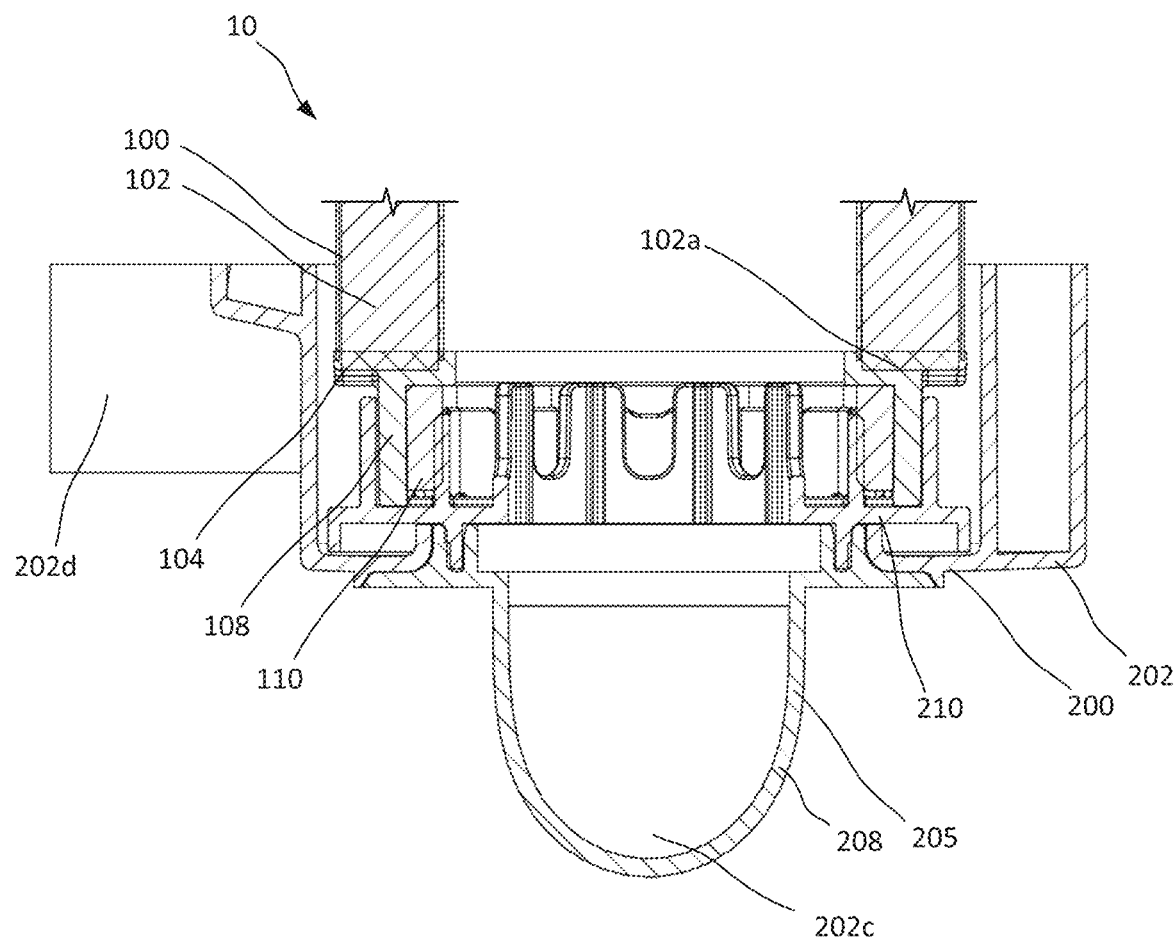
FIG. 29 is a partial longitudinal cross-sectional view of the assembly shown in FIG. 27.
Figure 30:
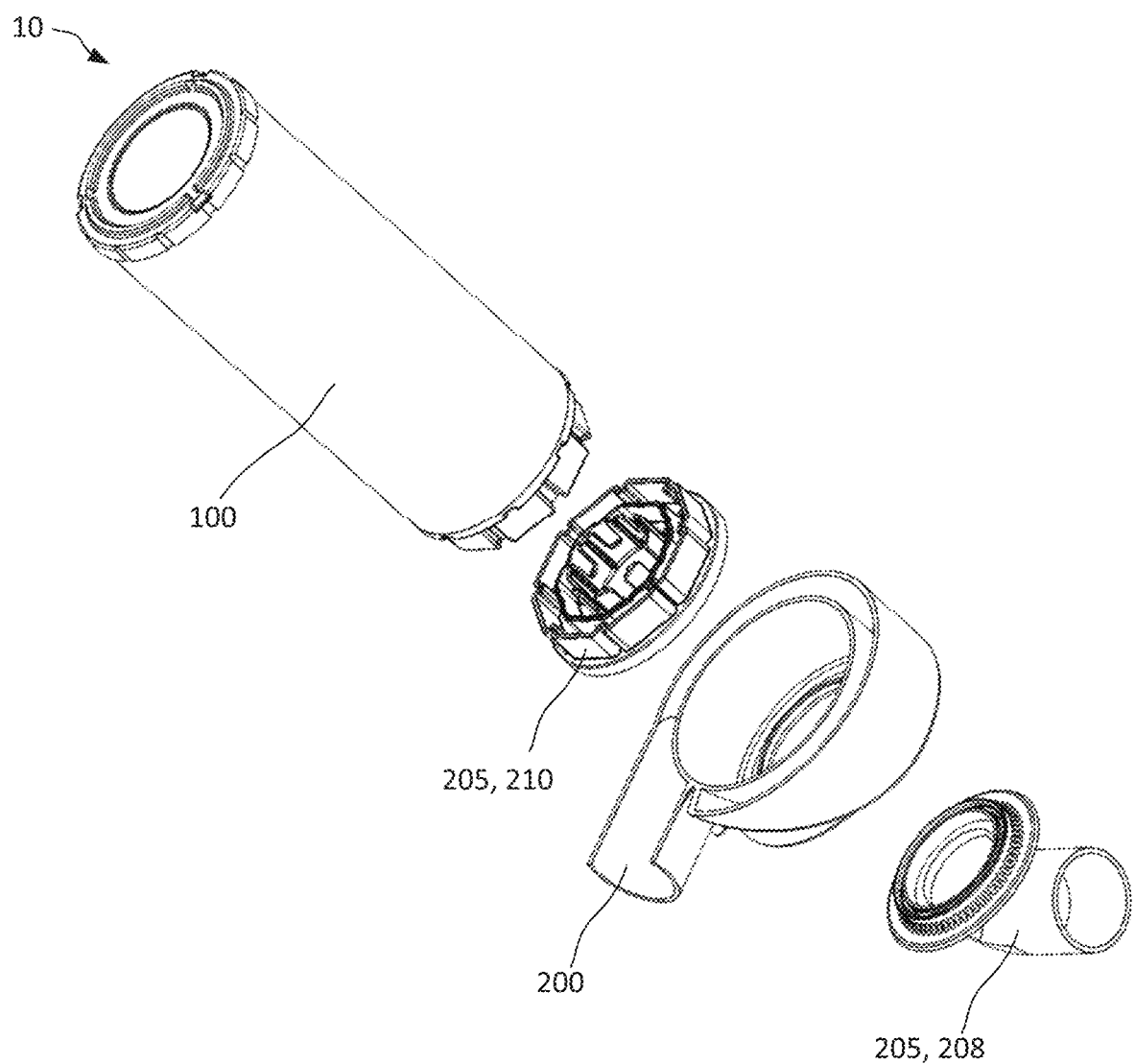
FIG. 30 is a perspective exploded view of the assembly shown in FIG. 27.
Figure 31:
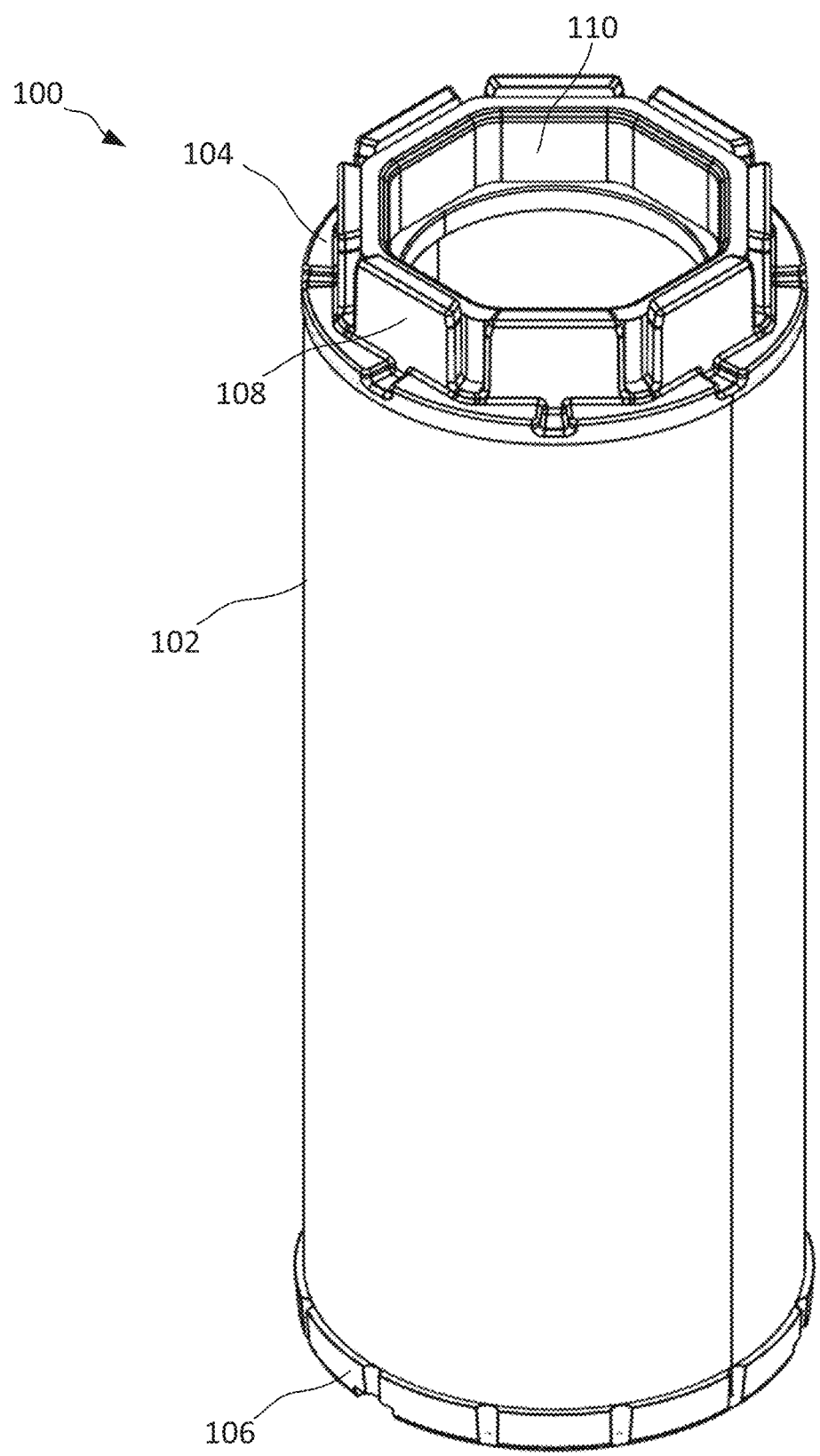
FIG. 31 is a perspective view of the filter cartridge shown in FIG. 27.
Figure 32:
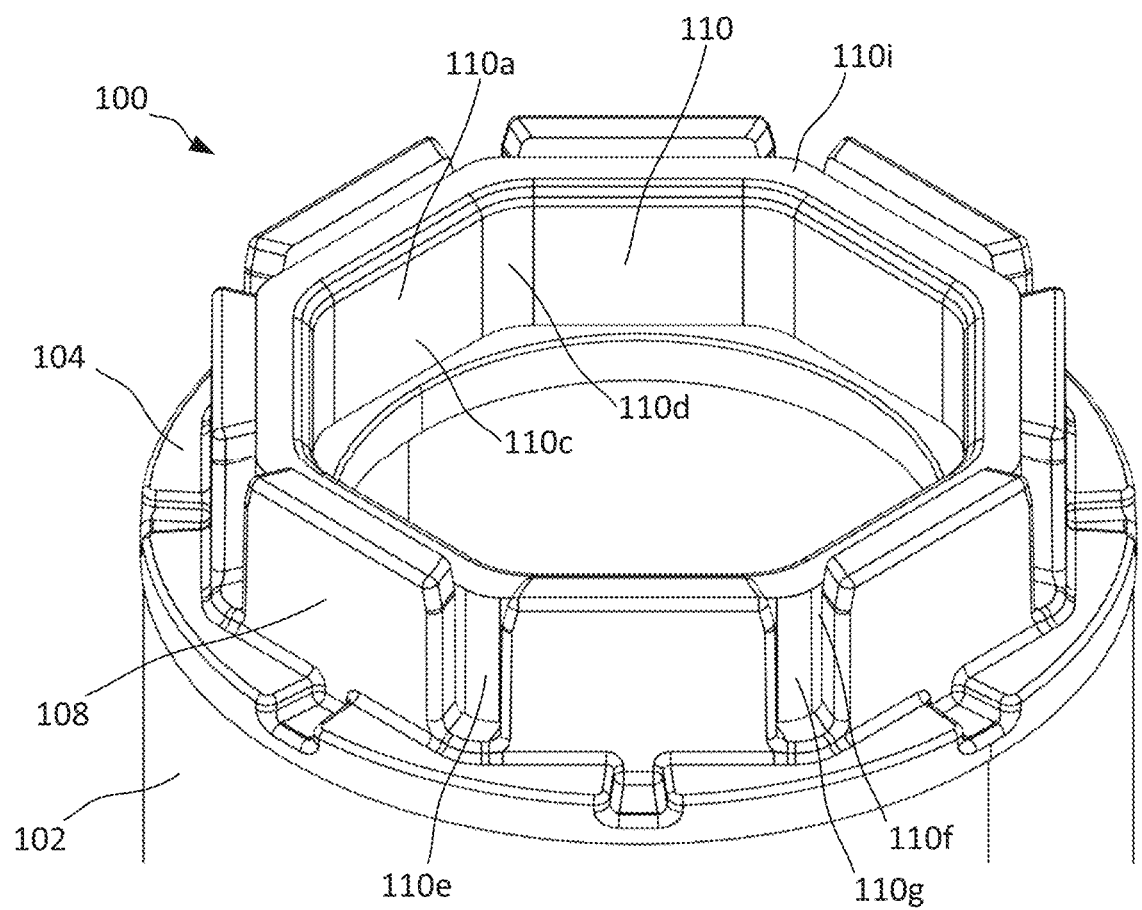
FIG. 32 is an enlarged perspective view of a portion of the filter cartridge shown in FIG. 31.
Figure 33:
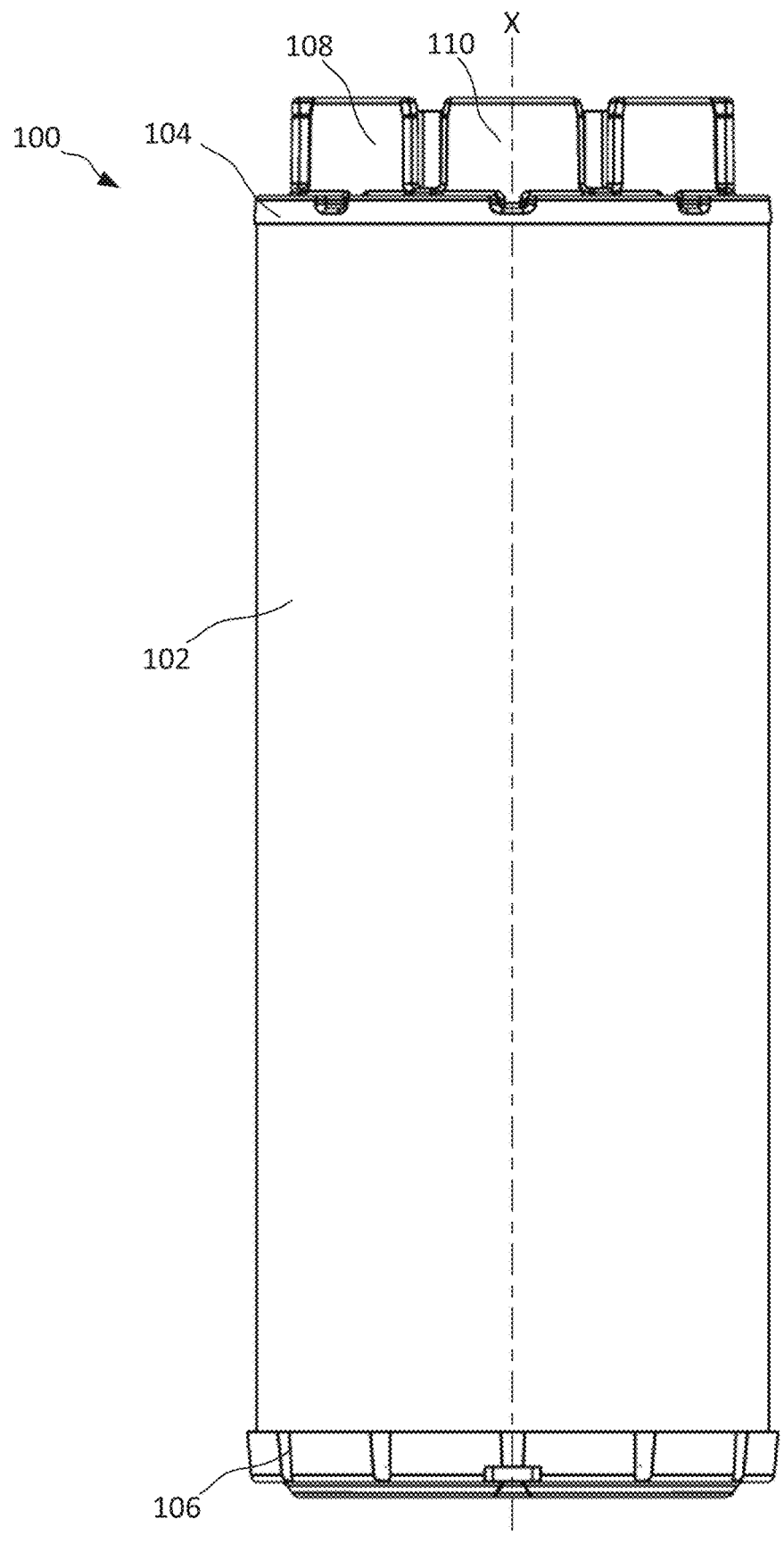
FIG. 33 is a side view of the filter cartridge shown in FIG. 31.
Figure 34:
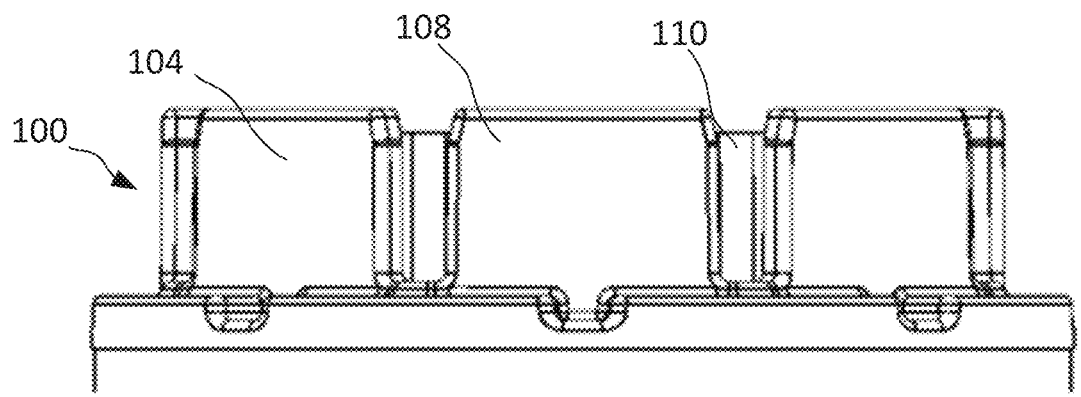
FIG. 34 is an enlarged portion of the filter cartridge view shown at FIG. 33.

Referring to FIG. 26, a schematic illustration of a process 1000 for forming any of the filter cartridge end cap arrangements disclosed herein is presented. As shown, at a stage 2010, the seal member 110 is formed in a first mold 300 having a radially outward facing seal forming surface 302, having a first diameter, that defines the seal surface 110a. In some examples, the seal member 110 is formed from a polyurethane material that is relatively soft in comparison to the material used for the support structure 108, which can also be a polyurethane material. Other materials and combinations of materials may be provided for the support structure 108 and seal member 110. Once the seal member 110 has been sufficiently cured, the seal member can be placed into a second mold 310 at a stage 2020. The second mold 310 has a radially outward facing surface 312 that has a second diameter that is greater than the first diameter. Accordingly, in order to place the seal member 110 within the second mold 310, the seal member 110 must be stretched over the surface 312. Once the seal member is so installed, the material for the support structure 108 can be poured into the second mold 310 to surround the seal member 110 at a stage 2030. The second mold 310 is formed with various ribs and other structures to ensure that the reinforcement members 108b are formed to have the desired shape shown in any of the previous drawings. In some examples, stage 2030 also includes placing the end of the media 102 within the mold such that the material for the support structure 108 bonds and seals to the media 102, thereby resulting in the fully formed end cap 104 being bonded to the media 102. In some examples, the end cap 104 is fully formed and then later attached to the media 102 by any means known in the art. Once the material for the support structure 108 has cured, the support structure and seal member 110 are sufficiently bonded together such that the seal surface 110a of the seal member is maintained at the diameter defined by the surface 312 after removal from the mold 312. Accordingly, the seal member 110 has a degree of resulting internal tension which advantageously aids in providing an additional sealing force against the outlet tube.

Example of FIGS. 27-48

Referring to FIGS. 27 to 48, aspects of an example filter cartridge 100 and related air cleaner assembly components are further illustrated. It is noted that FIGS. 27 to 30 show only a portion of the air cleaner housing assembly 200 for purposes of clarity and that the filter cartridge 100 would be completely enclosed within the housing assembly 200 in a similar manner to that shown at FIG. 1 in an actual installation. Further, the features of the air cleaner housing assembly 200 and an associated safety filter cartridge 150 described below in association with FIGS. 49 to 55B are likewise suitable for use with this example. The filter cartridge 100 of this example shares many features in common with the filter cartridge 100 shown in FIGS. 8 to 13 and differs primarily in that a differently configured open end cap 104 is provided, as discussed herein. As most easily viewed at FIGS. 27 to 34, the filter cartridge 100 includes filter media 102 extending between a first end cap 104 and a second end cap 106. In the particular example shown, the filter media 102 is pleated media arranged in a tubular manner to define a central opening 102c around an axis X. Other media types and configurations are possible, for example, fluted media, depth media, non-pleated media, coiled media, and/or stacked media, etc.

In one aspect, the first end cap 104 is an open end cap and is connected to a first axial end 102a of the filter media 102 in a fluid tight manner. In one aspect, the second end cap 106 is a closed end cap and is connected to a second axial end 102b of the filter media 102 in a fluid tight manner. The first and second end caps 104, 106 can, for instance, be formed and attached to the filter cartridge 100 by a polyurethane potting process. In one aspect, the end caps 104, 106, have generally annular or circular outer and innermost perimeters. The filter media 102 is also shown as being provided with an annular or circular shape with a hollow interior. Other shapes for the end caps 104, 106 and filter media 102 are possible, for example, elliptical shapes, obround, oval or race-track shapes, polygonal, and/or conical or frustoconical shapes.

In one aspect, the first end cap 104 has a multi-component construction including a support structure 108 and an adjoining seal member 110. In some examples, the support structure 108 is formed from a material that is harder and/or stiffer than a material forming the seal member 110. In some examples, the support structure 108 is secured to the media 102 and the seal member 110 is secured to the support structure 108. In some examples, the seal member 110 is secured to the media 102 and the support structure 108 is secured to the seal member 110. In some examples, both the support structure 108 and the seal member 110 are secured to the media 102 and to each other. In examples, the support structure 108 is formed from a material that has a higher hardness and/or stiffness in comparison to the seal member 110. With respect to the materials described herein, materials with a higher hardness typically also happen to have a higher stiffness, and vice versa. For reference, hardness refers to a material's resistance to permanent deformation or indentation while stiffness refers to a material's resistance to elastic deformation under load. In some examples, the material used for the support structure 108 has a lower coefficient of friction in comparison to the material used for the seal member 110. According to preferred embodiments, the support structures 108 are made of a relatively hard material. Preferably, the support structures comprise materials which are from medium hard to hard and up to extra hard. To express and measure the hardness of a material, the known shore-A scale or shore-D scale can be used. In embodiments, the support structures have a hardness either measured on a shore-A scale between 60 and 100, preferably between 70 and 100, more preferably between 80 and 100 or, alternatively, when measured on a shore-D scale between 0 and 100, preferably between 15 and 100, more preferably between 30 and 100. In comparison, in examples, the seal member 110 can be provided with a hardness of less than 20 on the shore-A scale.

As most easily seen at FIGS. 31 to 43, the seal member 110 extends between a base end 110h and a distal end 110i and defines a radially inward facing surface 110a and an opposite radially outward facing surface 110e that each have a generally polygonal cross-sectional shape in a relaxed state of the seal member 110. In the example presented, the inward facing surface 110a has a plurality of respective flat sides 110c joined together by radiused or curved corner portions 110d, while the outward facing surface 10e has a plurality of respective flat sides 110f joined together by radiused or curved corner portions 110g. As shown, each of the surfaces 110a, 110e has eight flat sides and eight corner portions. Other numbers of flat sides and corner portions are possible, such as three, four, five, and six sides, as schematically depicted at FIGS. 88 to 91. Additional sides are also possible, such as seven and nine or more flat sides and corner portions. In the example shown, the radially inward facing surface 110a defines a seal surface for forming a seal against a correspondingly shaped outlet tube assembly 205. In the example shown, the outlet tube assembly 205 includes a first part 208 and adjoining second part 210. As shown, each of the first and second parts 208, 210 define a central opening for allowing air to pass therethrough. The second part 210 is shown as having a sidewall 212 having a radially outward facing seal surface 212a with flat sides 212b and corners 212c that form a generally polygonal cross-sectional shape corresponding to the shape of the seal surface 110a. The outlet tube assembly 205 is further illustrated at FIGS. 44 to 48. Other arrangements are possible. For example, the radially outward facing surface 110e can instead or additionally define a seal surface for sealing against the outlet tube assembly 205. It is noted that the radially inward facing side of the sidewall 212 that is opposite the seal surface 212a may be used as a generally polygonal shaped seal surface for a secondary filter having a correspondingly shaped polygonal seal member. Such a use is shown and described in conjunction with the example shown at FIGS. 49 to 55B which is fully applicable to this example as well.

Figure 35:
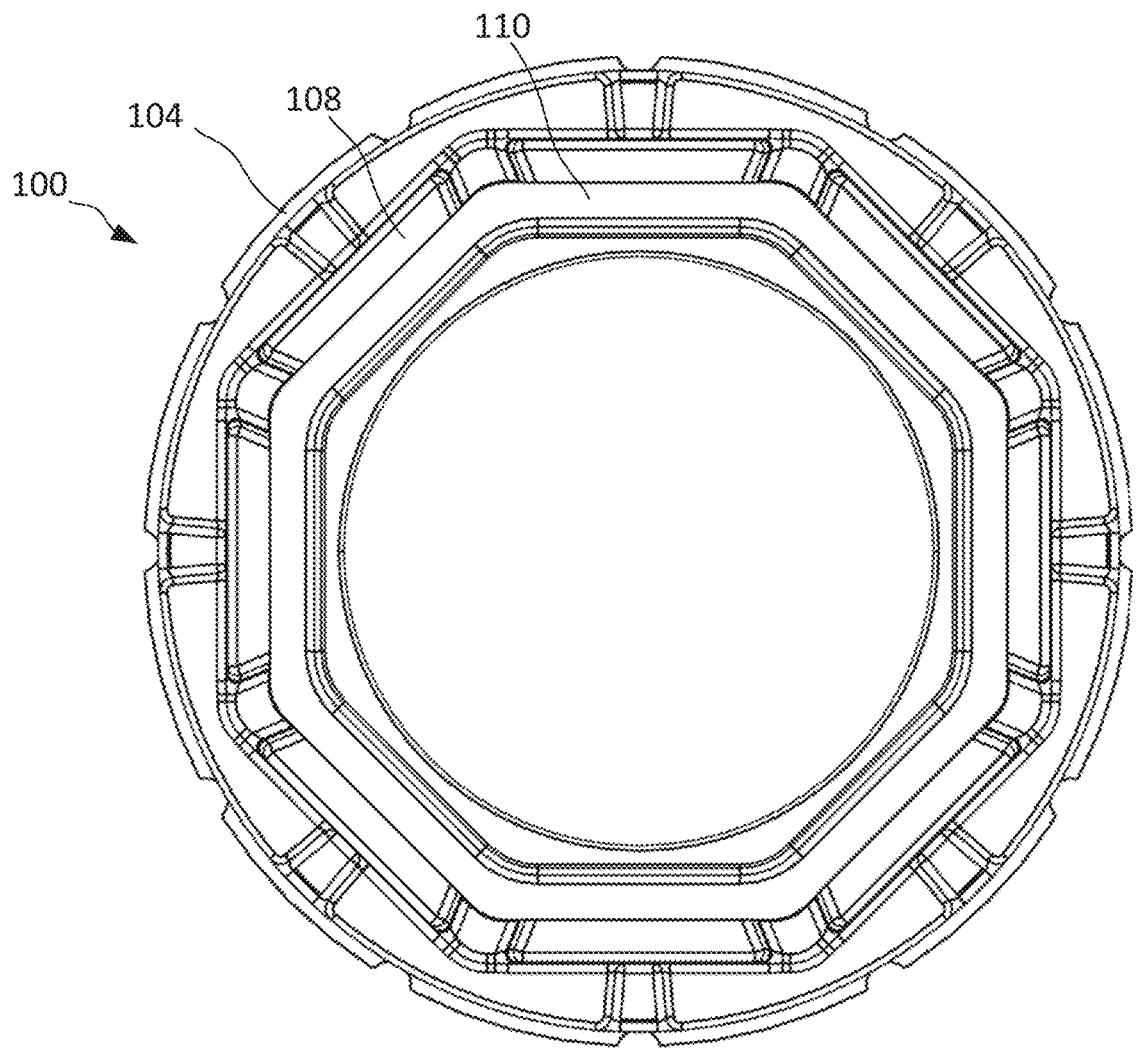
FIG. 35 is a topview of the filter cartridge shown in FIG. 31.
Figure 36:
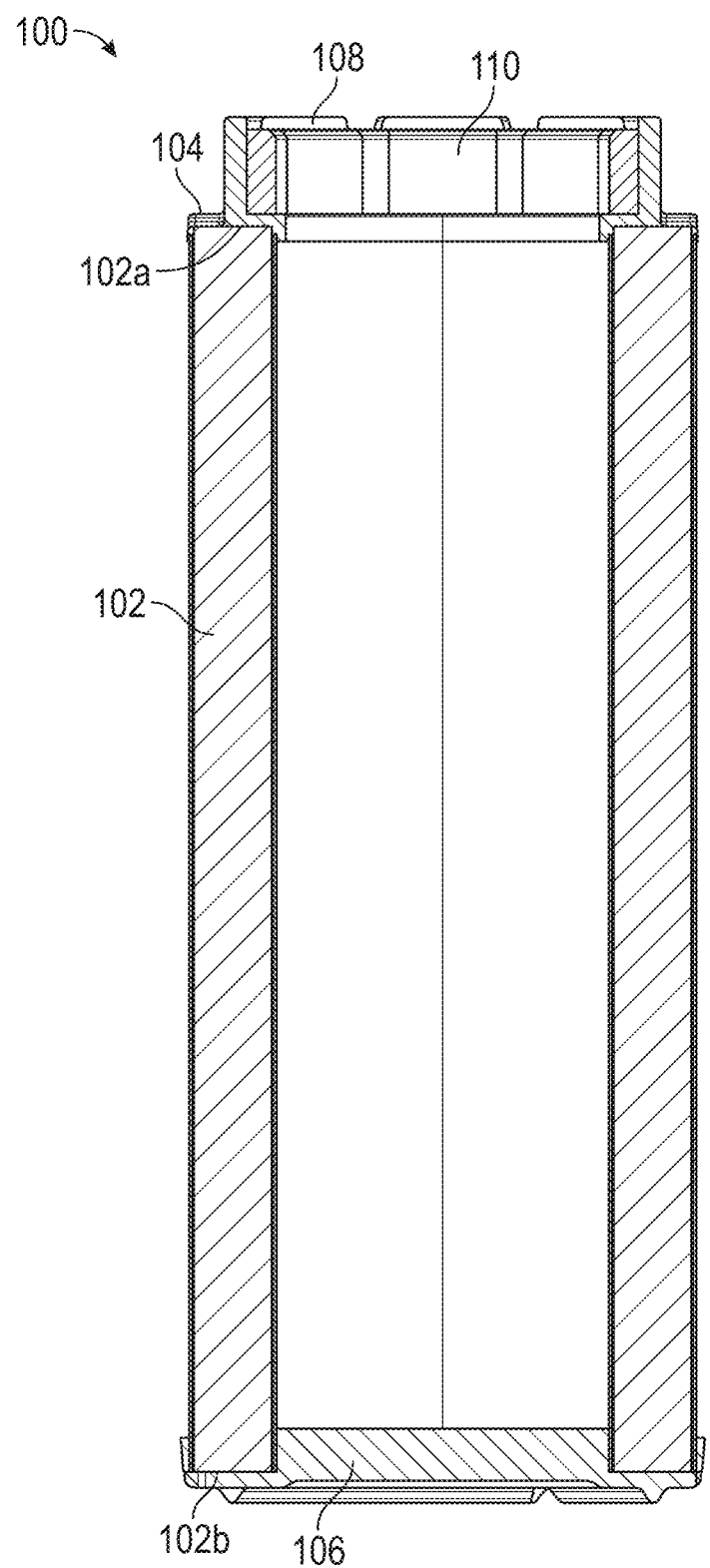
FIG. 36 is a cross-sectional side view of the filter cartridge shown in FIG. 31.
Figure 37:
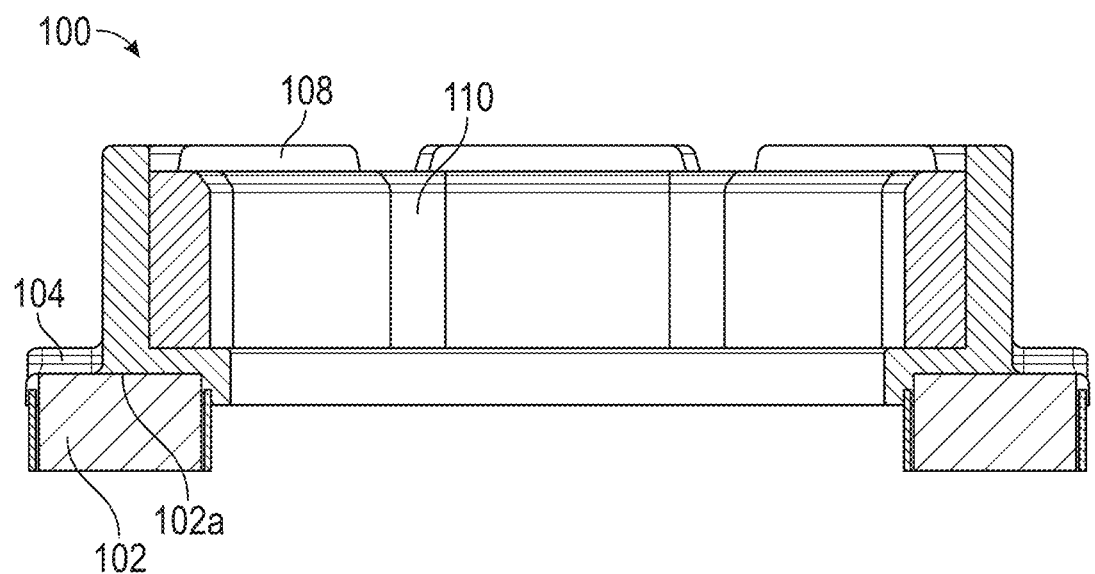
FIG. 37 is an enlarged cross-sectional side view of a portion of the filter cartridge shown in FIG. 36.
Figure 38:
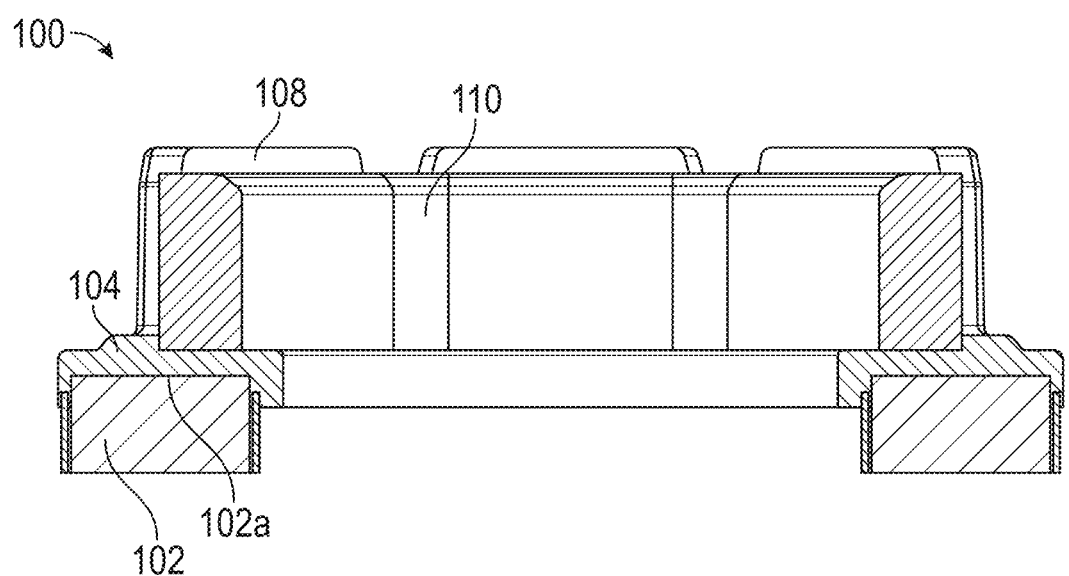
FIG. 38 is an enlarged cross-sectional side view of a portion of the filter cartridge shown in FIG. 36, taken along a line extending between support members of the end cap.
Figure 39:
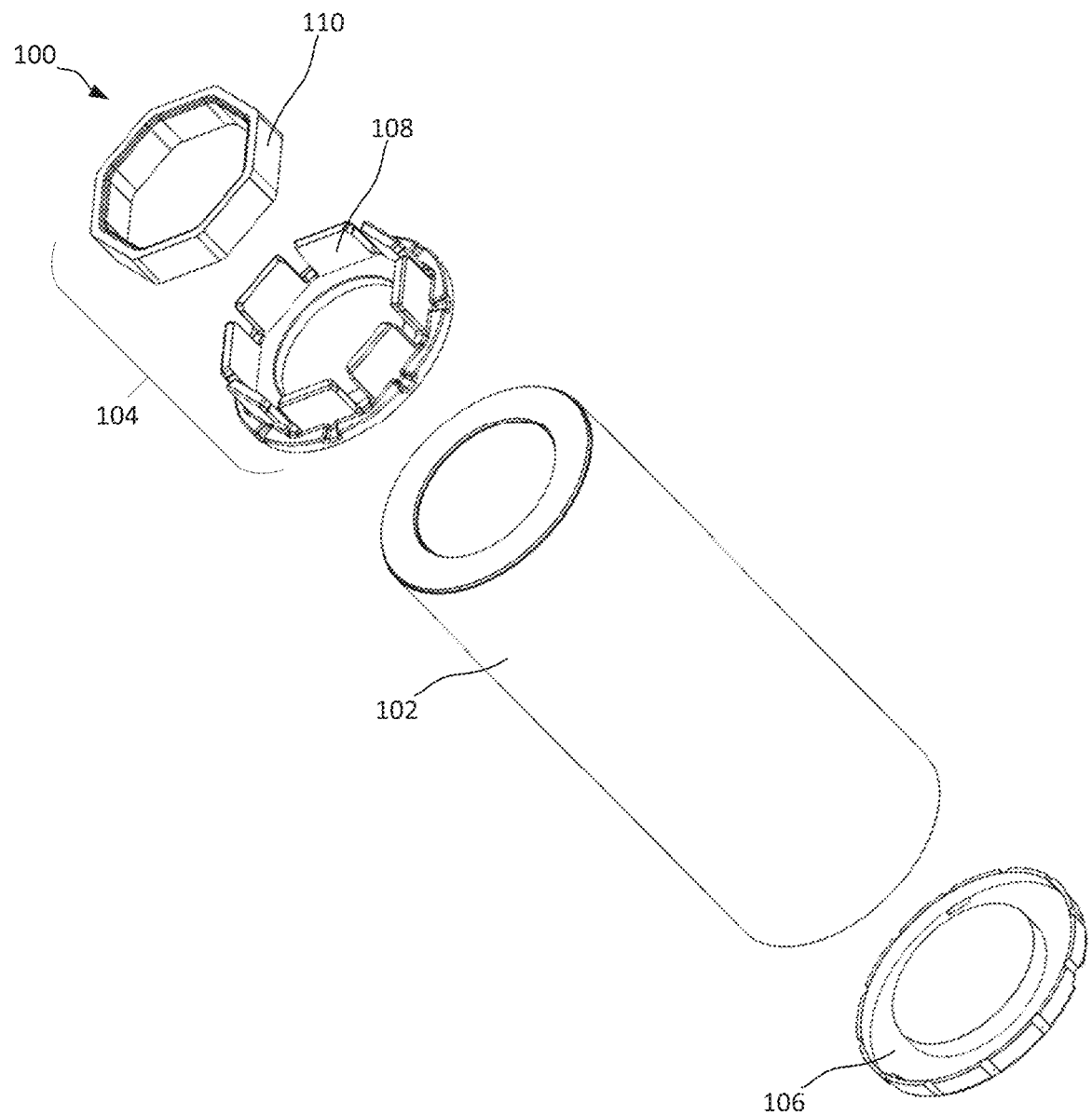
FIG. 39 is an exploded perspective view of the filter cartridge shown in FIG. 31.
Figure 40:
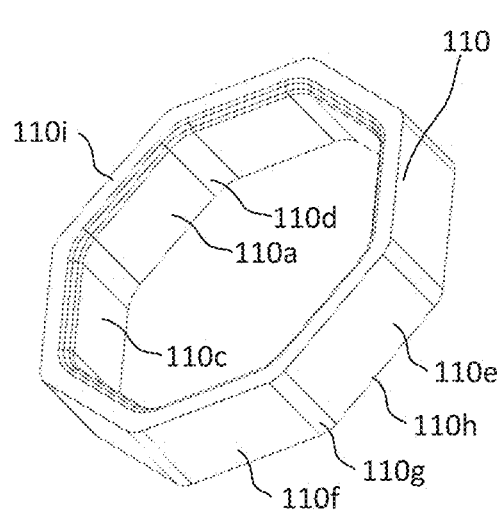
FIG. 40 is a perspective view of a seal member of the filter cartridge shown in FIG. 31.
Figure 41:
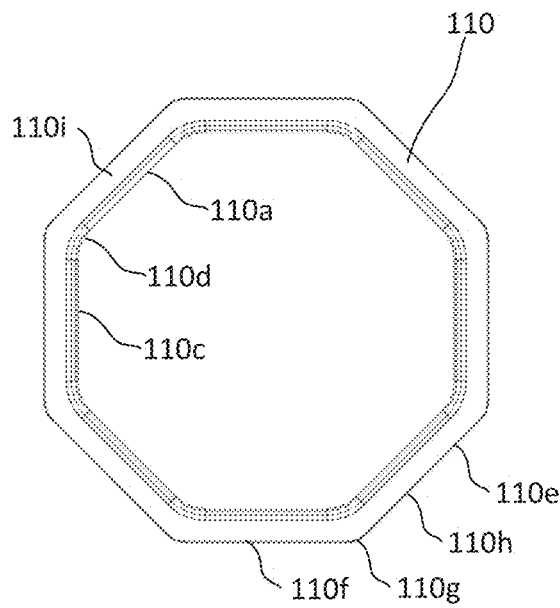
FIG. 41 is an end view of the seal member shown in FIG. 40.
Figure 42:
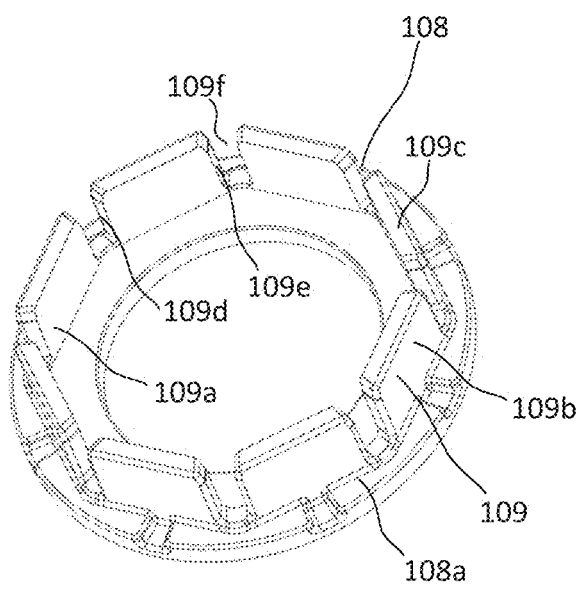
FIG. 42 is a perspective view of a support structure of the filter cartridge shown in FIG. 31.
Figure 43:
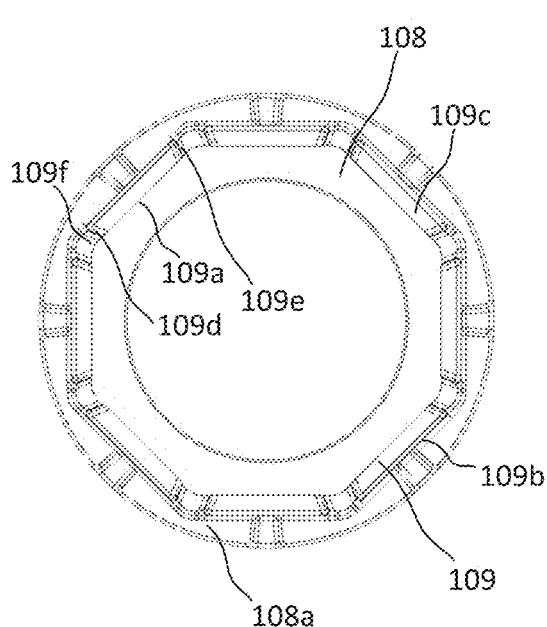
FIG. 43 is an end view of the support structure shown in FIG. 42.
Figure 44:
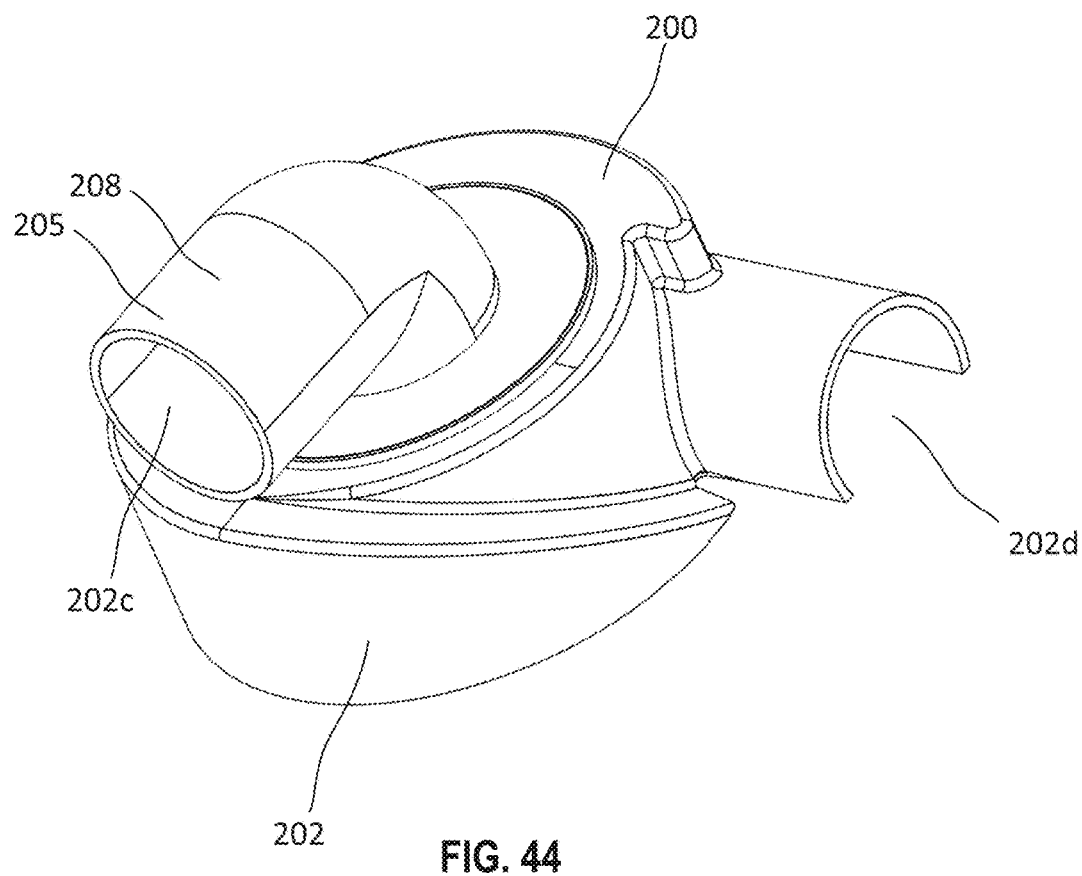
FIG. 44 is a first perspective view of the housing assembly portion shown in FIG. 27.
Figure 45:
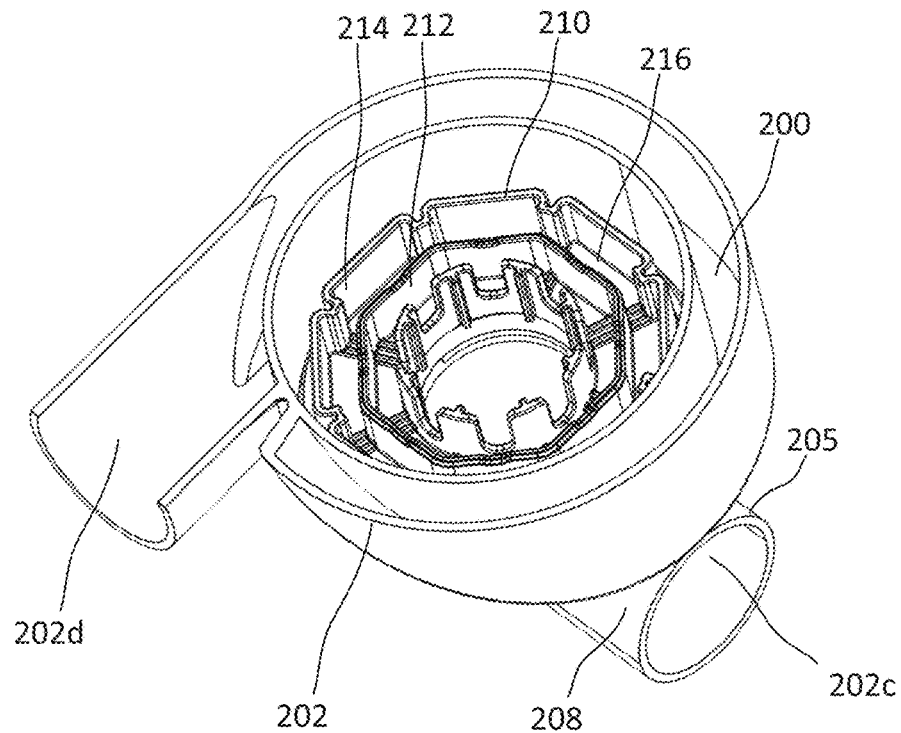
FIG. 45 is a second perspective view of the housing assembly portion shown in FIG. 27.
Figure 46:
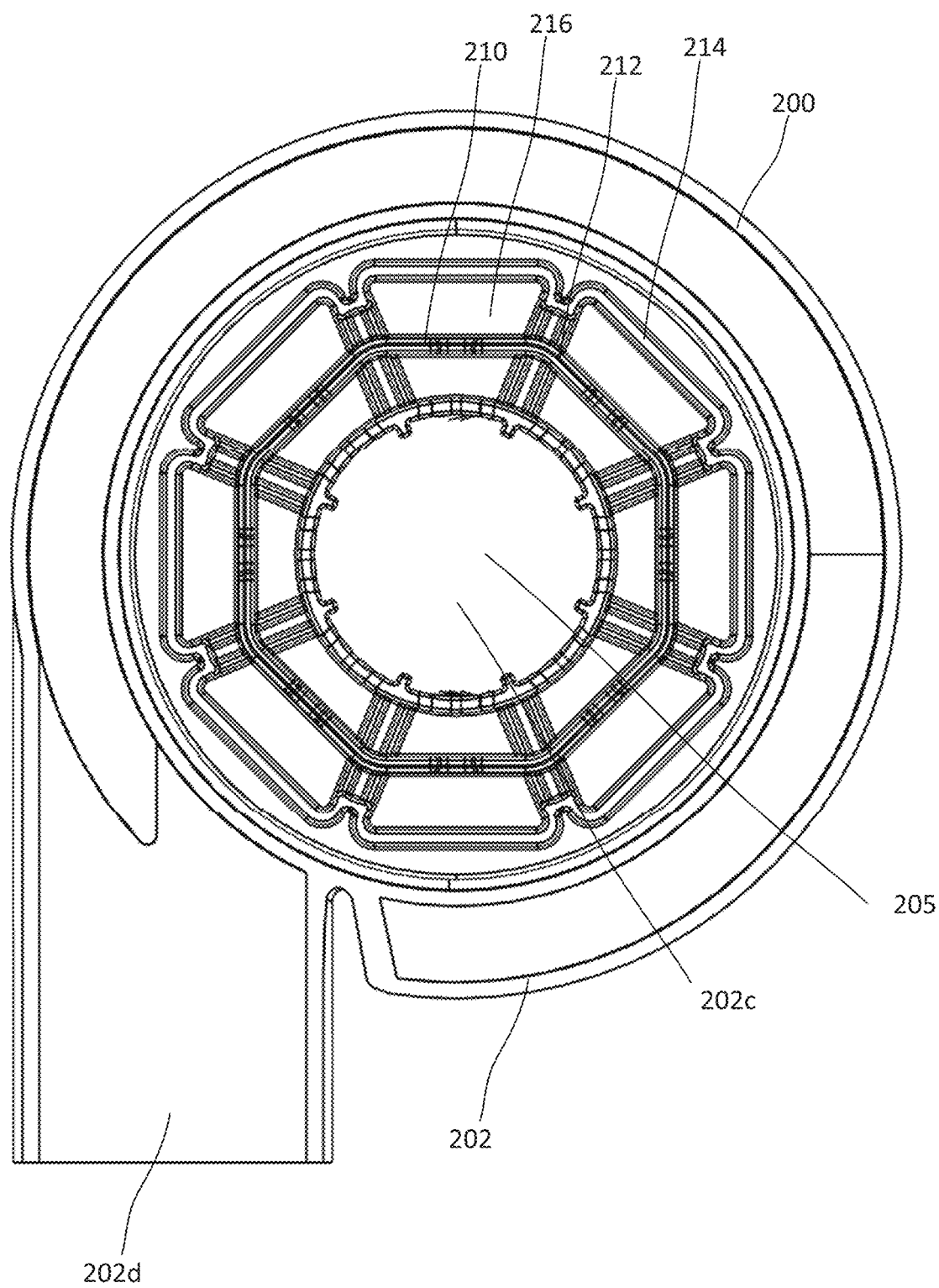
FIG. 46 is an end view of the housing assembly portion shown in FIG. 27.

As shown, the support structure 108 includes an annular base portion 108a from which a plurality of circumferentially arranged reinforcement members 109 extend in an axial direction away from the axial end 102a of the media 102 to distal ends 109c. The particular size, shape, and number of the reinforcement members 109 can be a matter of design choice. As shown, the reinforcement members 109 present generally rectangular inner and outer radial side surfaces and have a generally trapezoidal cross-sectional shape such that the ends of adjacent reinforcement members 109 are parallel to each other. Further, as can be seen at FIG. 35, the reinforcement members 109 can be provided with a thickness that is about that same as that of the seal member 110, for example a thickness that is within 25 percent of the thickness of the seal member 110. The support structure 108 may also be referred to as a seal support arrangement 108. Reinforcement members 109 may also be characterized as being extension members 109 or support members 109. With such an arrangement, gaps 109f are formed between adjacent side edges or surfaces 109d, 109e of the reinforcement members 109 such that the end cap 104 has an overall cross-sectional thickness along the flat sides that is greater than an overall cross-sectional thickness at the corner portions. In one aspect, each of the reinforcement members 109 presents a radially inward facing surface 109a and an oppositely disposed radially outward facing surface 109b. In the example shown, the surfaces 109a, 109b are generally parallel to the longitudinal axis X of the filter cartridge 100. Other angles are possible, as already discussed with respect to the first disclosed example filter cartridge 100. In one aspect, each of the reinforcement members 109 has a generally trapezoidal cross-sectional shape such that the adjacent side or edge surfaces 109e, 109f of the reinforcement members 109 are generally parallel to each other. Other shapes are possible. In one aspect, the reinforcement members 109 have a degree of flexibility in the radial direction but are rigid in the axial direction and in a lateral direction extending between the edges 109d, 109e.

In one aspect, and as most easily viewed at FIG. 35, the seal member 110 and support structure 108 are arranged with respect to each other such that the seal member flat sides 110f of the outer surface 110e are immediately adjacent to and touching the radially inward facing surfaces 109a of the reinforcement members 109 and such that the gaps 109f defined between the reinforcement members 109 are radially aligned with the curved corner portions 110d, 110g of the seal member 110. In some examples, the support structure 108 is overmolded onto the seal member 110 in a manner similar to that described with respect to FIG. 26 and process 1000, which results in the reinforcement members 109 being bonded or otherwise adhered to the flat sides 110f of the seal member. With such an arrangement, the reinforcement members 109 can provide radial support to the seal member 110 to provide enhanced sealing between the flat sides 110c and the flat sides 212b of the outlet tube assembly 205. As the corner portions 110d, 110g of the seal member 110 are not supported by the reinforcement members 109, the corner portions 110d, 110g of the seal member 110 can be characterized as being unsupported by and/or unattached to the reinforcement members. This configuration provides for a particular advantage in that the seal member 110, at the locations of the corner portions 110d, 110g, is allowed to stretch in a circumferential direction between the reinforcement members 109 and over the corner portions 212c of the outlet tube assembly 205 which enhances sealing at the corner portions. Further, the bonding or adherence along the flat sides provides for anchor points between which the seal member 110 can stretch, for example at the corner portions where there are gaps between the reinforcement members 109. Accordingly, the seal member 110 can be characterized as being constrained from stretching in a circumferential direction along the flat sides by the bonded reinforcement members 109. In some examples, the reinforcement members 109 can be fully or partially embedded within the material of the seal member 110, along with the base portion 108a, at a location radially outward or inward of the seal surface. In some examples, the reinforcement members 109 can be covered by a thin layer of the seal member 110, such as an ultrathin urethane such that the reinforcement members 109 are generally external to the main body of the seal member 110 but are not exposed. In some examples, the reinforcement members 109 can be spaced radially from the surface of the seal member 110 such that a radial gap exists between the reinforcement members 109 and the seal member 110. In such an arrangement, the reinforcement members 109 could still radially support the seal member 110 once the seal member 110 has expanded over the outlet tube of the air cleaner housing.

To aid in orientation of the filter cartridge 100 with respect to the second part 210 of the outlet tube assembly 205, the second part 210 can be provided with a sidewall 214 having a complementary shape for receiving the reinforcement members 109. In one aspect, the second part 210 may be referred to as a receiver plate 210. As detailed at FIG. 48, the sidewall 214 defines a radially inward facing radial surface having a plurality of spaced apart flat sections 214a interrupted by inwardly extending protrusions 214b having side edges 214c, 214d. Taken together, the surfaces 214a, 214c, and 214d form a recess areas 216 that can receive the reinforcement members 109 such that surface 109b faces surface 214a and edge surfaces 109d, 109e face surfaces 214c, 214d, and such that the protrusions 214b are received within gaps 109f between the reinforcement members 109. As distal ends 109c of the reinforcement members 109 define the distal end of the support structure 108 and of the filter cartridge 100 itself, the protrusions 214b can act as guide surfaces during insertion of the filter cartridge 100. For example, if the filter cartridge 100 is initially rotated such that the polygonal shapes of the seal member 110 and sidewall 212 are misaligned, the ends 109c will contact the top surfaces of the protrusion 214b. As the reinforcement members 109 and sidewall 214 are formed of relatively hard material (e.g., ABS plastic), relatively little friction exists between these components. Accordingly, once contact is made between these components, an operator can easily rotate the cartridge 100 until the gaps 109f are aligned with the protrusions 214b, at which point the filter cartridge can drop fully into place. Once this position is achieved, the protrusions 214b are adjacent the corner portions 110d of the seal member 110 but do not prevent the seal material from stretching or otherwise extending about the corners 212c of the sidewall 212.

Figure 47:
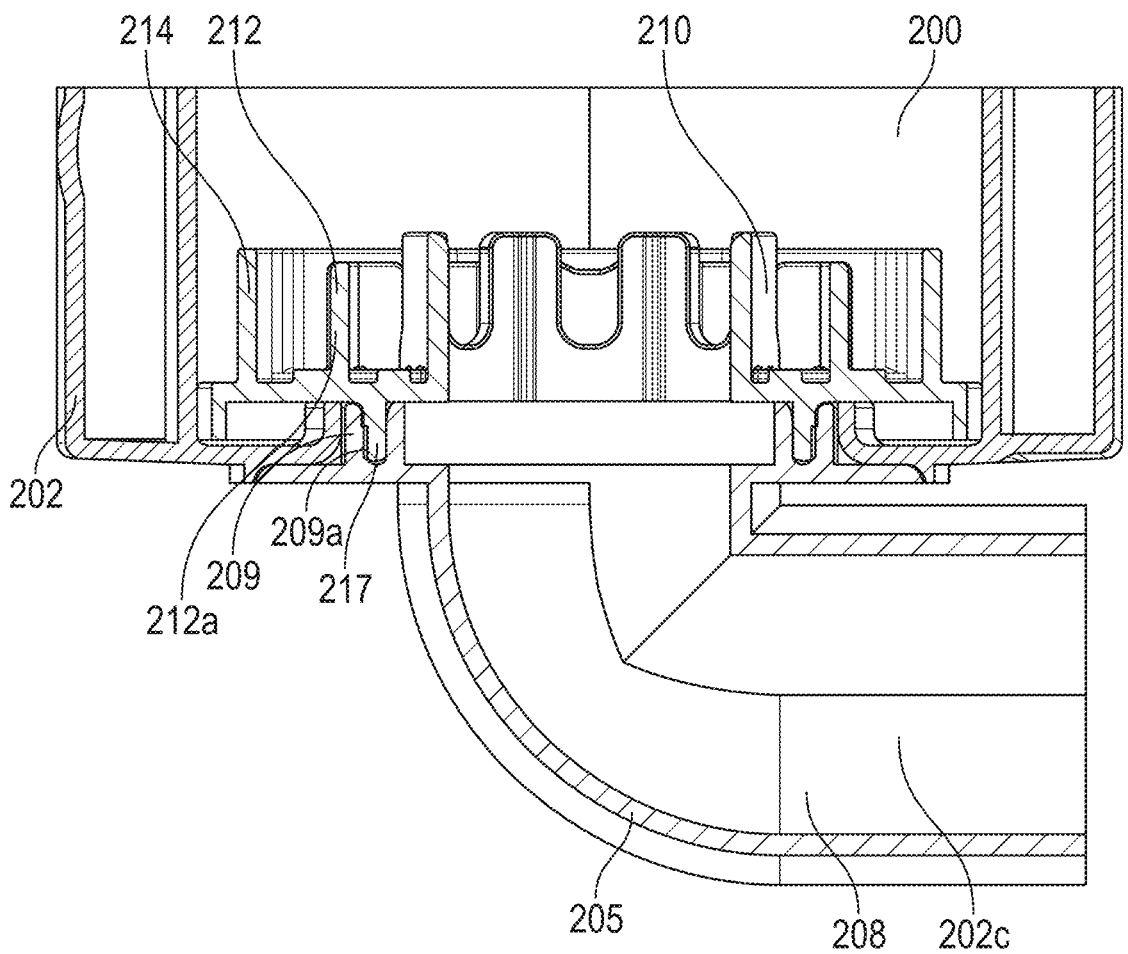
FIG. 47 is a lateral cross-sectional view of the housing assembly portion shown in FIG. 27 and depicting a first part and a second part of an outlet tube assembly.

With reference to FIG. 47, it can be seen that the first part 208 of the outlet tube assembly 205 is provided with a U-shaped, annular wall structure 209 defining a cavity 209a, while the second part 210 is provided with a single annular wall structure 217 that is received within the cavity 209a such that the housing wall 202 is sandwiched between the first and second parts 208, 210. In one example, the wall structures 209, 217 form a tongue and groove weld joint formed by a spin welding process. Spin welding is a friction welding process used to join two plastic parts. It involves rotating one part against another at high speed, generating heat through friction. The heat softens the plastic surfaces, allowing them to fuse together as they cool, forming a strong bond. Such a process allows for modularity of parts in that different second parts 210 may be used with the same air cleaner housing and first part 208 without requiring modification thereof. Such a construction also better supports the second part 210 and related seal surfaces against moment forces exerted on the outlet tube first part 208. Where the outlet tube assembly 205 is constructed as a single component, as is shown with the first disclosed embodiment, forces exerted on the exterior of the outlet tube can cause the seal surfaces to rotate and compromise the seal between the outlet tube and the filter cartridge. As the parts 208 and 210 are joined together with a fused or welded attachment, the potential for undesirable leakage is minimized. Further, providing the wall structures 208 and 210 in separate parts allows for greater ease of manufacturing, such as molding, while also advantageously providing for a degree of modularity to accommodate differently sized and/or shaped housings and outlets.

Example of FIGS. 49 to 55B

Referring to FIGS. 49 to 55B an air cleaner assembly 10 is disclosed that is a more detailed version of that presented at FIGS. 27 to 48 and that includes an alternative configuration for the first and second parts 208, 210. The air cleaner assembly 10 associated with FIGS. 49 to 55B also presents a safety or secondary filter cartridge 150. The features associated with the example presented in FIGS. 49 to 55B should be considered overlapping with and compatible with those presented at FIGS. 27 to 48. Accordingly, where components or features are in common, the above-provided description for FIGS. 27 to 48 is fully applicable for the example shown at FIGS. 49 to 55B and need not be repeated herein. Rather, this section will focus on the additional or different features presented at FIGS. 49 to 55B. Further, the description for the example of FIGS. 49 to 55B is also fully applicable to the example presented at FIGS. 27 to 48.

Figure 49:
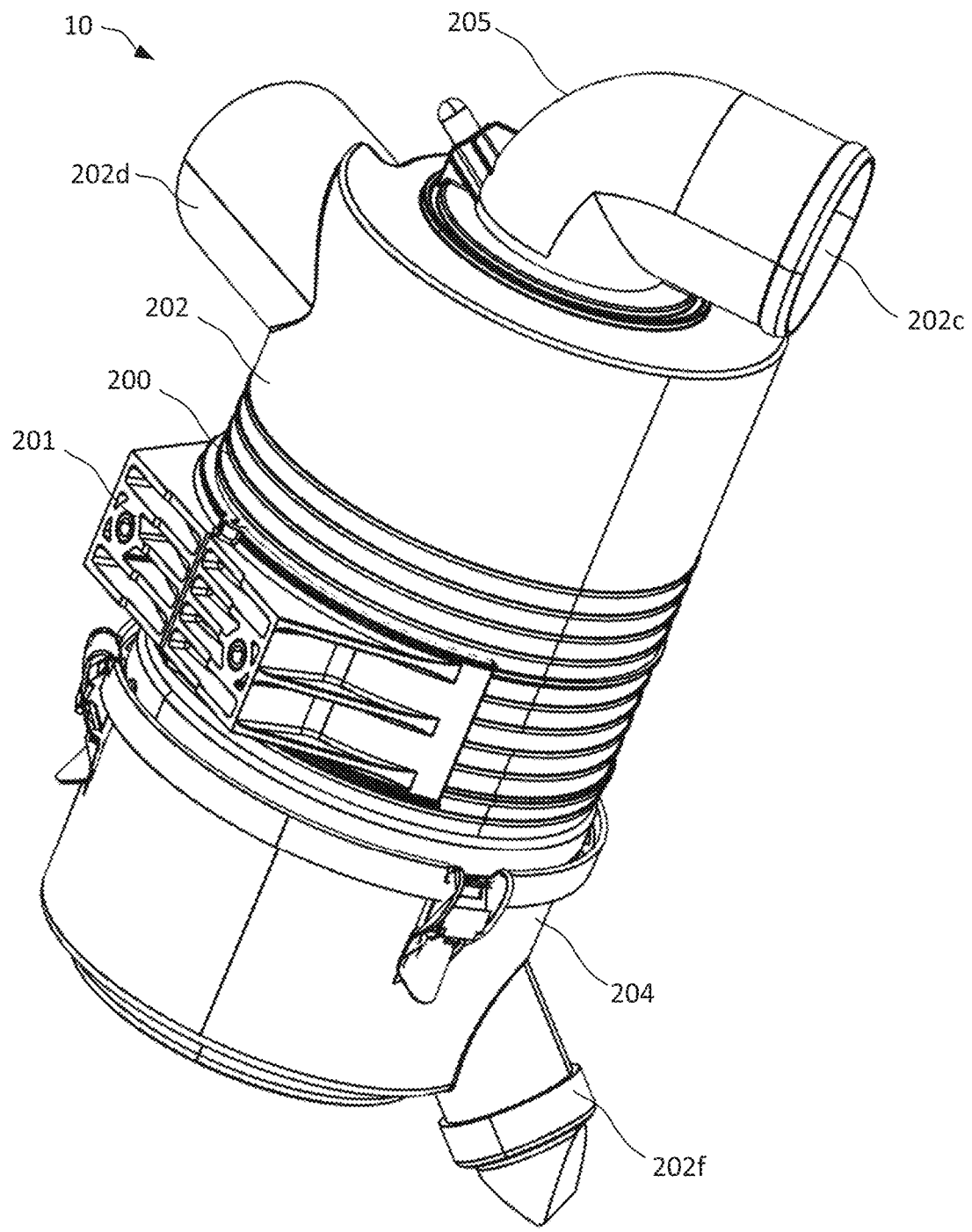
FIG. 49 is a perspective view of an air cleaner assembly within which the filter cartridge of FIGS. 30 to 41 is disposed.
Figure 50:
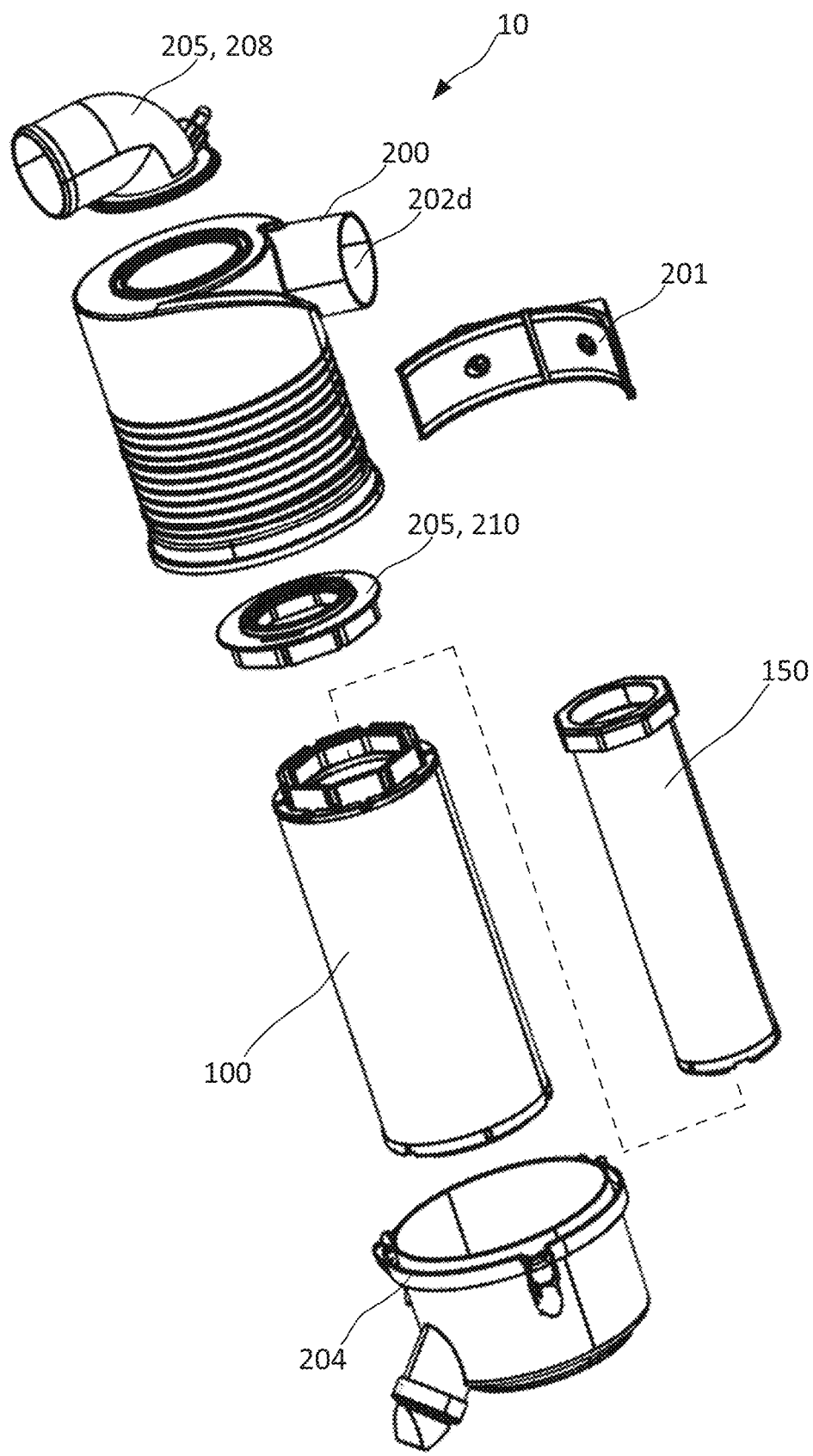
FIG. 50 is an exploded perspective view of the air cleaner assembly shown in FIG. 49.

In one aspect, and as shown at FIGS. 49 and 50, the air cleaner assembly 10 includes the above-described filter cartridge 100 and a safety filter cartridge 150 that are housed within an interior volume of air cleaner housing 200. The air cleaner housing 200 is shown as being provided with a main housing body 202 and a cover 204. A mounting structure 201 for mounting the main housing body 202 to another structure is also shown. The air cleaner housing 200 also includes an outlet tube assembly 205 having joined together first and second parts 208, 210. In the example shown, the outlet tube assembly 205 is rotatable with respect to the main housing body 202. The air cleaner assembly 10 is also provided with an air inlet 202d. In some examples, assembly 205 can be configured as an air inlet while structure 202d can be configured as an air outlet.

Figure 51:
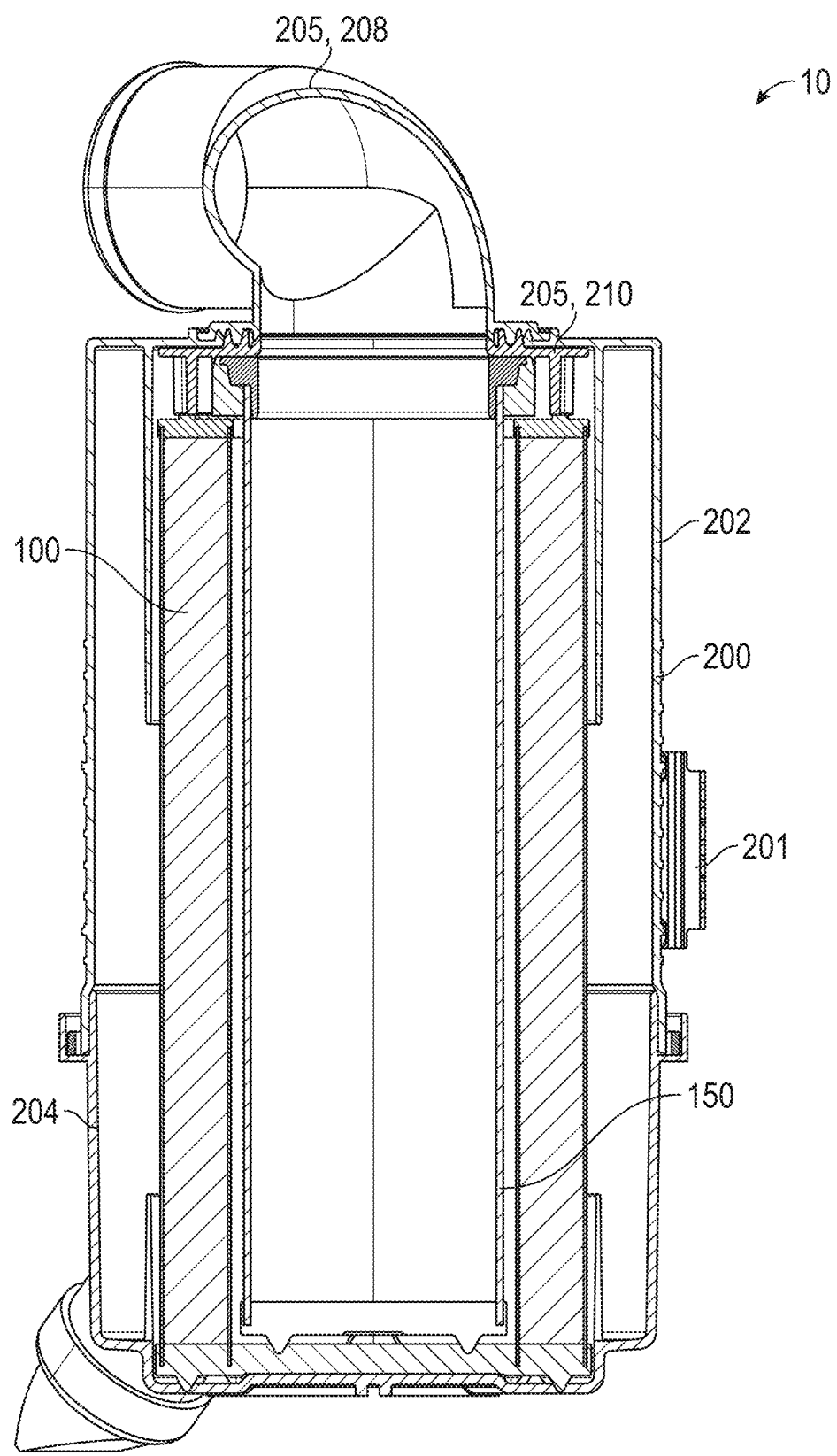
FIG. 51 is a longitudinal cross-sectional view of the air cleaner assembly shown in FIG. 49.
Figure 51A:
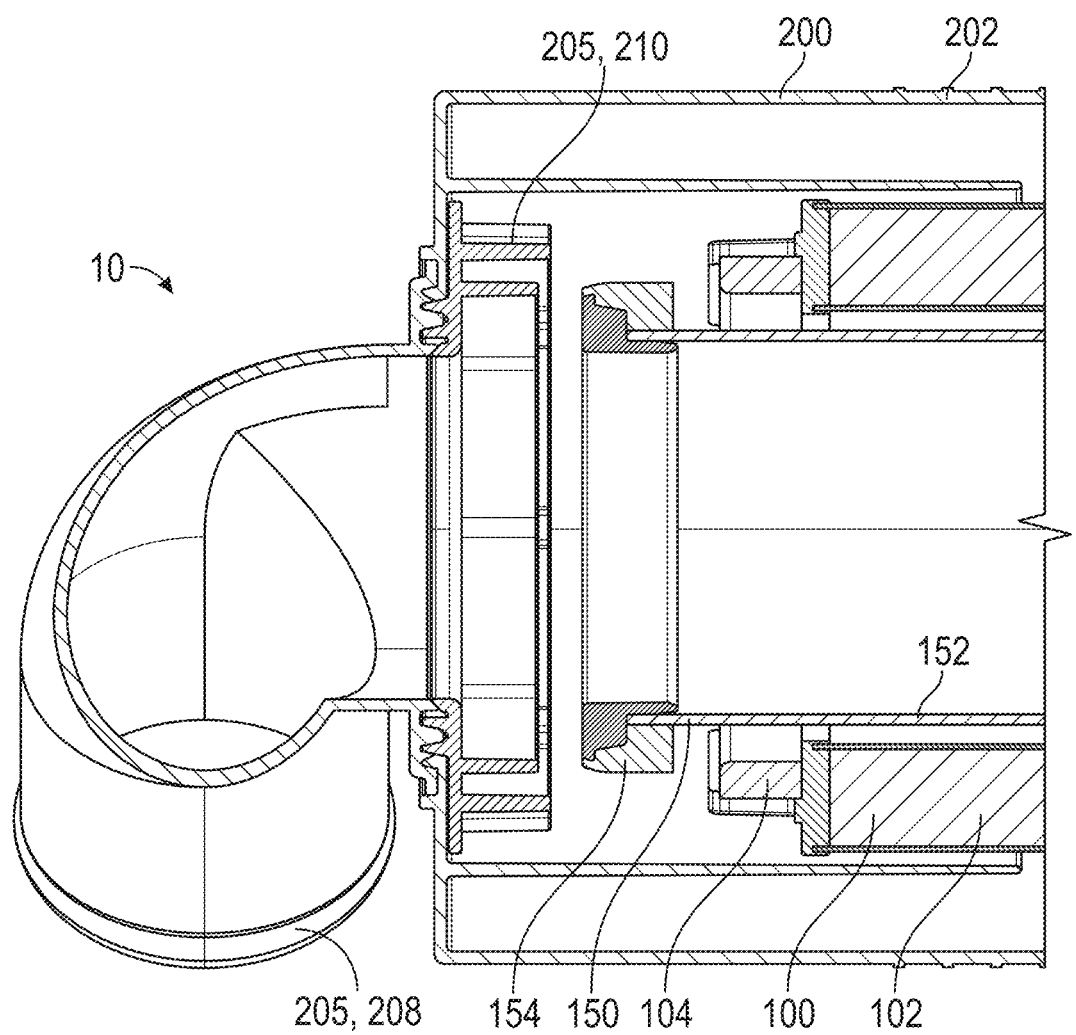
FIG. 51A is an enlarged portion of the cross-sectional view presented in FIG. 51.
Figure 51B:
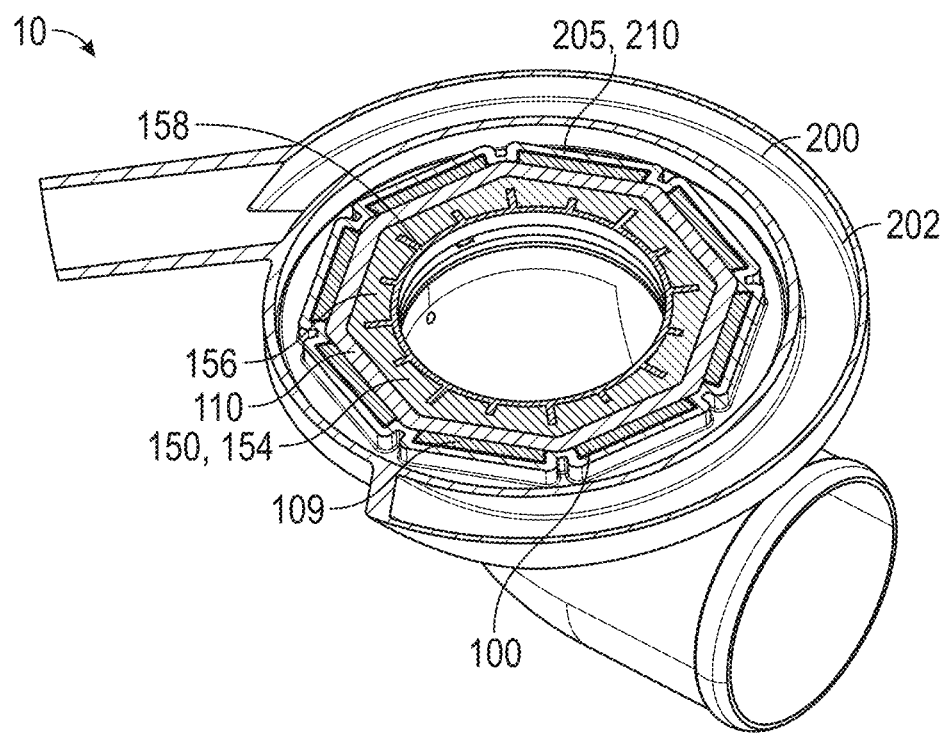
FIG. 51B is a lateral cross-sectional view of the air cleaner assembly shown in FIG. 49.
Figure 52:
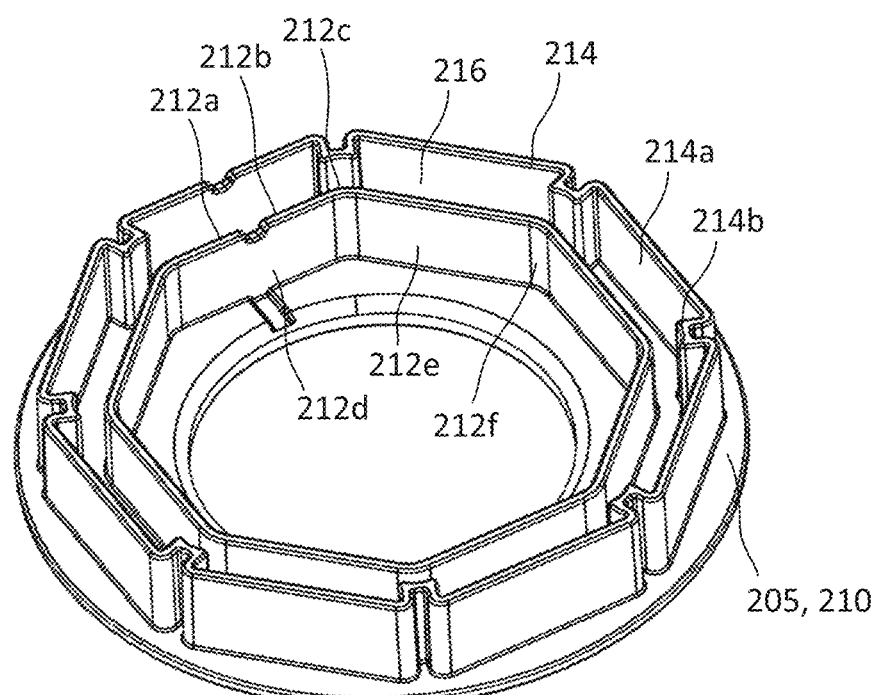
FIG. 52 is a perspective view of a second outlet part of the housing assembly associated with the air cleaner assembly shown in FIG. 49.
Figure 53:
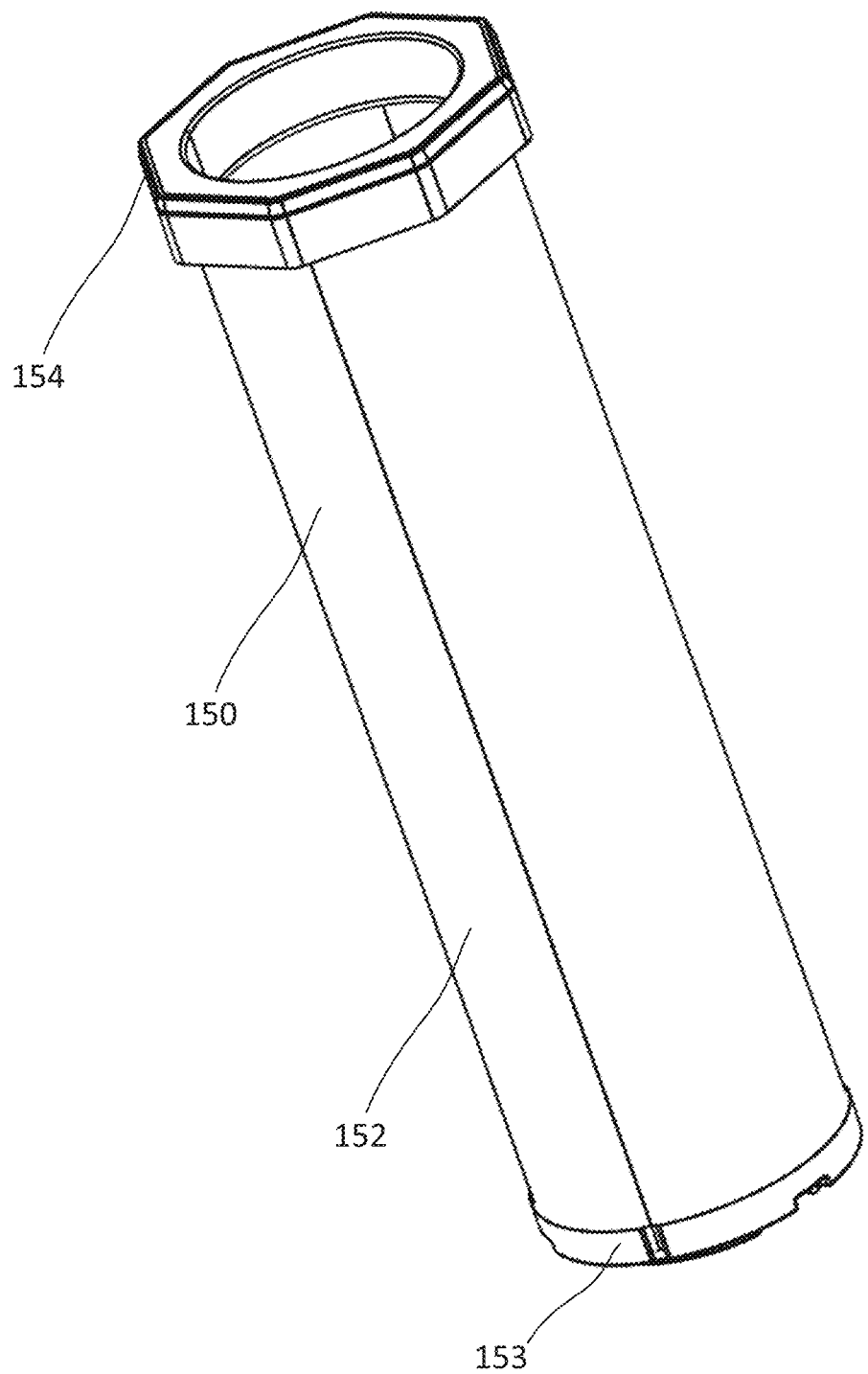
FIG. 53 is a perspective view of a safety filter cartridge associated with the air cleaner assembly shown in FIG. 49.
Figure 54:
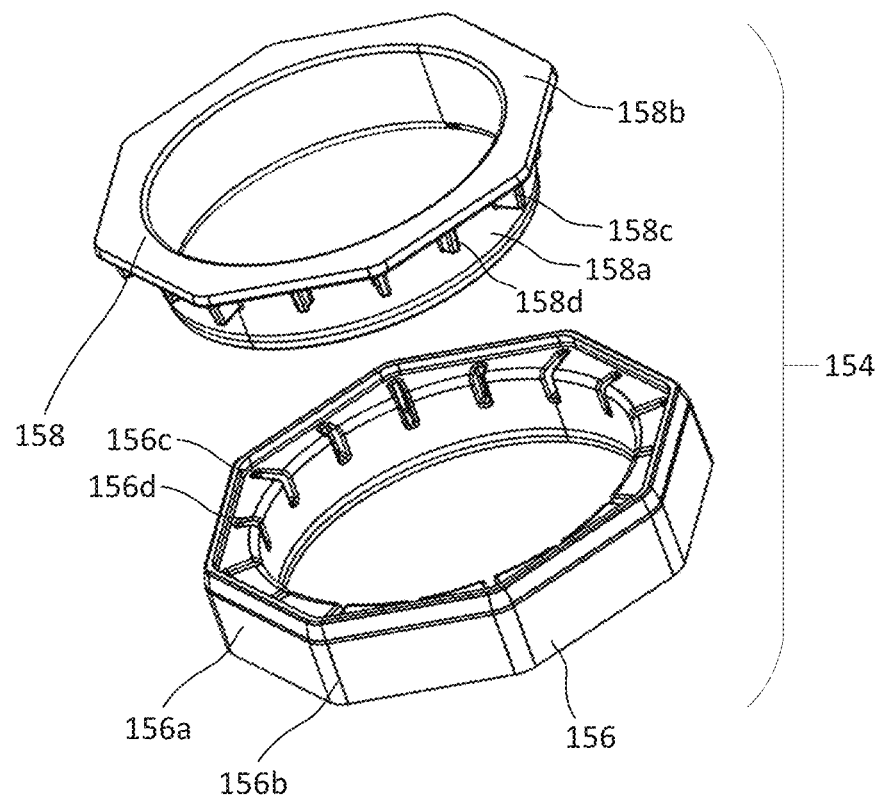
FIG. 54 is a perspective exploded view of an end cap of the safety filter cartridge shown in FIG. 53.
Figure 55A:
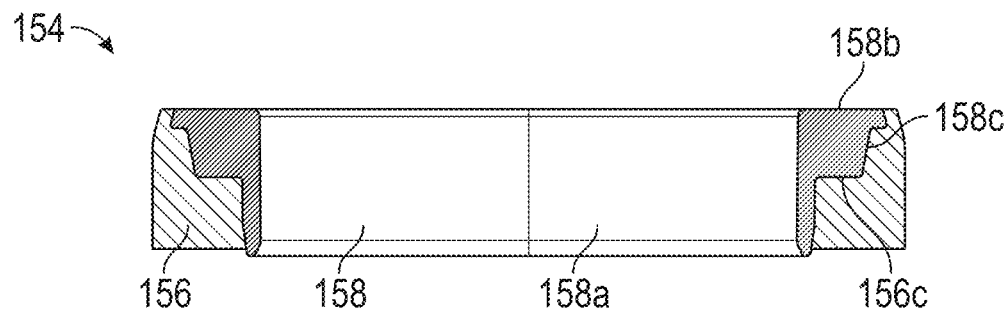
FIG. 55A is a cross-sectional view of the end cap shown in FIG. 54, taken through opposite corner portions of the end cap.
Figure 55B:
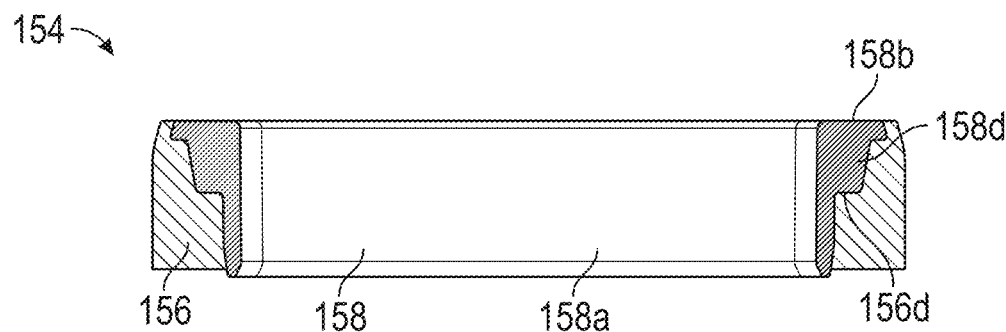
FIG. 55B is a cross-sectional view of the end cap shown in FIG. 54, taken through a centerline of opposite flat sides of the end cap.

As most easily viewed at FIGS. 53 to 55B, the safety filter cartridge 150 is provided with filter media 152 extending between a first end cap 153 and a second end cap 154. In the particular example shown, the filter media 152 is non-pleated media arranged in a tubular manner to define a central opening. As detailed in a later section, many media types and configurations are possible for use with all of the disclosed example filter cartridges herein, for example, fluted media, z-media, depth media, non-pleated media, coiled media, and/or stacked media, etc. In one aspect, the second end cap 154 is an open end cap and presents a radially outward facing seal surface defined by a plurality of flat sides 156a and adjoining rounded corner portions 156b. Accordingly, the seal surface of the second end cap 154 may be characterized as having a generally polygonal shape. In the example shown, eight flat sides 156a and eight corner portions 156b are provided that are aligned with the flat sides 212e and corner portions 212f of the second part 210. As most easily seen at FIG. 54, the end cap 154 is provided with a seal member 156 and a support member 158. As shown, the seal member 156 is provided with a plurality of slots 156c located opposite corner portions 156b and a plurality of slots 156d located opposite flat sides 156a. The support member 158 is provided with corresponding tabs or protrusions 158c, 158d that are received into the slots 156c, 156d. It is noted that the seal member 156 can be overmolded onto the support member 158 such that the slots 156c, 156d are simply the areas at which the tabs or protrusions 158c, 158d are present within the material of the seal member 156. The seal member 156 can also be a separately formed component and later joined to the support member 158. The support member 158 is also shown as having a cylindrically shaped sidewall 158a and top flange member 158b which support the seal member 156 on those sides. As can be seen at FIGS. 55A and 55b, the tabs or protrusions 158c aligned with the corner portions 156b are larger than the tabs or protrusions 158d at the flat sides 156a. With such a construction, the tabs or protrusions 158c, 158d provide radial support to the flat sides 156a and corner portions 156b to aid in ensuring that an adequate seal is formed against corresponding flat sides 212d and corner portions 212f of a seal surface 212d of the wall structure. The cross-sectional view shown at FIG. 51B provides an illustration showing these features in an installed condition with respect to the second part 210 and air cleaner housing 202.

Examples of FIGS. 56A to 56D and 57

Figure 56A:
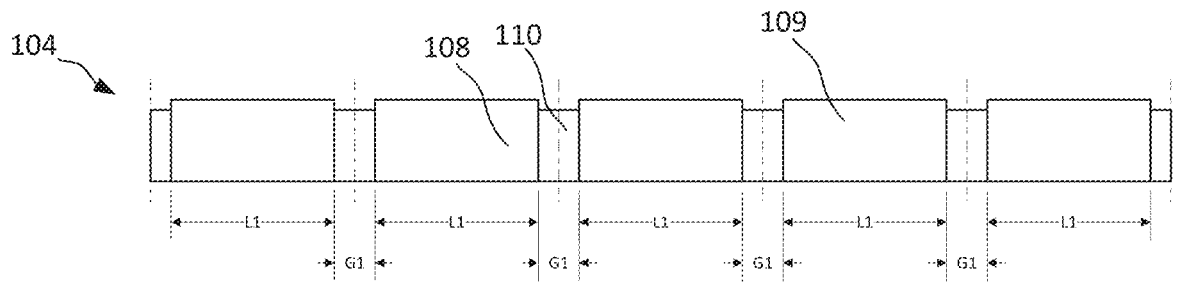
FIG. 56A is a flat schematic of the seal member and support structure of the filter cartridge shown in FIG. 31.
Figure 56B:
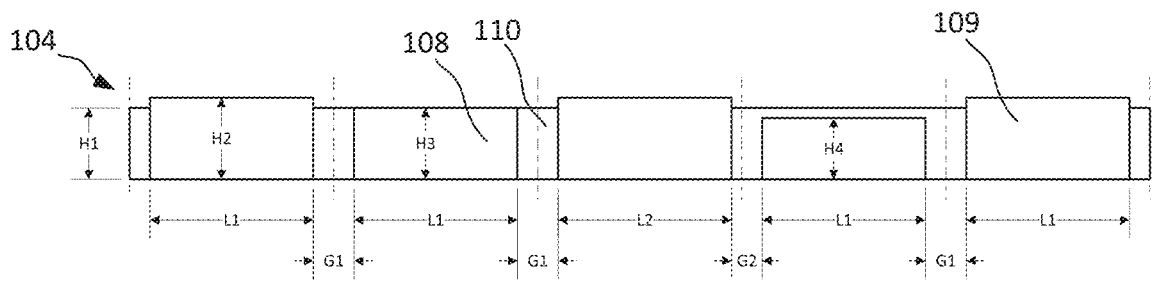
FIG. 56B is a flat schematic illustrating alternate arrangement options of the seal member and support structure of the filter cartridge shown in FIG. 31.
Figure 56C:
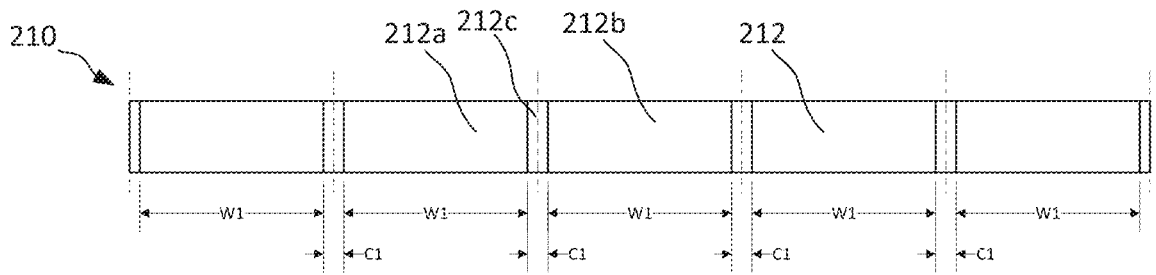
FIG. 56C is a flat schematic of a portion of a sidewall of the second part of the outlet tube assembly shown in FIGS. 47 and 48.
Figure 56D:
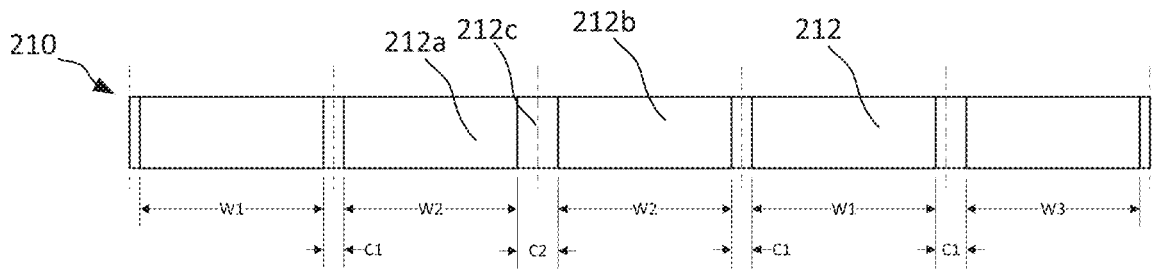
FIG. 56D is a flat schematic illustrating alternative arrangement options of the sidewall of the second part of the outlet tube assembly shown in FIGS. 47 and 48.

With reference to FIGS. 56A to 56B, flat schematic illustrations of the seal member 110 and support structure 108 are shown to illustrate further concepts associated with the disclosure. As shown at FIG. 56A, it can be seen that the reinforcement members 109 may all be provided with the same length L1 such that the resulting gaps therebetween all have the same length G1 and such that the distal ends of the reinforcement members 109 extend beyond the distal end of the seal member. FIG. 56B shows that alternatives to this configuration are possible. For example, FIG. 56B illustrates that the reinforcement members 109 may be provided with different or dissimilar lengths L1, L2, may form gaps with different lengths G1, G2, and may be provided with different or dissimilar heights, for example a height H2 that is greater than a height H1 of the seal member, a height H3 that is the same as height H1, and a height H4 that is less than the height H1. In examples, the lengths of the support members 109 are a majority of the length of the corresponding flat sides 110f. In some examples, the combined lengths of all of the support members 109 are more than 75 percent of the combined lengths of all of the flat sides 110f. FIG. 56C illustrates that the wall structure 212 may be provided with flat surfaces 212b having the same width W1 and corner portions 212c having the same width C1. FIG. 56D illustrates that alternatives for the wall structure 212 are possible. For example, the wall structure 212 may be provided with flat surfaces 212b having different or dissimilar widths W1, W2 and may be provided with corner portions 212c having different or dissimilar widths C1, C2. In one advantageous aspect of the disclosed design, a wall structure 212 having a radial surface 212a with dissimilarly sized corner portions 212c can be readily accommodated by the seal member 110 as the corner portions of the seal member are unconstrained by the reinforcement members 109 and can therefore stretch over variously sized corner portions 212c of the sidewall 212. In some examples, and as noted elsewhere, the seal surface 110a can also be provided with different or dissimilar widths which may correspond to widths C1, C2. It is noted that all of the examples depicted in FIGS. 56A to 56D are usable with any of the disclosed arrangements herein, for example, with the configurations shown at FIGS. 23 to 48 and FIGS. 49 to 55.

Figure 57:
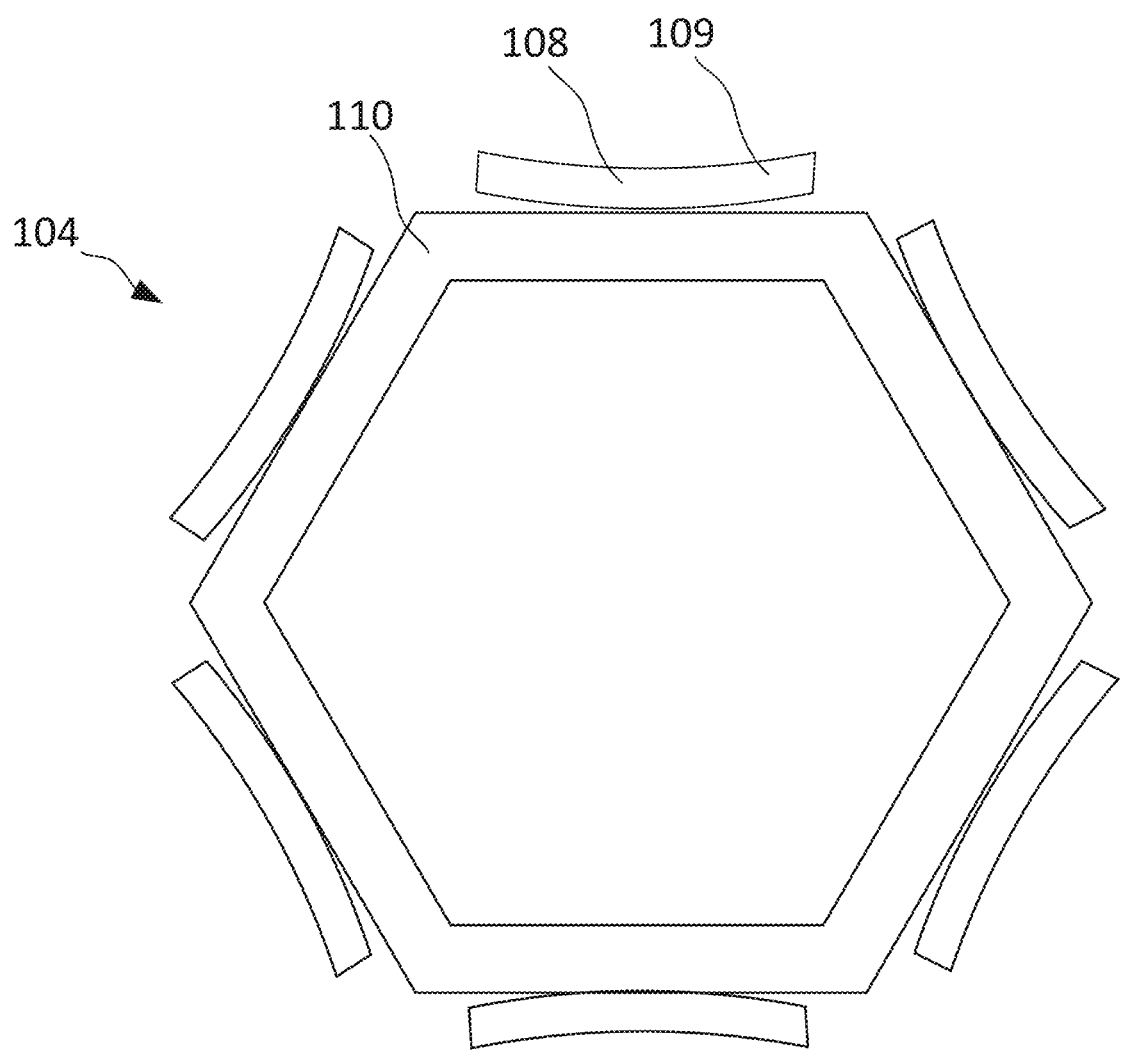
FIG. 57 is a schematic top view of the seal member and support structure of the filter cartridge shown in FIG. 31 in an alternative arrangement.

Referring to FIG. 57, it is illustrated that the reinforcement member 109 may alternatively be provided with an arc-shaped cross-sectional profile such that at least a center section of the reinforcement members 109 is in contact with the seal member 110. Such a configuration can be advantageous in creating a spring effect onto the seal member to effectuate a seal of the seal member at the central location of the flat sides where sealing may be relatively difficult to ensure. In such arrangements, the outside corner portions of the reinforcement members 109 can use the wall structure 214 as support for creating the spring force against the seal member 110. In some examples, the reinforcement members 109 are curved such that the side edges are out of contact with the seal member 110. In some examples, the seal member 110 is adhered with the reinforcement members 109 to a degree such that the seal member 110 remains in contact with the curved length of the reinforcement members 109. As the depicted curvature is relatively minor (e.g., a straight line can extend within the thickness of each member 109 between its ends), the reinforcement members 109 may be characterized as being generally flat, in accordance with the above, or as having a curved or slightly curved surface.

Examples of FIGS. 58A to 58E

Referring to FIGS. 58A to 58E, alternative arrangement configurations for the sidewall 214 of the second part 210 are presented, as described below.

Figure 48:
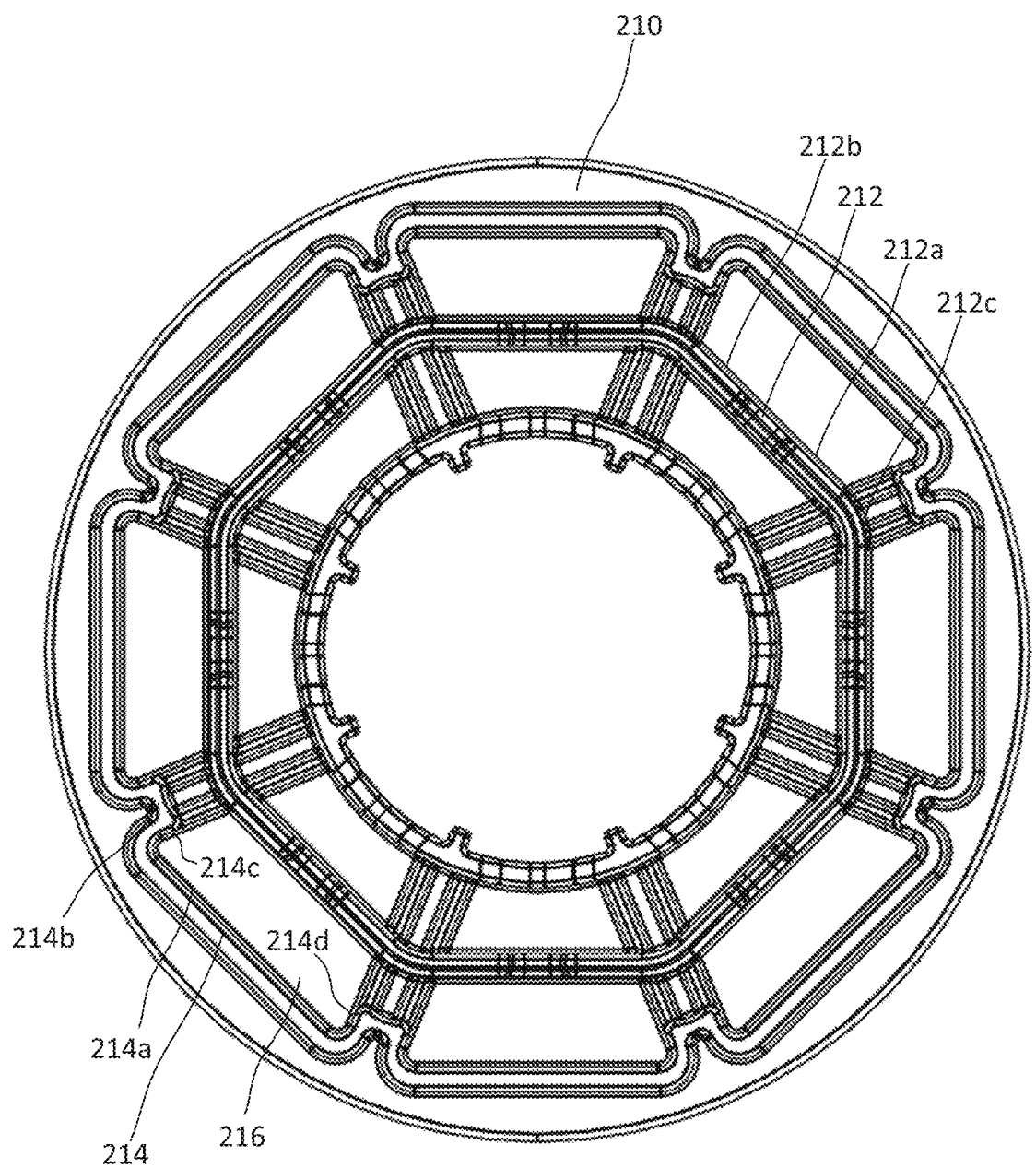
FIG. 48 is an end view of a second portion of the outlet tube assembly shown in FIG. 47.
Figure 58A:
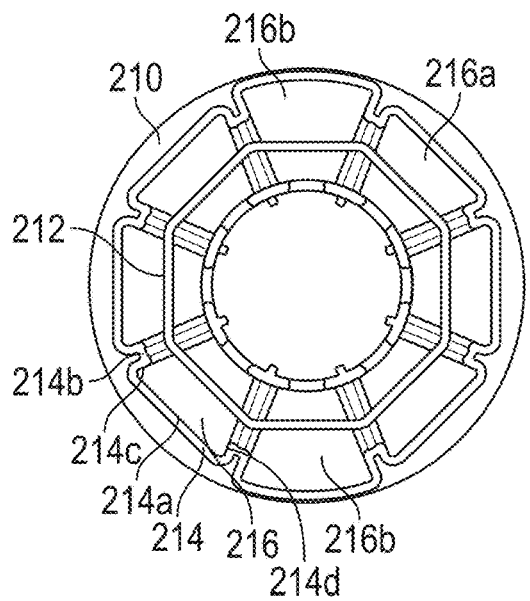
FIGS. 58A-58E are schematic top views of alternative arrangements of the second part of the outlet tube assembly shown at FIGS. 47 and 48.

FIG. 58A presents an example showing that the recesses 216 defined by the sidewall 214 can have different shapes and sizes instead of being identical or matching, as is the case with the example shown at FIG. 48. As shown, the sidewall 214 defines eight recesses 216 in which two oppositely located recesses 216b have a larger or deeper shape in comparison to the remaining recesses 216a. The recesses 216b are also defined by a curved surface 214a rather than the flat surface 214a defining the recesses 216a. In the disclosed example, the sidewall 216 and second part 210 have two-fold or mirror symmetry. However, other configurations are possible. For example, the sidewall 214 could be configured with recesses 216b such that only a single fold symmetry results. For example, the sidewall 214 could be provided with a single different recess 216b or multiple recesses 216b arranged in an asymmetrical shape. Further, more than two recesses 216b may be provided in either a symmetrical or asymmetrical arrangement. It is also noted that the sidewall 214 could be formed to define only recesses 216b without any recesses 216a being present. In one aspect, by providing differently shaped recesses 216, an indexing feature is provided which ensures that only an appropriate filter cartridge 100 having a similarly or complementarily shaped support structure 108 and/or seal member 110 can be received by the second part 210 in a desired rotational orientation.

Figure 58B:
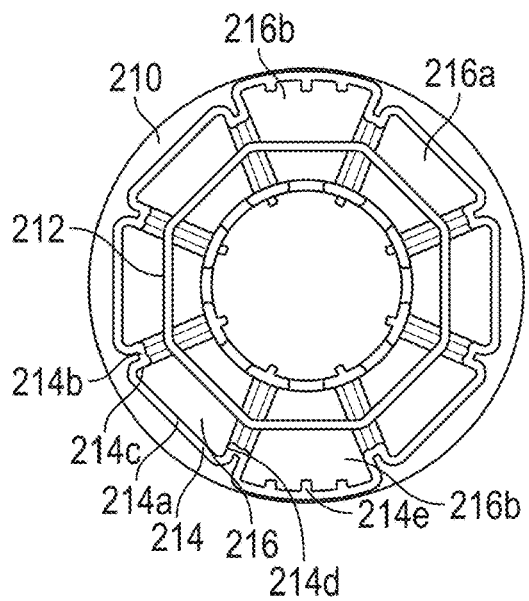

FIG. 58B presents an example similar to that shown in FIG. 58A but in which recesses 216b are each provided with a plurality of radial inward extensions 214e extending from surface 214a. In the example shown, three extensions 214e are provided for each recess 216b. More or fewer extensions 214e may be provided. In one aspect, the center extension 214e has a longer length in comparison to the two outermost extensions 214e. Other arrangements are possible such as: all of the extensions 214e having the same length, none of the extensions having an equal length, extensions 214e being provided in differing arrangements on different recesses, and extensions 214e being provided on all of the recesses. Further, the recesses 216a may also be provided with such extensions 214e. With the inclusion of such extensions 214e, further indexing features are provided which ensure that only an appropriate filter cartridge 100 having a similarly or complementarily shaped support structure 108 and/or seal member 110 can be received by the second part 210 in a desired rotational orientation.

Figure 58C:
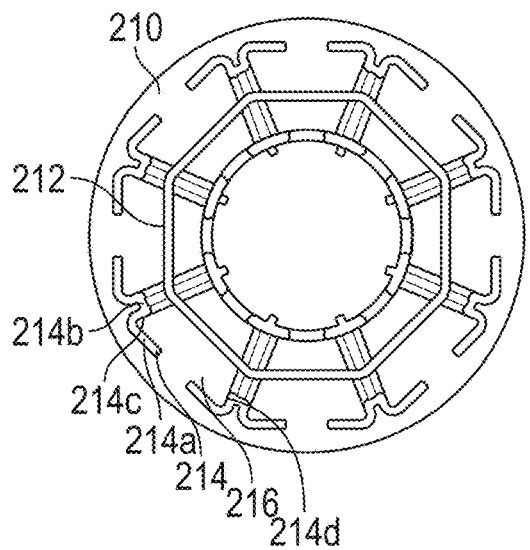

FIG. 58C shows an example in which the surface 214a is provided with a gap rather than being continuous. Such an arrangement can allow for receiving a protrusion associated with the support structure 108 to be received into the gap to provide a further indexing feature.

Figure 58D:
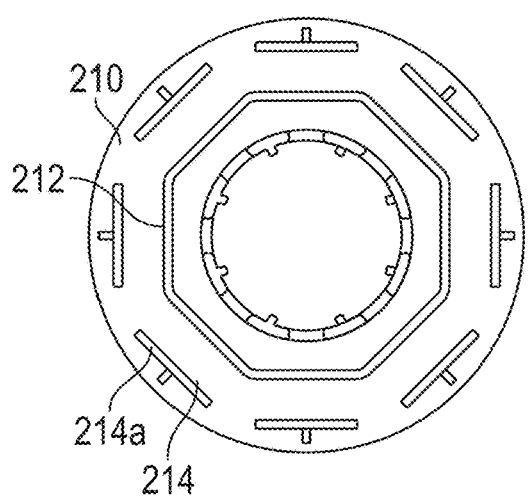

FIG. 58D shows an example in which the sidewall 214 is provided without surfaces 214b and 214c such that no recess 216 is formed with the sidewall 214a. With such an arrangement, the surfaces 214a of the sidewall 214 simply abut the outward facings surfaces 109b of the reinforcement members 109 without any securement of the side edges of the reinforcement members. As a result, the indexing function of the sidewall 214 is provided solely by the surfaces 214a as the filter cartridge 100 must still be rotated to sufficiently align the surfaces 214a, 109b before the filter cartridge 100 will fully drop into place.

Figure 58E:
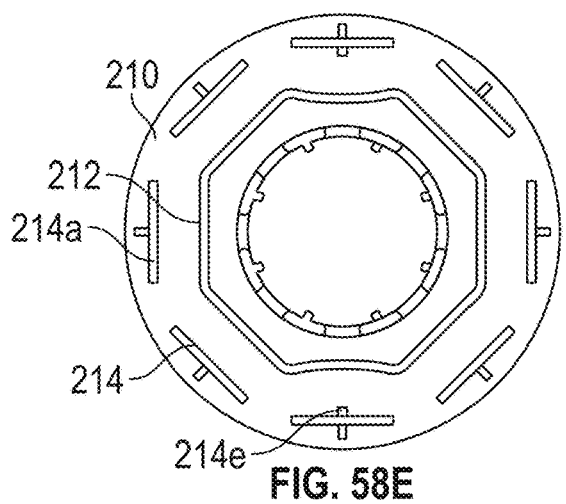

FIG. 58E shows a further example that is generally similar to that shown in FIG. 57, but in which two of the surfaces 214a are each provided with a single extension 214e extending in a radial inward direction to provide for a further indexing function. Other arrangements for the extension 214e are possible, as described above.

It should be understood that the various individual features disclosed in FIG. 54 to FIG. 59 may be provided in different combinations than what is specifically shown in the drawings. For example, any of the disclosed designs may be provided with similar or differently shaped recesses 216, with or without radial extensions 214e, with or without gaps in the surface 214a, and with or without one or both of surfaces 214b, 214c, and any combination thereof.

Figure 59:
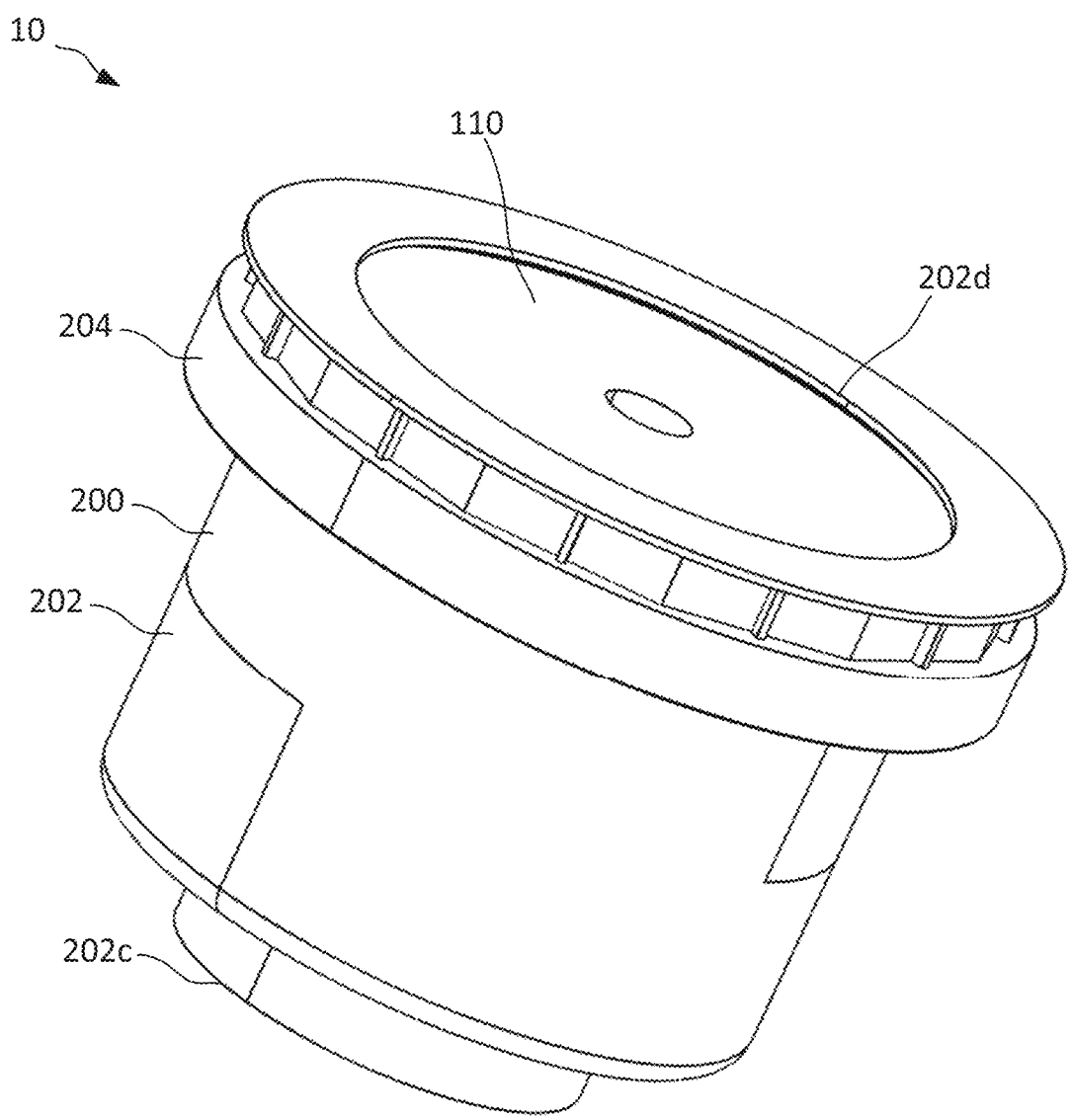
FIGS. 59-80 schematically show views of an example air cleaner assembly having a filter cartridge with an end cap mounted to an outer circumferential side of the filter cartridge.
Figure 60:
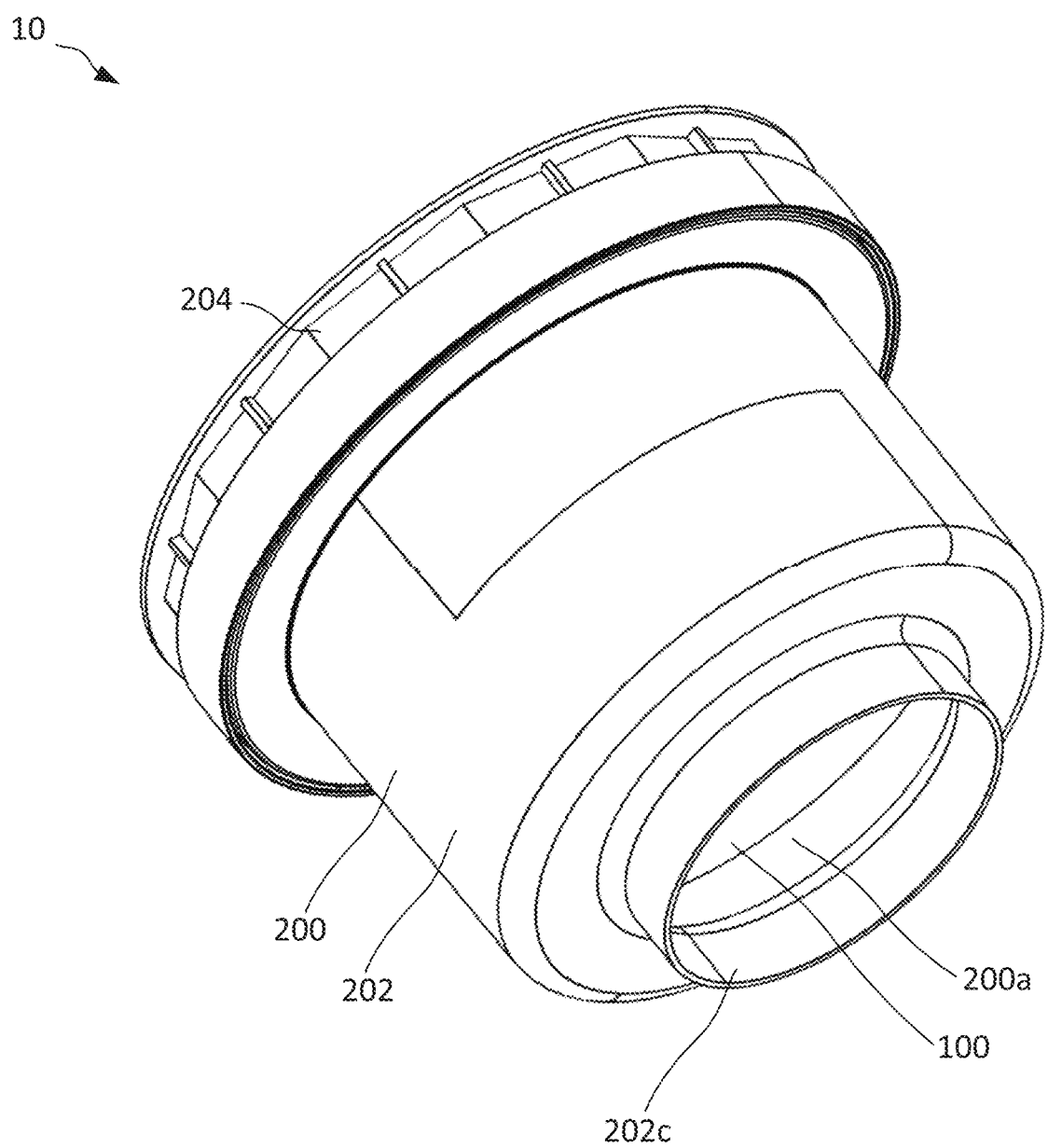
Figure 61:
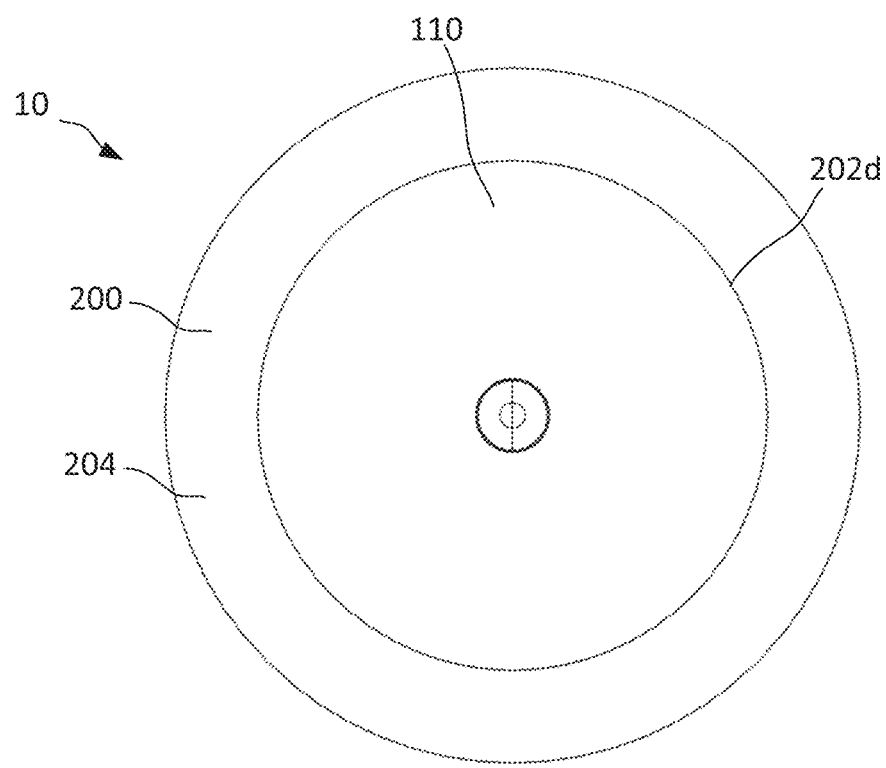
Figure 62:
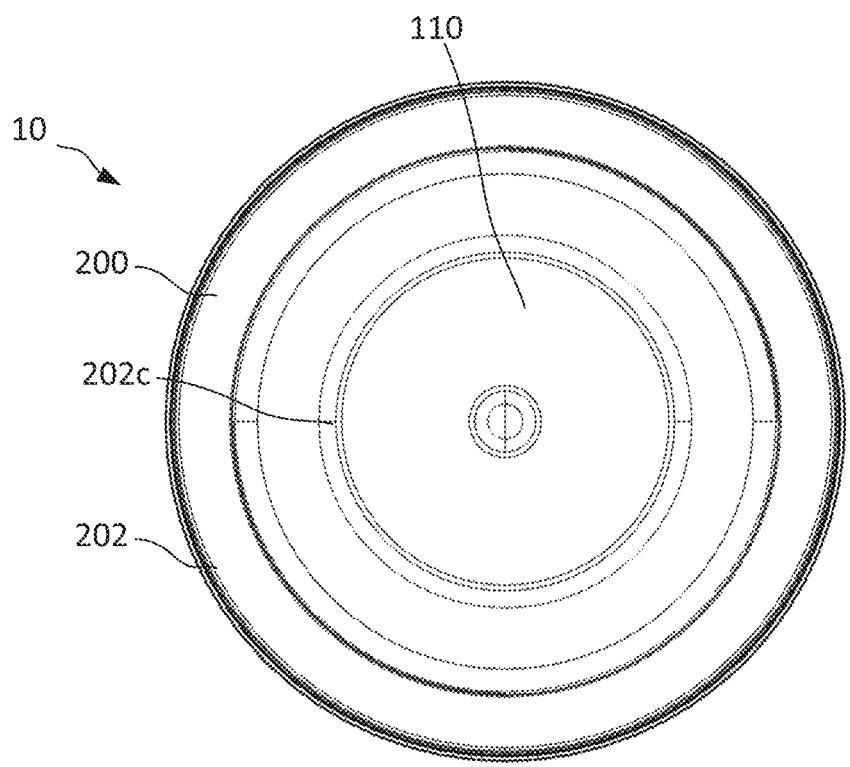
Figure 63:
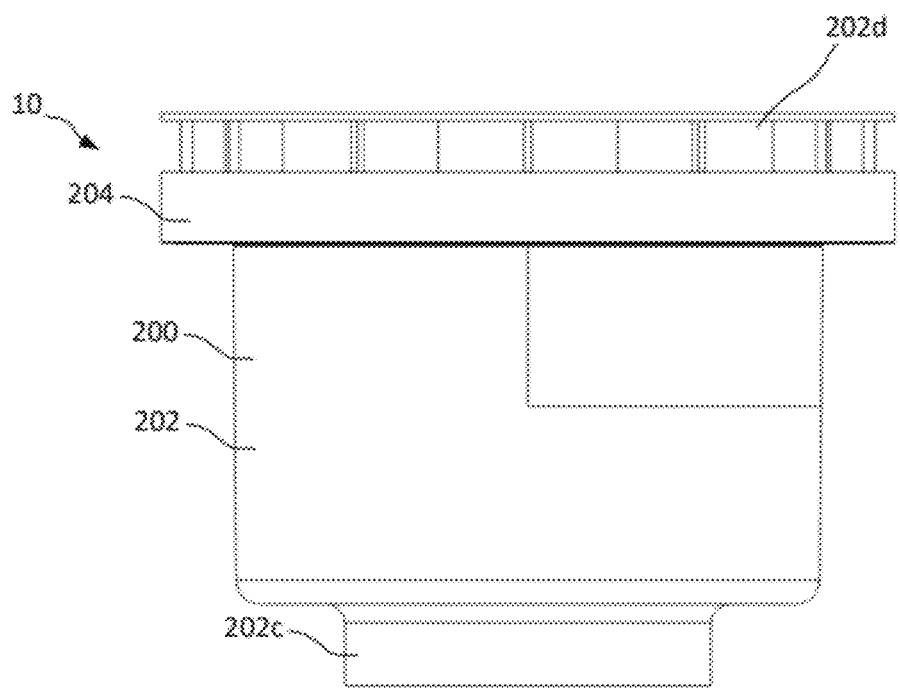
Figure 117:
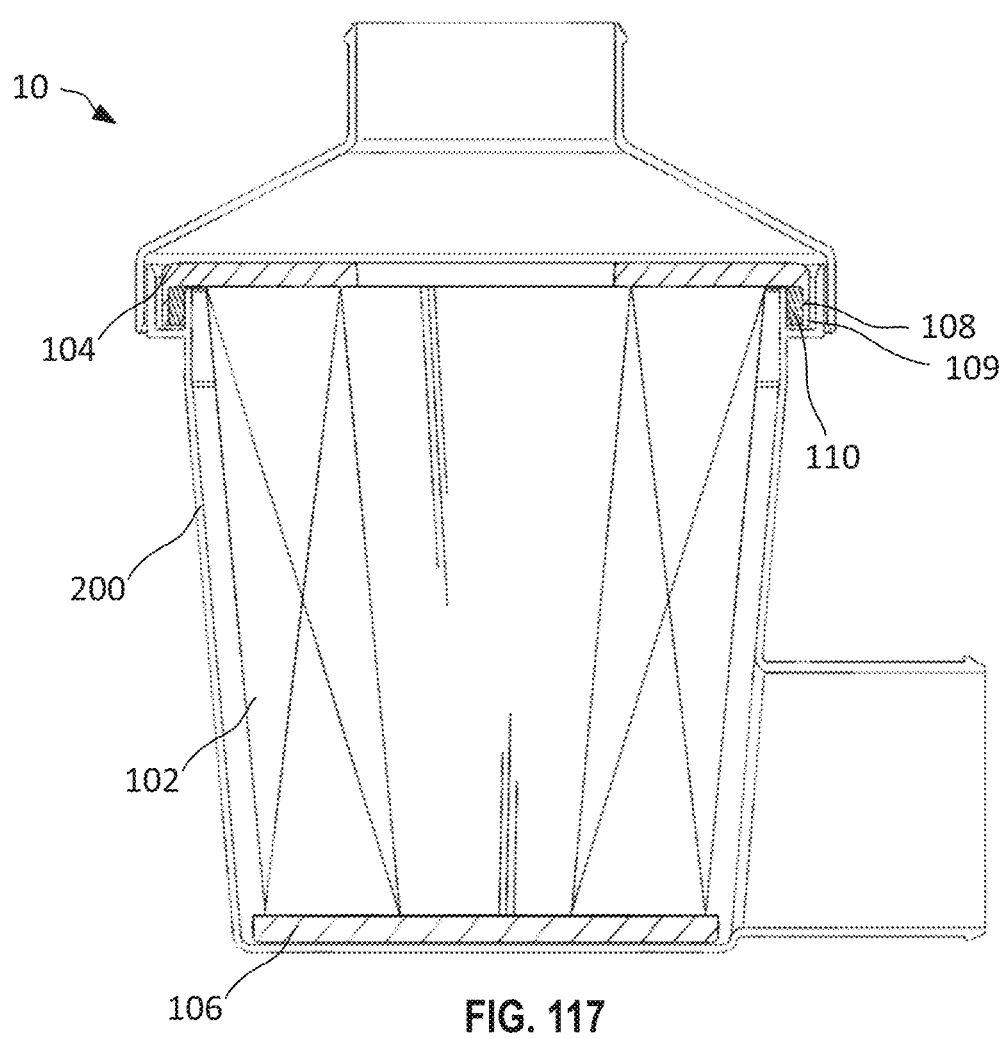
FIG. 117 is a cross-sectional view of an air cleaner assembly including the filter cartridge of FIG. 116.

Additional Examples of FIGS. 59 to 117

Referring now to FIGS. 59 to 87, additional air cleaner embodiments are presented illustrating the concept that the end cap 104 can be mounted to the outer circumferential side filter cartridge 100 rather than to the axial face of the media pack, as is shown in previous embodiments. In some examples, and as shown, the end cap 104 is mounted directly to the media pack outer perimeter 102e. Other arrangements are possible. For example, the filter cartridge 100 can be provided with an outer shell surrounding the media pack 102 and the end cap 104 can be mounted or formed as part of the shell.

The examples illustrated at FIGS. 59 to 87 also differ from the previously illustrated embodiments in that the filter media pack 102 is shown as being formed form fluted or z-media. This type of filter media can be constructed by combining a corrugated or fluted sheet with a flat facing sheet to create a series of parallel channels. In some examples, the manufacturing process involves forming a corrugated or fluted pattern in a first sheet of filter material through the application of heat and pressure between corrugating rollers. Adhesive beads are then applied along the peaks of the flutes on one side, after which a flat facing sheet is bonded to the fluted sheet to create enclosed channels. The combined sheets are then rolled or coiled into the desired shape, such as cylindrical or oval configurations. Many other processes are also possible for forming a media pack with fluted channels, as is described in PCT Publication WO2020/163756, the entirety of which is incorporated by reference herein. While the examples shown in FIGS. 60 to 87 illustrate a fluted media pack, it should be understood that the end cap 104 of these figures may be used with other types of media such as any of the media types shown and described in the WO '756 publication, including tubular pleated media of the type shown in association with FIGS. 1 to 59. It should also be understood that the end caps disclosed in association with FIGS. 1 to 59 may also be used with any of the media types shown and described in the WO '756 publication, including fluted filter media of the type shown in association with FIGS. 60 to 87. In one aspect, the media pack 102 shown in FIGS. 59-87 may be provided with a hollow space that is filled by a central core 102d, as is illustrated most clearly at FIG. 64. Media packs without a hollow space or central core can also be utilized without departing from the concepts presented herein.

Referring now to FIGS. 59-80, an air cleaner 10 is shown including a filter cartridge 100 and a housing assembly 200. The filter cartridge 100 comprises a filter media 102 formed of rolled fluted media and an end cap 104 mounted to the circumferential outer surface of the filter media 102. The filter cartridge 100 is provided with an end cap 104 that circumscribes at least a portion of the outer perimeter 102e of the media pack 102. A seal member 110, having a polygonal shape, is carried by the end cap 104 and is configured to form a seal between the filter cartridge 100 and the housing assembly 200 when installed. The end cap further includes a support structure 108 having circumferentially arranged reinforcement members 109 that support the seal member 110 in the same manner as previously described. However, in contrast to previously disclosed embodiments and as most easily seen at FIG. 64, the reinforcement members 109 circumscribe the media pack 102 such that they are located between the media pack axial ends 102a, 102b and extend in a direction towards the axial end 102b. In the example shown, the seal member 110 has twelve flat sides and associated corner portions while the support structure 108 includes twelve corresponding reinforcement members 109. Other numbers of flat sides and reinforcement members 109 are possible, as discussed herein.

Figure 64:
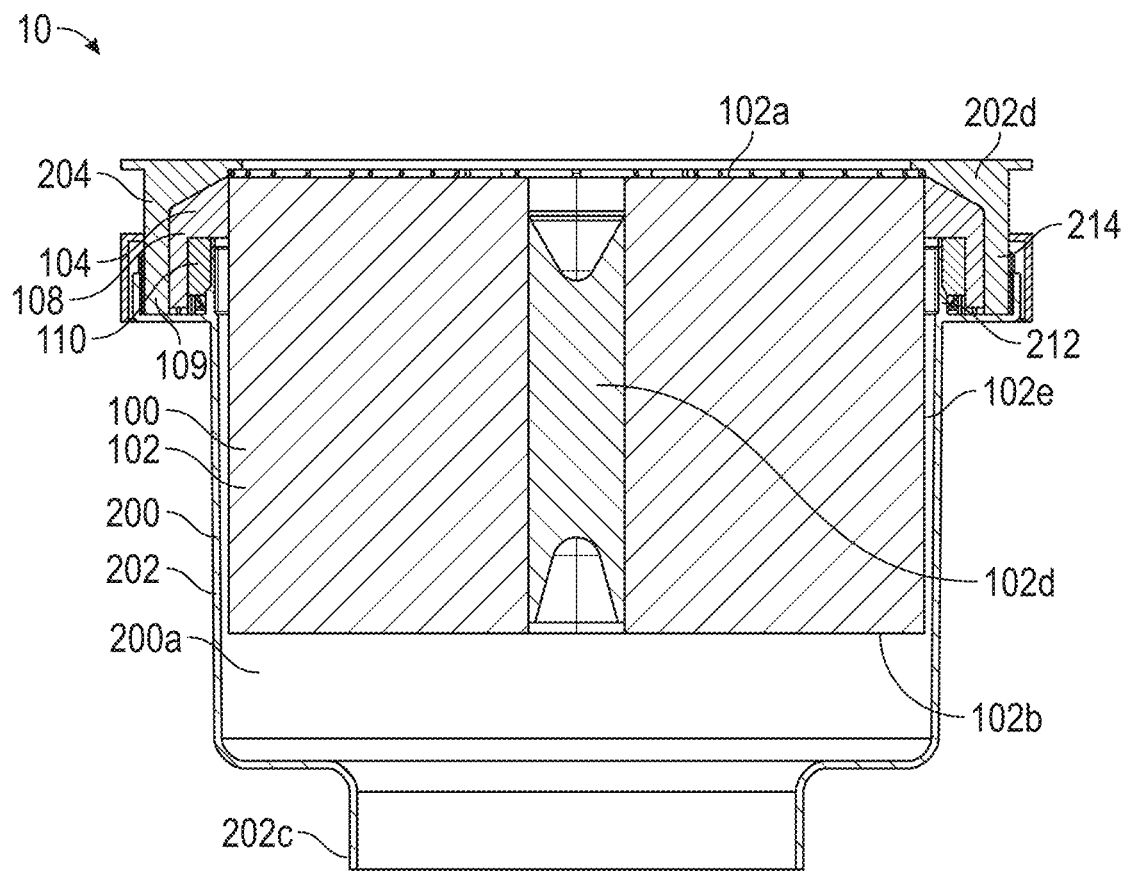
Figure 64A:
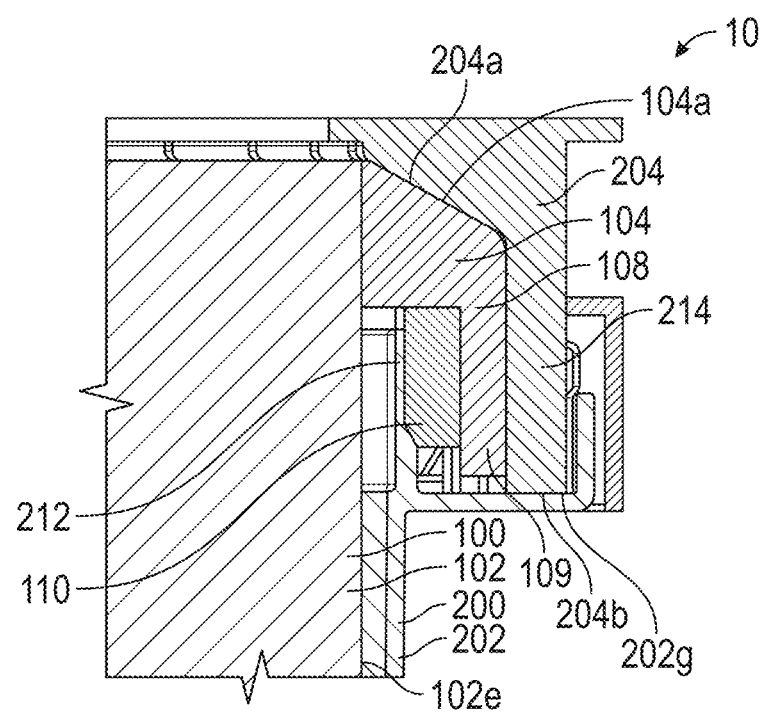
Figure 64B:
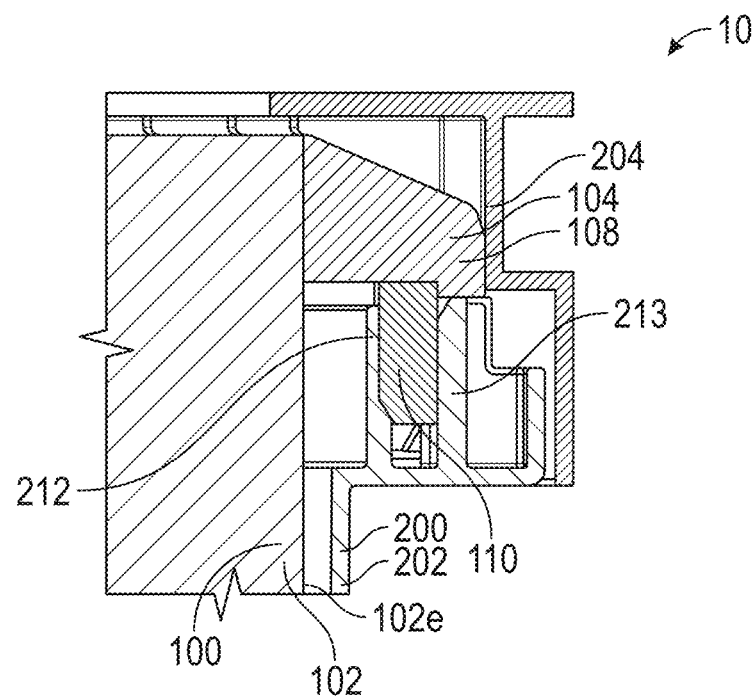
Figure 65:
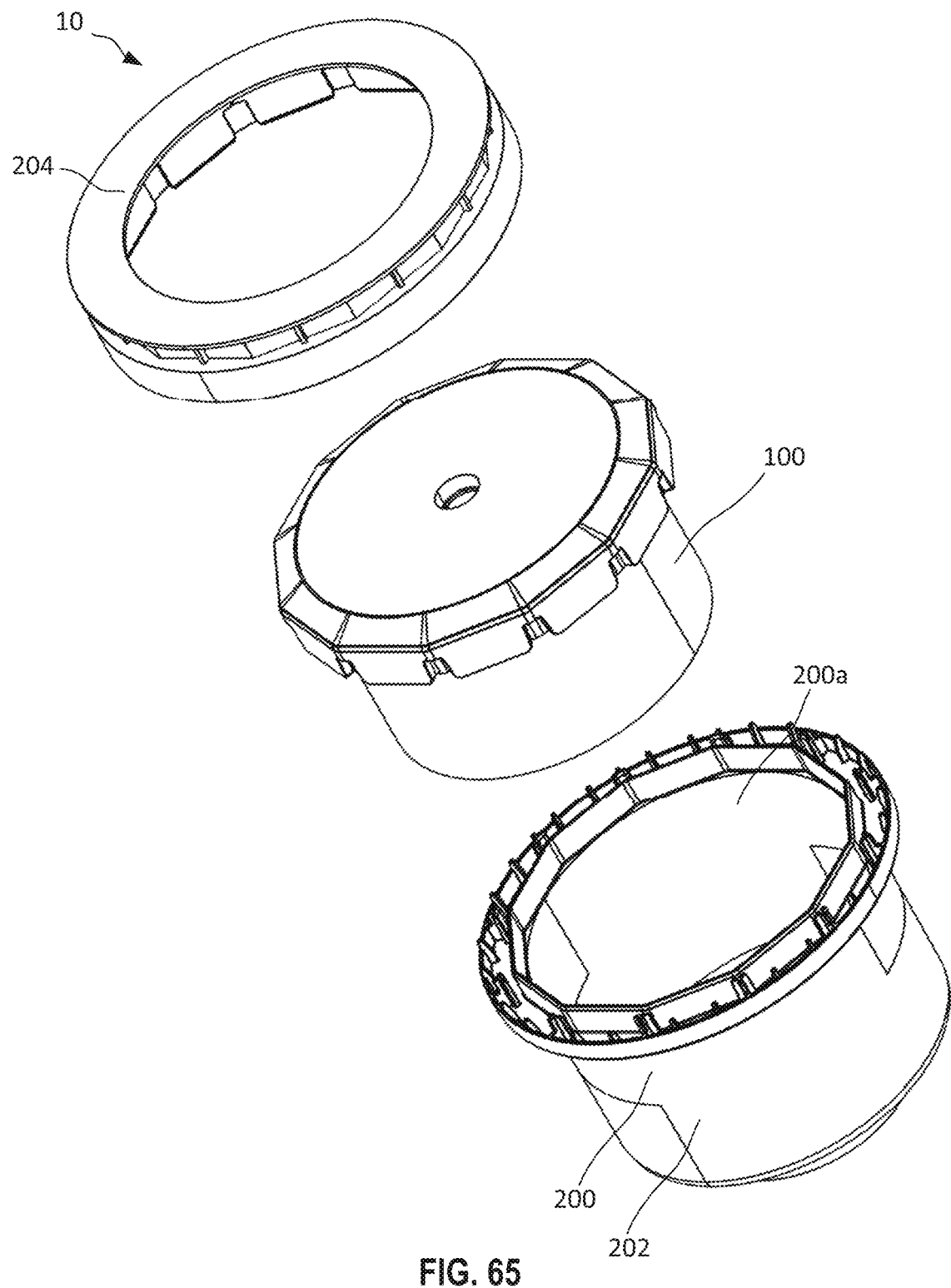
Figure 66:
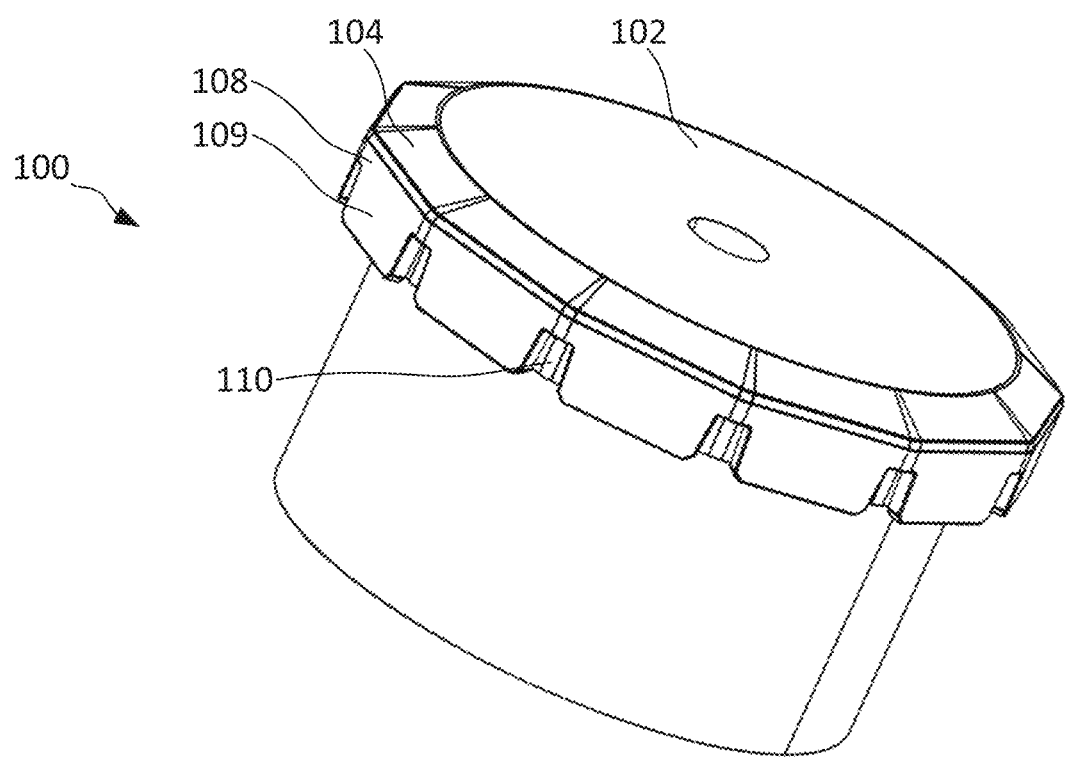
Figure 67:
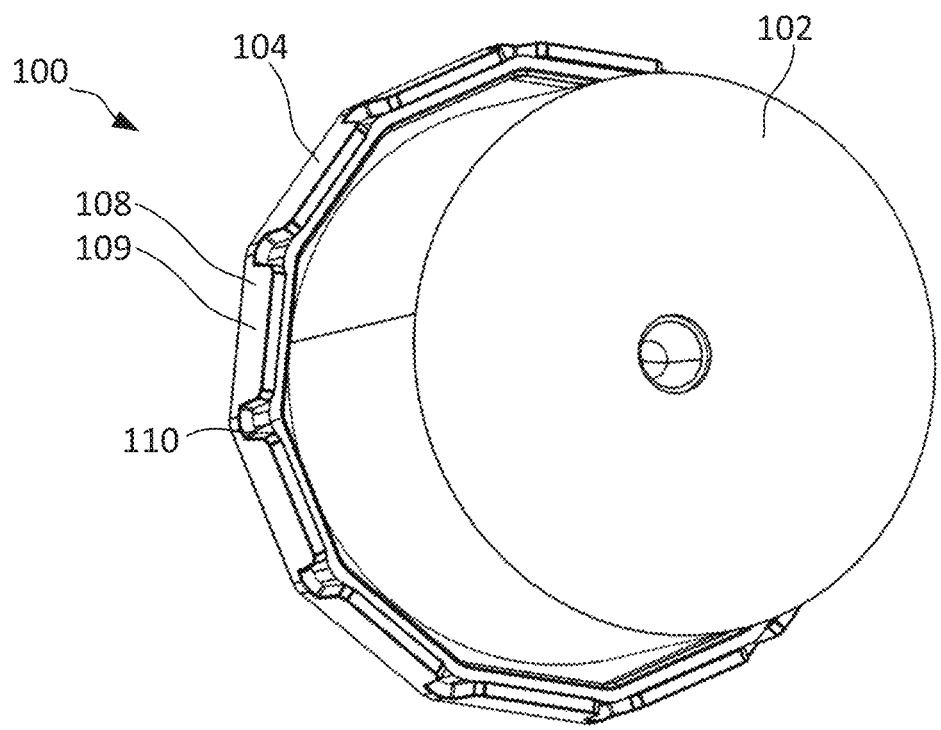
Figure 68:
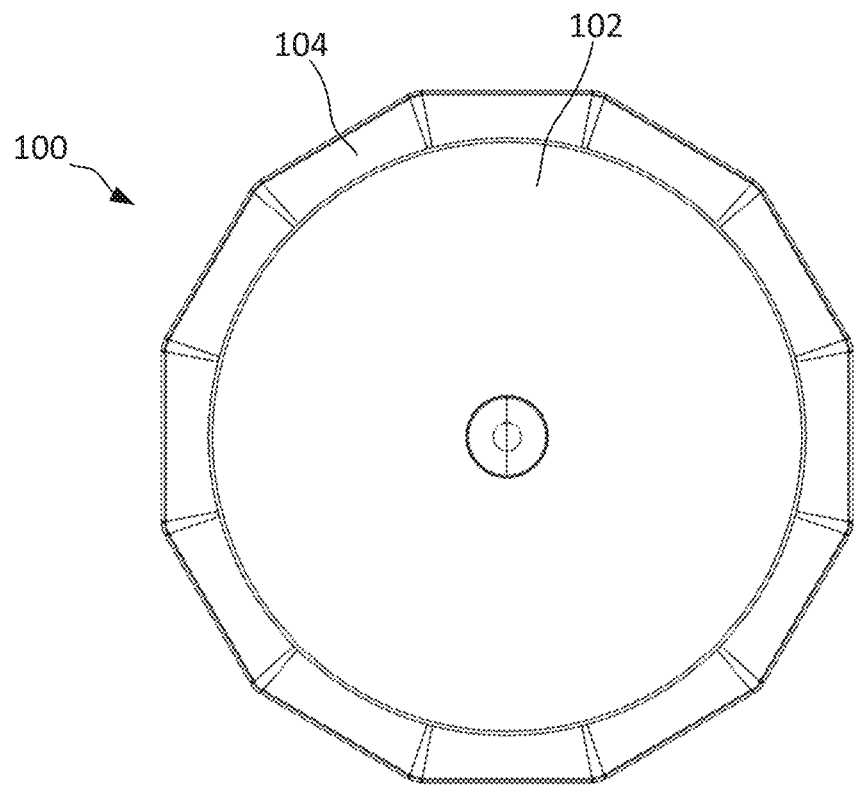
Figure 69:
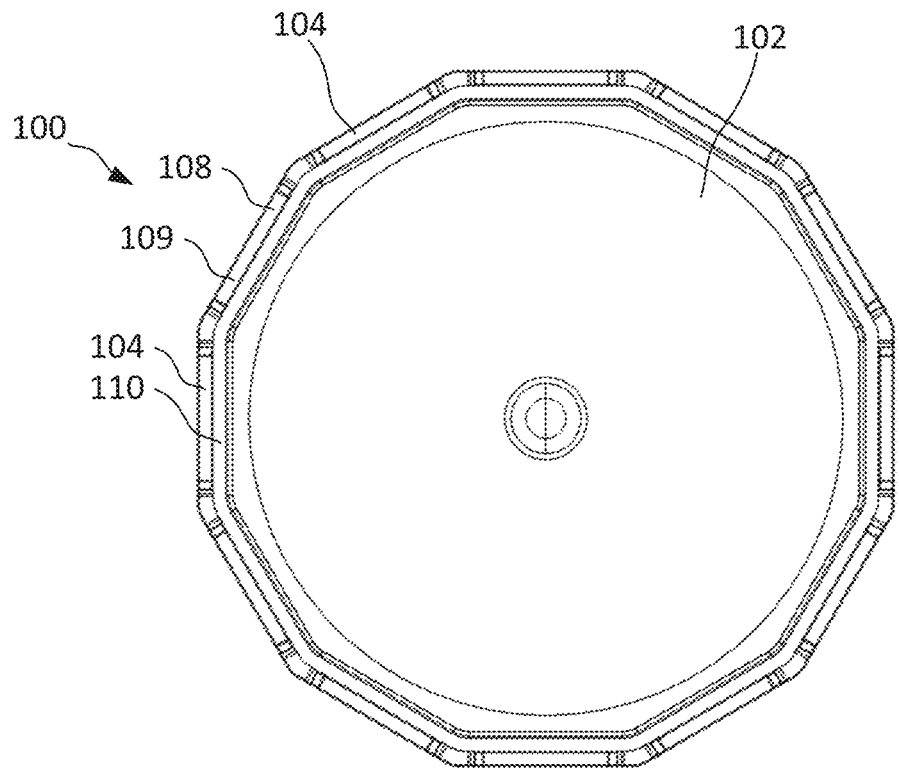
Figure 70:
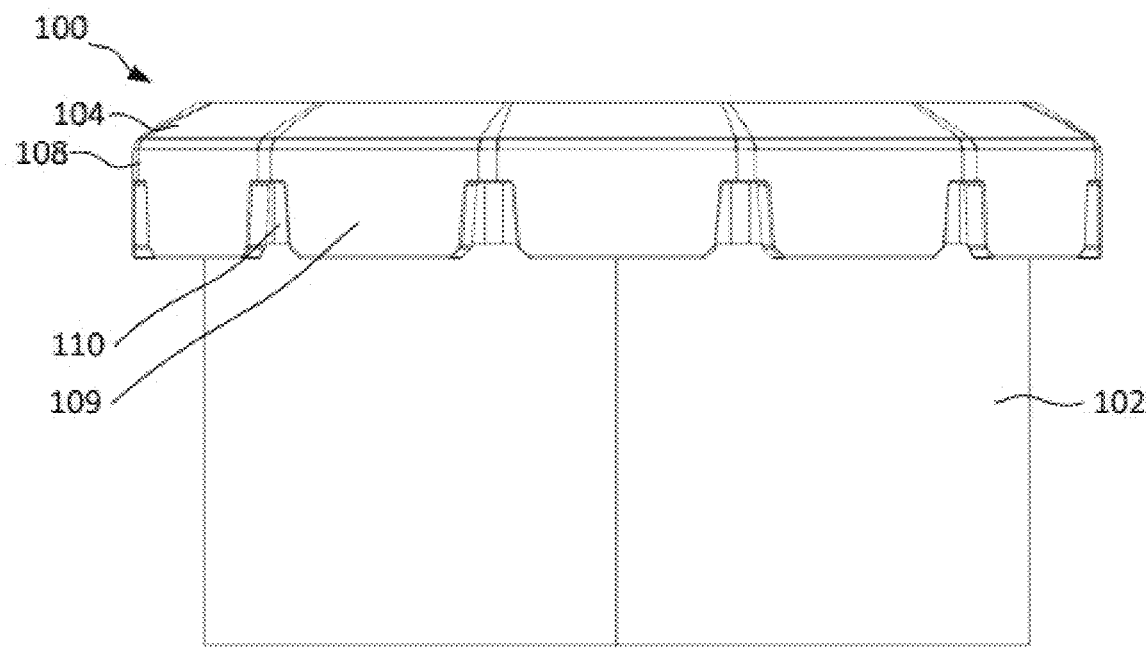
Figure 71:
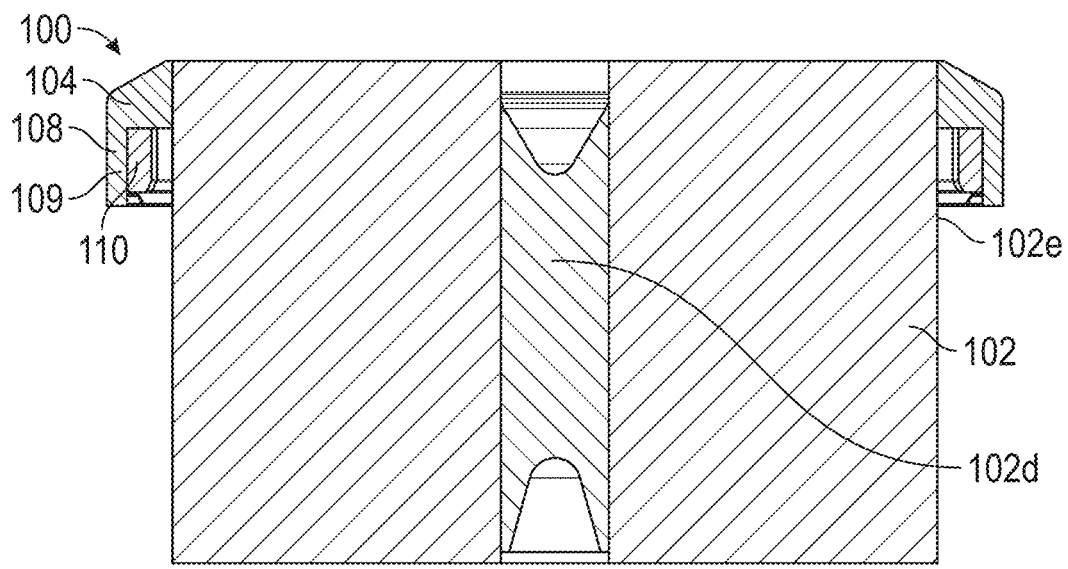
Figure 72:
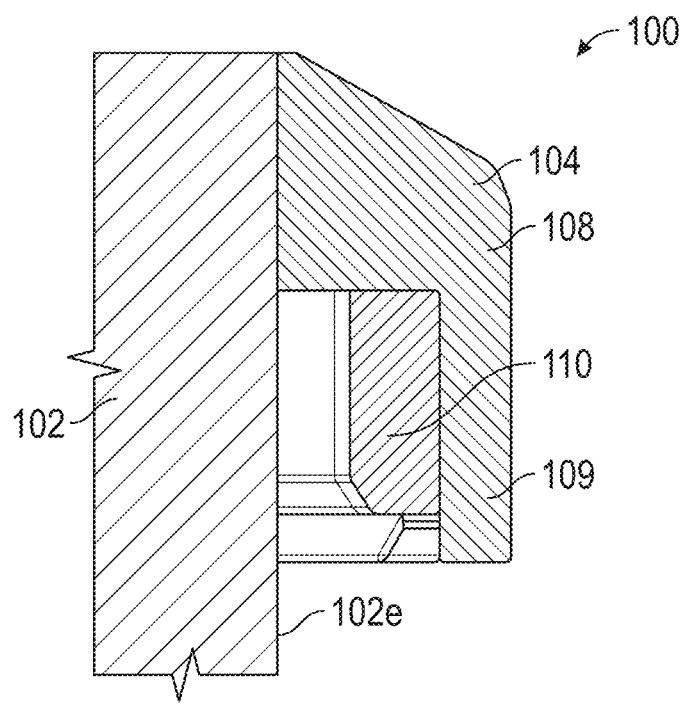
Figure 73:
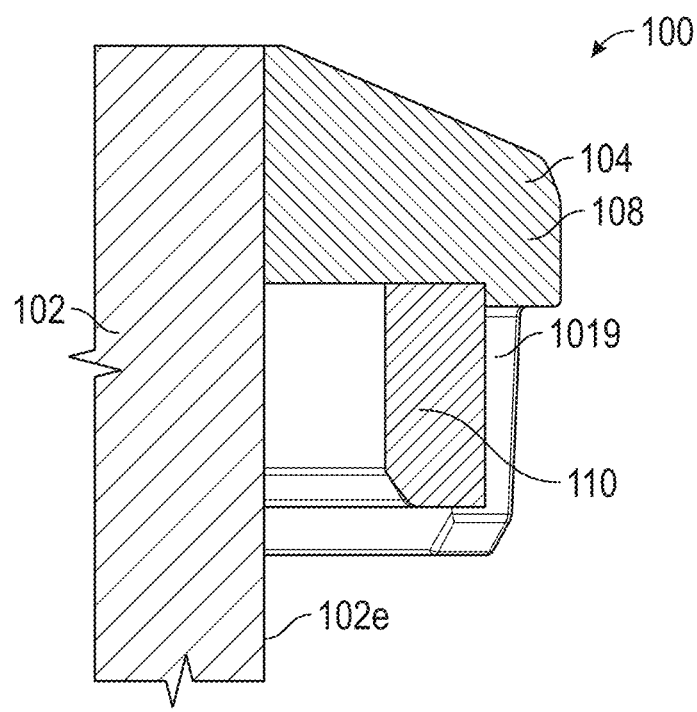
Figure 74:
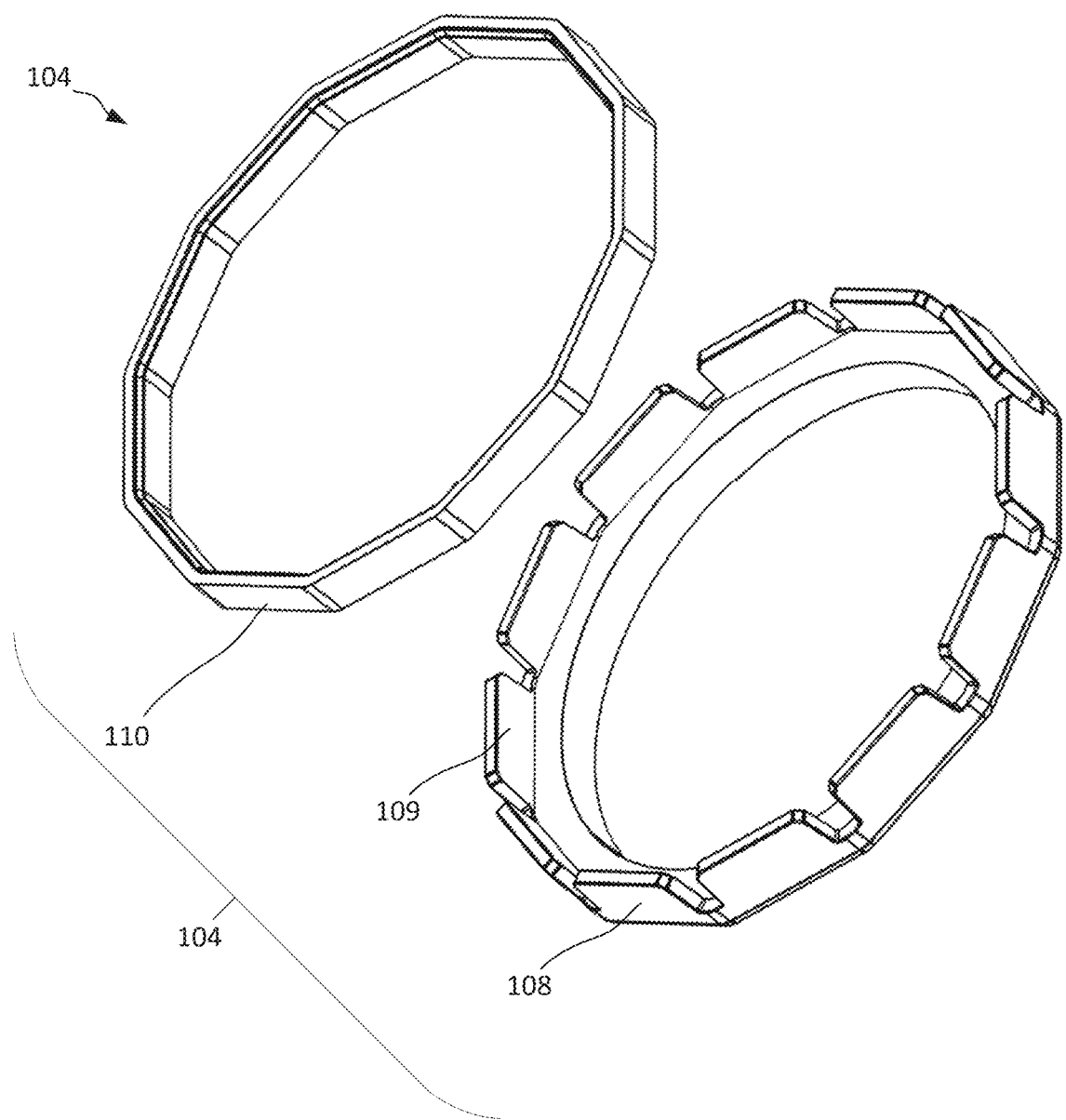
Figure 75:
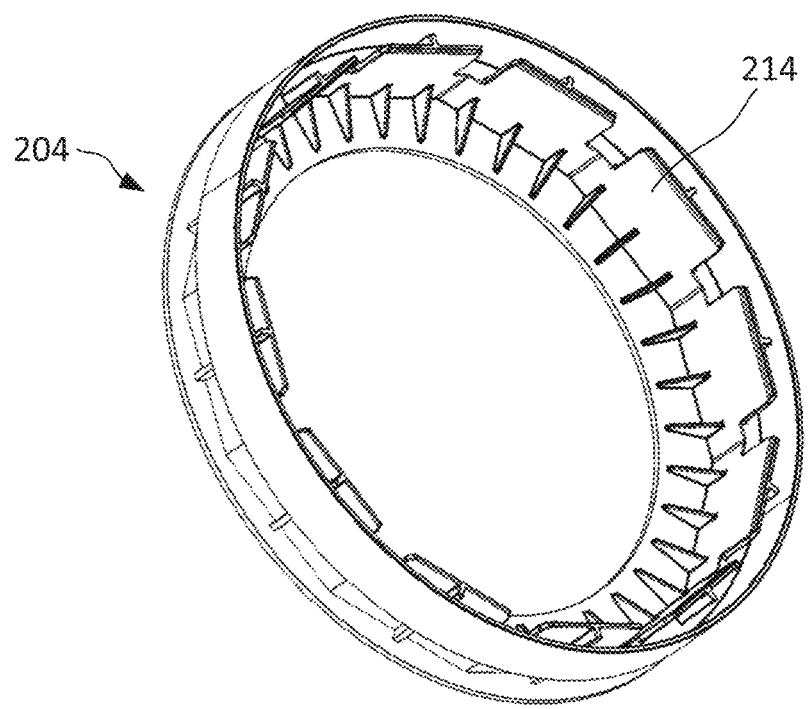
Figure 76:
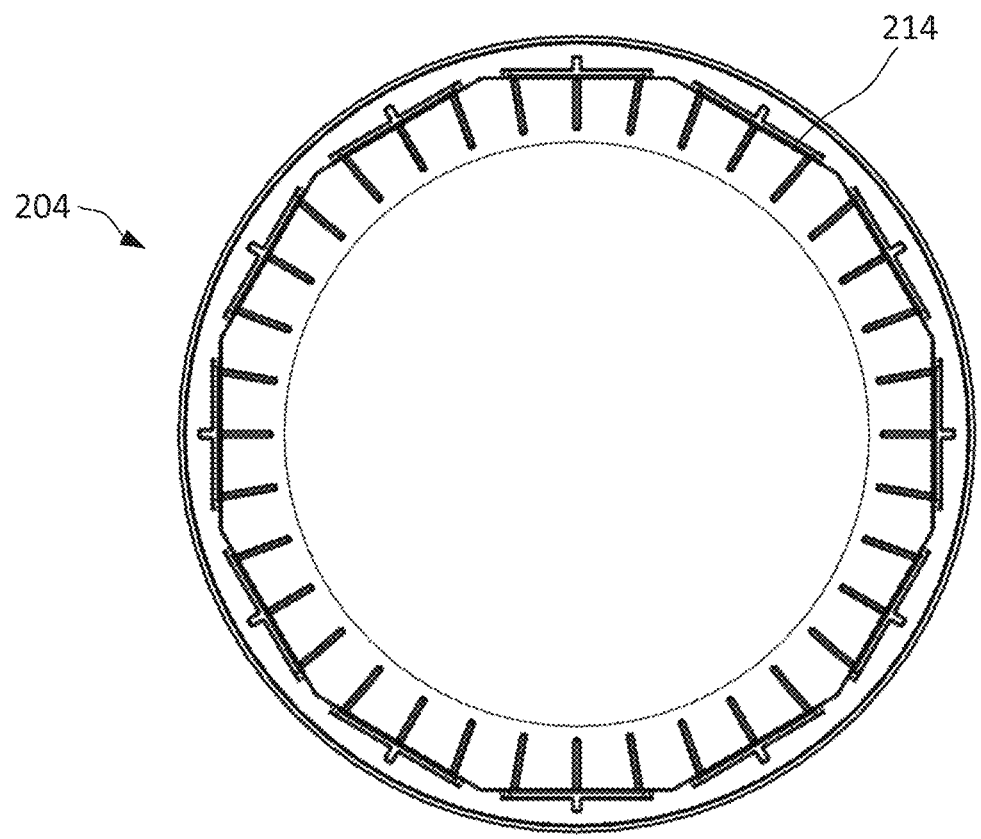
Figure 77:
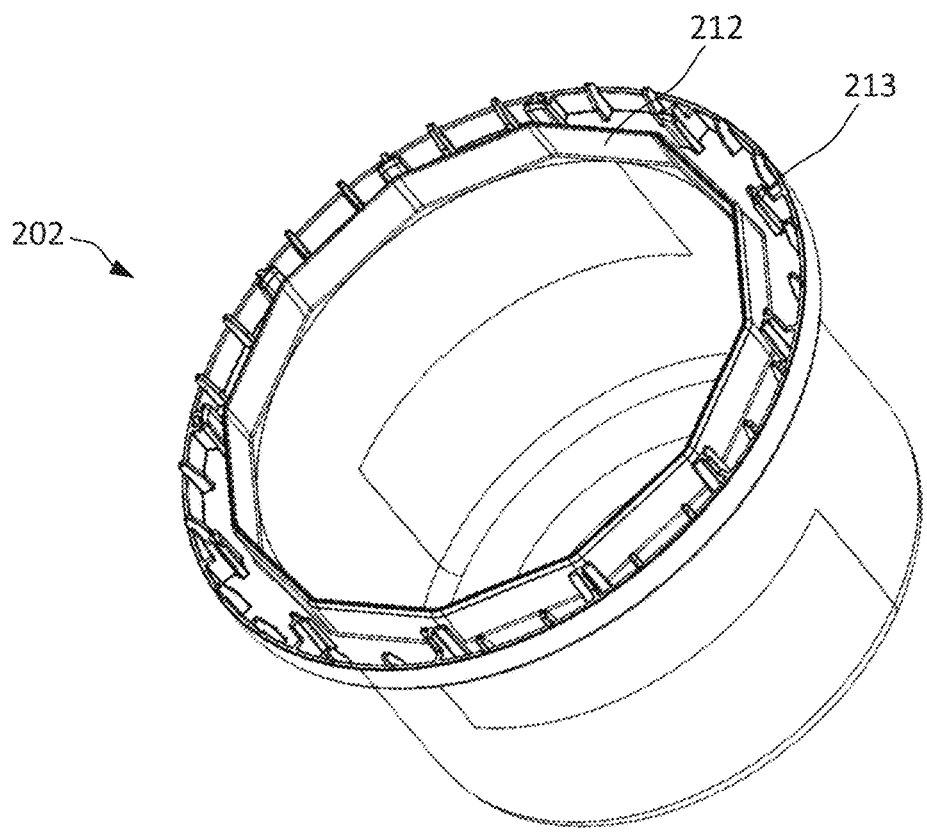
Figure 78:
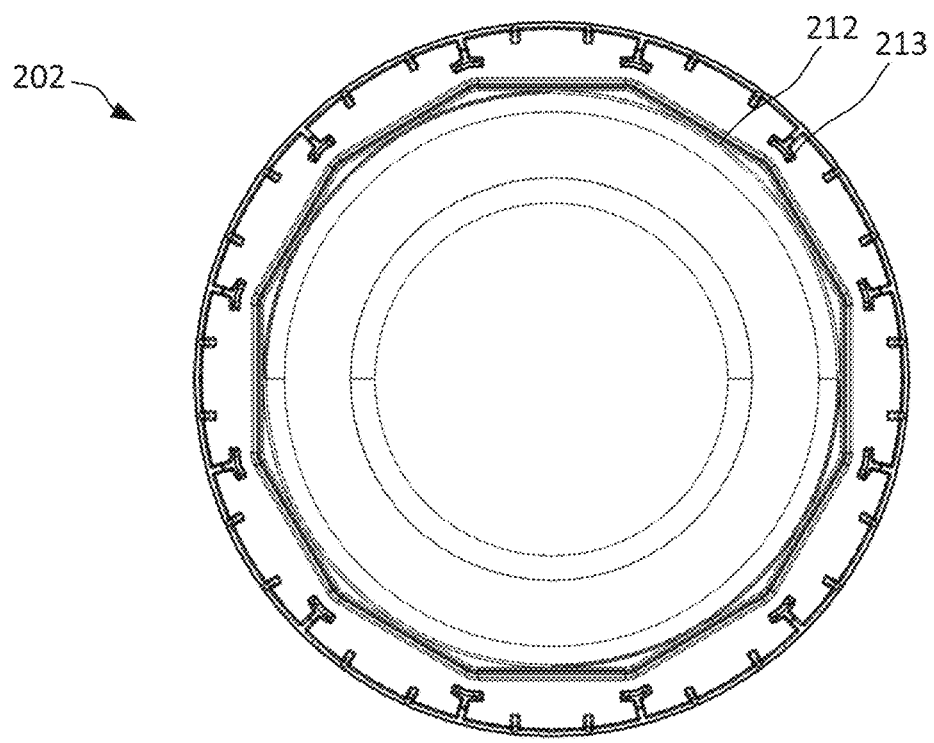
Figure 79:
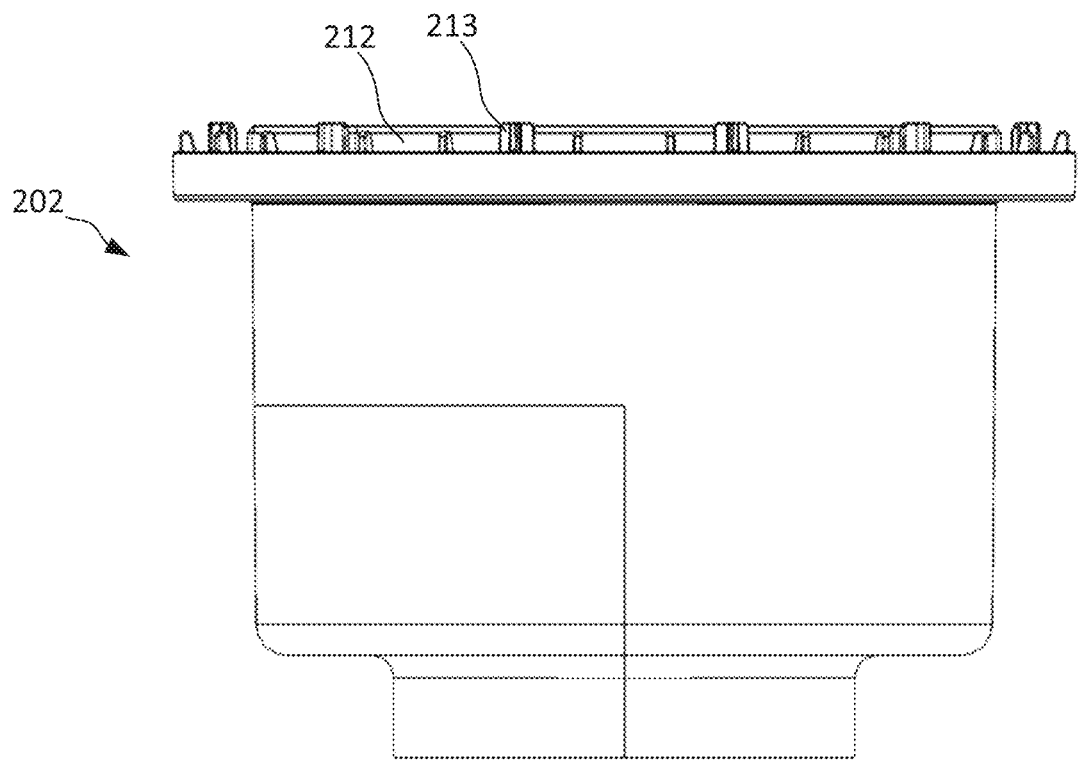
Figure 80:
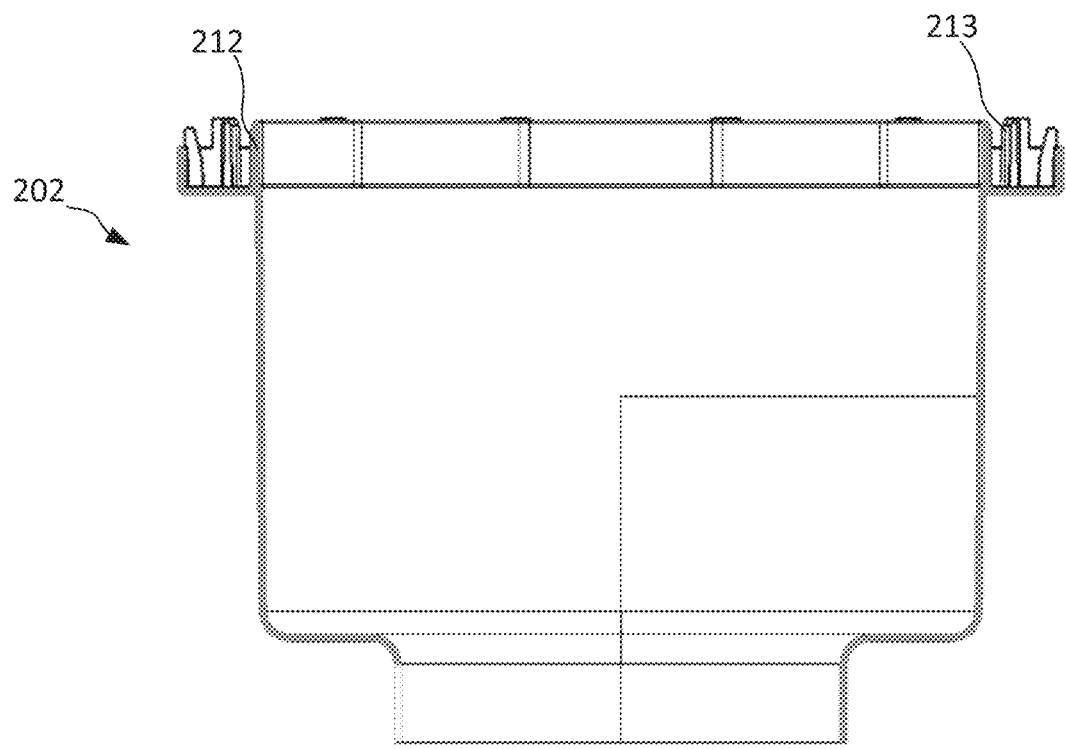
Figure 81:
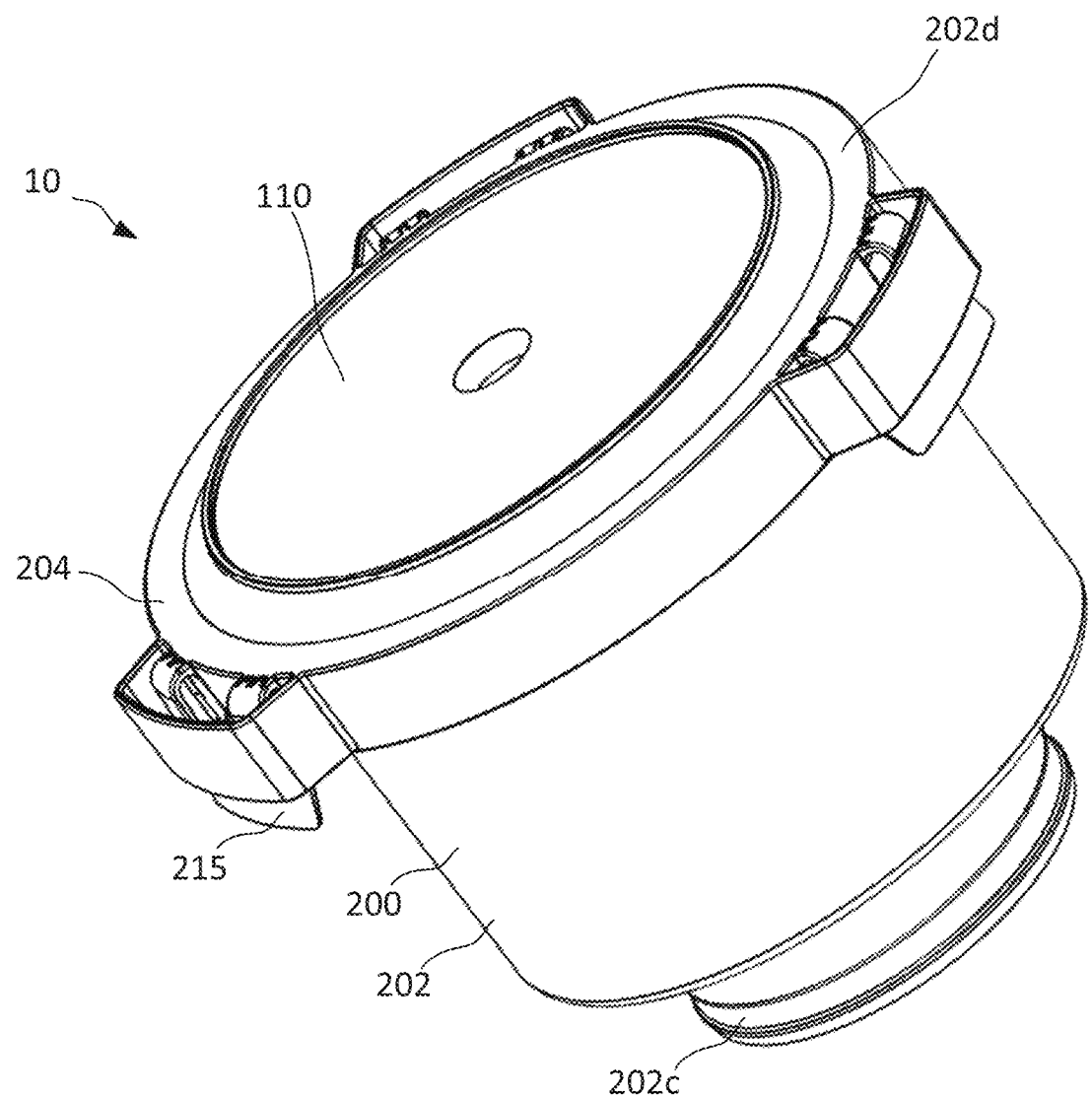
FIGS. 81-84 schematically show views of an example air cleaner assembly generally similar to that shown in FIGS. 59-80, but with an alternative cover and latching arrangement.
Figure 82:
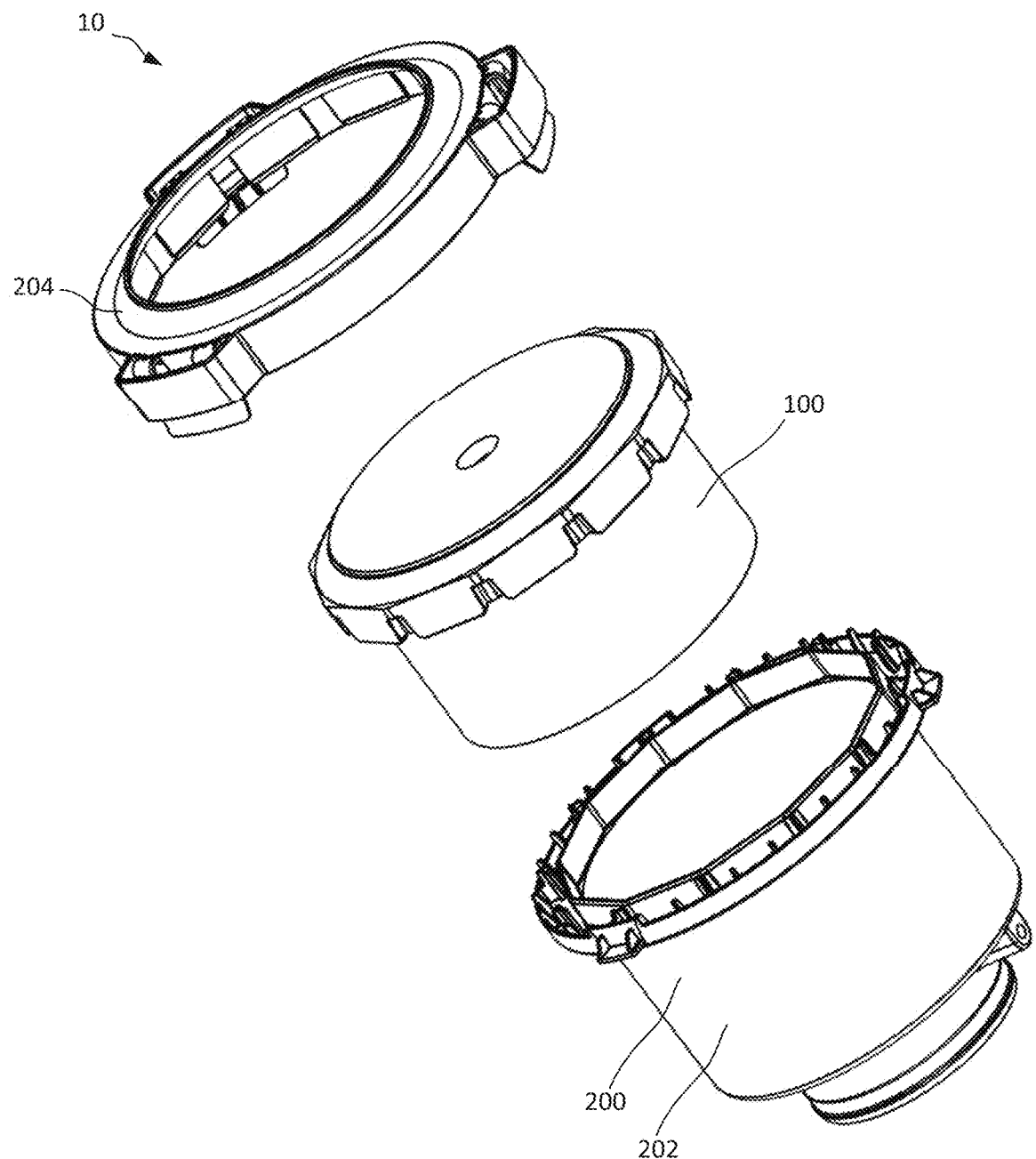
Figure 83:
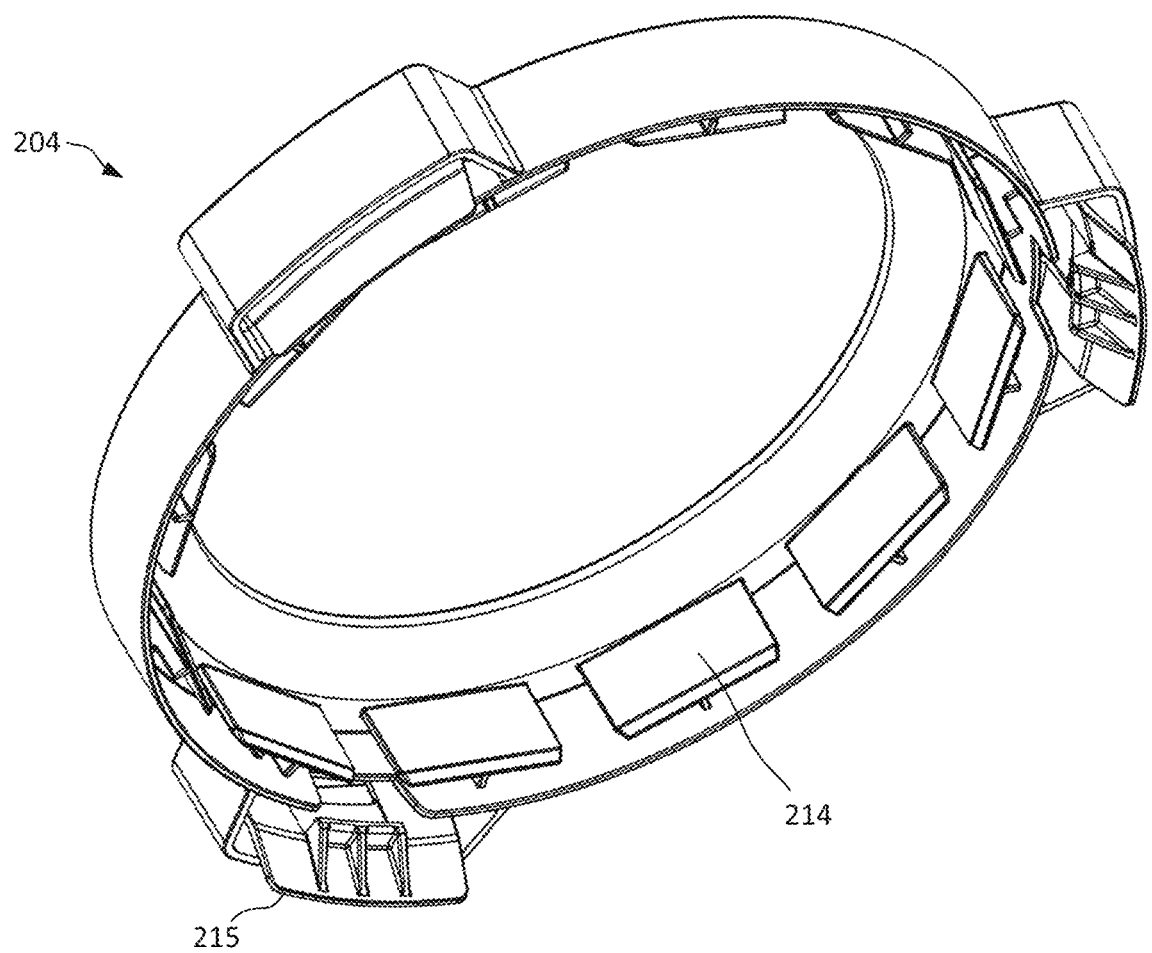
Figure 84:
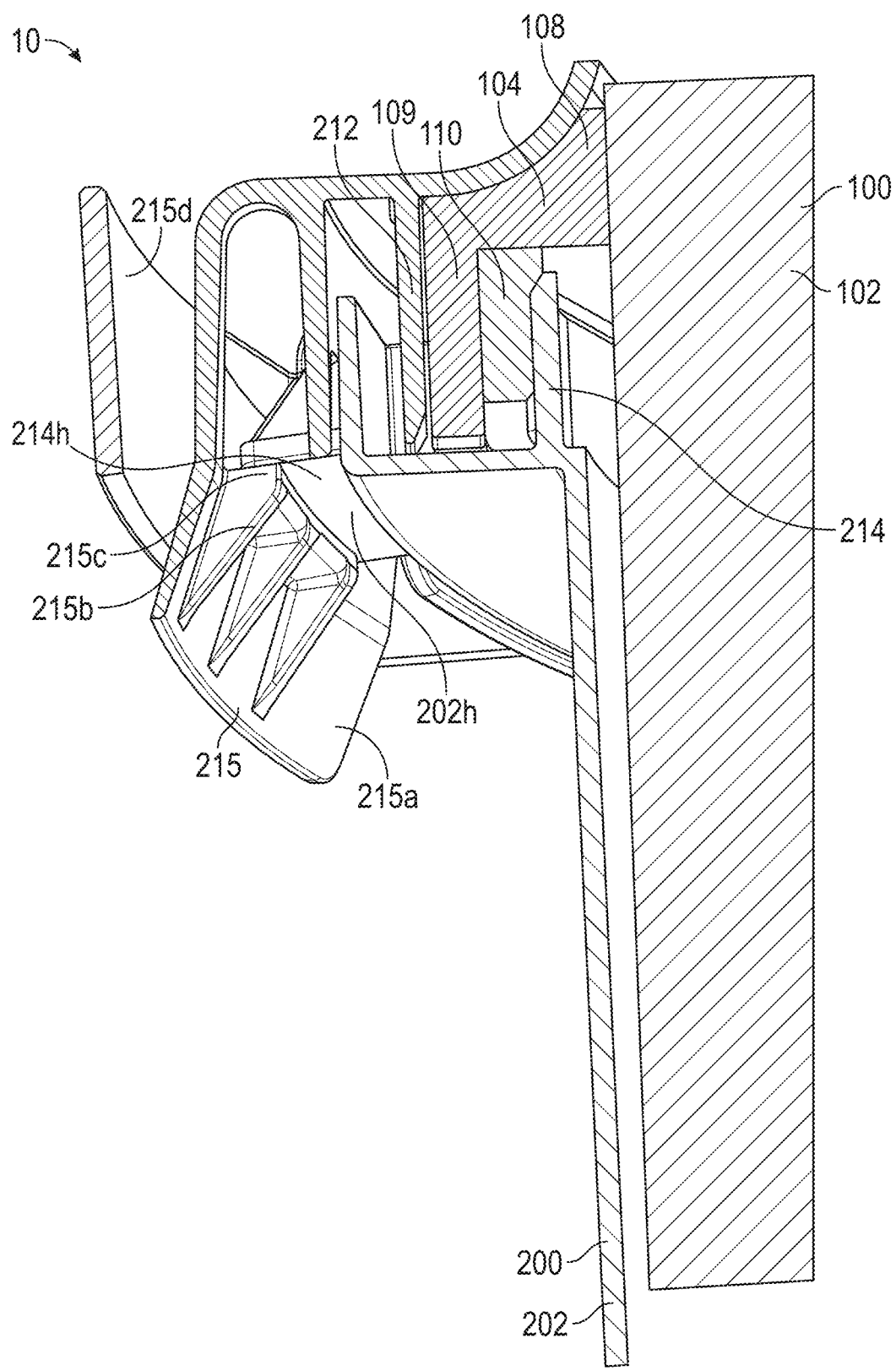

With continued reference to FIG. 64, it can be seen that the configurations of the sidewalls 212 and 214 are also modified, in comparison to previous embodiments, in that the sidewall 212 is located on the main housing 202 while the sidewall 214 remains associated with the cover 204. With such an arrangement, during installation, the filter cartridge 100 is received into the interior volume 202a of the main housing 202 such that the seal member 110 engages with and forms a seal against the outer surface of the sidewall 212 with the seal member stretching around the corners of the sidewall 212. Subsequently, once the cover 204 is installed, the sidewall 214 engages against the outer surfaces of the reinforcement members 109 to result in an enhanced seal, as previously described for the earlier-disclosed embodiments. As is most easily seen at FIGS. 75 and 76, the sidewall 214 is configured with flat portions separated by gaps in an arrangement similar to the example shown at FIG. 57. However, any of the arrangements disclosed at FIGS. 48 and 54 to 58 may be utilized for the sidewall 214. To additionally support the seal member 110 at the exposed corner portions or segments, the housing 202 can be provided with radially inward extending protrusions 213 that extend to and contact the seal member 110, as is illustrated at FIG. 64B. The protrusions 213 are further illustrated at FIGS. 77 to 80 and function in the same manner as already described for projections 202e illustrated at FIG. 17. As illustrated at FIG. 64A, it can be seen that the filter cartridge 100 is clamped or secured between the cover 204 and the main body 202 by virtue of contact between a first bottom facing side 204a of the cover 204 and an upward facing side 104a of the end cap 104 and by virtue of contact between a second bottom facing side 204b of the cover 204 and an upward facing side 202g of the main housing 202.

FIGS. 81-84 illustrate a variation of the filter cartridge design shown in FIGS. 59-80 that is generally similar but in which an additional latch arrangement 215 is provided for securing the cover 204 to the housing main body 202. The latch arrangement 215 allows for tool-free removal and installation of the cover 204. As shown, the cover 204 is provided with a plurality of radially deflectable latch members or arms 215a that carry a ramped latch member 215b presenting an upward facing surface 215c. The housing 202 is provided with an plurality of corresponding radial extensions or protrusions 202h against which the ramped latch members 215b can act against to expand the radial arms 215a outward during installation Once the cover 204 is sufficiently depressed onto the housing 202, the ramped latch members 215b extend past the extensions 202h and the deflectable arms 215a can return towards their natural positions. In this position, downward facing surfaces 214h of the extensions 202h engage against the upward facing surfaces 215c of the ramped latch members 215b to retain the cover 204 onto the main housing 202. To remove the cover 204, an operator need only to deflect the arms 215a in a radial outward direction to disengage the surfaces 215c, 214h from each other. In the example shown, the latch arrangement is further provided with surrounding portions 215d on the cover 204 that surround the deflectable arms 215a and can act as a guard for the arms 215a and/or as handles.

Figure 85:
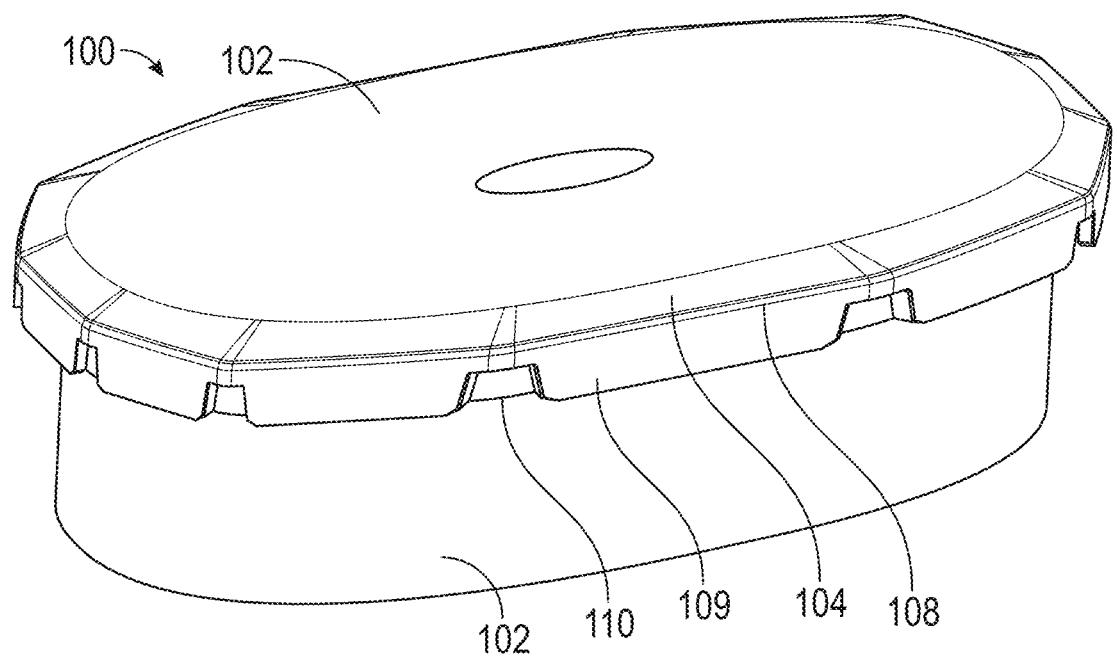
FIGS. 85-86 schematically show views of an example filter cartridge in accordance with FIGS. 59-84 in which the media pack is provided with a non-round cross-sectional shape.
Figure 86:
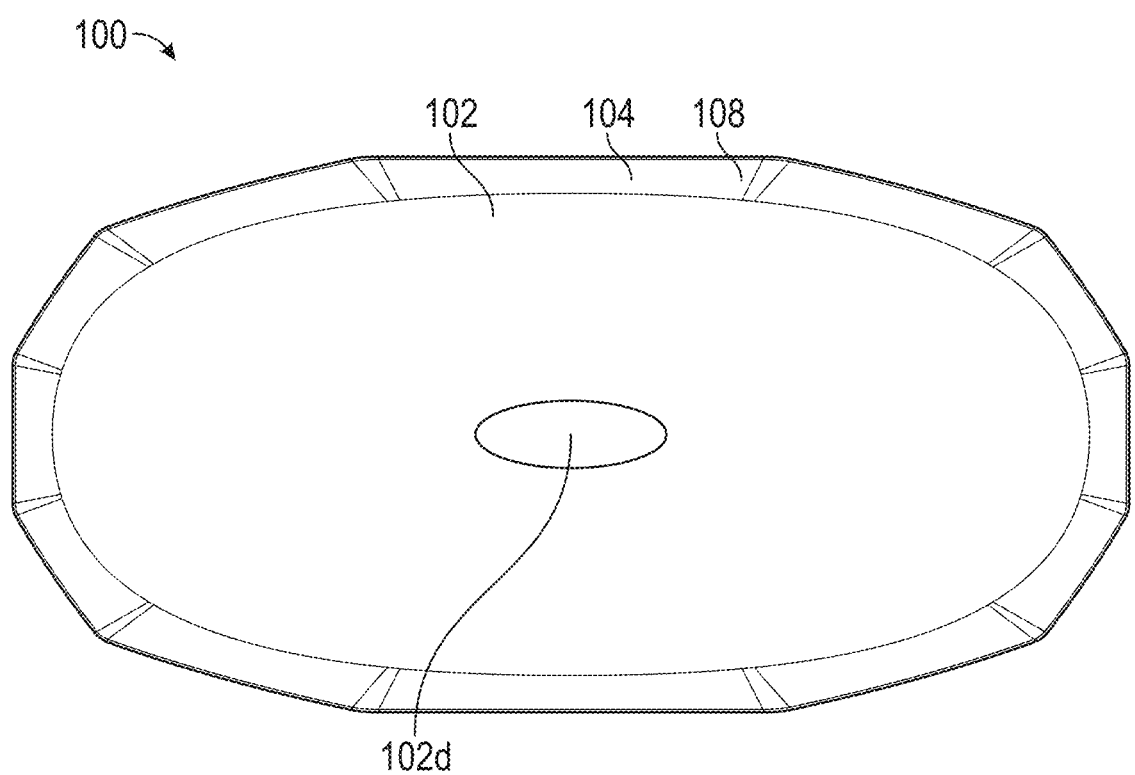
Figure 87:
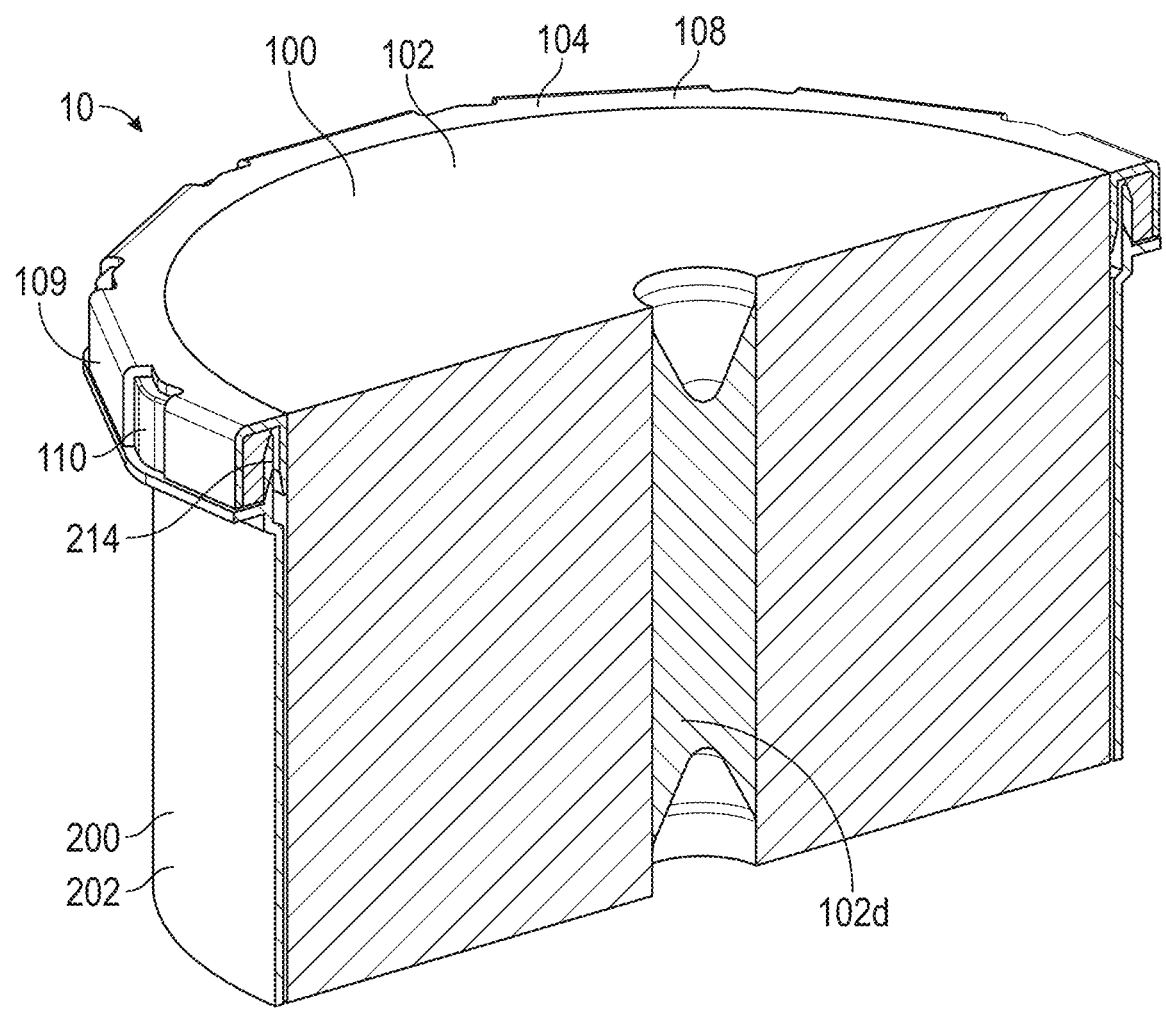
FIG. 87 schematically shows a further example of an air cleaner having a filter cartridge with an end cap mounted to an outer circumferential side of the filter cartridge.
Figure 116:
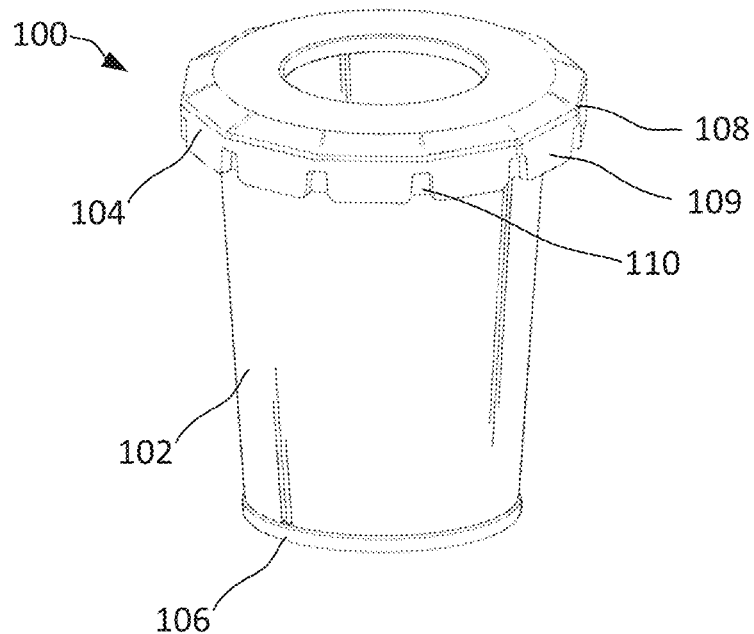
FIG. 116 is a perspective view of an example filter cartridge construction usable with any of the filter cartridges disclosed herein.

With reference to FIGS. 85 to 87 and 116 to 117, further variations are illustrated. For example, FIGS. 85 to 86 depict another variation of the filter cartridge 100 having an oval or racetrack-shaped cross-section rather than circular. The oval configuration maintains the same basic components and mounting arrangement as described above, while providing an alternative form factor that may be advantageous for certain installation spaces. FIG. 87 shows yet another embodiment wherein the filter cartridge 100 is designed for use without a removable cover 204 and in which the support structure only partially covers an axial face of the seal member 110. FIGS. 116 to 117 show an example similar to that shown in FIGS. 60 to 80 but in which pleated media 102 with a hollow center is utilized instead of fluted type media.

Figure 88:
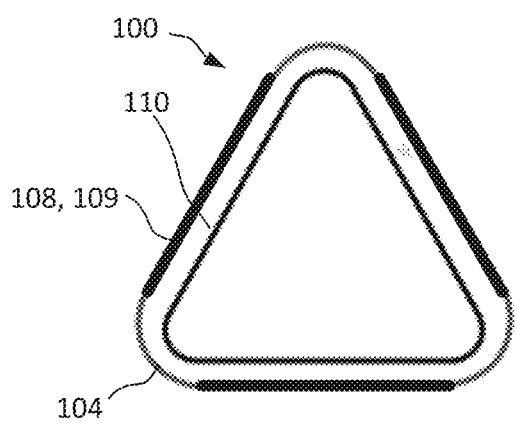
FIG. 88 schematically shows an example seal and support arrangement suitable for use with any of the filter cartridges disclosed herein, wherein the seal member has three flat sides and corner portions and the support structure has three reinforcement members.
Figure 89:
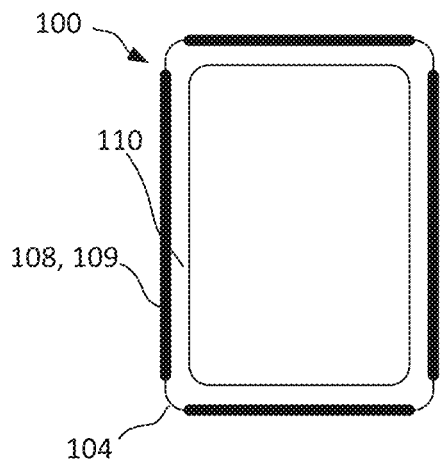
FIG. 89 schematically shows an example seal and support arrangement suitable for use with any of the filter cartridges disclosed herein, wherein the seal member has four flat sides and corner portions and the support structure has four reinforcement members.
Figure 90:
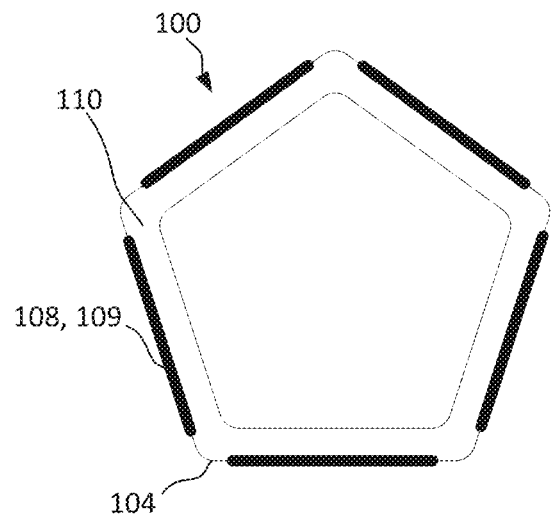
FIG. 90 schematically shows an example seal and support arrangement suitable for use with any of the filter cartridges disclosed herein, wherein the seal member has five flat sides and corner portions and the support structure has five reinforcement members.
Figure 91:
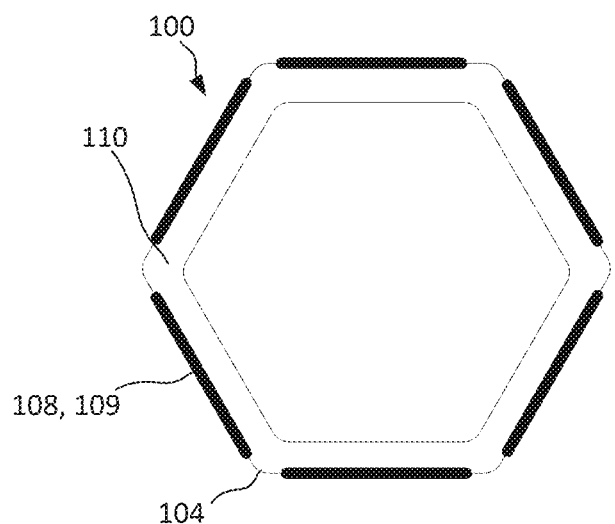
FIG. 91 schematically shows an example seal and support suitable for use with any of the filter cartridges disclosed herein, wherein the seal member has six flat sides and corner portions and the support structure having six reinforcement members.

FIGS. 88 to 91, as noted above, illustrate example arrangements in which the seal arrangement is provided with different numbers of flat sides and corner portions than previously depicted. As shown, FIG. 88 shows a three-sided seal member 110 with reinforcement members 109 being provided along each of the flat sides between adjacent the corner portions. As shown, FIG. 89 shows a four-sided seal member 110 with reinforcement members 109 being provided along each of the flat sides between adjacent the corner portions. As shown, FIG. 90 shows a five-sided seal member 110 with reinforcement members 109 being provided along each of the flat sides between adjacent the corner portions. As shown, FIG. 91 shows a six-sided seal member 110 with reinforcement members 109 being provided along each of the flat sides between adjacent the corner portions. The number of flat sides and/or corner portions can be a matter of design choice.

Figure 92:
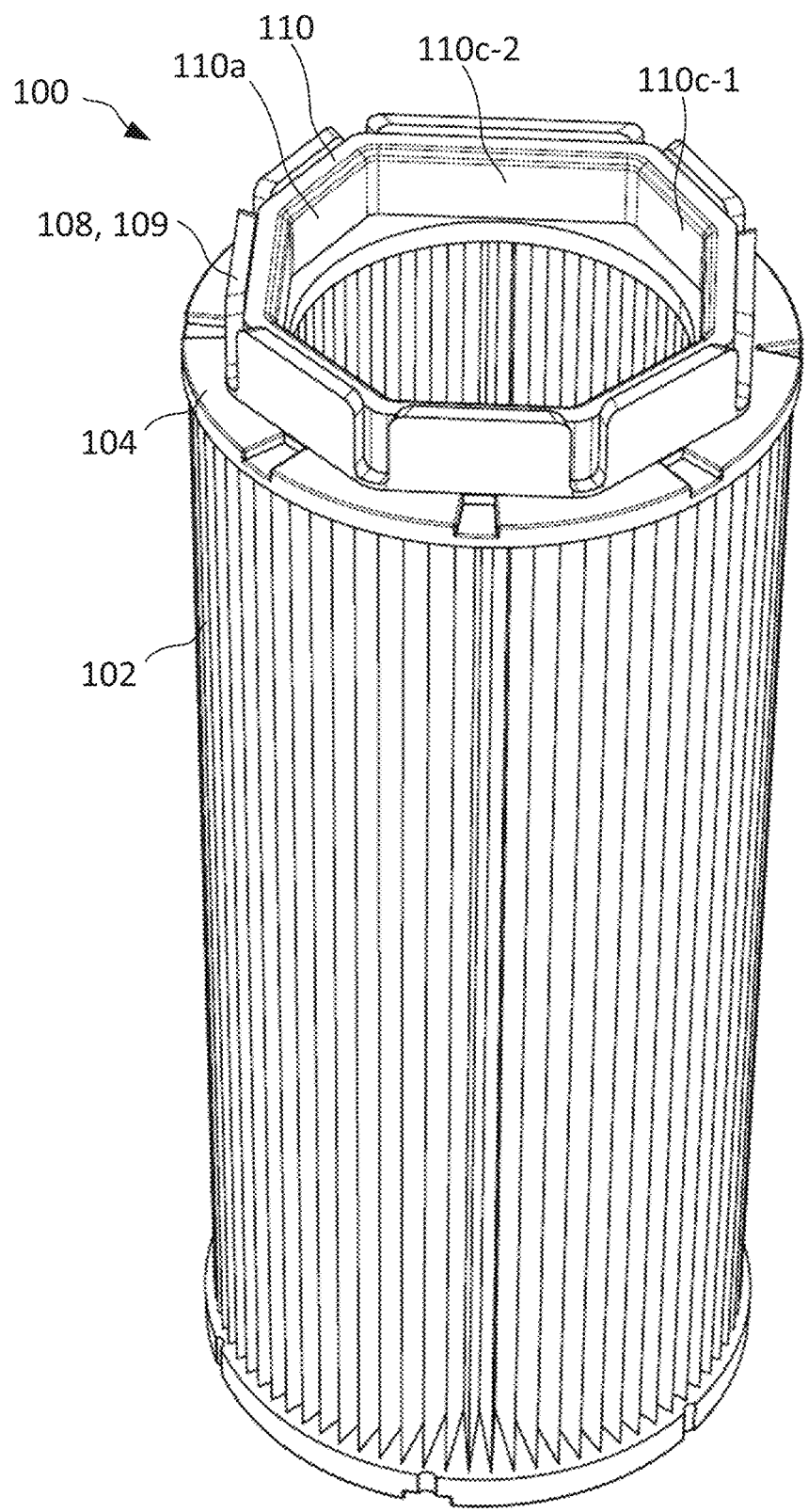
FIG. 92 is a perspective view an example filter cartridge in which the seal member has one flat side that is longer than the remaining flat sides and in which the support structure has one reinforcement member that is longer than the remaining reinforcement members.
Figure 93:
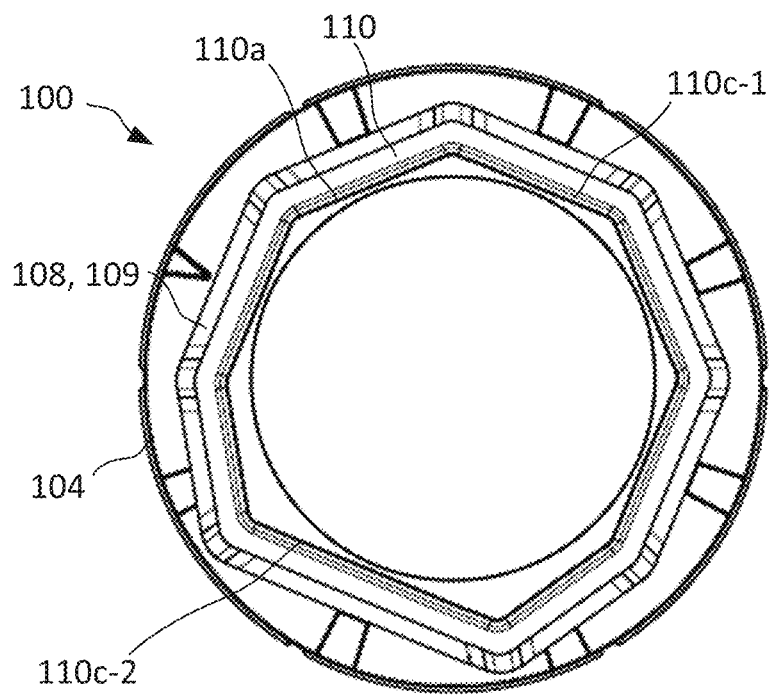
FIG. 93 is a top view of the filter cartridge of FIG. 92.
Figure 94:
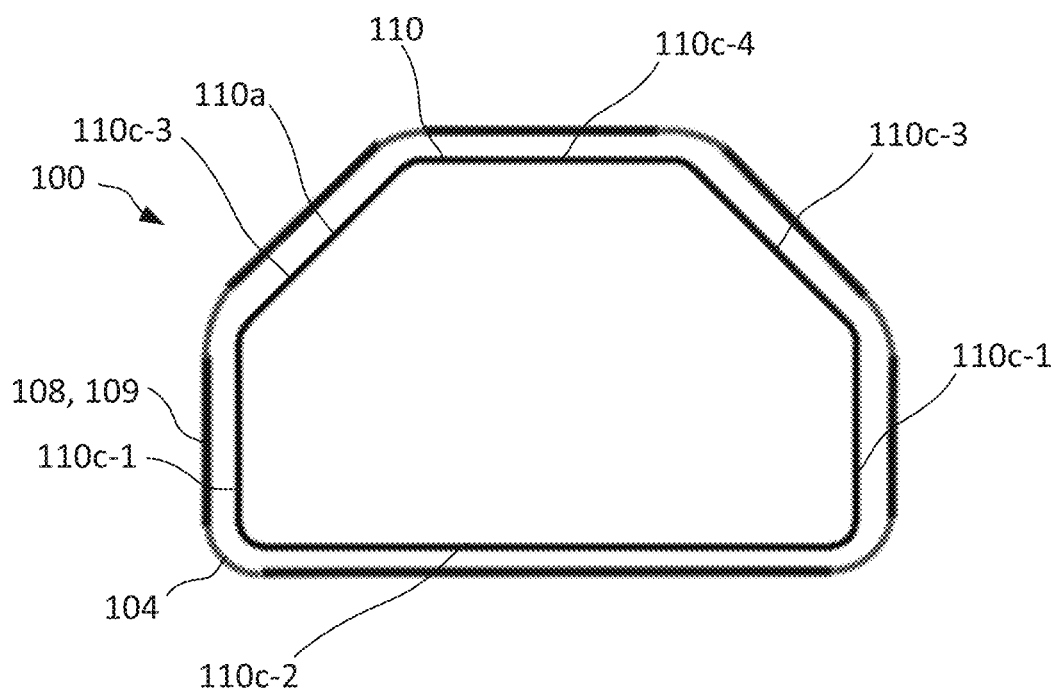
FIG. 94 is a schematic top view of a seal member and support structure in which multiple different lengths of flat sides and reinforcement members are provided.

FIGS. 92 to 93 discloses filter cartridge examples and aspects usable with any of the filter cartridges disclosed herein, wherein the seal member 110 has at least one flat side that is longer than at least one other side. Such arrangements may be referred to as forming generally irregular polygonal shapes. In the particular example shown, the seal member 110 has eight flat sides in which seven of the flat sides 110c-1 have the same length and in which one of the flat sides 110c-2 has a length that is longer than that of the flat sides 110c-1. The reinforcement member 109 extending along the flat side 110c-2 is also longer in comparison to the remaining reinforcement members 109. With such an arrangement, single fold symmetry results in which the filter cartridge 100 can be received by the housing in only a single rotational orientation. Many other combinations are possible. For example, every other flat side 110c could have the same length while the remaining flat sides 110c are provided with a longer or shorter length such that half of the flat sides have one length and the other half have a second length that is different than the first length. Such an arrangement would provide for rotational symmetry on an order that is half the number of flat sides. In some example configurations, none of the sides have an equal length to any other side. FIG. 94 shows yet another example in which a six-sided arrangement is provided in which two flat sides 110c-1 have a first length, one flat side 110c-2 has a second length, two flat sides 110c-3 have a third length, and one flat side 110c-4 has a fourth length, wherein each of the first, second, third, and fourth lengths are different from each other. With the above-described arrangements, in which varying lengths are present, an advantage can result in ensuring that the filter cartridge 100 is oriented in a desired rotational position before being allowed to drop fully into place and into sealing engagement with the seal part 212 of the housing.

Figure 95:
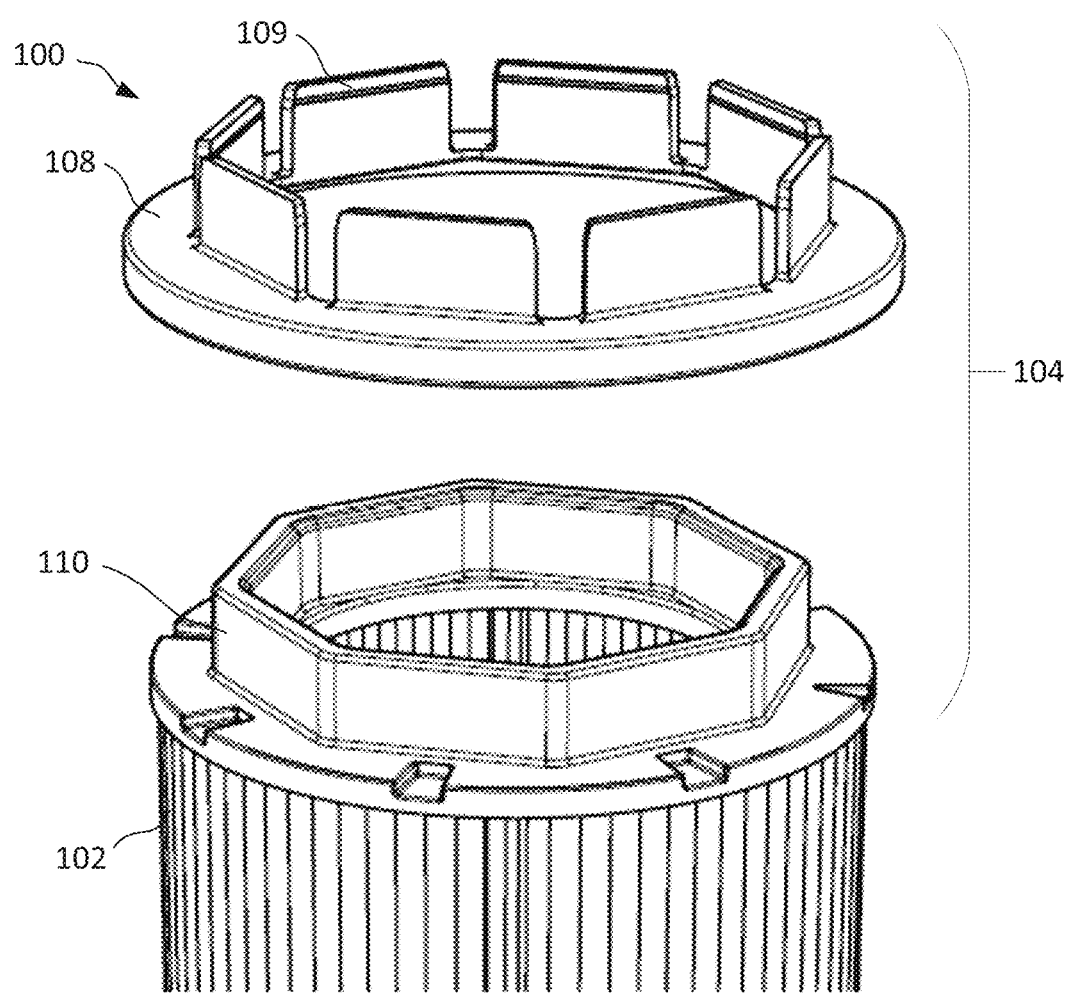
FIG. 95 is a perspective exploded view of an example end cap construction usable with any of the filter cartridges disclosed herein.

FIGS. 95 to 113 show further examples illustrating different construction and arrangement approaches that may be used with any of the filter cartridges disclosed herein. FIG. 95 shows an example end cap 104 for a filter cartridge 100 and illustrates that the seal member 110 may be molded directly onto the media pack 102. FIG. 95 further shows that the support structure 108 may be either overmolded onto the seal member 110 and media pack 102 or may be a separately formed component that is placed over the seal member 110. In the latter case, the support arrangement 108 can be secured to the seal member 110 via various means, such as with an adhesive. Alternatively, the support arrangement 108 can be attached with a friction or press fit onto the seal member 110 such that the support arrangement 108 could be re-used on another filter cartridge 100.

Figure 96:
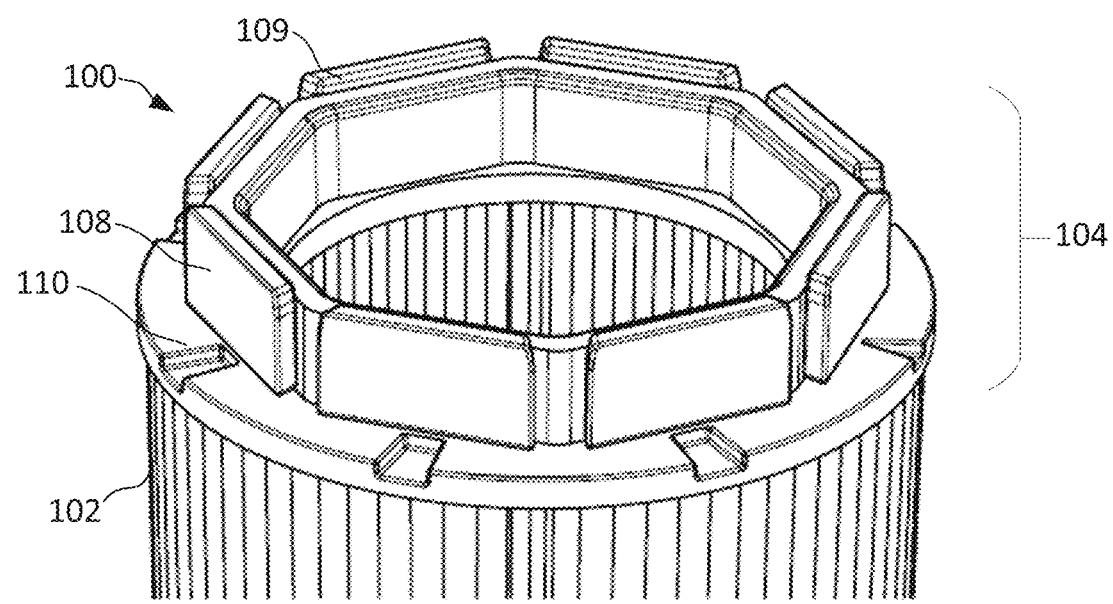
FIG. 96 is a perspective view of an example filter cartridge construction usable with any of the filter cartridges disclosed herein.
Figure 97:
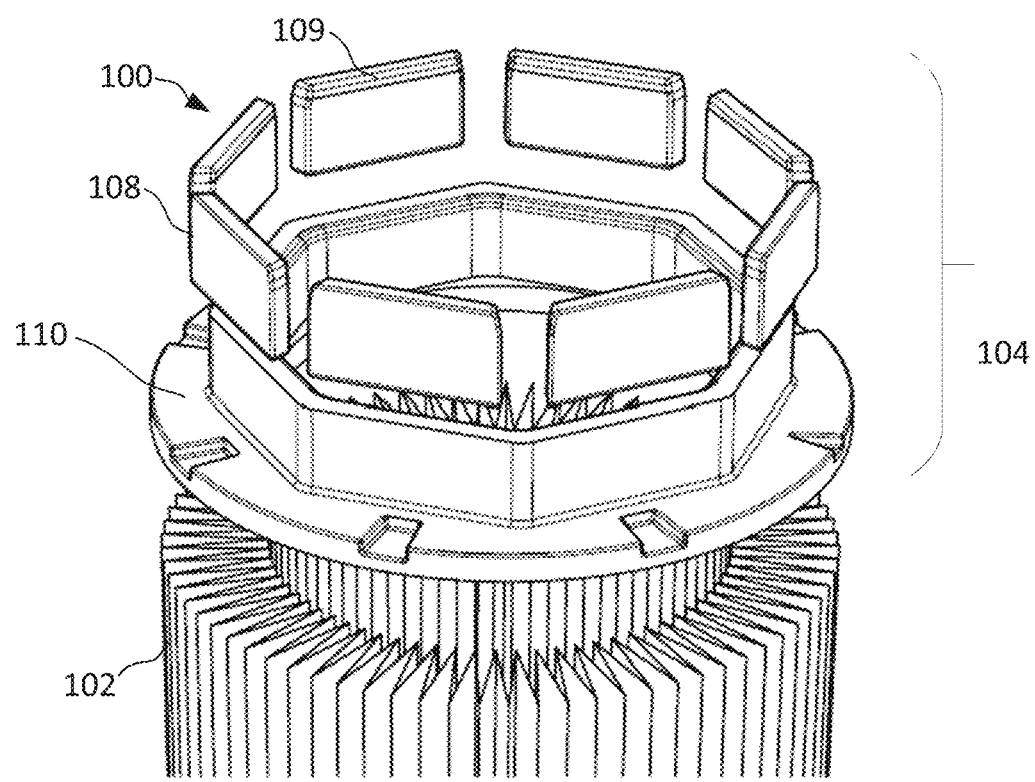
FIG. 97 is an exploded perspective exploded view the filter cartridge construction shown in FIG. 96.

FIGS. 96 and 97, similar to the example shown in FIG. 95, show an end cap 104 for a filter cartridge 100 in which the seal member 100 is molded directly onto the media pack 102. In contrast to the example of FIG. 95, the support structure 108 in FIGS. 96 and 97 is shown as being formed without a base part such that the support structure 108 is formed only by the reinforcement members 109. The reinforcement members 109 also have a length that is a majority of the length of the flat sides 110f. In such an arrangement, the reinforcement members can be either molded or otherwise formed and adhered onto the seal member 100.

Figure 98:
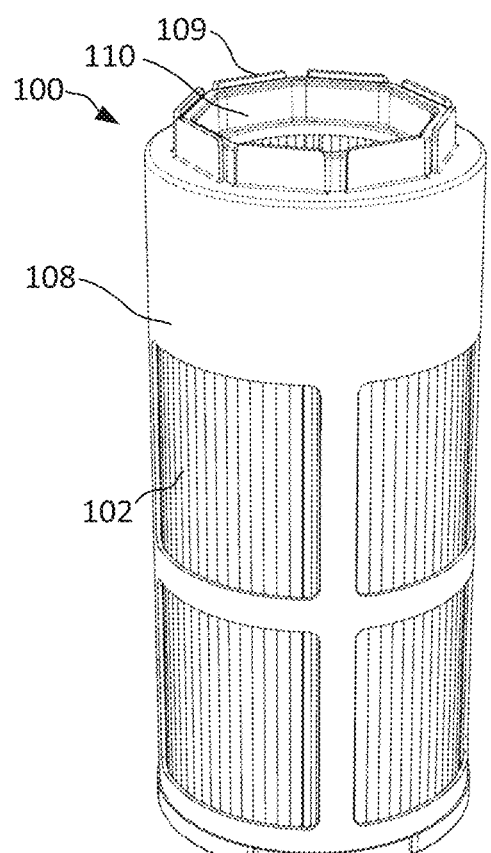
FIG. 98 is a perspective view of an example filter cartridge construction usable with any of the filter cartridges disclosed herein.
Figure 99:
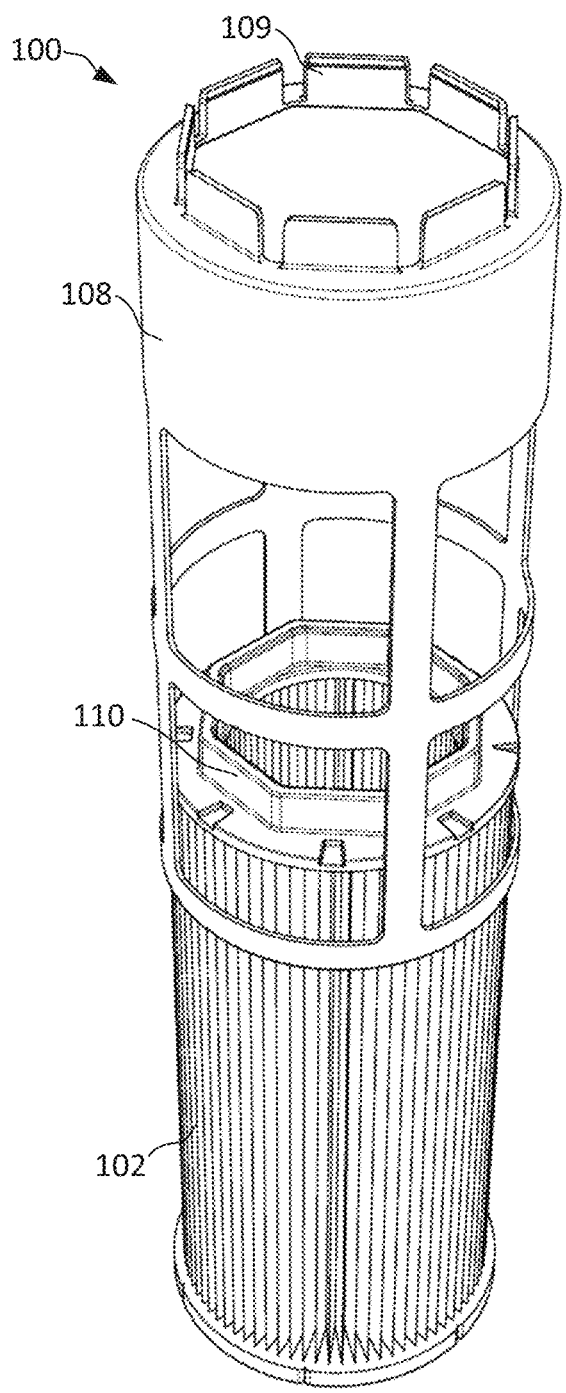
FIG. 99 is an exploded perspective exploded view the filter cartridge construction shown in FIG. 98.

FIGS. 98 and 99 also show a seal member 110 that is molded directly onto the media pack and having a separately formed reinforcement structure 108. However, in contrast to the examples shown at FIGS. 95 to 97, the support structure 108 in FIGS. 98 and 99 is configured as an apertured outer support tube that extends the length of the media pack 102, wherein the support tube has an end wall that supports the reinforcement member 109. The reinforcement structure 108 may be permanently secured to the media pack 102 and/or seal member 110 or may be removable and reusable. Although usable with any of the embodiments disclosed herein, it is specifically noted that a similar construction could be applied to the filter cartridge 100 depicted in FIGS. 8 to 10 such that the radially flexible reinforcement members 108b are formed as part of an outer support tube for the media pack 102.

Figure 100:
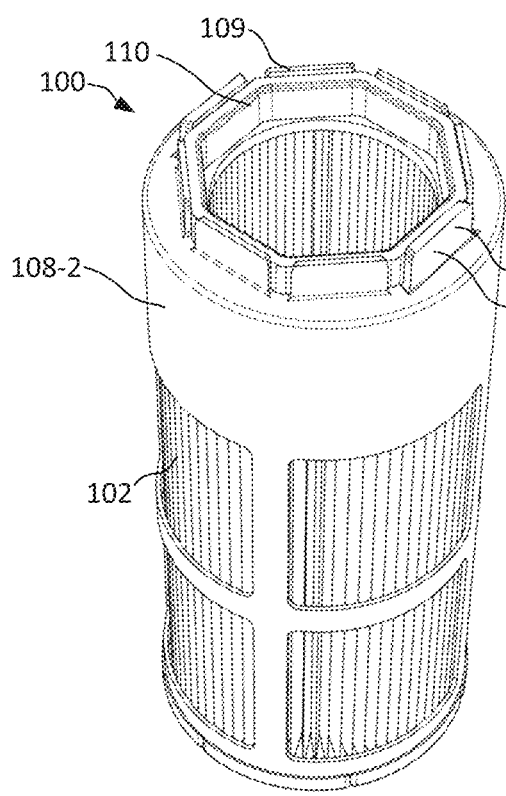
FIG. 100 is a perspective view of an example filter cartridge construction usable with any of the filter cartridges disclosed herein.
Figure 101:
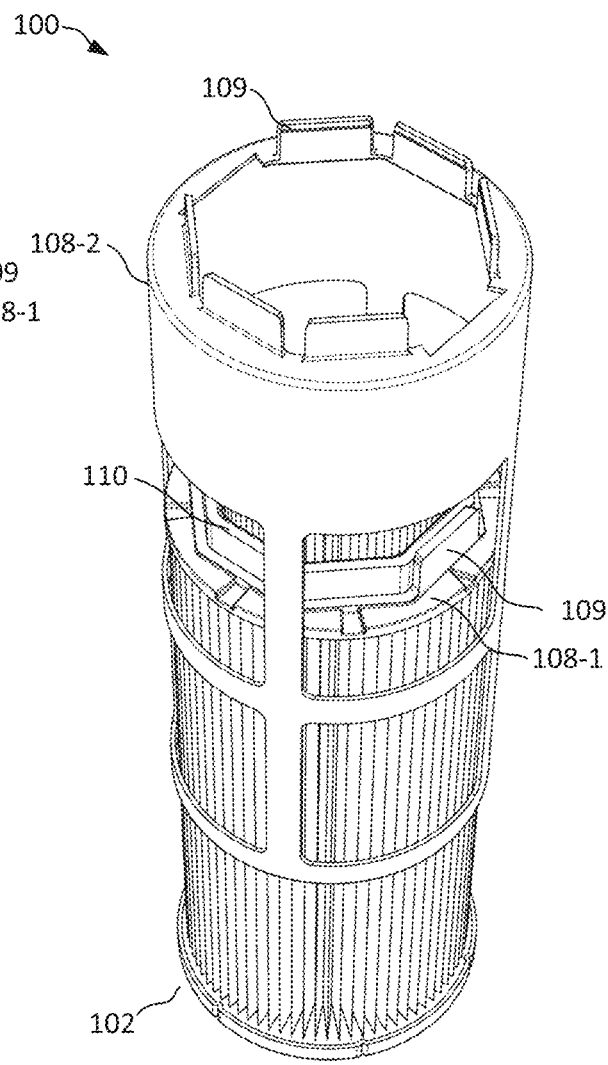
FIG. 101 is an exploded perspective exploded view the filter cartridge construction shown in FIG. 100.

FIGS. 100 and 101 present yet another construction alternative. In the example shown, the support structure 108 is provided in two separate part 108-1 and 108-2. Support structure part 108-1 is shown as being molded onto the media pack 102 and seal member 110 and forming two of the eight total reinforcement members 109. Support structure part 108-2 is shown as being generally similar to the support tube configuration shown in FIGS. 98 and 99 but with apertures for receiving the two reinforcement members 109 formed by the support structure part 108-1. Other combinations are possible in which the reinforcement members 109 are provided on the support structure parts 108-1 and 108-2 in different combinations. It is noted that FIGS. 100 and 101 show that reinforcement members 109 associated with the filter cartridge 100 have a larger size in comparison to those provided on the support structure 108. Accordingly, the resulting construction has only two orders of rotational symmetry. In some examples, all reinforcement members 109 are the same such that rotational symmetry equals the number of polygonal sides that are provided. In some examples, one of the reinforcement members 109 is different from the others such that single fold symmetry results.

Figure 102:
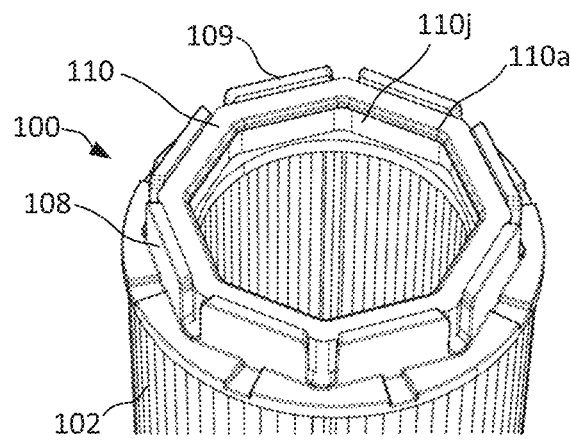
FIG. 102 is a perspective view of an example filter cartridge construction usable with any of the filter cartridges disclosed herein.
Figure 103:
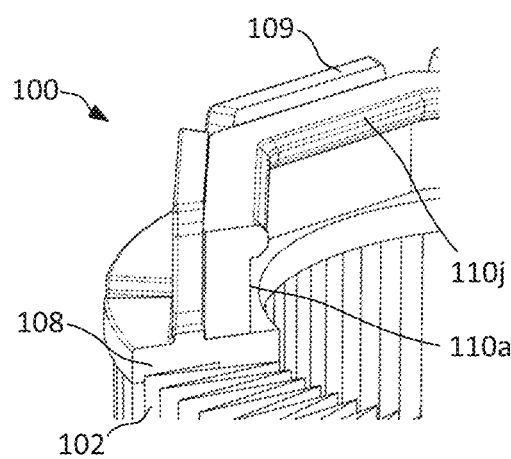
FIG. 103 is a cross-sectional perspective view of the filter cartridge construction shown in FIG. 102.
Figure 104:
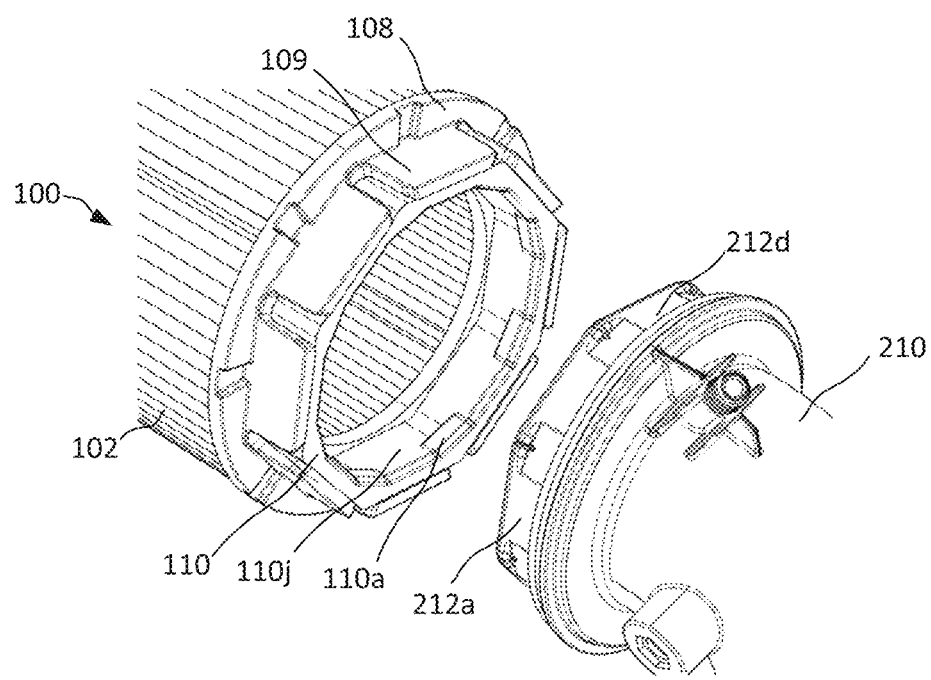
FIG. 104 is a perspective view of an example filter cartridge construction usable with any of the filter cartridges disclosed herein.
Figure 105:
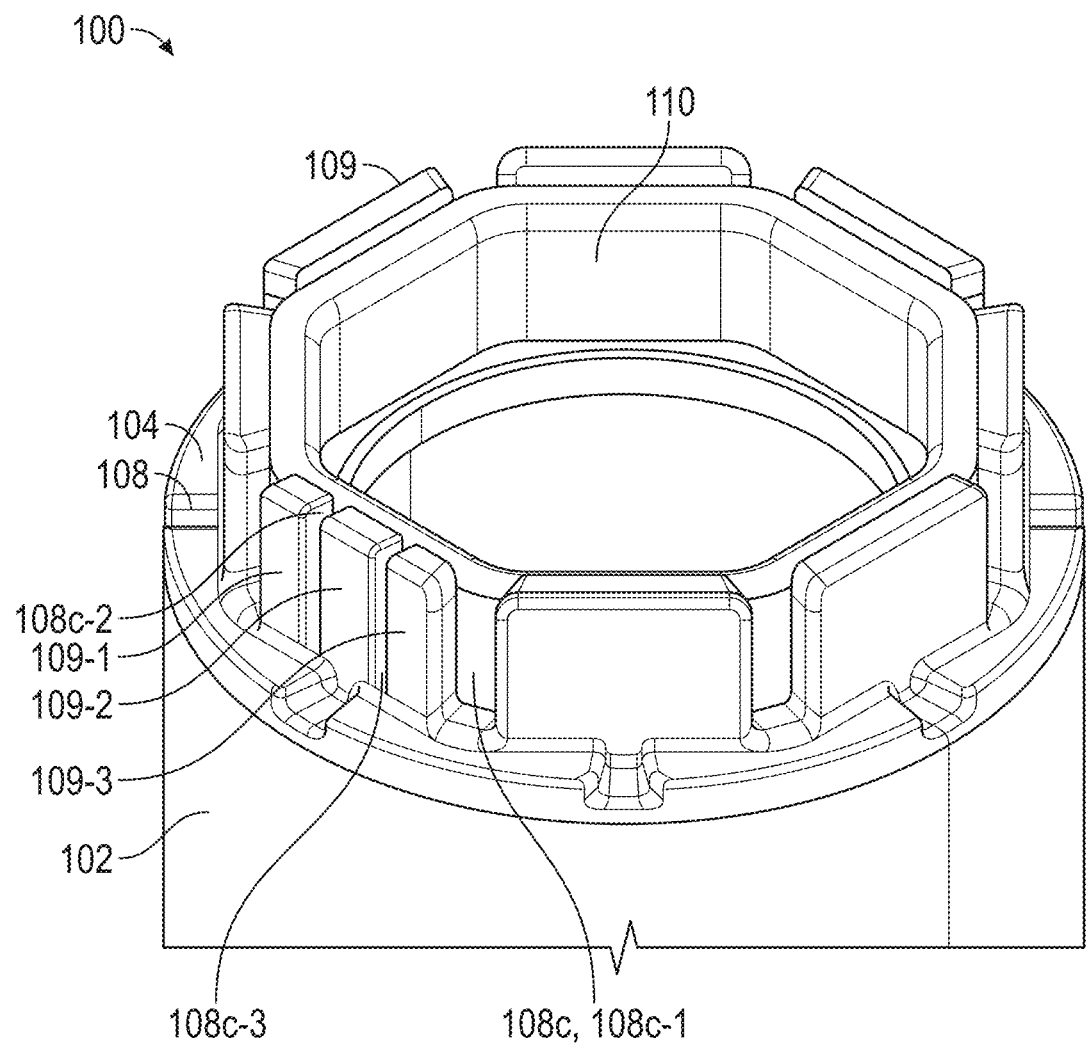
FIG. 105 is a perspective view of an example filter cartridge construction usable with any of the filter cartridges disclosed herein.

FIGS. 102 to 104 show embodiments in which the filter cartridge 100 is provided with an undercut or recessed portion 110j below the seal surface 110a for receiving a correspondingly shaped radial protrusion 212g formed by the outlet tube assembly 205. With such a construction, seal member 110 must initially expand around the radial protrusion 212g. After sufficient axial displacement of the filter cartridge 100, the seal surface 110a moves past the radial protrusion 212g and comes into sealing contact with seal surface 212a. To accommodate this compression, the reinforcement members 109 can be configured to deflect radially outward during the insertion process. In the example shown at FIGS. 102 and 103, the undercut portion 110j extends continuously while in the example shown at FIG. 104, the undercut portion 110j is provided at the locations of the corner portions as the radial protrusions on the outlet tube assembly 205 are provided at only those locations.

FIGS. 105 to 113 illustrate across several examples that the number of reinforcement members 109 and associated gaps 108c can be different than the number of flat sides 110c, 110f and corner portions 110d, 110g of the seal member 110. In the example shown at FIG. 105, one of the flat sides is supported by three separate, spaced apart reinforcement members 109-1, 109-2, 109-3 creating gaps 108c-2 and 108c-3 in addition to the already provided and described gaps 108c-1 at the corner portions. Accordingly, while all of the corner portions 110d, 110g are radially aligned with a gap 108c-1 between adjacent reinforcement members 109, not all gaps, such as 108c-2, 108c-3 are necessarily aligned with a corner portion 110d, 110g. In some examples, the gaps 108c-2 and/or 108c-3 can be configured to accept radial protrusions extending radially inwardly from the sidewall 214. When so configured, the additionally-provided gaps 108c-2, 108c-3 and corresponding housing protrusions can operate as a verification or safety feature such that only a filter cartridge 100 designed for use with the housing assembly 200 can be successfully installed into the housing as the housing protrusions would otherwise block the cartridge from being fully inserted into the housing assembly 200.

Figure 106:
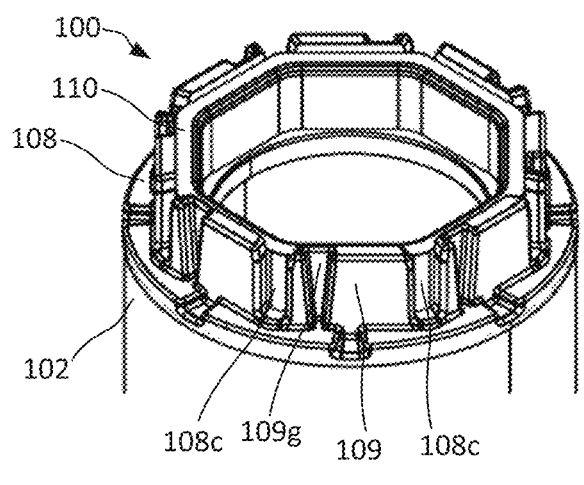
FIG. 106 is a perspective view of an example filter cartridge construction usable with any of the filter cartridges disclosed herein.
Figure 107:
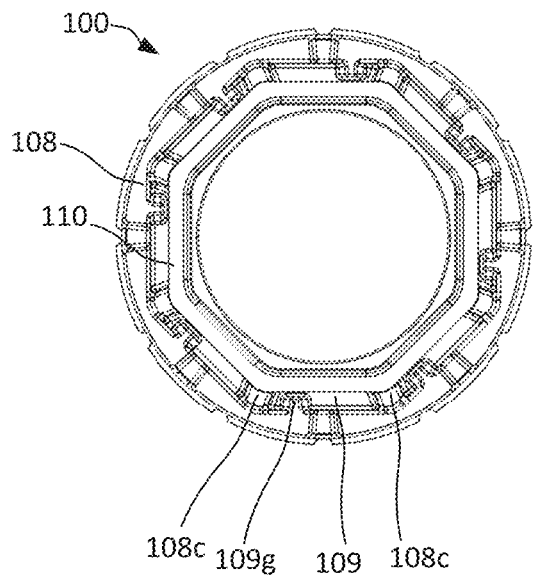
FIG. 107 is a top view of the filter cartridge construction shown in FIG. 106.
Figure 108:
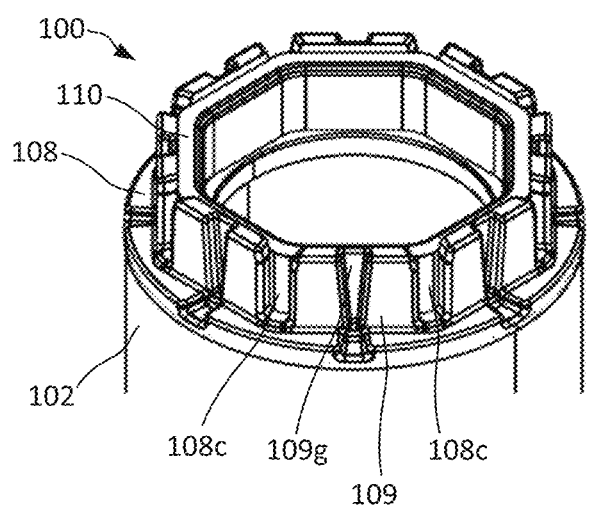
FIG. 108 is a perspective view of an example filter cartridge construction usable with any of the filter cartridges disclosed herein.
Figure 109:
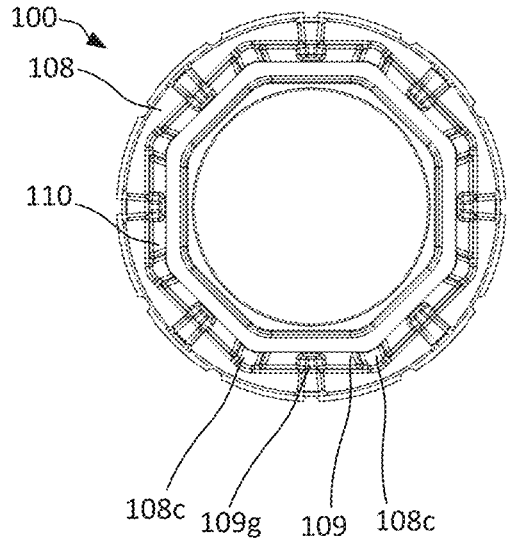
FIG. 109 is a top view of the filter cartridge construction shown in FIG. 108.

FIGS. 106 and 107 show a variation of such an approach but in which each of the reinforcement members 109 is provided with a partial thickness groove 109g for receiving a corresponding protrusion associated with the housing assembly 200. As shown, the grooves 109g are tapered or narrow from the distal end of the filter cartridge 100 in a direction towards the closed end cap 106 and are located on one side of the reinforcement members 109 such that the grooves 109g are proximate one of the gaps 108c. FIGS. 108 and 109 show a variation in which the grooves 109g are centered within the reinforcement members 109. In some examples, the grooves 109g can be the full thickness of the reinforcement members 109 such that each reinforcement member 109 is divided into two separate members. In some examples, the grooves have axial or straight sidewalls, rather than being tapered. However, it is noted that the wider initial opening provided by the tapered grooves 109g can help to serve as a lead-in surface during installation. In some examples, only some of the reinforcement members 109 are provided with a groove 109g. In some examples, more than one groove 109g can be provided for each reinforcement member 109. In some examples, the grooves 109g are provided at different locations on different reinforcement members 109. In some examples, not all reinforcement members 109 are provided with a groove 109g. However, it is noted that by providing a similarly shaped and located groove 109g on each reinforcement member 109, a particular rotational position of the filter cartridge 100 beyond what is already required by the shape of the polygonal seal surface is not required.

Figure 110:
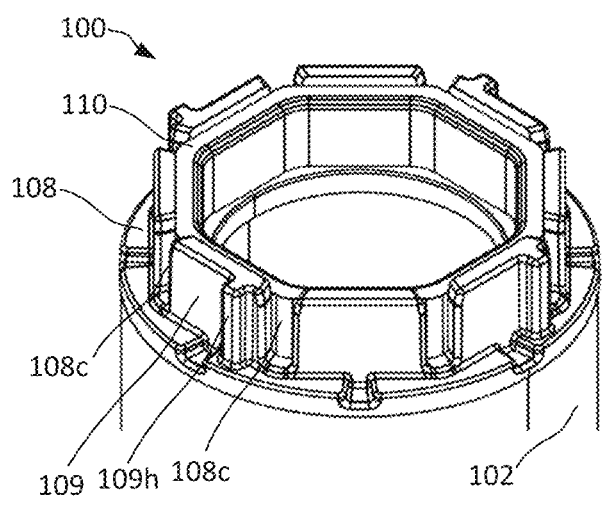
FIG. 110 is a perspective view of an example filter cartridge construction usable with any of the filter cartridges disclosed herein.
Figure 111:
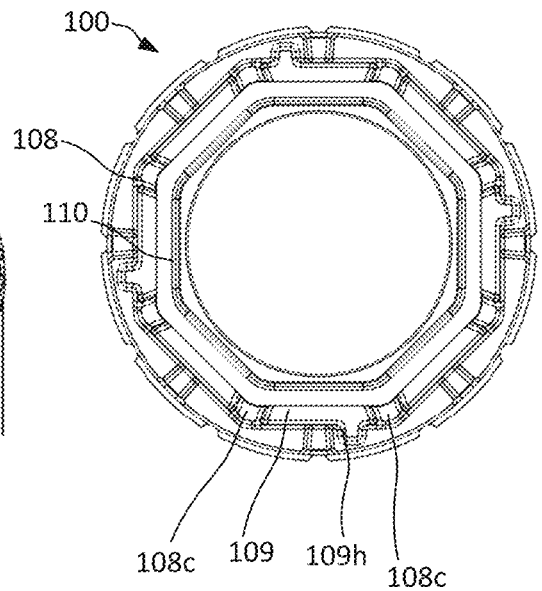
FIG. 111 is a top view of the filter cartridge construction shown in FIG. 110.
Figure 112:
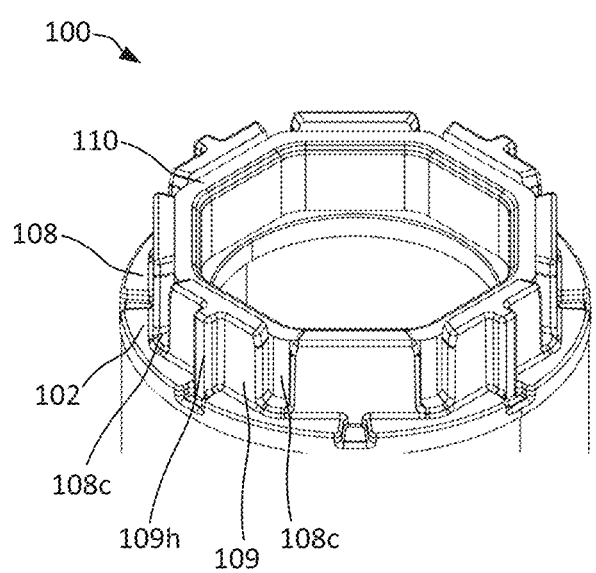
FIG. 112 is a perspective view of an example filter cartridge construction usable with any of the filter cartridges disclosed herein.
Figure 113:
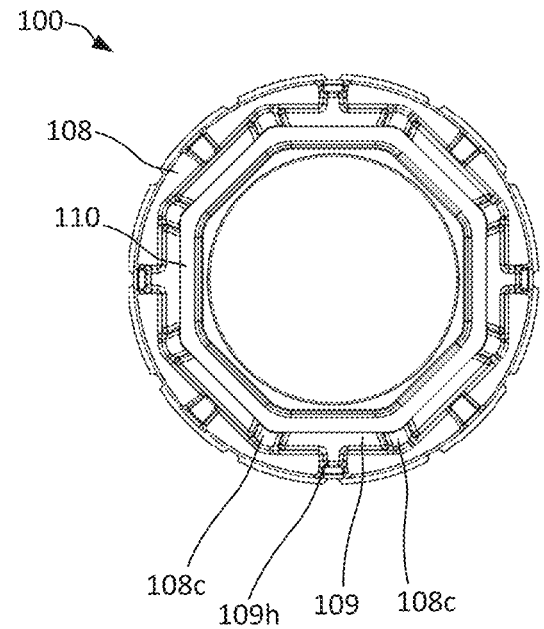
FIG. 113 is a top view of the filter cartridge construction shown in FIG. 112.

FIGS. 110 to 113 show additional examples similar to that shown in FIGS. 106 to 109, but in which radial protrusions 109h are provided instead of a groove 109g. With such a construction, the housing assembly 200 is configured with recesses or gaps to receive the radial protrusions 109h rather than being provided with protrusions. As shown at FIGS. 110 and 111, the radial protrusion 109h is provided at an offset location along the reinforcement member 109 such that each radial protrusion 109h is located proximate a gap 108c. FIGS. 112 and 113 show the radial protrusion 109h located in a centered location along the reinforcement member 109. It is noted that in the examples shown at FIGS. 110 to 113, the protrusions 109h are provided on every other reinforcement member rather than on every single reinforcement member 109. Accordingly, during installation, the filter cartridge 100 must be rotated into one of four acceptable radial positions rather than the eight that would be dictated by the octagonal shaped seal member 110 alone. It is noted that in some examples, one or more radial protrusions 109h and one or more grooves 109g may be provided for one or more reinforcement members 109. In such cases, the housing assembly 200 would also be provided with a combination of corresponding protrusions and recesses. In one aspect, the above-described grooves 109g and protrusions 109h may be more generically described as keying features, alignment features, and/or guide features.

Figure 114:
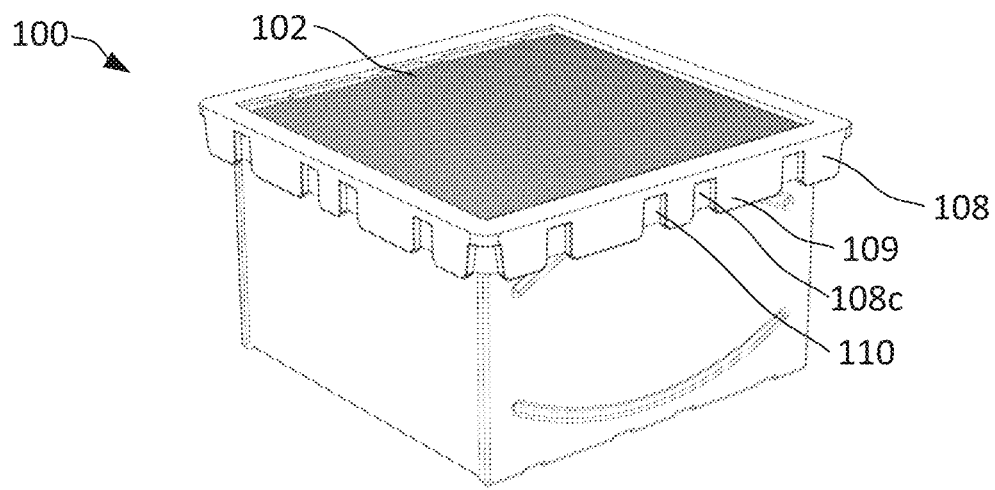
FIG. 114 is a perspective view of an example filter cartridge construction usable with any of the filter cartridges disclosed herein.
Figure 115:
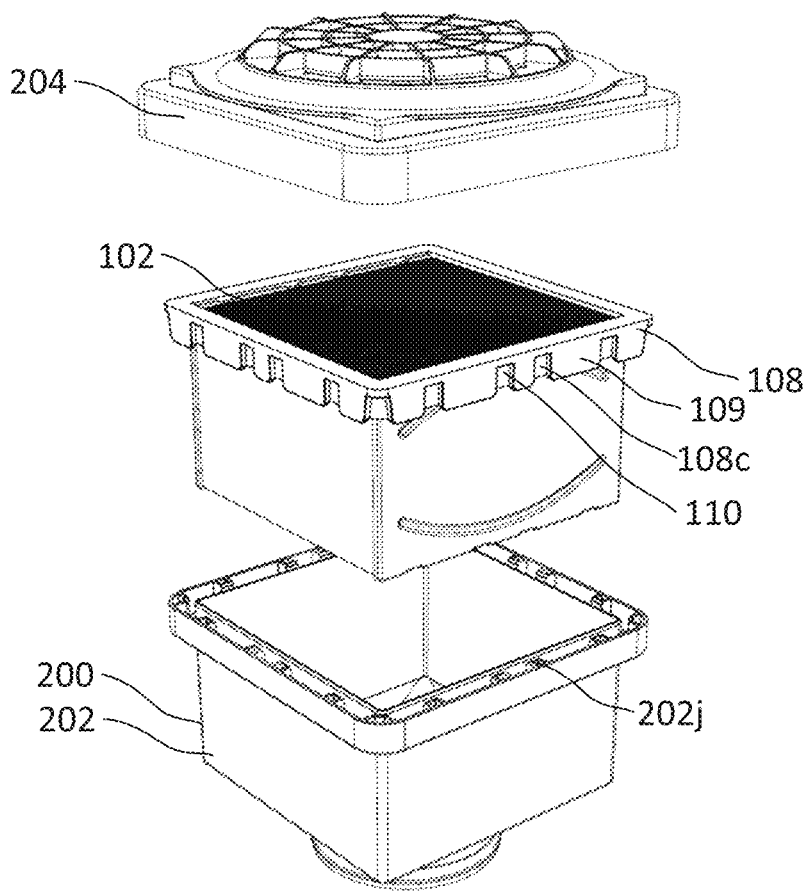
FIG. 115 is a perspective exploded view of an air cleaner assembly including the filter cartridge of FIG. 114.

FIGS. 114 to 115 show an additional illustrative example in which a filter cartridge 100 having a four-sided inwardly directed radial seal spaced from the media pack outer perimeter is provided. As shown, the seal member 110 is carried by a shell that forms the support structure 108 and reinforcement members 109, wherein the multiple spaced-apart reinforcement members 109 are provided along each side. In one aspect, the reinforcement members 109 have different lengths from each other such that the gaps 108c formed between them are provided at different distances from each other. As can be seen at FIG. 115, the housing assembly 200 is shown as including radially inward extending protrusions 202j which extend into the gaps 108c between the reinforcement members 108. Accordingly, and as explained above, only a filter cartridge 100 having a matching construction can be successfully installed into the housing body 202. In the example shown, the media 102 is fluted media.

Example Media Configurations, Generally

Any type of filter media can be used as the media pack 102, 152 for the above-disclosed filter cartridges 100, 150 as further described herein with relation to FIGS. 118-140. Further, the media type for filter cartridge 100 may be the same type or a different type of media than that for an associated filter cartridge 150 that may also be present in the air cleaner housing. For example, the filter cartridge 100 may have pleated or fluted type media while another filter cartridge 150 may be provided with fluted or pleated type media, respectively.

The media can be of a variety of types and configurations, and can be made from using a variety of materials. For example, pleated media arrangements can be used in cartridges according to the principles of the present disclosure, as discussed below.

The principles are particularly well adapted for use in situations in which the media is quite deep in extension between the inlet and outlet ends of the cartridge, but alternatives are possible. Also, the principles are often used in cartridges having relatively large cross-dimension sizes. With such arrangements, alternate media types to pleated media will often be desired.

In this section, examples of some media arrangements that are usable with the techniques described herein are provided. It will be understood, however, that a variety of alternate media types can be used. The choice of media type is generally one of preference for: availability, function in a given situation of application, ease of manufacturability, etc., and the choice is not necessarily specifically related to the overall function of selected ones of various filter cartridge/air cleaner interaction features characterized herein.

a. Media Pack Arrangements Using Filter Media Having Media Ridges (Flutes) Secured to Facing Media Fluted filter media (media having media ridges) can be used to provide fluid filter constructions in a variety of manners. One well known manner is characterized herein as a z-filter construction. The term "z-filter construction" as used herein, is meant to include (but not be limited) a type of filter construction in which individual ones of corrugated, folded or otherwise formed filter flutes are used to define (typically in combination with facing media) sets of longitudinal, typically parallel, inlet and outlet filter flutes for fluid flow through the media. Some examples of z-filter media are provided in U.S. Pat. Nos. 5,820,646; 5,772,883; 5,902,364; 5,792,247; 5,895,574; 6,210,469; 6,190,432; 6,350,291; 6,179,890; 6,235,195; Des. 399,944; Des. 428, 128; Des. 396,098; Des. 398,046; and Des. 437,401; each of these cited references being incorporated herein by reference.

One type of z-filter media, utilizes two specific media components joined together, to form the media construction. The two components are: (1) a fluted (typically corrugated) media sheet or sheet section, and (2) a facing media sheet or sheet section. The facing media sheet is typically non-corrugated, however it can be corrugated, for example perpendicularly to the flute direction as described in PCT Publication WO 2005/077487, incorporated herein by reference.

The fluted media section and facing media section can comprise separate materials between one another. However, they can also be sections of the single media sheet folded to bring the facing media material into appropriate juxtaposition with the fluted media portion of the media. For example, a single continuous sheet of media formed with alternating fluted and flat sections along the length of the media can be folded upon itself in zig-zag fashion to form a fluted media configuration.

The fluted (typically corrugated) media sheet and the facing media sheet or sheet section together, are typically used to define media having parallel flutes. In some instances, the fluted sheet and facing sheet are separate and then secured together and are then coiled, as a media strip, to form a z-filter media construction. Such arrangements are described, for example, in U.S. Pat. Nos. 6,235,195 and 6,179,890, each of which is incorporated herein by reference. In certain other arrangements, some non-coiled sections or strips of fluted (typically corrugated) media secured to facing media, are stacked with one another, to create a filter construction. An example of this is described in FIG. 11 of U.S. Pat. No. 5,820,646, incorporated herein by reference.

Herein, strips of material comprising fluted sheet (sheet of media with ridges) secured to corrugated sheet, which are then assembled into stacks to form media packs, are sometimes referred to as "single facer strips," "single faced strips," or as "single facer" or "single faced" media. The terms and variants thereof, are meant to refer to a fact that one face, i.e., a single face, of the fluted (typically corrugated) sheet is faced by the facing sheet, in each strip.

Typically, coiling of a strip of the fluted sheet/facing sheet (i.e., single facer) combination around itself, to create a coiled media pack, is conducted with the facing sheet directed outwardly. Some techniques for coiling are described in PCT Publication WO 2004/082795, which is incorporated herein by reference. The resulting coiled arrangement generally has, as the outer surface of the media pack, a portion of the facing sheet, as a result.

The term "corrugated" used herein to refer to structure in media, is often used to refer to a flute structure resulting from passing the media between two corrugation rollers, i.e., into a nip or bite between two rollers, each of which has surface features appropriate to cause corrugations in the resulting media. he term "corrugation" is however, not meant to be limited to such flutes, unless it is stated that they result from flutes that are by techniques involving passage of media into a bite between corrugation rollers. The term "corrugated" is meant to apply even if the media is further modified or deformed after corrugation, for example by the folding techniques described in PCT Publication WO 2004/007054 incorporated herein by reference.

Corrugated media is a specific form of fluted media. Fluted media is media which has individual flutes or ridges (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements or cartridges generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner. In some instances, each of the inlet flow end (or face) and outlet flow end (or face) will be generally flat or planar, with the two parallel to one another. However, variations from this, for example non-planar faces, are possible.

A straight through flow configuration (especially for a coiled or stacked media pack) is, for example, in contrast to serviceable filter cartridges such as cylindrical pleated filter cartridges of the type shown in U.S. Pat. No. 6,039,778, incorporated herein by reference, in which the flow generally makes a substantial turn as its passes into and out of the media. That is, in a U.S. Pat. No. 6,039,778 filter, the flow enters the cylindrical filter cartridge through a cylindrical side, and then turns to exit through an open end of the media (in forward-flow systems). In a typical reverse-flow system, the flow enters the serviceable cylindrical cartridge through an open end of the media and then turns to exit through a side of the cylindrical filter media. An example of such a reverse-flow system is shown in U.S. Pat. No. 5,613,992, incorporated by reference herein.

The term "z-filter media construction" and variants thereof as used herein, without more, is meant to include, but not necessarily be limited to, any or all of: a web of corrugated or otherwise fluted media (media having media ridges) secured adjacent to (facing) media, whether the sheets are separate or part of a single web, with appropriate sealing (closure) to allow for definition of inlet and outlet flutes; and/or a media pack constructed or formed from such media into a three dimensional network of inlet and outlet flutes; and/or, a filter cartridge or construction including such a media pack.

Figure 118:
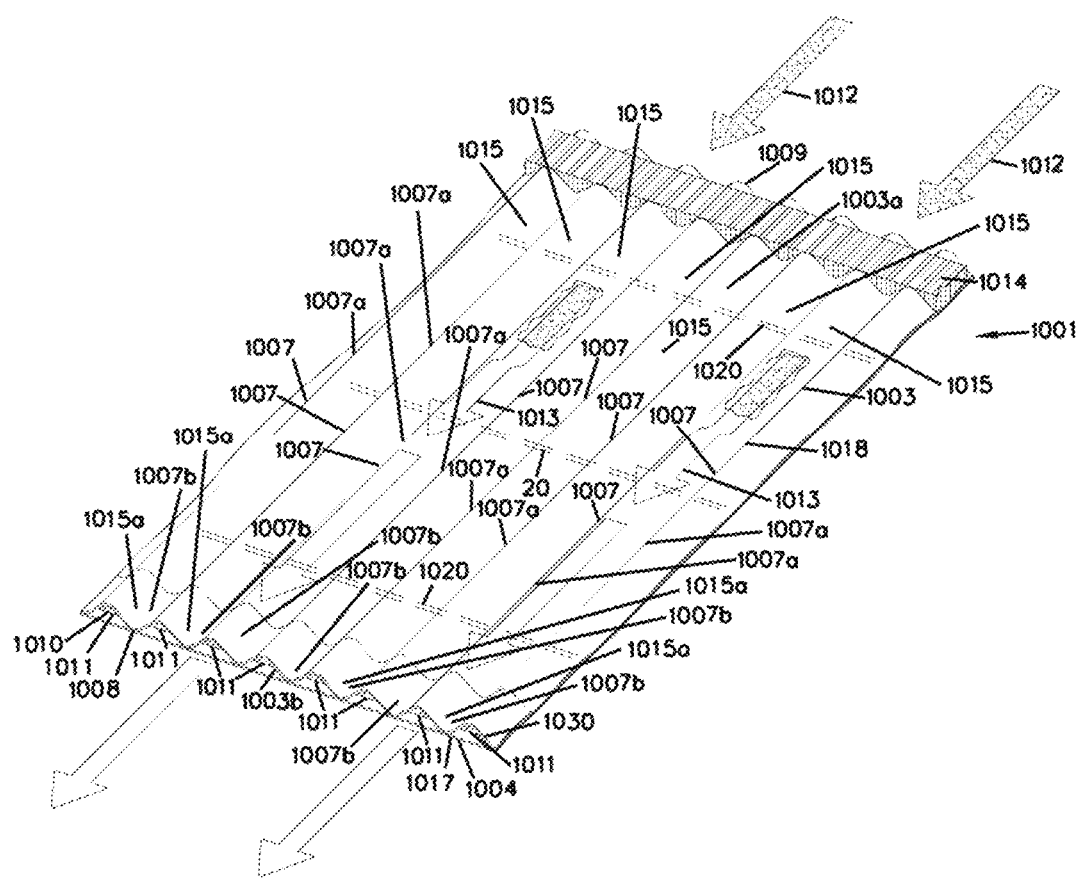
FIG. 118 is a fragmentary, schematic, perspective view of a first example media type usable in arrangements according to the present disclosure.

In FIG. 118, an example of media 1001 usable in z-filter media construction is shown. The media 1001 is formed from a fluted, in this instance corrugated, sheet 1003 and a facing sheet 1004. A construction such as media 1001 is referred to herein as a single facer or single faced strip.

Sometimes, the corrugated fluted or ridged sheet 1003, shown in FIG. 118, is of a type generally characterized herein as having a regular, curved, wave pattern of flutes, ridges, or corrugations 1007. The term "wave pattern" in this context, is meant to refer to a flute, ridge or corrugated pattern of alternating troughs 1007b and ridges 1007a. The term "regular" in this context is meant to refer to the fact that the pairs of troughs and ridges (1007b, 1007a) alternate with generally the same repeating corrugation (flute or ridge) shape and size. (Also, typically in a regular configuration each trough 1007b is substantially an inverse ridge for each ridge 1007a.) The term "regular" is thus meant to indicate that the corrugation (or flute) pattern comprises troughs (inverted ridges) and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 1003 is flexible. With respect to the characterization of a repeating pattern, it is not meant that in any given filter construction, an equal number of ridges and troughs is necessarily present. The media 1001 could be terminated, for example, between a pair comprising a ridge and a trough, or partially along a pair comprising a ridge and a trough. (For example, in FIG. 118, the media 1001 depicted in fragmentary has eight complete ridges 1007a and seven complete troughs 1007b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, in certain instances the corrugation pattern is not the result of a folded or creased shape provided to the media, but rather the apex of each ridge 1007a and the bottom of each trough 1007b is formed along a radiused curve. A typical radius for such z-filter media would be at least 0.25 mm and typically would be not more than 3 mm.

An additional characteristic of the particular regular, curved, wave pattern depicted in FIG. 118, for the corrugated sheet 1003, is that at approximately a midpoint region 1030 between each trough and each adjacent ridge, along most of the length of the flutes 1007, is located a transition region where the curvature inverts. For example, viewing a back side or face 1003a, in FIG. 118, trough 1007b is a concave region, and ridge 1007a is a convex region. Of course, when viewed toward front side or face 1003b, trough 1007b of side 1003a forms a ridge; and ridge 1007a of face 1003*a*, forms a trough. (In some instances, region 1030 can be a straight segment, instead of a point, with curvature inverting at ends of the region 1030.)

A characteristic of the particular regular, wave pattern fluted (in this instance corrugated) sheet 1003 shown in FIG. 118, is that the individual corrugations, ridges or flutes are generally straight, although alternatives are possible. By "straight" in this context, it is meant that through at least 70%, typically at least 80% of the length, the ridges 1007*a* and troughs (or inverted ridges) 1007*b* do not change substantially in cross-section. The term "straight" in reference to corrugation pattern shown in FIG. 118, in part distinguishes the pattern from the tapered flutes of corrugated media described in FIG. 1 of PCT Publication WO 97/40918 and PCT Publication 2003/47722, each of which is incorporated herein by reference. The tapered flutes of FIG. 1 of WO 97/40918, for example, would be a curved wave pattern, but not a "regular" pattern, or a pattern of straight flutes, as the terms are used herein.

Referring to FIG. 118 and as referenced above, the media 1001 has first and second opposite edges 1008 and 1009. When the media 1001 is formed into a media pack, in general edge 1009 will form an inlet end or face for the media pack and edge 1008 will form an outlet end or face, although an opposite orientation is possible.

In the example depicted, the various flutes 1007 extend completely between the opposite edges 1008, 1009, but alternatives are possible. For example, they can extend to a location adjacent or near the edges, but not completely therethrough. Also, they can be stopped and started partway through the media, as for example in the media of U.S. Publication 2014/0208705, incorporated herein by reference.

When the media is as depicted in FIG. 118, adjacent edge 1008 can provided a sealant bead 1010, sealing the corrugated sheet 3 and the facing sheet 1004 together. Bead 1010 will sometimes be referred to as a "single facer" or "single face" bead, or by variants, since it is a bead between the corrugated sheet 1003 and facing sheet 1004, which forms the single facer (single faced) media strip 1001. Sealant bead 1010 seals closed individual flutes 1011 adjacent edge 1008, to passage of air therefrom (or thereto in an opposite flow).

In the media depicted in FIG. 118, adjacent edge 1009 is provided seal bead 1014. Seal bead 1014 generally closes flutes 1015 to passage of unfiltered fluid therefrom (or flow therein in an opposite flow), adjacent edge 1009. Bead 1014 would typically be applied as media 1001 is configured into a media pack. If the media pack is made from a stack of strips 1001, bead 1014 will form a seal between a backside 1017 of facing sheet 1004, and side 1018 of the next adjacent corrugated sheet 1003. When the media 1001 is cut in strips and stacked, instead of coiled, bead 1014 is referenced as a "stacking bead." (When bead 1014 is used in a coiled arrangement formed from a long strip of media 1001, it may be referenced as a "winding bead.").

In alternate types of through-flow media, seal material can be located differently, and added sealant or adhesive can even be avoided. For example, in some instances, the media can be folded to form an end or edge seam, or the media can be sealed closed by alternate techniques such as ultrasound application, etc. Further, even when sealant material is used, it need not be adjacent opposite ends.

Referring to FIG. 118, once the filter media 1001 is incorporated into a media pack, for example by stacking or coiling, it can be operated as follows. First, air in the direction of arrows 1012, would enter open flutes 1011 adjacent end 1009. Due to the closure at end 1008, by bead 1010, the air would pass through the filter media 1001, for example as shown by arrows 1013. It could then exit the media or media pack, by passage through open ends 1015*a* of the flutes 1015, adjacent end 1008 of the media pack. Of course, operation could be conducted with air flow in the opposite direction.

For the particular arrangement shown herein in FIG. 118, the parallel corrugations 1007*a*, 1007*b* are generally straight completely across the media, from edge 1008 to edge 1009. Straight flutes, ridges or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation shapes are known. For example, in Yamada et al., U.S. Pat. No. 5,562,825, corrugation patterns which utilize somewhat semicircular (in cross section) inlet flutes adjacent narrow V-shaped (with curved sides) exit flutes are shown (see FIGS. 1 and 3, of Yamada '825). In Matsumoto, et al., U.S. Pat. No. 5,049, 326, circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S., 4,925,561, (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918, flutes which have curved wave patterns, but with different sized ridges and troughs, are shown. Yamada '825, Matsumoto '326, Ishii '561, and WO 97/40918 are incorporated herein by reference. Also, flutes, which are modified in shape to include various ridges, are known.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

Typically, in the corrugation process, an inelastic deformation is caused to the media. This prevents the media from returning to its original shape. However, once the tension is released, the flute or corrugations will tend to spring back, recovering only a portion of the stretch and bending that has occurred. The facing media sheet is sometimes tacked to the fluted media sheet, to inhibit this spring back in the corrugated sheet. Such tacking is shown at 1020.

Also, typically, the media contains a resin. During the corrugation process, the media can be heated to above the glass transition point of the resin. When the resin then cools, it will help to maintain the fluted shapes.

The media of the corrugated (fluted) sheet 1003, facing sheet 1004, or both, can be provided with a fine fiber material on one or both sides thereof, for example in accordance with U.S. Pat. No. 6,673,136, incorporated herein by reference. In some instances, when such fine fiber material is used, it may be desirable to provide the fine fiber on the upstream side of the material and inside the flutes. When this occurs, air flow, during filtering, will typically be into the edge comprising the stacking bead.

Figure 119:
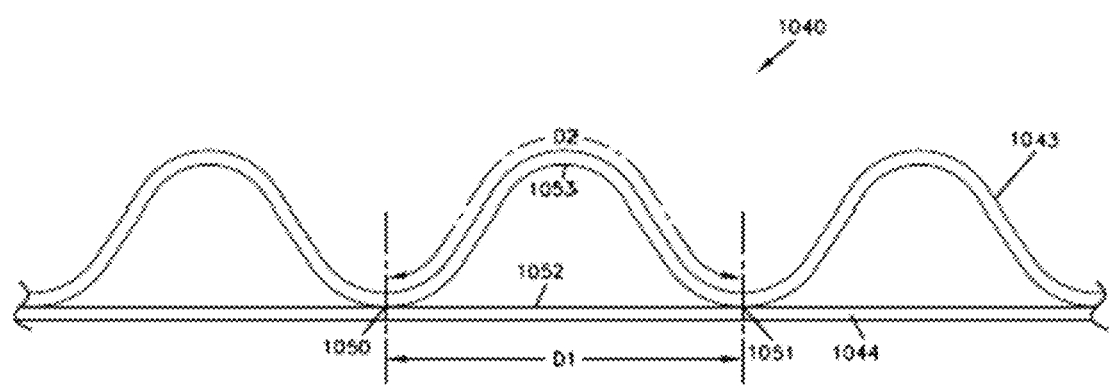
FIG. 119 is an enlarged, schematic, cross-sectional view of a portion of the media type depicted in FIG. 118.

An issue with respect to z-filter constructions relates to closing of the individual flute ends. Although alternatives are possible, typically a sealant or adhesive is provided, to accomplish the closure. As is apparent from the discussion above, in typical z-filter media especially that which uses straight flutes as opposed to tapered flutes and sealant for flute seals, large sealant surface areas (and volume) at both the upstream end and the downstream end are needed. High quality seals at these locations are important to proper operation of the media structure that results. The high sealant volume and area, creates issues with respect to this. Attention is now directed to FIG. 119, in which z-filter media; i.e., a z-filter media construction 1040, utilizing a regular, curved, wave pattern corrugated sheet 1043, and a non-corrugated flat sheet 1044, i.e., a single facer strip is schematically depicted. A distance D1, between points 1050 and 1051, defines the extension of flat sheet 1044 in region 1052 underneath a given corrugated flute 1053. A length or distance D2 of the arcuate media for the corrugated flute 1053, over the same distance D1 is of course larger than D1, due to the shape of the corrugated flute 1053. For a typical regular-shaped media used in fluted filter applications, the linear length D2 of the media 1053 between points 1050 and 1051 will often be at least 1.2 times D1. Typically, D2 would be within a range of 1.2 to 2.0 times D1, inclusive. One particularly convenient arrangement for air filters has a configuration in which D2 is about 1.25 to 1.35 times D1. Such media has, for example, been used commercially in Donaldson Powercore™ Z-filter arrangements. Another potentially convenient size would be one in which D2 is about 1.4 to 1.6 times D1. Herein the ratio D2/D1 will sometimes be characterized as the flute/flat ratio or media draw for the corrugated media.

Figure 120:
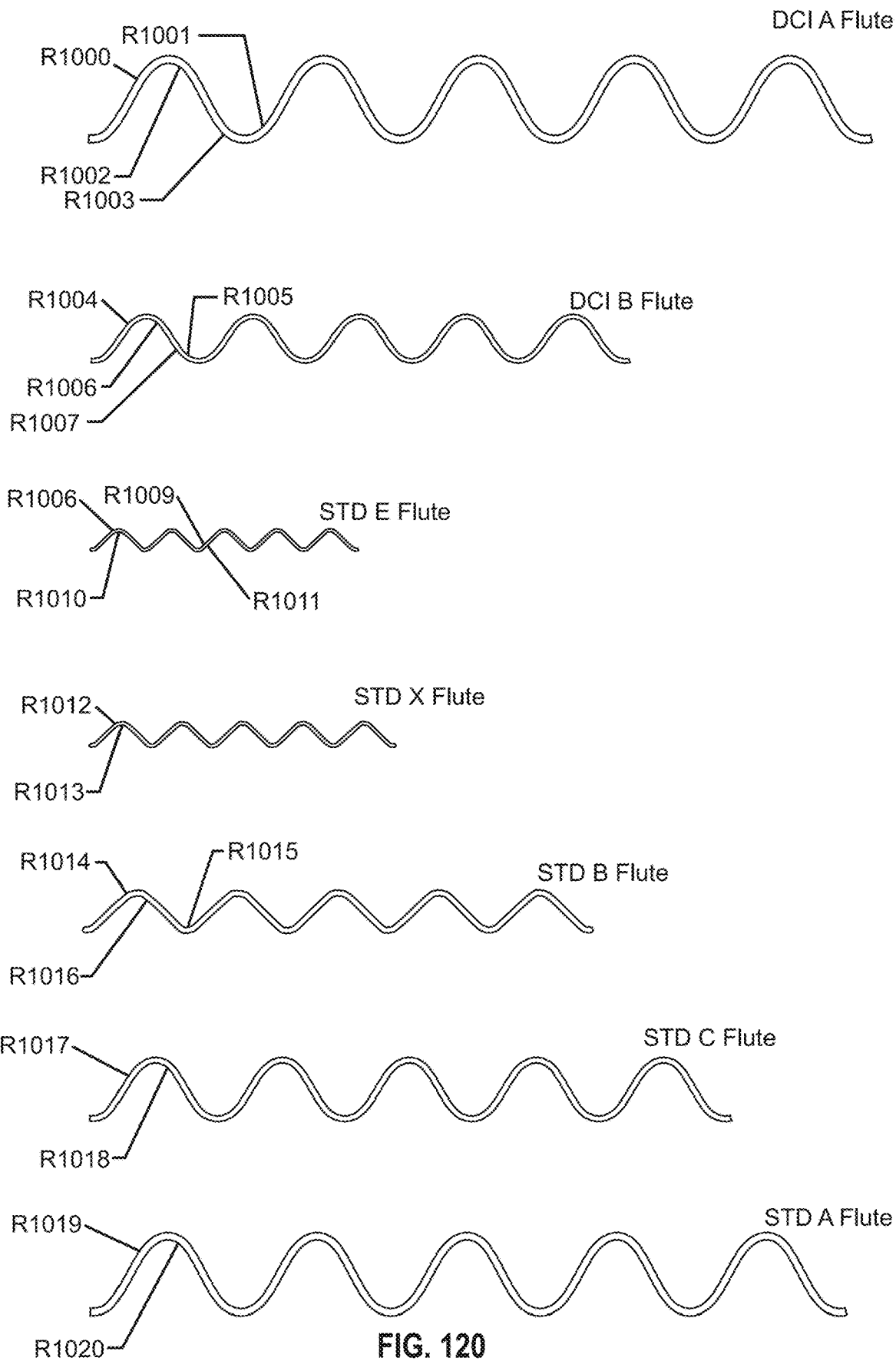
FIG. 120 includes schematic views of examples of various fluted media definitions, for media of the type of FIGS. 118 and 119.

In the corrugated cardboard industry, various standard flutes have been defined. For example, the standard E flute, standard X flute, standard B flute, standard C flute and standard A flute. FIG. 120 in combination with Table A below provides definitions of these flutes.

Donaldson Company, Inc., (DCI) the assignee of the present disclosure, has used variations of the standard A and standard B flutes, in a variety of z-filter arrangements.

TABLE A (Flute definitions for FIG. 120)

DCI A Flute: Flute/flat = 1.52:1; The Radii (R) are as follows:
R1000 = .0675 inch (1.715 mm); R1001 = .0581 inch (1.476 mm);
R1002 = .0575 inch (1.461 mm); R1003 = .0681 inch (1.730 mm);
DCI B Flute: Flute/flat = 1.32:1; The Radii (R) are as follows:
R1004 = .0600 inch (1.524 mm); R1005 = .0520 inch (1.321 mm);
R1006 = .0500 inch (1.270 mm); R1007 = .0620 inch (1.575 mm);
Std. E Flute: Flute/flat = 1.24:1; The Radii (R) are as follows:
R1008 = .0200 inch (.508 mm); R1009 = .0300 inch (.762 mm);
R1010 = .0100 inch (.254 mm); R1011 = .0400 inch (1.016 mm);
Std. X Flute: Flute/flat = 1.29:1; The Radii (R) are as follows:
R1012 = .0250 inch (.635 mm); R1013 = .0150 inch (.381 mm);
Std. B Flute: Flute/flat = 1.29:1; The Radii (R) are as follows:
R1014 = .0410 inch (1.041 mm); R1015 = .0310 inch (.7874 mm);
R1016 = .0310 inch (.7874 mm);
Std. C Flute: Flute/flat = 1.46:1; The Radii (R) are as follows:
R1017 = .0720 inch (1.829 mm); R1018 = .0620 inch (1.575 mm);
Std. A Flute: Flute/flat = 1.53:1; The Radii (R) are as follows:
R1019 = .0720 inch (1.829 mm); R1020 = .0620 inch (1.575 mm).

Of course, other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

It is noted that alternative flute definitions such as those characterized in U.S. Publication 2009/0127211; U.S. Publication 2008/0282890; and/or U.S. Publication 2010/0032365 can be used, with air cleaner features as characterized herein below. The complete disclosures of each of U.S. 2009/0127211, U.S. 2008/0282890, and U.S. 2010/0032365 are incorporated herein by reference.

Another media variation comprising fluted media with facing media secured thereto, can be used in arrangements according to the present disclosure, in either a stacked or coiled form, is described in U.S. Publication 2014/0208705, owned by Baldwin Filters, Inc. and incorporated herein by reference.

B. Manufacture of Media Pack Configurations Including the Media of FIGS. 118-120, see FIGS. 121-124

Figure 121:
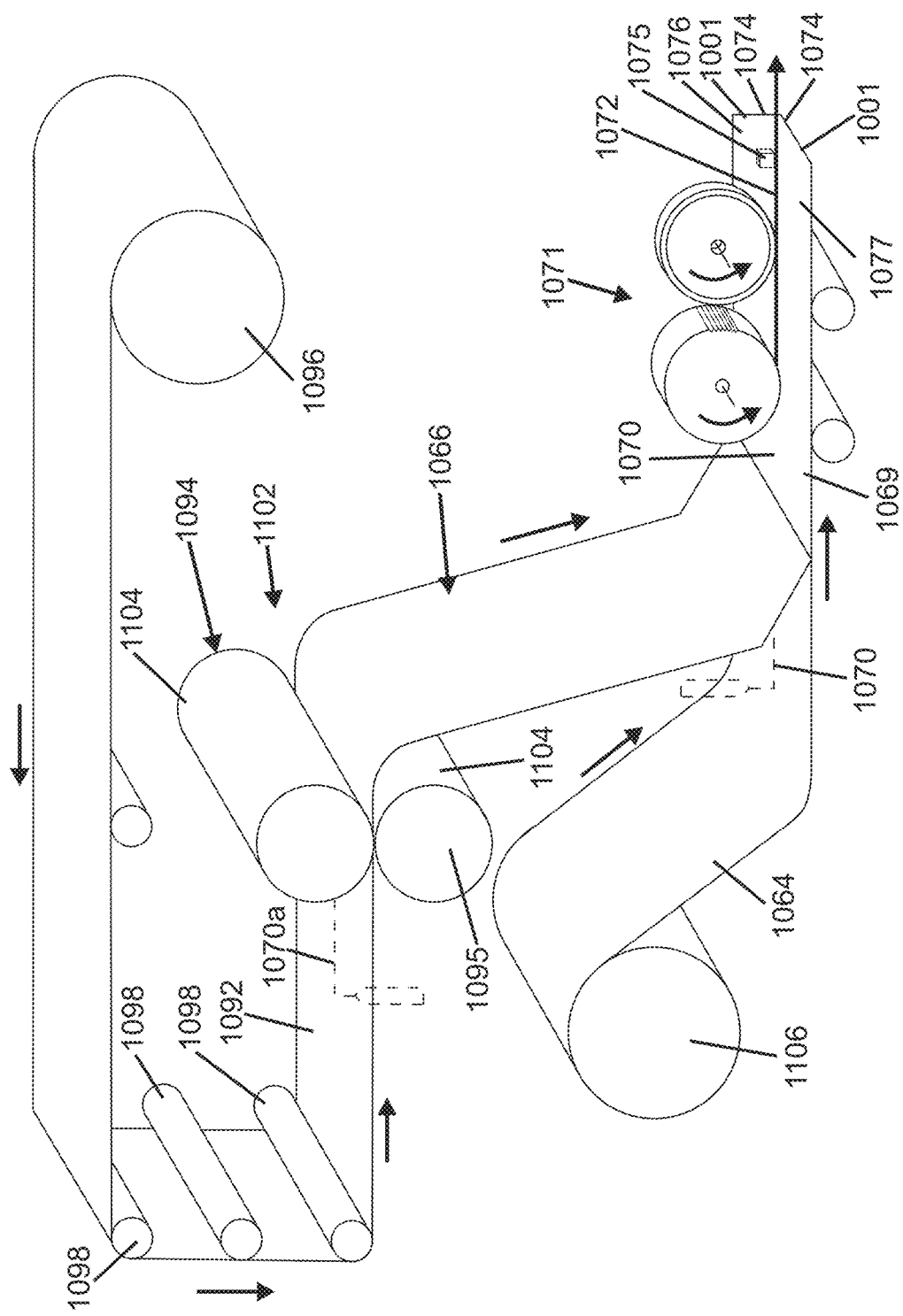
FIG. 121 is a schematic view of an example process for manufacturing media of the type of FIGS. 118-120.

In FIG. 121, one example of a manufacturing process for making a media strip (single facer) corresponding to strip 1001 of FIG. 118 is shown. In general, a facing sheet 1064 and a fluted (corrugated) sheet 1066 having flutes 1068 are brought together to form a media web 1069, with an adhesive bead located therebetween at 1070. The adhesive bead 1070 will form a single facer bead 1010, see FIG. 118. An optional darting process occurs at station 1071 to form center darted section 1072 located mid-web. The z-filter media or Z-media strip 1074 can be cut or slit at 1075 along the bead 1070 to create two pieces or strips 1076, 1077 of z-filter media 1074, each of which has an edge with a strip of sealant (single facer bead) extending between the corrugating and facing sheet. Of course, if the optional darting process is used, the edge with a strip of sealant (single facer bead) would also have a set of flutes darted at this location.

Techniques for conducting a process as characterized with respect to FIG. 121 are described in PCT Publication WO 2004/007054, incorporated herein by reference.

Still in reference to FIG. 121, before the z-filter media 1074 is put through the darting station 1071 and eventually slit at 1075, it must be formed. In the schematic shown in FIG. 121, this is done by passing a sheet of filter media 1092 through a pair of corrugation rollers 1094, 1095. In the schematic shown in FIG. 121, the sheet of filter media 1092 is unrolled from a roll 1096, wound around tension rollers 1098, and then passed through a nip or bite 1102 between the corrugation rollers 1094, 1095. The corrugation rollers 1094, 1095 have teeth 1104 that will give the general desired shape of the corrugations after the flat sheet 1092 passes through the nip 1102. After passing through the nip 1102, the sheet 1092 becomes corrugated across the machine direction and is referenced at 1066 as the corrugated sheet. The corrugated sheet 1066 is then secured to facing sheet 1064. (The corrugation process may involve heating the media, in some instances.)

Still in reference to FIG. 121, the process also shows the facing sheet 1064 being routed to the darting process station 1071. The facing sheet 1064 is depicted as being stored on a roll 1106 and then directed to the corrugated sheet 1066 to form the Z-media 1074. The corrugated sheet 1066 and the facing sheet 1064 would typically be secured together by adhesive or by other means (for example, by sonic welding).

Referring to FIG. 121, an adhesive line 1070 is shown used to secure corrugated sheet 1066 and facing sheet 1064 together, as the sealant bead. Alternatively, the sealant bead for forming the facing bead could be applied as shown as 1070a. If the sealant is applied at 1070a, it may be desirable to put a gap in the corrugation roller 1095, and possibly in both corrugation rollers 1094, 1095, to accommodate the bead 1070a.

Of course, the equipment of FIG. 121 can be modified to provide for the tack beads 1020 of FIG. 118, if desired.

The type of corrugation provided to the corrugated media is a matter of choice, and will be dictated by the corrugation or corrugation teeth of the corrugation rollers 1094, 1095. One useful corrugation pattern will be a regular curved wave pattern corrugation, of straight flutes or ridges, as defined herein above. A typical regular curved wave pattern used, would be one in which the distance D2, as defined above, in a corrugated pattern is at least 1.2 times the distance D1 as defined above. In example applications, typically D2=1.25 to 1.35 times D1, although alternatives are possible. In some instances, the techniques may be applied with curved wave patterns that are not "regular," including, for example, ones that do not use straight flutes. Also, variations from the curved wave patterns shown, are possible.

Figure 122:
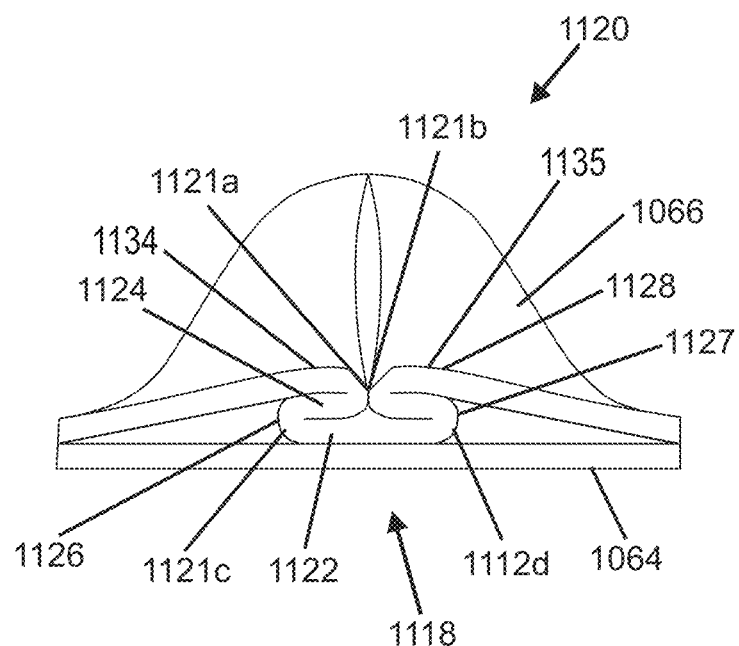
FIG. 122 is a schematic cross-sectional view of an optional end dart for media flutes of the type of FIGS. 118-121.

As described, the process shown in FIG. 121 can be used to create the center darted section 1072. FIG. 122 shows, in cross-section, one of the flutes 1068 after darting and slitting.

A fold arrangement 1118 can be seen to form a darted flute 1120 with four creases 1121a, 1121b, 1121c, 1121d. The fold arrangement 1118 includes a flat first layer or portion 1122 that is secured to the facing sheet 1064. A second layer or portion 1124 is shown pressed against the first layer or portion 1122. The second layer or portion 1124 is preferably formed from folding opposite outer ends 1126, 1127 of the first layer or portion 1122.

Still referring to FIG. 122, two of the folds or creases 1121a, 1121b will generally be referred to herein as "upper, inwardly directed" folds or creases. The term "upper" in this context is meant to indicate that the creases lie on an upper portion of the entire fold 1120, when the fold 1120 is viewed in the orientation of FIG. 122. The term "inwardly directed" is meant to refer to the fact that the fold line or crease line of each crease 1121a, 1121b, is directed toward the other.

In FIG. 122, creases 1121c, 1121d, will generally be referred to herein as "lower, outwardly directed" creases. The term "lower" in this context refers to the fact that the creases 1121c, 1121d are not located on the top as are creases 1121a, 1121b, in the orientation of FIG. 122. The term "outwardly directed" is meant to indicate that the fold lines of the creases 1121c, 1121d are directed away from one another.

The terms "upper" and "lower" as used in this context are meant specifically to refer to the fold 1120, when viewed from the orientation of FIG. 122. That is, they are not meant to be otherwise indicative of direction when the fold 1120 is oriented in an actual product for use.

Based upon these characterizations and review of FIG. 122, it can be seen that a regular fold arrangement 1118 according to FIG. 122 in this disclosure is one which includes at least two "upper, inwardly directed, creases." These inwardly directed creases are unique and help provide an overall arrangement in which the folding does not cause a significant encroachment on adjacent flutes.

A third layer or portion 1128 can also be seen pressed against the second layer or portion 1124. The third layer or portion 1128 is formed by folding from opposite inner ends 1134, 1135 of the third layer 1128.

Another way of viewing the fold arrangement 1118 is in reference to the geometry of alternating ridges and troughs of the corrugated sheet 1066. The first layer or portion 1122 is formed from an inverted ridge. The second layer or portion 1124 corresponds to a double peak (after inverting the ridge) that is folded toward, and in preferred arrangements, folded against the inverted ridge.

Techniques for providing the optional dart described in connection with FIG. 122, in a preferred manner, are described in PCT Publication WO 2004/007054, incorporated herein by reference. Techniques for coiling the media, with application of the winding bead, are described in PCT Publication WO 2004/082795, and incorporated herein by reference.

Alternate approaches to darting the fluted ends closed are possible. Such approaches can involve, for example: darting which is not centered in each flute; and rolling, pressing or folding over the various flutes. In general, darting involves folding or otherwise manipulating media adjacent to fluted end, to accomplish a compressed, closed, state.

Techniques described herein are particularly well adapted for use in media packs that result from a step of coiling a single sheet comprising a corrugated sheet/facing sheet combination, i.e., a "single facer" strip. However, they can also be made into stacked arrangements.

Coiled media or media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media or media pack. Typical shapes are circular as described in PCT Publication WO 2004/007054. Other usable shapes are obround, some examples of obround being oval shape. In general, oval shapes have opposite curved ends attached by a pair of opposite sides. In some oval shapes, the opposite sides are also curved. In other oval shapes, sometimes called racetrack shapes, the opposite sides are generally straight. Racetrack shapes are described, for example, in PCT Publications WO 2004/007054 and WO 2004/082795, each of which is incorporated herein by reference.

Another way of describing the peripheral or perimeter shape is by defining the perimeter resulting from taking a cross-section through the media pack in a direction orthogonal to the winding access of the coil.

Opposite flow ends or flow faces of the media or media pack can be provided with a variety of different definitions. In many arrangements, the ends or end faces are generally flat (planer) and perpendicular to one another. In other arrangements, one or both of the end faces include tapered, for example, stepped, portions which can either be defined to project axially outwardly from an axial end of the side wall of the media pack; or, to project axially inwardly from an end of the side wall of the media pack.

The flute seals (for example from the single facer bead, winding bead or stacking bead) can be formed from a variety of materials. In various ones of the cited and incorporated references, hot melt or polyurethane seals are described as possible for various applications.

Figure 123:
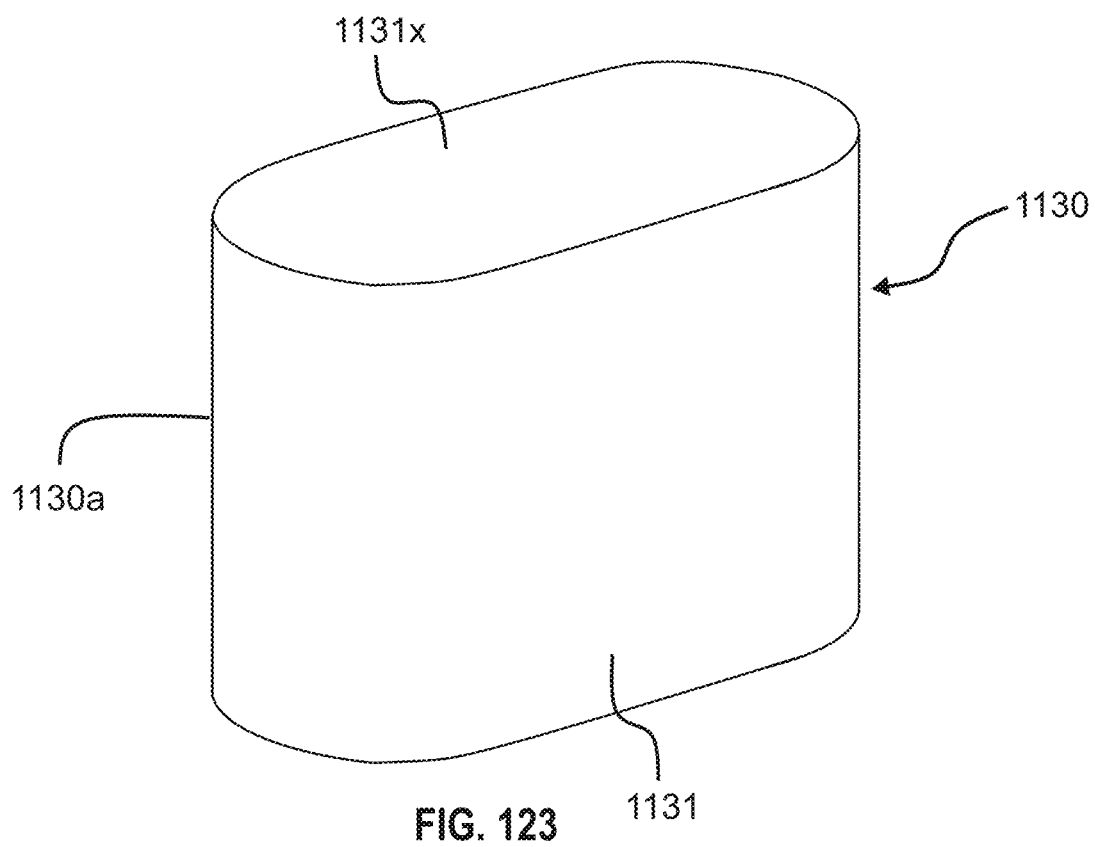
FIG. 123 is a schematic perspective view of a coiled filter arrangement usable in a filter cartridge having features in accordance with the present disclosure, and made with a strip of media, for example, in accordance with FIG. 118.

In FIG. 123, a coiled media pack (or coiled media) 1130 constructed by coiling a single strip of single faced media is depicted, generally. The particular coiled media pack depicted is an oval media pack 1130a, specifically a racetrack shaped media pack 1131. The tail end of the media, at the outside of the media pack 1130 is shown at 1131x. It will be typical to terminate that tail end along straight section of the media pack 1130 for convenience and sealing. Typically, a hot melt seal bead or seal bead is positioned along that tail end to ensure sealing. In the media pack 130, the opposite flow (end) faces are designated at 1132, 1133. One would be an inlet flow end or face, the other an outlet flow end or face.

Figure 124:
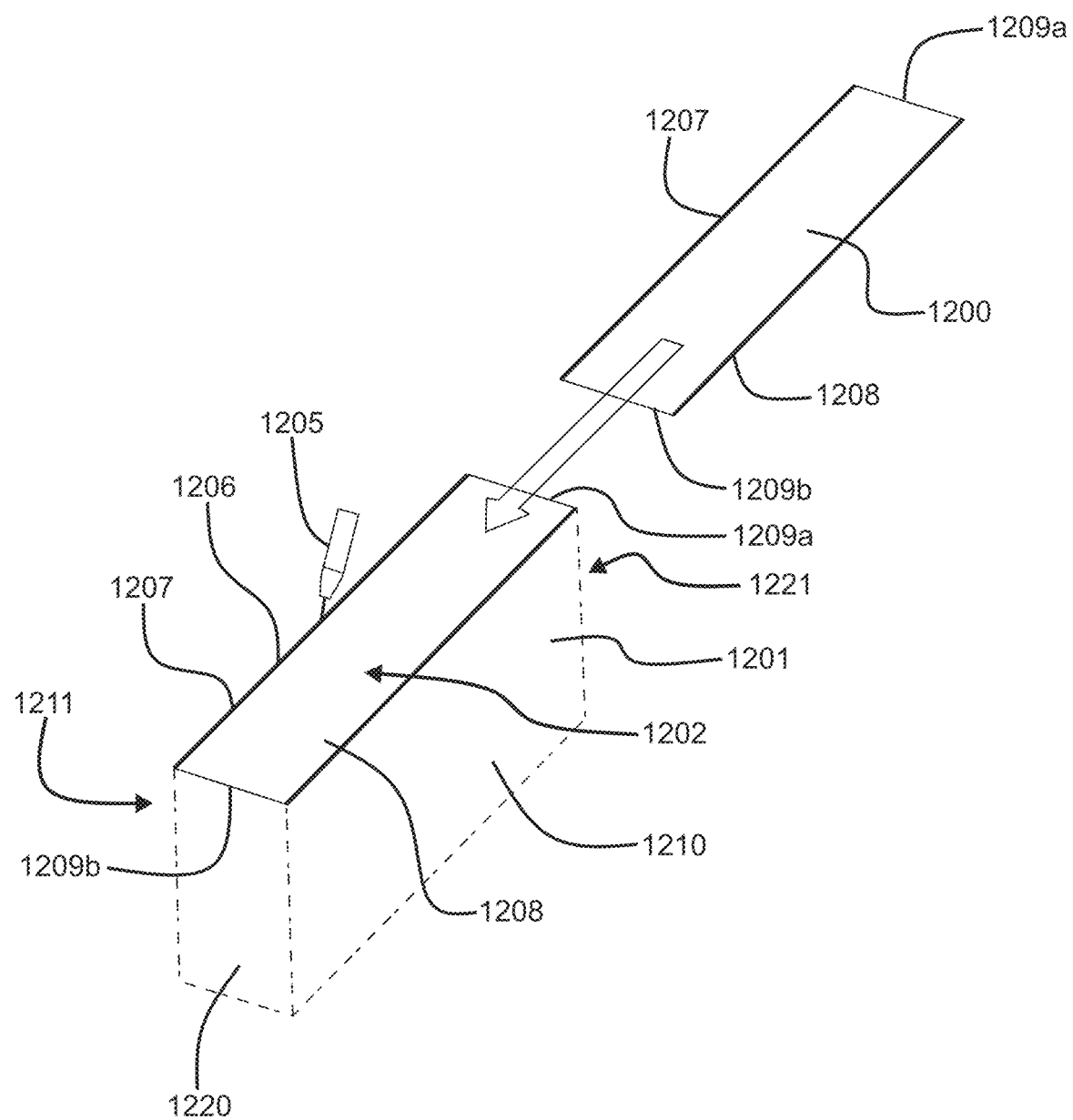
FIG. 124 is a schematic perspective view of a stacked media pack arrangement usable in a filter arrangement having selected features in accordance with the present disclosure and made from a strip of media for example in accordance with FIG. 118.

In FIG. 124, there is (schematically) shown a step of forming stacked z-filter media (or media pack) from strips of z-filter media, each strip being a fluted sheet secured to a facing sheet. Referring to FIG. 124, single facer strip 1200 is being shown added to a stack 1201 of strips 1202 analogous to strip 1200. Strip 1200 can be cut from either of strips 1076, 1077, FIG. 121. At 1205 in FIG. 124, application of a stacking bead 1206 is shown, between each layer corresponding to a strip 1200, 1202 at an opposite edge from the single facer bead or seal. (Stacking can also be done with each layer being added to the bottom of the stack, as opposed to the top.)

Referring to FIG. 124, each strip 1200, 1202 has front and rear edges 1207, 1208 and opposite side edges 1209$a$, 1209$b$. Inlet and outlet flutes of the corrugated sheet/facing sheet combination comprising each strip 1200, 1202 generally extend between the front and rear edges 1207, 1208, and parallel to side edges 1209$a$, 1209$b$.

Still referring to FIG. 124, in the media or media pack 1201 being formed, opposite flow faces are indicated at 1210, 1211. The selection of which one of faces 1210, 1211 is the inlet end face and which is the outlet end face, during filtering, is a matter of choice. In some instances, the stacking bead 1206 is positioned adjacent the upstream or inlet face 1211; in others, the opposite is true. The flow faces 1210, 1211, extend between opposite side faces 1220, 1221.

The stacked media configuration or pack 1201 shown being formed in FIG. 124, is sometimes referred to herein as a "blocked" stacked media pack. The term "blocked" in this context, is an indication that the arrangement is formed to a rectangular block in which all faces are 90° relative to all adjoining wall faces. For example, in some instances, the stack can be created with each strip 1200 being slightly offset from alignment with an adjacent strip, to create a parallelogram or slanted block shape, with the inlet face and outlet face parallel to one another, but not perpendicular to upper and bottom surfaces.

In some instances, the media or media pack will be referenced as having a parallelogram shape in any cross-section, meaning that any two opposite side faces extend generally parallel to one another.

It is noted that a blocked, stacked arrangement corresponding to FIG. 124 is described in the prior art of U.S. Pat. No. 5,820,646, incorporated herein by reference. It is also noted that stacked arrangements are described in U.S. Pat. Nos. 5,772,883; 5,792,247; 7,351,270; and U.S. Publication 2004/0187689. Each of these latter references is incorporated herein by reference. It is noted that a stacked arrangement shown in U.S. Publication 2005/0130508 is a slanted stacked arrangement.

It is also noted that, in some instances, more than one stack can be incorporated into a single media pack. Also, in some instances, the stack can be generated with one or more flow faces that have a recess therein, for example, as shown in U.S. Pat. No. 7,625,419 incorporated herein by reference.

Figure 125:
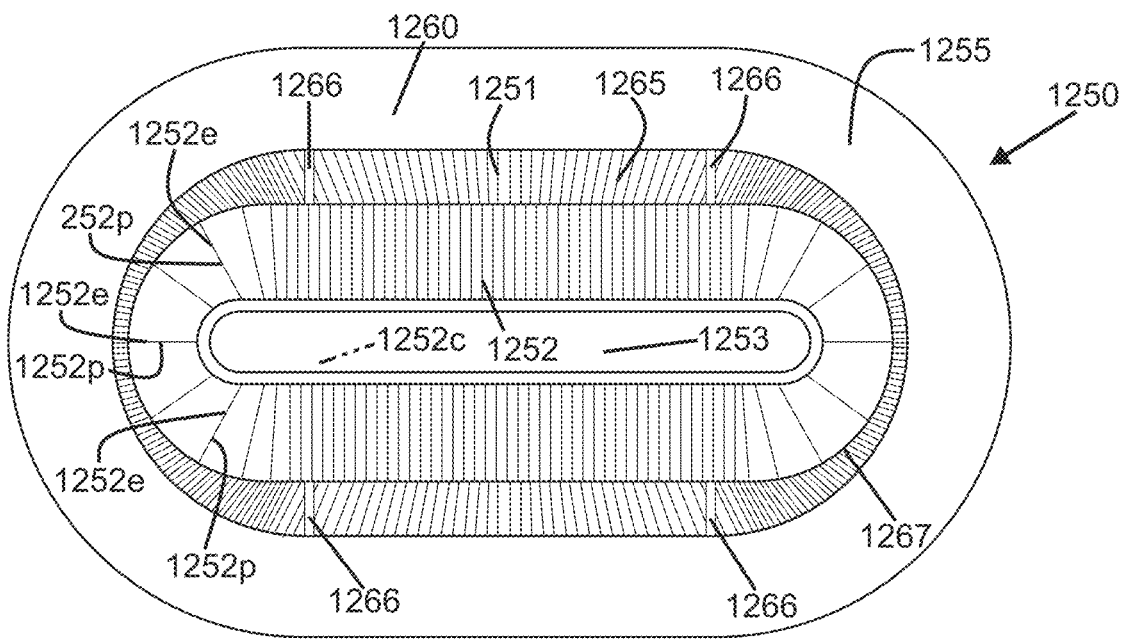
FIG. 125 is a schematic flow end view of a filter media pack using an alternate media to the media of FIG. 118, and alternately usable in selected filter cartridges in accordance with the present disclosure.
Figure 126:
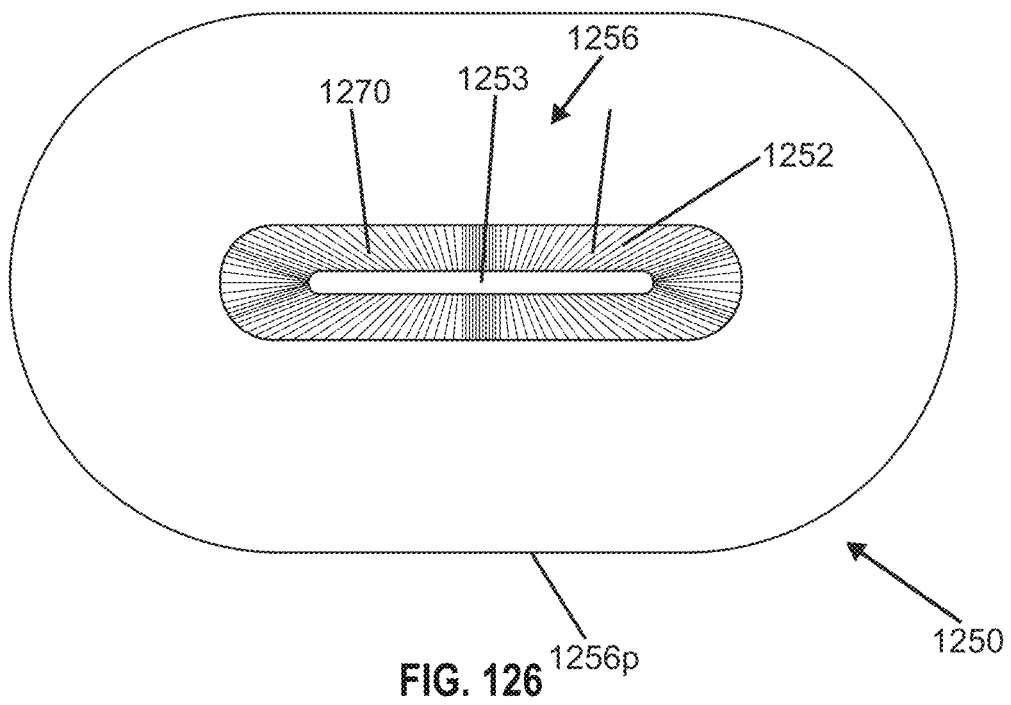
FIG. 126 is a schematic opposite flow end view to the view of FIG. 125.
Figure 127:
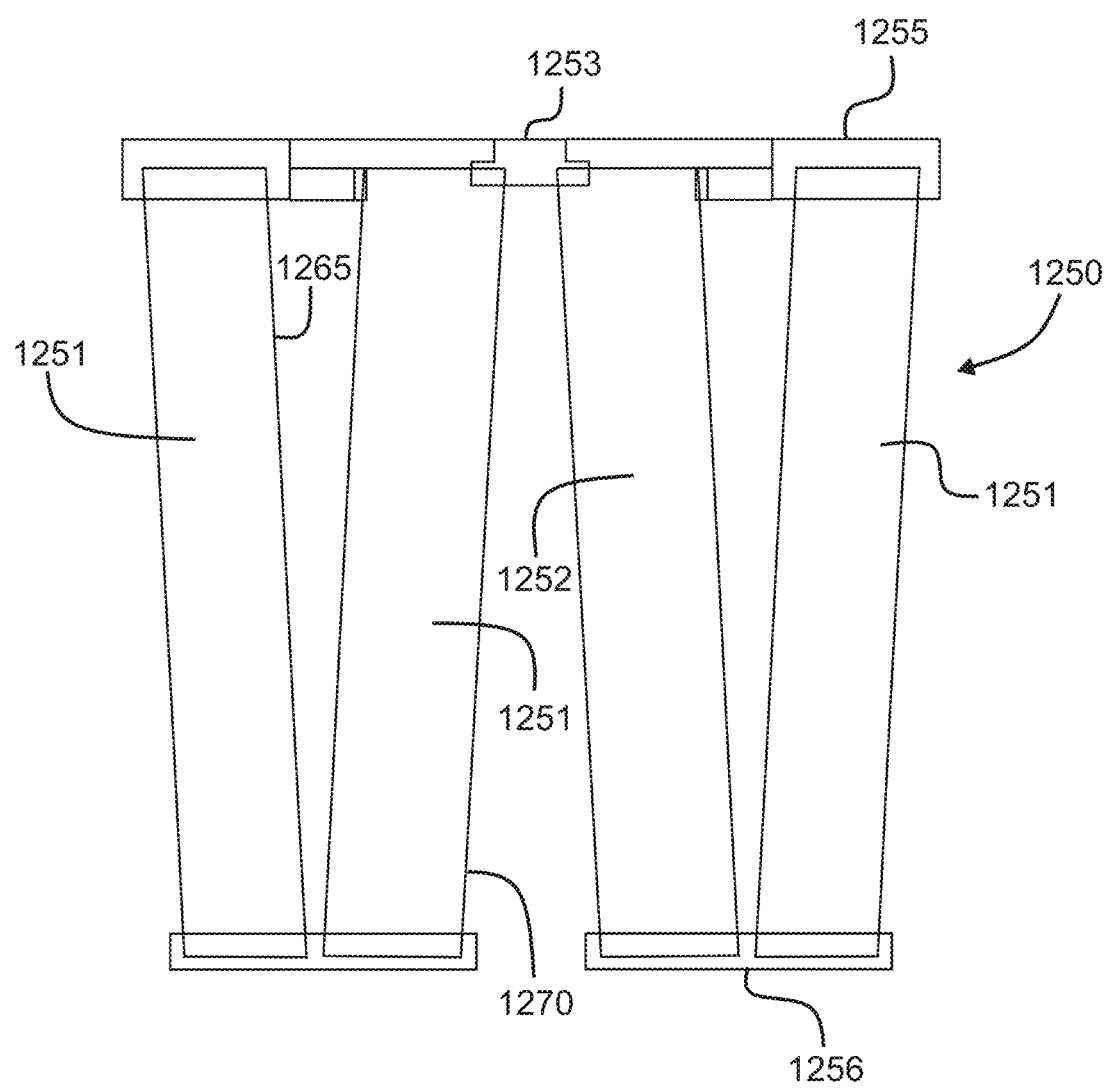
FIG. 127 is a schematic cross-sectional view of the media pack of FIGS. 125 and 126.
Figure 128:
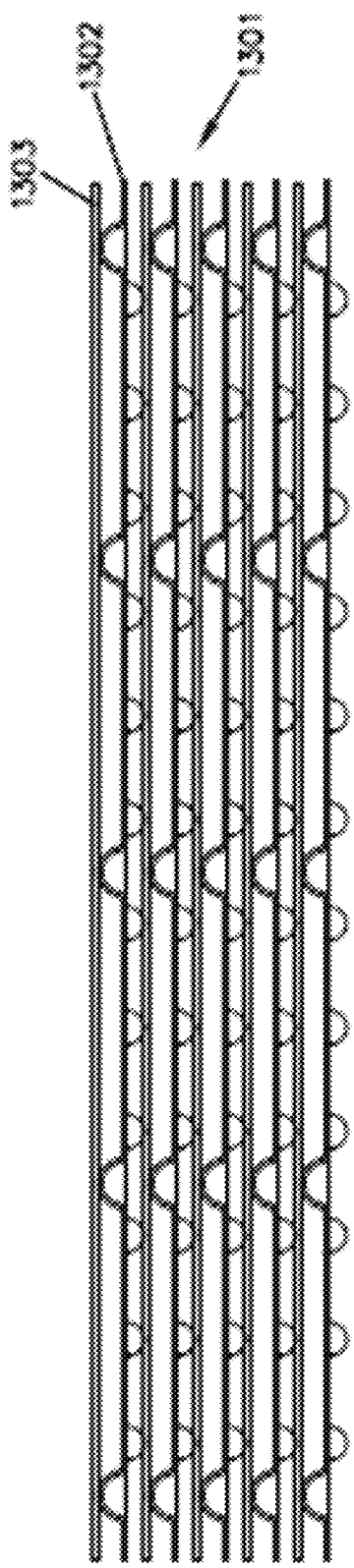
FIG. 128 is a schematic, fragmentary, cross-sectional view of a further alternate media type usable in a media pack of a filter cartridge having features in accordance with the present disclosure.

C. Selected Media or Media Pack Arrangements Comprising Multiple Spaced Coils of Fluted Media; FIGS. 125-127

Alternate types of media arrangements or packs that involve flutes between opposite ends extending between can be used with selected principles according to the present disclosure. An example of such alternate media arrangement or pack is depicted in FIGS. 125-127. The media of FIGS. 125-127 is analogous to one depicted and described in DE 202008017059; and as can sometimes found in arrangements available under the mark "IQORON" from Mann & Hummel.

Referring to FIG. 125, the media or media pack is indicated generally at 1250. The media or media pack 1250 comprises a first outer pleated (ridged) media loop 1251 and a second, inner, pleated (ridged) media loop 1252, each with pleat tips (or ridges) extending between opposite flow ends. The view of FIG. 125 is toward a media pack (flow) end 1255. The end 1255 depicted, can be an inlet (flow) end or an outlet (flow) end, depending on selected flow direction. For many arrangements, using principles characterized having the media pack 1250 would be configured in a filter cartridge such that end 1255 is an inlet flow end.

Still referring to FIG. 125, the outer pleated (ridged) media loop 1251 is configured in an oval shape, though alternatives are possible. At 1260, a pleat end closure, for example molded in place, is depicted closing ends of the pleats or ridges 1251 at media pack end 1255.

Pleats or ridges 1252 (and the related pleat tips) are positioned surrounded by and spaced from loop 1251, and thus pleated media loop 1252 is also depicted in a somewhat oval configuration. In this instance, ends 1252$e$ of individual pleats or ridges 1252$p$ in a loop 1252 are sealed closed. Also, loop 1252 surrounds a center 1252$c$ that is closed by a center strip 1253 of material, typically molded-in-place.

During filtering, when end 1255 is an inlet flow end, air enters gap 1265 between the two loops of media 1251, 1252. The air then flows either through loop 1251 or loop 1252, as it moves through the media pack 1250, with filtering.

In the example depicted, loop 1251 is configured slanting inwardly toward loop 1252, in extension away from end 1255. Also, spacers 1266 are shown supporting a centering ring 1267 that surrounds an end of the loop 1252, for structural integrity.

In FIG. 126, an end 1256 of the cartridge 1250, opposite end 1255 is viewable. Here, an interior of loop 1252 can be seen, surrounding an open gas flow region 1270. When air is directed through cartridge 1250 in a general direction toward end 1256 and away from end 1255, the portion of the air that passes through loop 1252 will enter central region 1270 and exit therefrom at end 1256. Of course, air that has entered media loop 1251, as shown in FIG. 125, during filtering would generally pass around (over) an outer perimeter 1256$p$ of end 1256.

In FIG. 127, a schematic cross-sectional view of cartridge 1250 is provided. Selected identified and described features are indicated by like reference numerals.

It will be understood from a review of FIGS. 124-127, the above description, that the cartridge 1250 described, is generally a cartridge which has media tips extending in a longitudinal direction between opposite flow ends 1255, 1256.

In the arrangement of FIGS. 125-127, the media pack 1250 is depicted with an oval, in particular racetrack, shaped perimeter. It is depicted in this manner since the air filter cartridges, in many examples below, also have an oval or racetrack shaped configuration. However, the principles can be embodied in a variety of alternate peripheral shapes.

D. Other Media Variations, FIGS. 128-133

Herein, in FIGS. 128-133, some schematic, fragmentary, cross-sectional views are provided of still further alternate variations of media types that can be used in selected applications of the principles characterized herein. Certain examples are described in PCT Publication WO 2016/077377, owned by the Assignee of the present disclosure, Donaldson Company, Inc. In general, each of the arrangements of FIGS. 128-133 represents a media type that can be stacked or coiled into an arrangement that has opposite inlet and outlet flow ends (or faces), with straight through flow.

Figure 138:
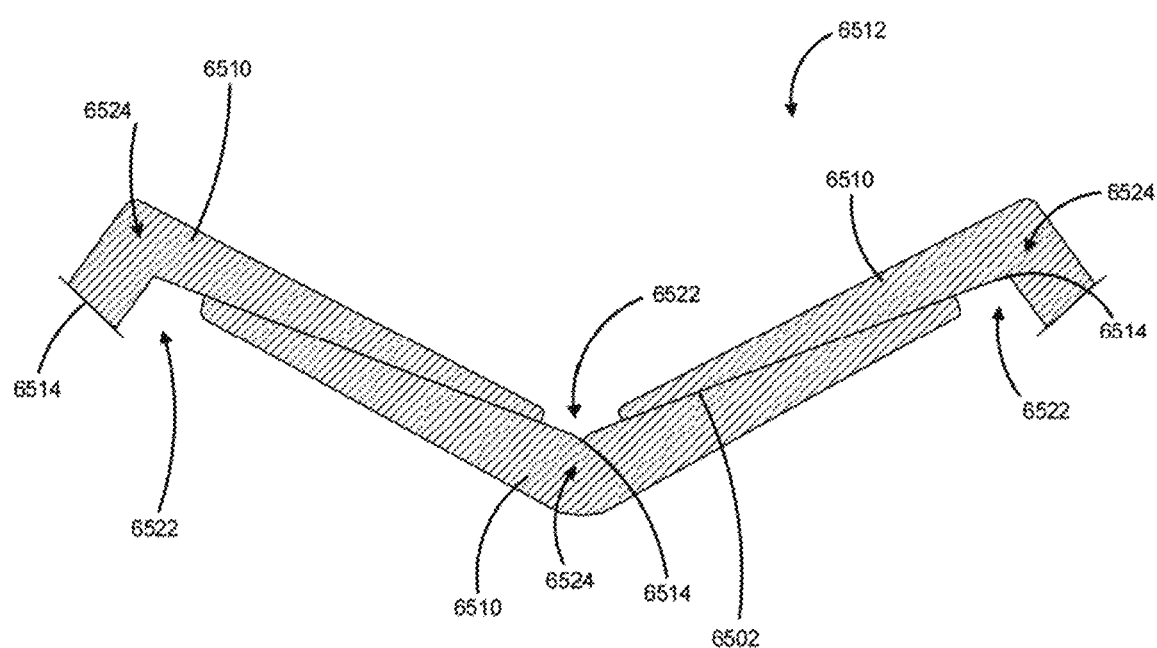

In FIG. 138, an example media arrangement 1301 from PCT Publication WO 2016/077377 is depicted, in which an embossed sheet 1302 is secured to a non-embossed sheet 1303, then stacked and coiled into a media pack, with seals along opposite edges of the type previously described for FIG. 118 herein.

Figure 129:
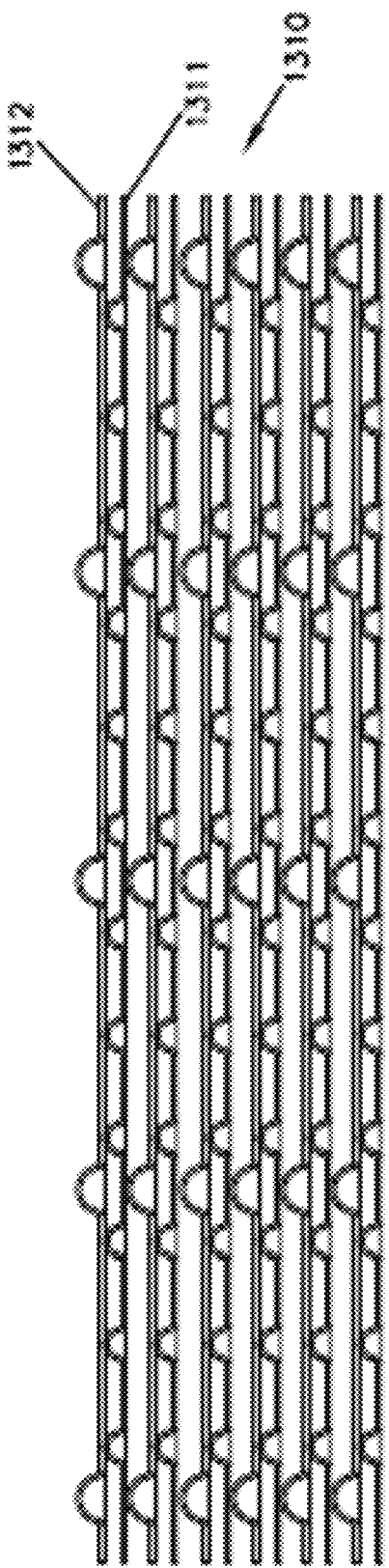
FIG. 129 is a schematic, fragmentary cross-sectional view of a first variation of the media type of FIG. 128.

In FIG. 129, an alternate example media pack 1310 from PCT Publication WO 2016/077377 is depicted, in which a first embossed sheet 1311 is secured to a second embossed sheet 1312 and then formed into a stacked or coiled media pack arrangement, having edge seals generally in accordance with FIG. 118 herein.

Edge seals can be conducted in either the upstream end or the downstream end, or in some instances, both. Especially when the media is likely to encounter chemical material during filtering, it may be desirable to avoid a typical adhesive or sealant.

Figure 130:
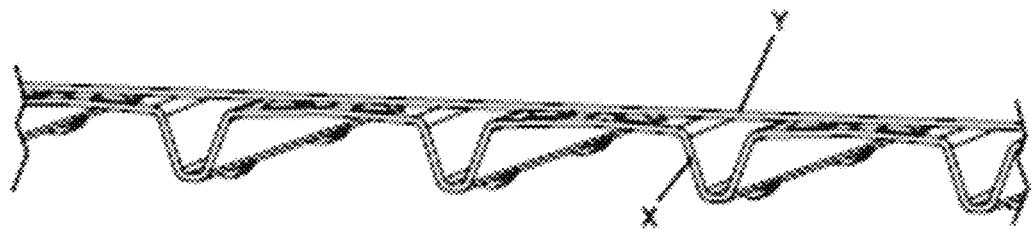
FIG. 130 is a schematic, fragmentary depiction of another usable fluted sheet/facing sheet combination in accordance with the present disclosure.

In FIG. 130, a cross-section is depicted in which the fluted sheet X has various embossments on it for engagement with the facing sheet Y. Again, these can be separate, or sections of the same media sheet.

Figure 131:
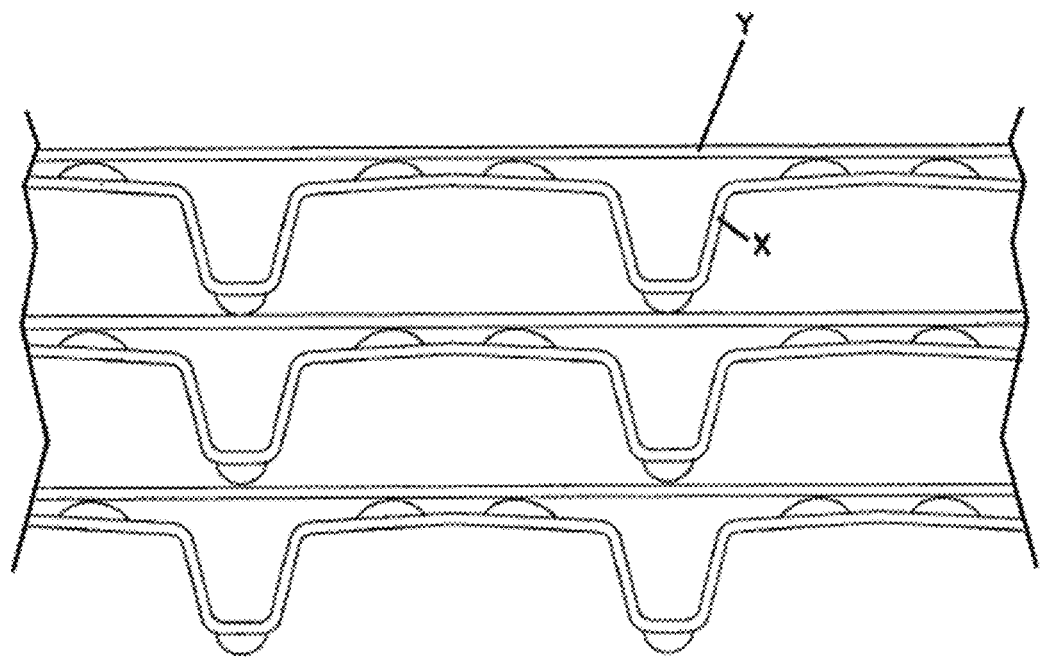
FIG. 131 is a fragmentary, second schematic view of the type of media in FIG. 130 shown in a media pack.

In FIG. 131, a schematic depiction of such an arrangement between the fluted sheet X and facing sheet Y is also shown.

Figure 132:
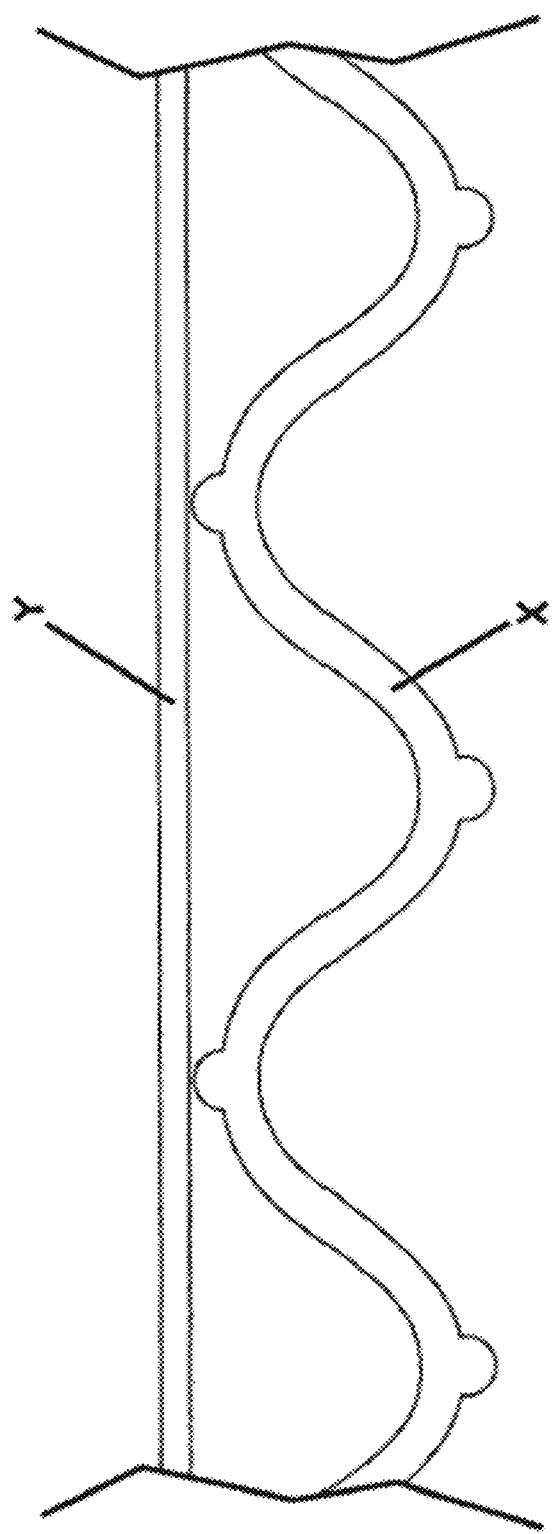
FIG. 132 is a schematic, fragmentary, plan view of still another media variation usable in arrangements according to the present disclosure.

In FIG. 132, a still further variation of such a principle is shown between a fluted sheet X and a facing sheet Y. These are meant to help understand how a wide variety of approaches are possible.

Figure 133:
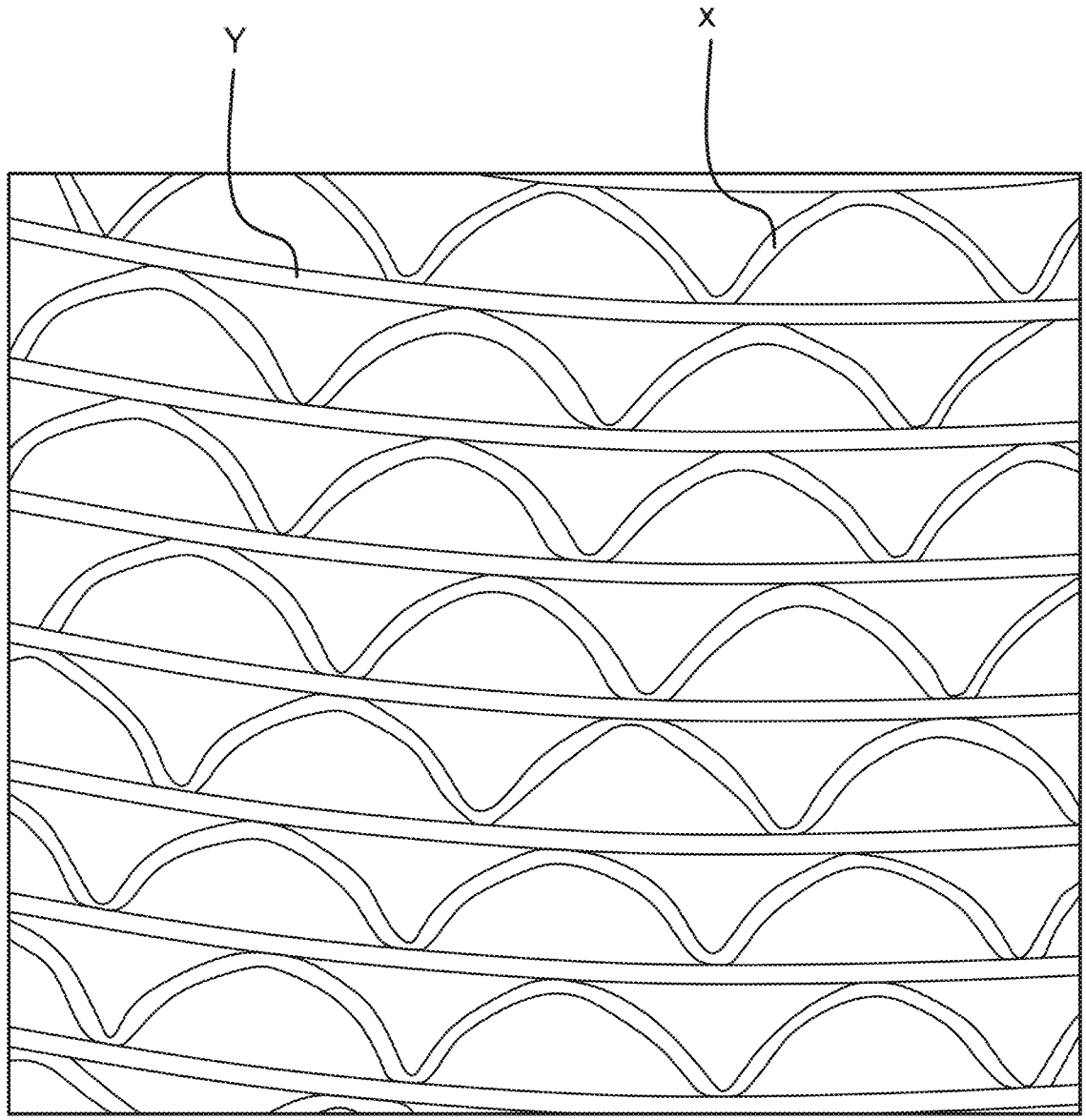
FIG. 133 is a schematic view of another variation of usable media in accordance with the present disclosure.

In FIG. 133, still another possible variation in fluted sheet X and facing sheet Y is shown.

Figure 134:
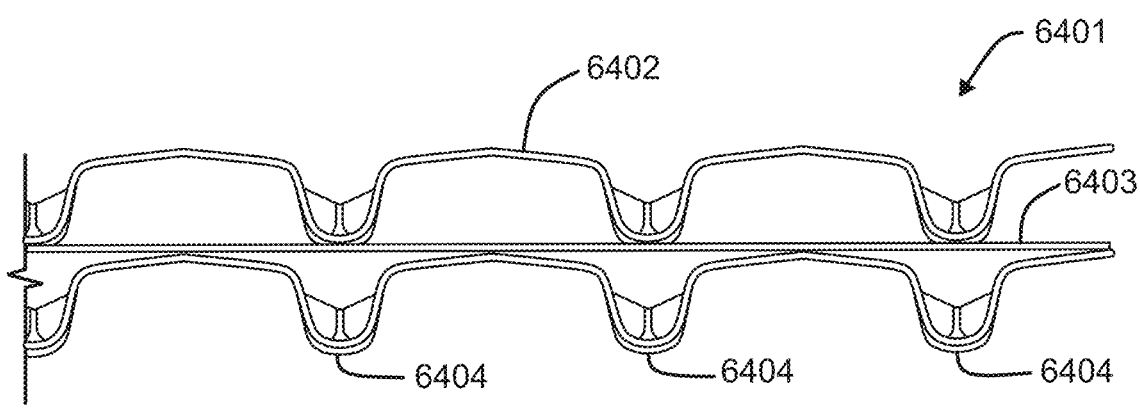
FIG. 134 is a schematic depiction of another usable fluted sheet/facing sheet combination in accordance with the present disclosure.
Figure 135:
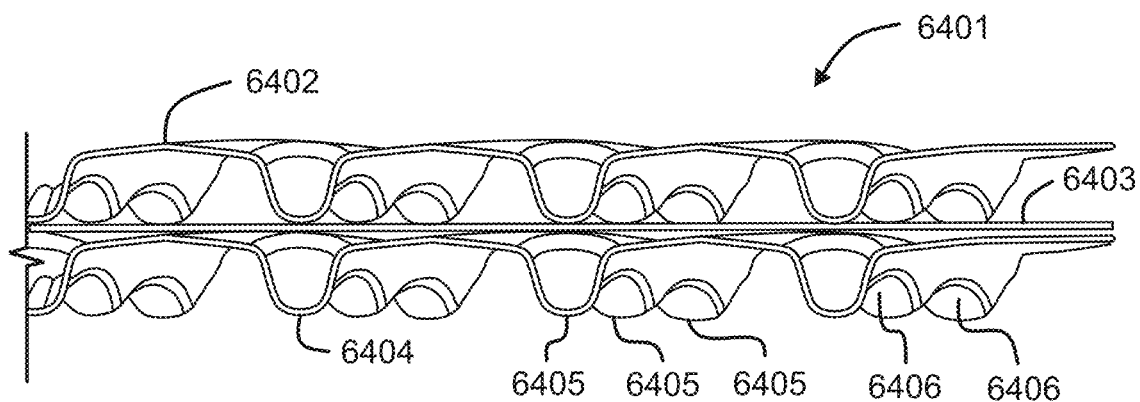
FIG. 135 is a perspective view of a portion of the usable fluted sheet/facing sheet combination depicted in FIG. 134.

In FIGS. 134 and 135, an example media arrangement 6401 is depicted, in which a fluted sheet 6402 is secured to a facing sheet 6403. The facing sheet 6403 may be a flat sheet. The media arrangement 6401 can then be stacked or coiled into a media pack, with seals along opposite edges of the type previously described for FIG. 118 herein. In the embodiment shown, flutes 6404 of fluted sheet 6402 have an undulating ridgeline including a series of peaks 6405 and saddles 6406. The peaks 6405 of adjacent flutes 6404 can be either aligned as shown in FIGS. 134 and 135, or offset. Further the peak height and/or density can increase, decrease, or remain constant along the length of the flutes 6404. The ratio of the peak flute height to saddle flute height can vary from about 1.5, typically from 1.1 to about 1.

It is noted that there is no specific requirement that the same media be used for the fluted sheet section and the facing sheet section. A different media can be desirable in each, to obtain different effects. For example, one may be a cellulose media, while the other is a media containing some non-cellulose fiber. They may be provided with different porosity or different structural characteristics, to achieve desired results.

A variety of materials can be used. For example, the fluted sheet section or the facing sheet section can include a cellulose material, synthetic material, or a mixture thereof. In some embodiments, one of the fluted sheet section and the facing sheet section includes a cellulose material and the other of the fluted sheet section and facing sheet section includes a synthetic material.

Synthetic material(s) can include polymeric fibers, such as polyolefin, polyamide, polyester, polyvinyl chloride, polyvinyl alcohol (of various degrees of hydrolysis), and polyvinyl acetate fibers. Suitable synthetic fibers include, for example, polyethylene terephthalate, polyethylene, polypropylene, nylon, and rayon fibers. Other suitable synthetic fibers include those made from thermoplastic polymers, cellulosic and other fibers coated with thermoplastic polymers, and multi-component fibers in which at least one of the components includes a thermoplastic polymer. Single and multi-component fibers can be manufactured from polyester, polyethylene, polypropylene, and other conventional thermoplastic fibrous materials.

The examples of FIGS. 118-134, are meant to indicate generally that a variety alternate media packs can be used in accordance with the principles herein. Attention is also directed to PCT Publication WO 2016/077377, incorporated herein by reference, with respect to the general principles of construction and application of some alternates media types.

E. Additional Media Pack Arrangements Including Pleated Media with Flutes; FIGS. 136-139

Additional examples of alternative types of media arrangements or packs that involve filtration media having flutes extending between opposite ends or flow faces in a straight through flow configuration are depicted in FIGS. 136-139. The flutes can be considered inlet flutes when they are arranged to receive dirty air via an inlet flow face, and they can be considered outlet flutes when they are arranged to permit filtered air to flow out via an outlet flow face.

Figure 136:
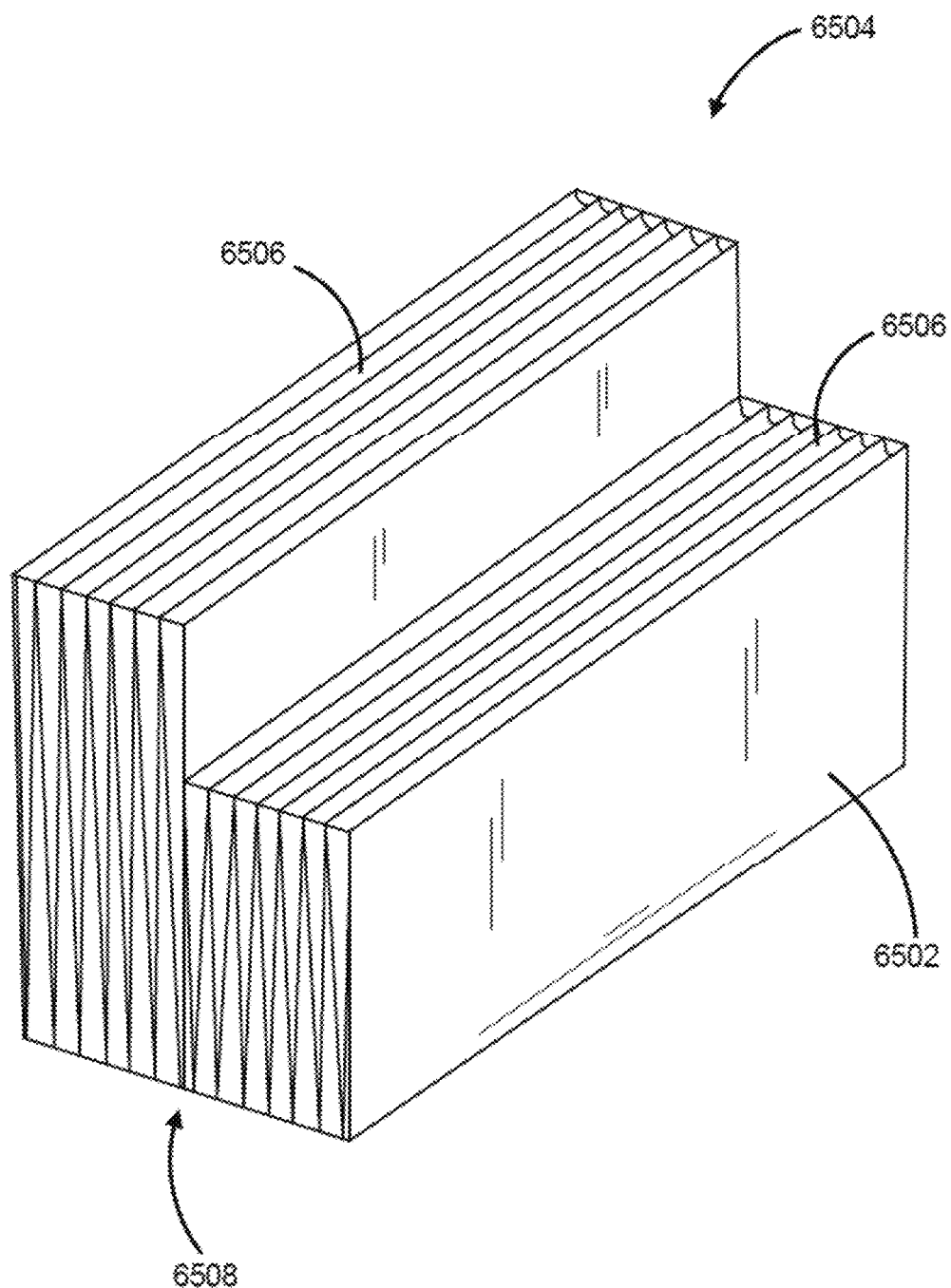
FIG. 136 is a perspective view of another media variation usable in arrangements according to the present disclosure.
Figure 137:
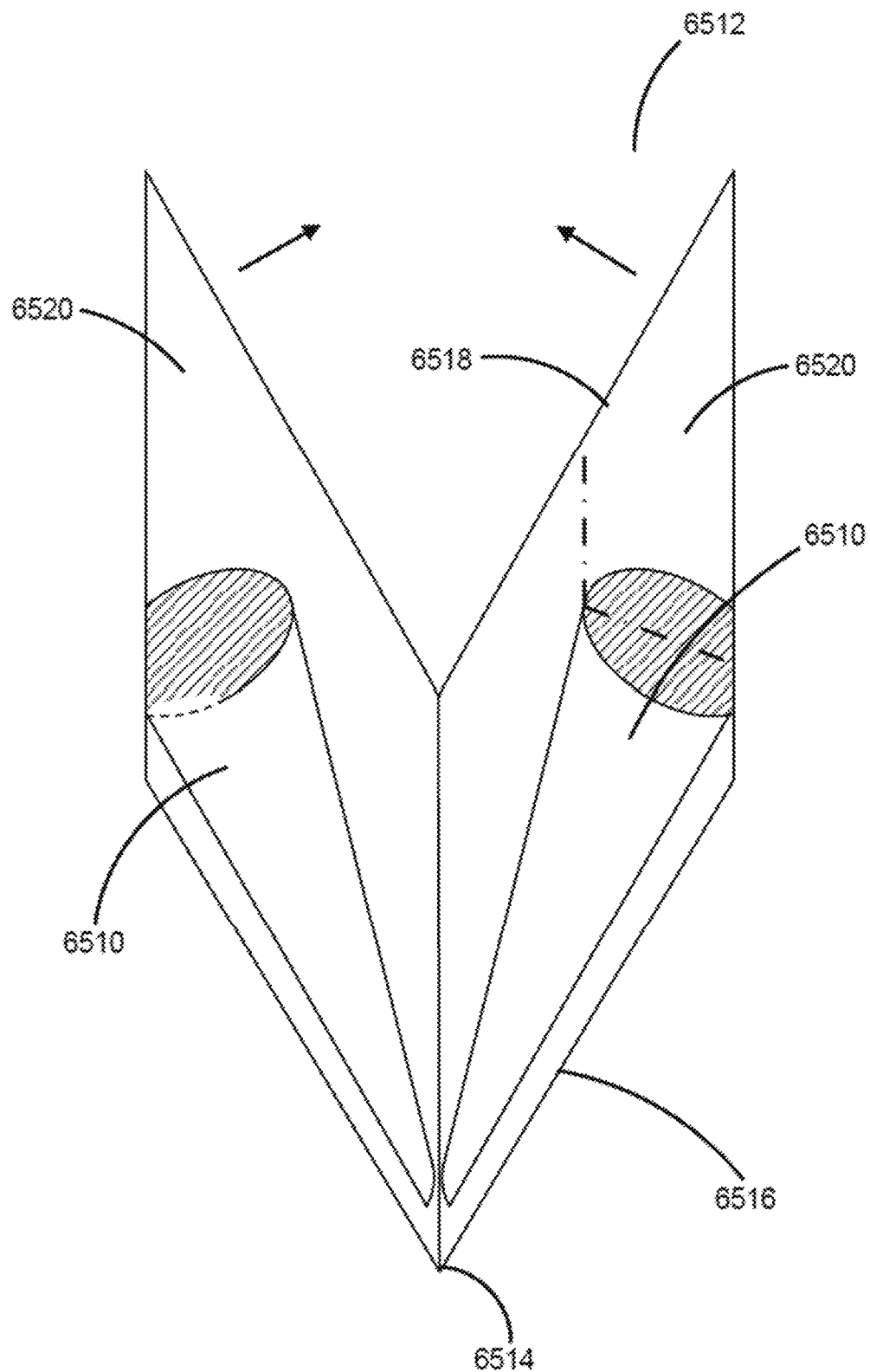

The filtration media 6502 depicted in FIGS. 136-138, which is analogous to ones depicted in U.S. Pat. Nos. 8,479,924 and 9,919,256 assigned to Mann+Hummel GmbH, is illustrated in an arrangement that shows how the filtration media 6502 can be formed into a media pack arrangement 6504.

The media pack arrangement 6504 can be considered as having relatively long or deep pleats from an inlet flow face 6506 to an outlet flow face 6508, and can also have varying pleat depths as illustrated. As the depth of pleats of a media pack increases, there is a tendency of the filtration media to collapse on each other thereby causing masking. Masking is undesirable because masked filtration media tends to no longer be available for filtration thereby decreasing dust holding capacity and flow through the media pack, and also potentially increasing pressure drop across the media pack. In order to reduce masking and to help the filtration media retain its shape, support structures are known to be applied to pleated media. In FIGS. 137 and 138, support sections or spacers 6510 are provided. It should be appreciated that FIGS. 137 and 138 are illustrated in a folded configuration 6512 having pleat folds 6514, but are expanded or separated to show how the filtration media 6502 and the support sections or spacers 6510 can be arranged.

Figure 139:
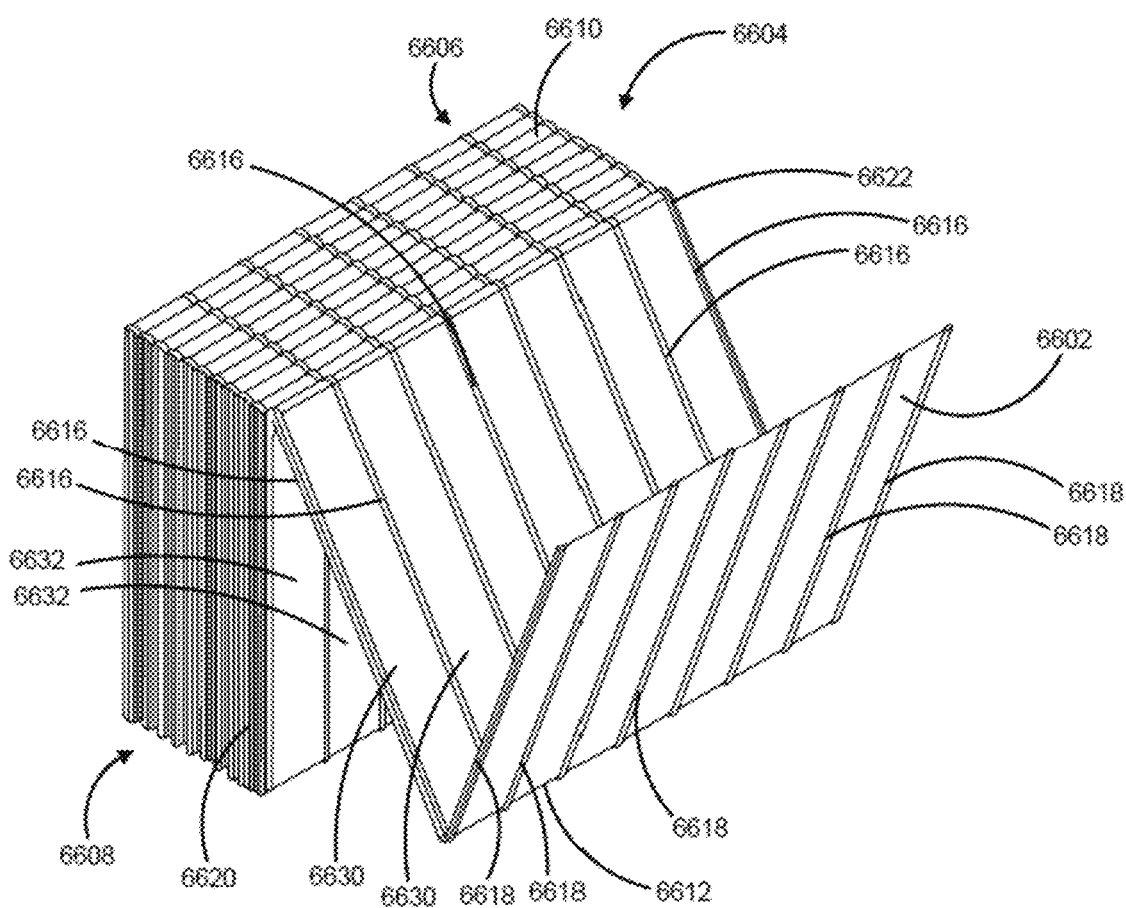

As illustrated in FIGS. 137 and 138, the filtration media 6502 extends between a first side 6516 and a second side 6518. Although only one support section 6510 is shown on each pleat face 6520, it should be appreciated that multiple support sections 6510 can be arranged along each pleat face 6520 so that when the filtration media 6502 is arranged into a media pack, as illustrated in FIG. 139 as media pack 6604, the volume between each of the support sections 6510 can be considered flutes extending between the inlet flow face 6506 and the outlet flow face 6508. The support sections 6510 can be arranged on each flow face 6520 so that opposite support sections 6510 contact or engage each other to help maintain the media pack shape while also limiting the amount of filtration media that would be contacted by the support sections 6510, as illustrated in FIG. 138. Furthermore, by providing that the support sections 6510 have adhesive properties, the support sections 6510 can be provided so that opposing support sections 6510 can adhere to each other when the filtration media 6502 is arranged into the media pack 6504.

The support sections 6510 can be arranged in a tapered configuration where support sections 6510 have a cross section at an interior fold 6522 and wherein the cross section increases toward an exterior fold 6524. In this context, the phrase "interior fold" refers to the side of the media that forms an acute angle, and the phrase "exterior fold" refers to the side of the media that forms an obtuse angle when the media is arranged into a media pack. Furthermore, the reference to changing the cross section of the support sections 6510 can refer to one or both of the height that the support section extends away from the media to which it is adhered and also to the width along the media to which it is adhered to in a direction toward or away from other support sections across adjacent flutes. Changing the shape of the support sections 6510 can help maintain the shape of the media pack and the resulting flutes, and can help reduce the amount of media that would otherwise be contacted by the support sections 6510 if they were not arranged in a tapered configuration. In addition, the support sections 6510 can be arranged in a non-tapered configuration. As illustrated in FIG. 138, the support sections 6510 can be provided so that they extend over the exterior folds 6524, although it is not necessary for the support sections 6510 to extend over the exterior folds. In addition, it is not necessary for the support sections 6510 to extend into the interior folds 6522, although, if desired, the support sections 6510 can be provided so that they extend into the interior folds 6522.

The support sections 6510 can be applied to the filtration media 6502 as adhesive extruded onto the filtration media 6502 where the adhesive forms the support sections 6510. Before the adhesive has a chance to fully cure, the filtration media 6502 can be folded into the media pack arrangement 6504, which may or may not have varying pleat depths. By forming the media pack arrangement 6504 before the adhesive has fully cured, the opposing support sections 6510 can become bonded or adhered to each other thereby forming flutes extending between the inlet flow face 6506 and the outlet flow face 6508.

It should be appreciated that the filtration media 6502 can be provided with deformation, such as corrugations, extending across the media. The direction of deformation, such as corrugation, can be parallel or perpendicular to the pleat fold direction.

The filtration media 6602 depicted in FIG. 139 is analogous to filtration media depicted in U.S. Publication 2018/0207566, assigned to Champion Laboratories, Inc., as another example of a media pack arrangement 6604 having inlet and outlet flutes in a straight through flow arrangement.

The filtration media pack arrangement 6604 can be formed by folding the filtration media 6602 to form an inlet flow face 6606 and an outlet flow face 6608. Pleat tips 6610 form the inlet flow face 6606, and pleat tips 6612 form the outlet flow face 6608. Adhesive beads 6616 and 6618, which may be continuous or discontinuous, extend along the filtration media 6602 in multiple lines across the filtration media 6602 from a media first side 6620 to a media second side 6622. The adhesive beads 6616 and 6618 along the media first side 6620 and along the media second side 6620 can be thickened, if desired, and can be arranged to provide an edge seal along the media first side 6620 and the media second side 6622. By providing that the adhesive beads 6616 and 6618 adhere to each other as the filtration media 6602 is folded, inlet flutes 6630 and outlet flutes 6632 can be formed in the straight through media pack arrangement 6604.

A similar type of filtration media pack arrangement is commercially available under the name Enduracube from Baldwin Filters, Inc. The filtration media pack available under the name Enduracube from Baldwin Filters, Inc. is arranged in a pleated configuration forming inlet flutes and outlet flutes extending between an inlet flow face and an outlet flow face.

F. Still Further Media Types

Many of the techniques characterized herein will preferably be applied when the media is oriented for filtering between opposite flow ends of the cartridge is media having flutes or pleat tips that extend in a direction between those opposite ends. However, alternatives are possible. The techniques characterized herein with respect to seal arrangement definition can be applied in filter cartridges that have opposite flow ends, with media positioned to filter fluid flow between those ends, even when the media does not include flutes or pleat tips extending in a direction between those ends. The media, for example, can be depth media, can be pleated in an alternate direction, or it can be a non-pleated material.

It is indeed the case, however, that the techniques characterized herein are particularly advantageous for use with cartridges that are relatively deep in extension between flow ends, usually at least 100 mm, typically at least 150 mm, often at least 200 mm, sometimes at least 250 mm, and in some instances 300 mm or more, and are configured for large loading volume during use. These types of systems will typically be ones in which the media is configured with pleat tips or flutes extending in a direction between opposite flow ends.

It is also noted that while the techniques described herein were typically developed for advantageous application and arrangements involving media packs with straight through flow configurations, the techniques can be applied to advantage in other systems. For example, the techniques can be applied when the cartridge comprises media surrounding a central interior, in which the cartridge has an open end. Such arrangements can involve "forward flow" in which air to be filtered enters the central open interior by passage through the media, and the exits through the open end; or, with reverse flow in which air to be filtered enters the open end and then turns and passes through the media. A variety of such arrangements are possible, including pleated media and alternate types of media. Configurations usable would include cylindrical and conical, among others.

Aspects

The present disclosure includes various aspects that may be claimed in the future. The following aspects are intended to highlight certain features without limiting the scope of protection. It should be understood that any of the following aspects may be claimed in a patent application claiming priority to the present disclosure, either alone or in combination with other aspects. Further, the following aspects may be modified or combined in any suitable manner apparent to one skilled in the art in light of the teachings herein. Features which are described in the context of separate aspects and embodiments of the disclosure may be used together and/or be interchangeable. Similarly, features described in the context of a single embodiment may also be provided separately or in any suitable subcombination. The aspects are numbered for convenience only and should not be construed as requiring a particular order or limiting the scope of what may be claimed. In various aspects, an air cleaner housing and related filter cartridges are provided that include features and components as described in one or more of the following aspects. The aspects may be combined or modified in ways apparent to those skilled in the art based on the teachings herein. While specific materials, dimensions, and configurations are described for certain aspects, these are exemplary only and other materials, dimensions and configurations may be used within the scope of the disclosure.

Aspect 1: A filter cartridge comprising: a) a media pack including media defining an outer perimeter extending along a longitudinal axis between a first axial end and a second axial end; and b) an end cap arranged about the media pack outer perimeter, the end cap including: i) a seal member presenting a seal surface that is spaced from the media pack outer perimeter and that faces in a radial inward direction towards the media pack outer perimeter, the seal surface having a generally polygonal shape with flat sides and adjoining corner portions.

Aspect 2: The filter cartridge of Aspect 1, or any of Aspects 3 to 155, wherein the end cap further includes a support structure including a base part and a plurality of spaced apart reinforcement members, the support structure being formed from a material that is different than a material associated with the seal member, wherein the reinforcement members are located adjacent a radially outward facing side of the seal member and are radially aligned with the flat sides of the seal member such that gaps between adjacent reinforcement members are radially aligned with the seal surface corner portions.

Aspect 3: The filter cartridge of Aspect 1, or any of Aspects 2 and 4 to 155, wherein the support structure and seal member are each formed from a polyurethane material.

Aspect 4: The filter cartridge of Aspect 1, or any of Aspects 2 to 3 and 5 to 155, wherein the seal member has at least three flat sides and three corner portions.

Aspect 5: The filter cartridge of Aspect 1, or any of Aspects 2 to 4 and 6 to 155, wherein the seal member has eight flat sides and eight corner portions.

Aspect 6: The filter cartridge of Aspect 1, or any of Aspects 2 to 5 and 7 to 155, wherein each of the flat sides of the seal member have an equal length.

Aspect 7: The filter cartridge of Aspect 1, or any of Aspects 2 to 6 and 8 to 155, wherein the adjoining corner portions have a radius or curved shape.

Aspect 8: The filter cartridge of Aspect 2, or any of Aspects 1, 3 to 7, and 9 to 155, wherein the plurality of spaced apart reinforcement members define a distal end of the filter cartridge.

Aspect 9: The filter cartridge of Aspect 2, or any of Aspects 1, 3 to 8, and 10 to 155, wherein the plurality of spaced apart reinforcement members have a height that is greater than a height of the seal member.

Aspect 10: The filter cartridge of Aspect 2, or any of Aspects 1, 3 to 9, and 11 to 155, wherein the seal member is secured to the support structure.

Aspect 11: The filter cartridge of Aspect 10, or any of Aspects 1 to 9 and 12 to 155, wherein the support structure is molded onto the seal member.

Aspect 12: The filter cartridge of Aspect 1, or any of Aspects 2 to 11 and 13 to 155, wherein the seal member is located axially beyond a distal end of the media pack.

Aspect 13: The filter cartridge of Aspect 1, or any of Aspects 2 to 12 and 14 to 155, wherein the seal member circumscribes the media pack.

Aspect 14: The filter cartridge of Aspect 1, or any of Aspects 2 to 13 and 15 to 155, wherein the media pack has one of a circular and a racetrack cross-sectional shape.

Aspect 15: The filter cartridge of Aspect 1, or any of Aspects 2 to 14 and 16 to 155, wherein the media pack includes pleated media.

Aspect 16: The filter cartridge of Aspect 1, or any of Aspects 2 to 15 and 17 to 155, wherein the media pack includes fluted media.

Aspect 17: The filter cartridge of Aspect 1, or any of Aspects 2 to 16 and 18 to 155, wherein the end cap is located proximate the first axial end of the media pack.

Aspect 18: The filter cartridge of Aspect 1, or any of Aspects 2 to 17 and 19 to 155, wherein a distal end of the end cap is generally flush with the media pack first axial end.

Aspect 19: The filter cartridge of Aspect 1, or any of Aspects 2 to 18 and 20 to 155, wherein the end cap is located proximate the first axial end of the media pack.

Aspect 20: The filter cartridge of Aspect 2, or any of Aspects 1, 3 to 19 and 21 to 155, wherein the plurality of reinforcement members extend in a direction from the first axial end and towards the second axial end of the media pack or extend in a direction from the second axial end towards the first axial end of the media pack.

Aspect 21: The filter cartridge of Aspect 20, or any of Aspects 1 to 19 and 22 to 155, wherein an axial end of the seal member is at least partially exposed and uncovered by the support structure.

Aspect 22: The filter cartridge of Aspect 20, or any of Aspects 1 to 19, 21, and 23 to 155, wherein at least a portion of the plurality of reinforcement members circumscribe the media pack.

Aspect 23: The filter cartridge of Aspect 20, or any of Aspects 1 to 19, 21, 22, and 24 to 155, wherein the support structure further includes an axially extending portion spaced from the plurality of reinforcement members, the axially extending portion being secured to the media pack.

Aspect 24: The filter cartridge of Aspect 23, or any of Aspects 1 to 22 and 25 to 155, wherein the seal member is located within an annular space defined between the axially extending portion and the plurality of reinforcement members.

Aspect 25: The filter cartridge of Aspect 20, or any of Aspects 1 to 19, 21 to 24, and 26 to 155, wherein an axial end of the plurality of reinforcement members is generally flush with an axial end of the seal member.

Aspect 26: The filter cartridge of Aspect 1, or any of Aspects 1 to 25 and 27 to 155, wherein the seal surface has at least eight flat sides.

Aspect 27: The filter cartridge of Aspect 26, or any of Aspects 1 to 25 and 28 to 155, wherein the seal surface has twelve flat sides.

Aspect 28: The filter cartridge of any preceding aspect, wherein a length of the flat sides of the seal surface is greater than a length of the reinforcement members.

Aspect 29: The filter cartridge of any preceding aspect, wherein the number of flat sides of the seal surface is equal to the number of reinforcement members.

Aspect 30: An air cleaner comprising: a) a housing assembly including a housing body defining an interior volume, an air inlet, and an air outlet, and defining a first seal surface having a generally polygonal shape with flat sides and adjoining corner portions; b) a filter cartridge positioned within the interior volume, the filter cartridge including: i) a media pack including filter media extending from a first end to a second end and forming a tubular shape having a hollow center; and ii) a first end cap operably arranged at the media pack first end, the first end cap including a seal member presenting an inner radial side defining a seal surface and presenting an outer radial side, the inner radial side and the outer radial side each having a generally polygonal shape formed by a plurality of flat sides and adjoining corner portions, wherein the seal surface of the seal member forms a seal against the first seal surface of the housing assembly; and a seal support arrangement including a plurality of support members located adjacent the flat sides of the seal member outer radial side such that the corner portions of the outer radial side are unsupported by the plurality of support members.

Aspect 31: The air cleaner of Aspect 30, or any of Aspects 1 to 29 and 32 to 155, wherein the housing assembly includes a wall structure defining the first seal surface and that further defines an oppositely facing second seal surface having a generally polygonal shape with flat sides and adjoining corner portions.

Aspect 32: The air cleaner of Aspect 30, or any of Aspects 1 to 29, 31, and 33 to 155, further comprising: a) a safety filter cartridge including filter media and having a seal member that forms a seal with the second seal surface.

Aspect 33: The air cleaner of Aspect 32, or any of Aspects 1 to 31 and 33A to 155, wherein the first seal surface is formed as part of an outlet tube assembly that defines the air outlet.

Aspect 33A. The air cleaner of Aspect 32, or any of Aspects 1 to 31, 33, and 34 to 155, wherein the first seal surface is defined by an outlet tube assembly having a plurality of spaced apart protrusions at a distal end and arranged such that the first seal surface is an undercut seal surface.

Aspect 34: The air cleaner of Aspect 33, or any of Aspects 1 to 32, 33A, and 35 to 155, wherein the outlet tube assembly includes a first part secured to a second part that includes a wall structure defining the first seal surface.

Aspect 35: The air cleaner of Aspect 34, or any of Aspects 1 to 33 and 35 to 155, wherein the first and second parts are joined together on opposite sides of an end wall of the housing assembly.

Aspect 36: An outlet tube assembly for use with an air cleaner housing, the outlet tube assembly comprising: a) a first part defining an air inlet or air outlet; and b) a second part joined to the first part such that a portion of the air cleaner housing is sandwiched between the first and second parts, wherein the second part includes a first sidewall having a radially outward facing seal surface with flat sides and adjoining corner portions forming a generally polygonal shape, and a second sidewall having a radially inward facing surface with a plurality of spaced apart flat sections interrupted by inwardly extending protrusions.

Aspect 37: The outlet tube assembly of Aspect 36, or any of Aspects 1 to 35 and 38 to 155, wherein the inwardly extending protrusions of the second sidewall include side edges that together with the flat sections define recess areas.

Aspect 38: The outlet tube assembly of Aspect 37, or any of Aspects 1 to 36 and 39 to 155, wherein the recess areas are configured to receive reinforcement members of a filter cartridge such that the protrusions are received within gaps between the reinforcement members.

Aspect 39: The outlet tube assembly of Aspect 36, or any of Aspects 1 to 35, 37 to 38, and 40 to 155, wherein the flat sections and protrusions of the second sidewall are configured to guide rotational alignment of a filter cartridge during installation.

Aspect 40: The outlet tube assembly of Aspect 36, or any of Aspects 1 to 35, 37 to 39, and 41 to 155, wherein at least one of the flat sections has a different width compared to the other flat sections.

Aspect 41: The outlet tube assembly of Aspect 36, or any of Aspects 1 to 3, 37 to 40, and 42 to 155, wherein at least one of the protrusions has a different width compared to the other protrusions.

Aspect 42: The outlet tube assembly of Aspect 36, or any of Aspects 1 to 35, 37 to 41, and 43 to 155, wherein the first sidewall defines a radially inward facing seal surface with flat sides and adjoining corner portions forming a generally polygonal shape.

Aspect 43: An air filter cartridge for use within a housing assembly of an air cleaner, the filter cartridge comprising: a) a media pack including filter media extending from a first end to a second end; and b) a first end cap arranged at the first end of the media pack, the first end cap presenting an inner radial side defining a seal surface having a generally polygonal shape formed by a plurality of flat sides and adjoining corner portions, the first end cap having a first cross-sectional thickness extending through the flat sides that is greater than a second cross-sectional thickness extending through the corner portions.

Aspect 44: The air filter cartridge of Aspect 43, or any of Aspects 1 to 42 and 45 to 155, wherein the first end cap is formed as a single, monolithic component.

Aspect 45: The air filter cartridge of Aspect 43, or any of Aspects 1 to 42, 44 to 44, and 46 to 155, wherein the first end cap includes a plurality of support members at least partially defining the first cross-sectional thickness.

Aspect 46: The air filter cartridge of Aspect 43, or any of Aspects 1 to 42, 44 to 45, and 47 to 155, wherein a distal axial end of the filter cartridge is defined by the end cap at a location that is radially aligned with the seal surface flat sides.

Aspect 47: The air filter cartridge of Aspect 43, or any of Aspects 1 to 42, 44 to 46, and 48 to 155, wherein the first end cap includes a seal member defining the inner radial side and defining an outer radial side, wherein the seal member is unsupported on the outer radial side at locations radially aligned with the seal surface corner portions.

Aspect 48: The air filter cartridge of Aspect 43, or any of Aspects 1 to 42, 44 to 47, and 49 to 155, wherein the seal member has a constant cross-sectional thickness.

Aspect 49: An air filter cartridge for use within a housing assembly of an air cleaner, the filter cartridge comprising: a) a media pack including filter media extending from a first end to a second end and forming a tubular shape having a hollow center; and b) a first end cap operably arranged at the media pack first end, the first end cap including: i) a seal member presenting an inner radial side defining a seal surface and presenting an outer radial side, the inner radial side and the outer radial side each having a generally polygonal shape formed by a plurality of flat sides and adjoining corner portions; and ii) a seal support arrangement including a plurality of support members located adjacent the flat sides of the seal member outer radial side such that the corner portions of the outer radial side are unsupported by the plurality of support members.

Aspect 50: The air filter cartridge of Aspect 49, or any of Aspects 1 to 48 and 51 to 155, wherein each of the plurality of support members extends in an axial direction parallel with the seal surface.

Aspect 51: The air filter cartridge of Aspect 49, or any of Aspects 1 to 48, 50, and 52 to 155, wherein the plurality of support members equals the number of the plurality of flat sides of the seal member outer radial side.

Aspect 52: The air filter cartridge of Aspect 49, or any of Aspects 1 to 48, 50 to 51, and 53 to 155, wherein the plurality of support members define an axial distal end of the filter cartridge.

Aspect 53: The air filter cartridge of Aspect 49, or any of Aspects 1 to 48, 50 to 52, and 54 to 155, wherein the seal member is formed from a first material and the plurality of support members are formed from a second material different from the first material.

Aspect 54: The air filter cartridge of Aspect 49, or any of Aspects 1 to 48, 50 to 53, and 55 to 155, wherein the plurality of flat sides includes one flat side having a different length in comparison to at least one other of the plurality of flat sides.

Aspect 55: An air filter cartridge for use within a housing assembly of an air cleaner, the filter cartridge comprising: a) a media pack including filter media extending from a first end to a second end and forming a tubular shape having a hollow center; and b) a first end cap operably arranged at the media pack first end, the first end cap including: i) a seal member presenting an inner radial side and an outer radial side, the inner radial side defining a seal surface having a generally polygonal shape formed by a plurality of flat sides and adjoining corner portions; and ii) a seal support arrangement including a plurality of support members located radially outward from the seal surface and being radially aligned with the flat sides such that the seal surface corner portions are radially aligned with gaps formed between adjacent support members.

Aspect 56: The air filter cartridge of Aspect 55, or any of Aspects 1 to 54 and 56 to 155, wherein the number of gaps between the plurality of support members equals the number of seal surface corner portions such that each of the gaps is radially aligned with one of the seal surface corner portions.

Aspect 57: The air filter cartridge of Aspect 55, or any of Aspects 1 to 54, 56, and 58 to 155, wherein the seal member outer radial side defines a generally polygonal shape having a second plurality of flat sides and adjoining corner portions, and wherein the plurality of support members are located adjacent the second plurality of flat sides.

Aspect 58: The air filter cartridge of Aspect 55, or any of Aspects 1 to 54, 56 to 58, and 59 to 155, wherein an exposed portion of the plurality of support members defines an axial distal end of the filter cartridge.

Aspect 59: The air filter cartridge of Aspect 55, or any of Aspects 1 to 54, 56 to 58, and 60 to 155, wherein the seal member is formed from a first material and the plurality of support members are formed from a second material that is different from the first material.

Aspect 60: The air filter cartridge of Aspect 55, or any of Aspects 1 to 54, 56 to 59, and 61 to 155, wherein the plurality of flat sides includes one flat side having a different length in comparison to at least one other of the plurality of flat sides.

Aspect 61: The air filter cartridge of Aspect 55, or any of Aspects 1 to 54, 56 to 60, and 62 to 155, wherein each of the plurality of support members extend in an axial direction that is generally parallel with the seal surface.

Aspect 62: An air filter cartridge comprising: a) a media pack including media defining an outer perimeter extending along a longitudinal axis between a first axial end and a second axial end; and b) a seal member operably arranged on the media pack, the seal member presenting a seal surface having a generally polygonal shape with flat sides and adjoining corner portions, wherein the seal surface is at least partially located between the media pack first and second axial ends, is spaced from the media pack outer perimeter, and faces in a radially inward direction towards the media pack outer perimeter.

Aspect 63: The air filter cartridge of Aspect 62, or any of Aspects 1 to 61 and 64 to 155, further including a support structure including a base part and a plurality of spaced apart reinforcement members.

Aspect 64: The air filter cartridge of Aspect 63, or any of Aspects 1 to 62 and 65 to 155, wherein the plurality of reinforcement members are located adjacent a radially outward facing side of the seal member and are radially aligned with the flat sides of the seal member such that gaps between adjacent reinforcement members are radially aligned with the seal surface corner portions.

Aspect 65: The air filter cartridge of Aspect 63, or any of Aspects 1 to 62, 64, and 66 to 155, wherein the support structure is formed from a first material that is different from a second material associated with the seal member.

Aspect 66: The air filter cartridge of Aspect 65, or any of Aspects 1 to 64 and 67 to 155, wherein the plurality of flat sides of the seal surface have a first length and the plurality of support members have a second length that is a majority of the first length.

Aspect 67: The air filter cartridge of Aspect 63, or any of Aspects 1 to 62, 64 to 66, and 68 to 155, wherein each of the plurality of support members extends in an axial direction parallel with the seal surface.

Aspect 68: The air filter cartridge of Aspect 64, or any of Aspects 1 to 63, 65 to 67, and 69 to 155, wherein the plurality of flat sides includes one flat side having a different length in comparison to at least one other of the plurality of flat sides.

Aspect 69: A filter cartridge comprising: a) a media pack including media extending between a first end and a second end along a longitudinal axis; b) an end cap secured to the media pack and including: i) a seal member presenting a radially inward or outward facing seal surface having a generally polygonal shape with flat sides and adjoining corner portions, the seal member being formed from a first material, the seal member having a second surface opposite the seal surface; and ii) a support structure including a base part and a plurality of spaced apart reinforcement members, the support structure being formed from a second material different than the first material, wherein the reinforcement members are located adjacent the seal member second surface and are radially aligned with the flat sides of the seal member such that gaps between adjacent reinforcement members are radially aligned with the seal surface corner portions.

Aspect 70: The filter cartridge of Aspect 69, or any of Aspects 1 to 68 and 71 to 155, wherein the support structure and seal member are each formed from a polyurethane material.

Aspect 71: The filter cartridge of Aspect 69, or any of Aspects 1 to 68, 70, and 72 to 155, wherein the seal member has at least three flat sides and three corner portions.

Aspect 72: The filter cartridge of Aspect 71, or any of Aspects 1 to 70, 71, and 73 to 155, wherein the seal member has eight flat sides and eight corner portions.

Aspect 73: The filter cartridge of Aspect 69, or any of Aspects 1 to 68, 70 to 72, and 74 to 155, wherein each of the flat sides of the seal member have an equal length.

Aspect 74: The filter cartridge of Aspect 69, or any of Aspects 1 to 68, 70 to 73, and 75 to 155, wherein the adjoining corner portions have a radius or curved shape.

Aspect 75: The filter cartridge of Aspect 69, or any of Aspects 1 to 68, 70 to 74, and 76 to 155, wherein the plurality of spaced apart reinforcement members define a distal end of the filter cartridge.

Aspect 76: The filter cartridge of Aspect 69, or any of Aspects 1 to 68, 70 to 75, and 77 to 155, wherein the plurality of spaced apart reinforcement members have a height that is greater than a height of the seal member.

Aspect 77: The filter cartridge of Aspect 69, or any of Aspects 1 to 68, 70 to 76, and 78 to 155, wherein the seal member is secured to the support structure.

Aspect 78: The filter cartridge of Aspect 77, or any of Aspects 1 to 76 and 79 to 155, wherein the support structure is molded onto the seal member.

Aspect 79: The filter cartridge of Aspect 69, or any of Aspects 1 to 68, 70 to 78, and 80 to 155, wherein the seal member is located axially beyond a distal end of the media pack.

Aspect 80: The filter cartridge of Aspect 69, or any of Aspects 1 to 68, 70 to 79, and 81 to 155, wherein the seal member circumscribes the media pack.

Aspect 81: The filter cartridge of Aspect 69, or any of Aspects 1 to 68, 70 to 80, and 82 to 155, wherein the media pack has one of a circular and a racetrack cross-sectional shape.

Aspect 82: The filter cartridge of Aspect 69, or any of Aspects 1 to 68, 70 to 81, and 83 to 155, wherein the media pack includes pleated media.

Aspect 83: The filter cartridge of Aspect 69, or any of Aspects 1 to 68, 70 to 82, and 84 to 155, wherein the media pack includes fluted media.

Aspect 84: A filter cartridge comprising: a) a media pack including media extending between a first end and a second end along a longitudinal axis; b) an end cap secured to the media pack and including: i) a seal member presenting a radially inward or outward facing seal surface, the seal member being formed from a first material; and ii) a support structure including a base part and a plurality of spaced apart, radially flexible extensions, the support structure being formed from a second material different than the first material, wherein at least a portion of the base part is covered by and/or embedded within the first material, the plurality of flexible extensions including an exposed portion that is uncovered by and/or embedded within the first material and that defines an axial end of the cartridge and is coincident with a radial innermost portion of the end cap and/or at least a portion of the radially inward or outward facing seal surface; iii) wherein the seal surface and the exposed portion of the flexible extensions are axially aligned such that a plane orthogonal to the longitudinal axis can pass through the seal member and through the exposed portion of the plurality of flexible extensions.

Aspect 85: The filter cartridge of Aspect 84, or any of Aspects 1 to 83 and 86 to 155, wherein the support structure and seal member are each formed from a polyurethane material.

Aspect 86: The filter cartridge of Aspect 84, or any of Aspects 1 to 83, 85, and 86 to 155 wherein the seal member has at least three flat sides and three corner portions.

Aspect 87: The filter cartridge of Aspect 84, or any of Aspects 1 to 83, 84 to 86, and 88 to 155 wherein the seal member has eight flat sides and eight corner portions.

Aspect 88: The filter cartridge of Aspect 87, or any of Aspects 1 to 86 and 89 to 155, wherein each of the flat sides of the seal member have an equal length.

Aspect 89: The filter cartridge of Aspect 87, or any of Aspects 1 to 86, 88, and 89 to 155, wherein the adjoining corner portions have a radius or curved shape.

Aspect 90: The filter cartridge of Aspect 84, or any of Aspects 1 to 83, 85 to 89, and 91 to 155, wherein the plurality of spaced apart reinforcement members define a distal end of the filter cartridge.

Aspect 91: The filter cartridge of Aspect 84, or any of Aspects 1 to 83, 85 to 90, and 91 to 155, wherein the plurality of spaced apart reinforcement members have a height that is greater than a height of the seal member.

Aspect 92: The filter cartridge of Aspect 84, or any of Aspects 1 to 83, 85 to 91, and 93 to 155, wherein the seal member is secured to the support structure.

Aspect 93: The filter cartridge of Aspect 92, or any of Aspects 1 to 91 and 94 to 155, wherein the support structure is molded onto the seal member.

Aspect 94: The filter cartridge of Aspect 84, or any of Aspects 1 to 83, 85 to 93, and 95 to 155, wherein the media pack has one of a circular and a racetrack cross-sectional shape.

Aspect 95: The filter cartridge of Aspect 84, or any of Aspects 1 to 83, 85 to 94, and 96 to 155, wherein the media pack includes pleated media.

Aspect 96: The filter cartridge of Aspect 84, or any of Aspects 1 to 83, 85 to 95, and 97 to 155, wherein the media pack includes fluted media.

Aspect 97: A filter cartridge comprising: a) a media pack including media extending between a first end and a second end along a longitudinal axis; b) an end cap secured to the media pack and including: i) a seal member presenting a radially inward or outward facing seal surface, the seal member being formed from a first material; and ii) a support structure including a base part and a plurality of spaced apart, radially flexible extensions, the support structure being formed from a second material different than the first material, wherein at least a portion of the base part is covered by and/or embedded within the first material, the plurality of flexible extensions including an exposed portion that is uncovered by and/or embedded within the first material and that defines an axial end of the cartridge; iii) wherein the seal surface and the exposed portion of the flexible extensions are axially aligned such that a plane orthogonal to the longitudinal axis can pass through the seal member and through the exposed portion of the plurality of flexible extensions.

Aspect 98: The filter cartridge of Aspect 97, or any of Aspects 1 to 96 and 99 to 155, wherein the support structure and seal member are each formed from a polyurethane material.

Aspect 99: The filter cartridge of Aspect 97, or any of Aspects 1 to 96, 98, and 100 to 155, wherein the seal member has at least three flat sides and three corner portions.

Aspect 100: The filter cartridge of Aspect 99, or any of Aspects 1 to 98 and 101 to 155, wherein the seal member has eight flat sides and eight corner portions.

Aspect 101: The filter cartridge of Aspect 97, or any of Aspects 1 to 96, 98 to 100, and 102 to 155, wherein each of the flat sides of the seal member have an equal length.

Aspect 102: The filter cartridge of Aspect 97, or any of Aspects 1 to 96, 98 to 101, and 103 to 155 wherein the adjoining corner portions have a radius or curved shape.

Aspect 103: The filter cartridge of Aspect 97, or any of Aspects 1 to 96, 98 to 102, and 104 to 155, wherein the plurality of spaced apart reinforcement members define a distal end of the filter cartridge.

Aspect 104: The filter cartridge of Aspect 97, or any of Aspects 1 to 96, 98 to 103, and 105 to 155, wherein the plurality of spaced apart reinforcement members have a height that is greater than a height of the seal member.

Aspect 105: The filter cartridge of Aspect 97, or any of Aspects 1 to 96, 98 to 104, and 106 to 155, wherein the seal member is secured to the support structure.

Aspect 106: The filter cartridge of Aspect 105, or any of Aspects 1 to 104 and 102 to 155, wherein the support structure is molded onto the seal member.

Aspect 107: The filter cartridge of Aspect 97, or any of Aspects 1 to 96, 98 to 105, and 108 to 155, wherein the seal member is located axially beyond a distal end of the media pack.

Aspect 108: The filter cartridge of Aspect 97, or any of Aspects 1 to 96, 98 to 108, and 109 to 155, wherein the seal member circumscribes the media pack.

Aspect 109: The filter cartridge of Aspect 97, or any of Aspects 1 to 96, 98 to 108, and 110 to 155, wherein the media pack has one of a circular and a racetrack cross-sectional shape.

Aspect 110: The filter cartridge of Aspect 97, or any of Aspects 1 to 96, 98 to 109, and 111 to 155, wherein the media pack includes pleated media.

Aspect 111: The filter cartridge of Aspect 97, or any of Aspects 1 to 96, 98 to 110, and 112 to 155, wherein the media pack includes fluted media.

Aspect 112: A filter cartridge comprising: a) a media pack including media extending between a first end and a second end along a longitudinal axis; b) an end cap secured to the media pack and including: i) a seal member presenting a radially inward or outward facing seal surface and an undercut portion radially recessed from the seal surface, the seal member being formed from a first material; and ii) a support structure including a base part and a plurality of spaced apart, radially flexible extensions, the support structure being formed from a second material different from the first material, wherein at least a portion of the base part is covered by and/or embedded within the first material, the plurality of flexible extensions including an exposed portion that is uncovered by and/or embedded within the first material; iii) wherein the seal surface and the exposed portion of the flexible extensions are axially aligned such that a plane orthogonal to the longitudinal axis can pass through the seal member and through the exposed portion of the plurality of flexible extensions.

Aspect 113: The filter cartridge of Aspect 112, or any of Aspects 1 to 111 and 113 to 155, wherein the support structure and seal member are each formed from a polyurethane material.

Aspect 114: The filter cartridge of Aspect 112, or any of Aspects 1 to 111, 113, and 115 to 155, wherein the seal member has at least three flat sides and three corner portions.

Aspect 115: The filter cartridge of Aspect 114, or any of Aspects 1 to 113 and 116 to 155, wherein the seal member has eight flat sides and eight corner portions.

Aspect 116: The filter cartridge of Aspect 112, or any of Aspects 1 to 111, 113 to 115, and 117 to 155, wherein each of the flat sides of the seal member have an equal length.

Aspect 117: The filter cartridge of Aspect 112, or any of Aspects 1 to 111, 113 to 116, and 118 to 155, wherein the adjoining corner portions have a radius or curved shape.

Aspect 118: The filter cartridge of Aspect 112, or any of Aspects 1 to 111, 113 to 117, and 119 to 155, wherein the plurality of spaced apart reinforcement members define a distal end of the filter cartridge.

Aspect 119: The filter cartridge of Aspect 112, or any of Aspects 1 to 111, 113 to 118, and 120 to 155, wherein the plurality of spaced apart reinforcement members have a height that is greater than a height of the seal member.

Aspect 120: The filter cartridge of Aspect 112, or any of Aspects 1 to 111, 113 to 119, and 121 to 155, wherein the seal member is secured to the support structure.

Aspect 121: The filter cartridge of Aspect 120, or any of Aspects 1 to 119 and 122 to 155, wherein the support structure is molded onto the seal member.

Aspect 122: The filter cartridge of Aspect 112, or any of Aspects 1 to 111, 113 to 121, and 123 to 155, wherein the seal member is located axially beyond a distal end of the media pack.

Aspect 123: The filter cartridge of Aspect 112, or any of Aspects 1 to 111, 113 to 122, and 123 to 155, wherein the seal member circumscribes the media pack.

Aspect 124: The filter cartridge of Aspect 112, wherein the media pack has one of a circular and a racetrack cross-sectional shape.

Aspect 125: The filter cartridge of Aspect 112, or any of Aspects 1 to 111, 113 to 124, and 125 to 155, wherein the media pack includes pleated media.

Aspect 126: The filter cartridge of Aspect 112, or any of Aspects 1 to 111, 113 to 125, and 127 to 155, wherein the media pack includes fluted media.

Aspect 127: A filter cartridge comprising: a) a media pack including media defining an outer perimeter extending along a longitudinal axis between a first axial end and a second axial end; and b) a seal member presenting a seal surface that faces in a radial inward direction, the seal surface having a generally polygonal shape with flat sides and adjoining corner portions, wherein the seal member is constrained from stretching in a circumferential direction along at least a portion of the flat sides and is unconstrained from stretching in a circumferential direction along the corner portions.

Aspect 128: The filter cartridge of Aspect 127, further comprising: a) a support structure including a base part and a plurality of spaced apart reinforcement members, the support structure being formed from a material that is different than a material associated with the seal member, wherein the reinforcement members are located adjacent a radially outward facing side of the seal member and are radially aligned with the flat sides of the seal member such that gaps between adjacent reinforcement members are radially aligned with the seal surface corner portions.

Aspect 129: The filter cartridge of Aspect 128, or any of Aspects 1 to 127 and 128 to 155, wherein the support structure and seal member are each formed from a polyurethane material.

Aspect 130: The filter cartridge of Aspect 127, or any of Aspects 1 to 126, 128 to 129 and 131 to 155, wherein the seal member circumscribes and is spaced from the media pack outer perimeter.

Aspect 131: The filter cartridge of Aspect 127, or any of Aspects 1 to 126, 128 to 130 and 132 to 155, wherein the seal surface has between three and eight flat sides and between three and eight corner portions.

Aspect 132: The filter cartridge of Aspect 127, or any of Aspects 1 to 126, 128 to 131 and 133 to 155, wherein each of the flat sides of the seal member have an equal length.

Aspect 133: The filter cartridge of Aspect 127, or any of Aspects 1 to 126, 128 to 132 and 134 to 155, wherein the adjoining corner portions have a radius or curved shape.

Aspect 134: The filter cartridge of Aspect 128, or any of Aspects 1 to 127, 129 to 133 and 135 to 155, wherein the plurality of spaced apart reinforcement members define a distal end of the filter cartridge.

Aspect 135: The filter cartridge of Aspect 128, or any of Aspects 1 to 127, 129 to 134 and 136 to 155, wherein the plurality of spaced apart reinforcement members have a height that is greater than a height of the seal member.

Aspect 136: The filter cartridge of Aspect 128, or any of Aspects 1 to 127, 129 to 135 and 137 to 155, wherein the seal member is secured to the support structure.

Aspect 137: The filter cartridge of Aspect 136, or any of Aspects 1 to 135 and 138 to 155, wherein the support structure is molded onto the seal member.

Aspect 138: The filter cartridge of Aspect 127, or any of Aspects 1 to 126, 128 to 137 and 139 to 155, wherein the seal member is located axially beyond a distal end of the media pack.

Aspect 139: The filter cartridge of Aspect 127, or any of Aspects 1 to 126, 128 to 138 and 140 to 155, wherein the seal member circumscribes the media pack.

Aspect 140: The filter cartridge of Aspect 127, or any of Aspects 1 to 126, 128 to 139 and 141 to 155, wherein the media pack has one of a circular and a racetrack cross-sectional shape.

Aspect 141: The filter cartridge of Aspect 127, or any of Aspects 1 to 126, 128 to 140 and 142 to 155, wherein the media pack includes pleated media.

Aspect 142: The filter cartridge of Aspect 127, or any of Aspects 1 to 126, 128 to 141 and 143 to 155, wherein the media pack includes fluted media.

Aspect 143: The filter cartridge of Aspect 127, or any of Aspects 1 to 126, 128 to 142 and 144 to 155, wherein the seal member is provided on an end cap located proximate the first axial end of the media pack.

Aspect 144: The filter cartridge of Aspect 143, or any of Aspects 1 to 142 and 145 to 155, wherein a distal end of the end cap is generally flush with the media pack first axial end.

Aspect 145: The filter cartridge of Aspect 143, or any of Aspects 1 to 142, 144, and 146 to 155, wherein the end cap is located proximate the first axial end of the media pack.

Aspect 146: The filter cartridge of Aspect 128, or any of Aspects 1 to 127, 129 to 145 and 147 to 155, wherein the plurality of reinforcement members extend in a direction from the first axial end and towards the second axial end of the media pack.

Aspect 147: The filter cartridge of Aspect 146, or any of Aspects 1 to 145 and 148 to 155, wherein an axial end of the seal member is at least partially exposed and uncovered by the support structure.

Aspect 148: The filter cartridge of Aspect 146, or any of Aspects 1 to 145, 147, and 148 to 155, wherein at least a portion of the plurality of reinforcement members circumscribe the media pack.

Aspect 149: The filter cartridge of Aspect 146, or any of Aspects 1 to 145, 146 to 148, and 148 to 155, wherein the support structure further includes an axially extending portion spaced from the plurality of reinforcement members, the axially extending portion being secured to the media pack.

Aspect 150: The filter cartridge of Aspect 149, or any of Aspects 1 to 148 and 151 to 155, wherein the seal member is located within an annular space defined between the axially extending portion and the plurality of reinforcement members.

Aspect 151: The filter cartridge of Aspect 146, or any of Aspects 1 to 145, 146 to 150, and 152 to 155, wherein an axial end of the plurality of reinforcement members is generally flush with an axial end of the seal member.

Aspect 152: The filter cartridge of Aspect 127, or any of Aspects 1 to 126, 128 to 151, and 153 to 155, wherein the corner portions are rounded corner portions.

Aspect 153: The filter cartridge of Aspect 148, or any of Aspects 1 to 147, 148 to 152, and 154 to 155, wherein the plurality of reinforcement members extend in a direction from the second axial end and towards the first axial end of the media pack.

Aspect 154: The filter cartridge of any preceding Aspect 1-153, wherein a length of the flat sides of the seal surface is greater than a length of the reinforcement members.

Aspect 155: The filter cartridge of any preceding aspect 11-154, wherein the number of flat sides of the seal surface is equal to the number of reinforcement members.

SUMMARY

The principles described herein can be applied in a variety of filter assemblies. Examples described in which the principles applied to (air) gas filter assemblies. Examples are described include air filters, for example, air filters used for treating engine intake airflows. The principles can be applied to a variety of alternate gas filtration arrangements, in some instances even with liquid filter assemblies. Again, the principles, techniques, and features described herein can be applied in a variety of systems, and there is no requirement that all of the advantageous features identified be incorporated in an assembly, system or component to obtain some benefit according to the present disclosure.

What is claimed is:

1. An air filter cartridge for use within a housing assembly of an air cleaner, the filter cartridge comprising:
   a) a media pack including filter media extending from a first end to a second end and forming a tubular shape having a hollow center; and
   b) a first end cap operably arranged at the media pack first end, the first end cap including:
      i) a seal member presenting an inner radial side defining a seal surface and presenting an outer radial side, the inner radial side and the outer radial side each having a generally polygonal shape formed by a plurality of flat sides and adjoining corner portions; and
      ii) a seal support arrangement including a plurality of support members located adjacent the flat sides of the seal member outer radial side such that the corner portions of the outer radial side are unsupported by the plurality of support members.

2. The air filter cartridge of claim 1, wherein each of the plurality of support members extend in an axial direction parallel with the seal surface.

3. The air filter cartridge of claim 1, wherein the plurality of support members equals the number of the plurality of flat sides of the seal member outer radial side.

4. The air filter cartridge of claim 1, wherein the plurality of support members define an axial distal end of the filter cartridge.

5. The air filter cartridge of claim 1, wherein the seal member is formed from a first material and the plurality of support members are formed from a second material different from the first material.

6. The air filter cartridge of claim 1, wherein the plurality of flat sides includes one flat side having a different length in comparison to at least one other of the plurality of flat sides.

7. An air filter cartridge for use within a housing assembly of an air cleaner, the filter cartridge comprising:
   a) a media pack including filter media extending from a first end to a second end and forming a tubular shape having a hollow center; and
   b) a first end cap operably arranged at the media pack first end, the first end cap including:
      i) a seal member presenting an inner radial side and an outer radial side, the inner radial side defining a seal surface having a generally polygonal shape formed by a plurality of flat sides and adjoining corner portions; and
      ii) a seal support arrangement including a plurality of support members located radially outward from the seal surface and being radially aligned with the flat sides such that the seal surface corner portions are radially aligned with gaps formed between adjacent support members.

8. The air filter cartridge of claim 7, wherein the number of gaps between the plurality of support members equals the number of seal surface corner portions such that each of the gaps is radially aligned with one of the seal surface corner portions.

9. The air filter cartridge of claim 7, wherein the seal member outer radial side defines a generally polygonal shape having a second plurality of flat sides and adjoining corner portions, and wherein the plurality of support members are located adjacent the second plurality of flat sides.

10. The air filter cartridge of claim 7, wherein an exposed portion of the plurality of support members defines an axial distal end of the filter cartridge.

11. The air filter cartridge of claim 7, wherein the seal member is formed from a first material and the plurality of support members are formed from a second material that is different from the first material.

12. The air filter cartridge of claim 7, wherein the plurality of flat sides includes one flat side having a different length in comparison to at least one other of the plurality of flat sides.

13. The air filter cartridge of claim 7, wherein each of the plurality of support members extends in an axial direction that is generally parallel with the seal surface.

14. An air filter cartridge comprising:
   a) a media pack including media defining an outer perimeter extending along a longitudinal axis between a first axial end and a second axial end; and
   b) a seal member operably arranged on the media pack, the seal member presenting a seal surface having a generally polygonal shape with flat sides and adjoining corner portions, wherein the seal surface is at least partially located between the media pack first and second axial ends, is spaced from the media pack outer perimeter, and faces in a radially inward direction towards the media pack outer perimeter.

15. The air filter cartridge of claim 14, further including a support structure including a base part and a plurality of spaced apart reinforcement members.

16. The air filter cartridge of claim 15, wherein the plurality of reinforcement members are located adjacent a radially outward facing side of the seal member and are radially aligned with the flat sides of the seal member such that gaps between adjacent reinforcement members are radially aligned with the seal surface corner portions.

17. The air filter cartridge of claim 15, wherein the support structure is formed from a first material that is different from a second material associated with the seal member.

18. The air filter cartridge of claim 15, wherein the plurality of flat sides of the seal surface have a first length and the plurality of support members have a second length that is a majority of the first length.

19. The air filter cartridge of claim 15, wherein each of the plurality of support members extend in an axial direction parallel with the seal surface.

20. The air filter cartridge of claim 14, wherein the plurality of flat sides includes one flat side having a different length in comparison to at least one other of the plurality of flat sides.

* * * * *